US006317700B1

(12) United States Patent
Bagne

(10) Patent No.: US 6,317,700 B1
(45) Date of Patent: Nov. 13, 2001

(54) COMPUTATIONAL METHOD AND SYSTEM TO PERFORM EMPIRICAL INDUCTION

(76) Inventor: Curtis A. Bagne, 2511 Tarragona Way, Troy, MI (US) 48098

( * ) Notice: Subject to any disclaimer, the term of this patent is extended or adjusted under 35 U.S.C. 154(b) by 0 days.

(21) Appl. No.: 09/470,956

(22) Filed: Dec. 22, 1999

(51) Int. Cl.[7] .................................................. G04F 10/10
(52) U.S. Cl. ........................................ 702/181; 604/890.1
(58) Field of Search .................................... 702/181, 179, 702/6, 27, 108; 703/11, 17, 22; 604/890.1, 891.1, 892.1

(56) References Cited

U.S. PATENT DOCUMENTS

| | | |
|---|---|---|
| 5,251,126 | 10/1993 | Kahn et al. . |
| 5,262,943 | 11/1993 | Thibdo et al. . |
| 5,267,139 | 11/1993 | Johnson . |
| 5,412,769 | 5/1995 | Marouka et al. . |
| 5,504,569 | 4/1996 | Kato et al. . |
| 5,544,281 | 8/1996 | Marouka et al. . |
| 5,563,983 | 10/1996 | Nozaki et al. . |
| 5,640,549 | 6/1997 | Powsner et al. . |
| 5,672,154 | 9/1997 | Sillen et al. . |
| 5,694,129 | 12/1997 | Fujinawa et al. . |
| 5,715,451 | 2/1998 | Marlin . |
| 5,742,811 | 4/1998 | Agrawal et al. . |

OTHER PUBLICATIONS

Curtis A. Bagne, Ph.D, et al., Evaluating the Effects of Drugs on Behavior and Quality of Life: An Alternative Strategy for Clinical Trials, Methodological Developments, Journal of Consulting and Clinical Psychology, 1992, vol. 60 No. 2, 225–239.

Richard C. Berchou, et al., Quantifying Treatment Effects in the Elderly, Drug Intelligence and Clinical Pharmacy, 1986, vol. 20, 460.

(List continued on next page.)

Primary Examiner—Marc S. Hoff
Assistant Examiner—Edward Raymond
(74) Attorney, Agent, or Firm—Brooks & Kushman P.C.

(57) ABSTRACT

The present invention is an improved computational method and system of empirical induction that can be used to arrive at generalized conclusions and make predictions involving longitudinal associations between and among variables and events. Empirical induction is used to gain scientific knowledge, to develop and evaluate treatments and other interventions, and to help make predictions and decisions. The invention, which is distinct from and often complementary to the statistical method, is applied to repeated measures and multiple time-series data and can be used to quantify, discover, analyze, and describe longitudinal associations for individual real and conceptual entities. Major improvements include provisions to define Boolean independent events and Boolean dependent events and to apply analysis parameters such as episode length and episode criterion for both independent and dependent variables, persistence after independent events, and delay and persistence after Boolean independent events. These improvements are in addition to levels of independent and dependent variables, delay after independent events, and provision to quantify benefit and harm across two or more dependent variables. Additional improvements include provisions to quantify longitudinal associations as functions of period or time and to compute values of predictive indices when there are two or more independent variables. Major applications and uses of the invention include data mining, the conduct of clinical trials of treatments for the management or control of chronic disorders, health-effect monitoring, the quantification and analysis internal control in adaptive systems, analyses of serial functional images, analyses of behavior and behavior modification, and use to create computerized devices and systems whose behavior can be modified by experience. The present invention is best implemented on the Internet.

104 Claims, 3 Drawing Sheets

OTHER PUBLICATIONS

Curtis A. Bagne, Ph.D, Group Comparison and Follow–up Evidence: Two Sources of Information About Treatment Effects, Journal of Clinical Research and Drug Development, 1988 vol. 2, 200.

Curtis A. Bagne, Ph.D, Clinical Pharmacoepidemiology and Benefit Scoring, Clinical Research and Pharmacoepidemiology, vol. 4, 115–116.

Curtis A. Bagne, Ph.D, The Use of Benefit/Harm Scoring to Evaluate Longitudinal Associations Between Treatment and Quality of Life: Applications to Clinical Trials, Drug Information Journal, vol. 27, 876–877.

D.F. Kraemer, et al., Monte Carlo Simulation Study of Benefit/Harm Scoring in Clinical Trials that Evaluate the Effects of Treatment on Quality of Life, Drug Information Journal, vol. 27, 877.

Curtis A. Bagne, Ph.D, Measurement of Dysregulation, Society of Biological Psychiatry, May 6–10, 1987.

Curtis A. Bagne, Ph.D, Outcome Assessment Can Be Improved By Using Measures of Longitudinal Association Between Treatment and Health, Society for Clinical Trials, May 17–20, 1987.

Curtis A. Bagne, Ph.D, Evaluating Overall Drug Utility Without Multiplicity: The Case For Benefit/Harm Scoring, Drug Information Association, Mar. 29–31, 1992.

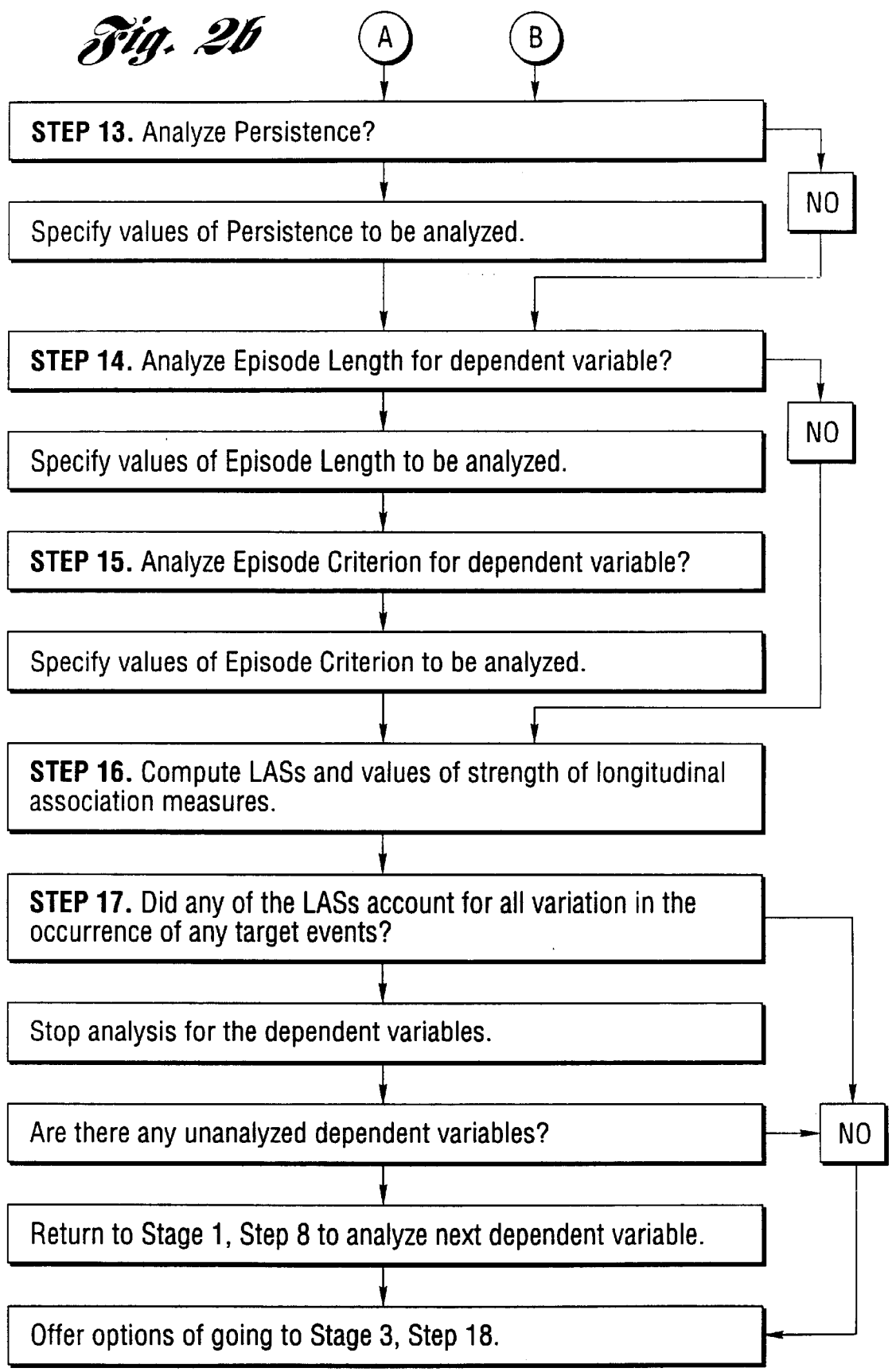

COMPUTATIONAL METHOD AND SYSTEM TO PERFORM EMPIRICAL INDUCTION

BACKGROUND OF THE INVENTION

1.1. Technical Field

This invention relates to computer-based computational methods and systems to perform empirical induction. Empirical induction involves procedures to arrive at generalized conclusions and to make predictions from data. In particular, this document addresses procedures for using repeated measures data to quantify, discover, analyze, and describe longitudinal associations between events and variables for individuals.

1.2. Description of Related Art

Statistical analysis is the prevailing computational method to perform empirical induction. Empirical induction is used to gain scientific knowledge, to develop and evaluate treatments and other interventions, and to help make predictions and decisions. This document focuses on empirical induction about patterns of association between and among variables.

Computational methods and systems of empirical induction are designed to provide high quality generalized conclusions and predictions. Generalized conclusions and predictions based on generalized conclusions are considered to be of high quality when they meet four criteria. First, the generalized conclusions and predictions are of high quality when they are based on observation and experience that is recorded as data that can be shared. Second, the generalized conclusions and predictions are of high quality when the data are properly analyzed by computational procedures that can be specified in detailed protocols, the protocols making the procedures transparent. Third, the generalized conclusions and predictions are of high quality when application of the protocols to the data yield results that can be reliably repeated by the same investigator and reproduced by other investigators. Fourth, the generalized conclusions and predictions are of high quality when they are not apt to be falsifiable by new or additional data.

The Appendix is an outline that helps reveal the logical structure of this document. Section 2.9 defines many terms used in this document.

1.2.1. Fundamental Limitations of the Statistical Method and a Derivative Nexus of Problems and Needs This section identifies four fundamental limitations of the statistical method and illustrates a common set of conditions under which these limitations lead to a nexus of related problems and needs. This section also offers a prime example of how the nexus of problems and needs hinders progress in science, some professions, and the advancement of human welfare.

There are two major research strategies for investigating individuals. First, individuals can be investigated directly as individuals. Second, individuals can be investigated indirectly as members of groups or collective entities. The statistical method primarily is a component of the second research strategy. The statistical method includes descriptive statistics for describing groups and populations as well as inferential statistics. Inferential statistics uses statistical descriptions of statistical samples to make inferences about populations.

The first fundamental limitation is that the statistical method is not well suited to perform empirical induction for individuals. In other words, the statistical method often is not well suited to provide high quality generalized conclusions about and predictions for individuals. For example, the value of a statistical measure such as a group mean may not describe any individual member of the group.

It is possible for applications of both the direct and the indirect research strategies for investigating individuals to arrive at similar high quality generalized conclusions and predictions. However, conditions suitable for the achievement of similar high quality generalized conclusions and predictions with the two different research strategies often do not obtain.

Conditions not favorable for similar high quality generalized conclusions and predictions with the direct and indirect research strategies for investigating individuals can be illustrated in the context of medicine. Investigations of phenomena in which individuals could be investigated either directly as individuals or indirectly as members of groups could be expected to arrive at similar high quality generalized conclusions about individuals if individual patients were clones with identical histories. Problems arise in clinical research and medicine because patients are not clones with identical histories. In areas of investigation such as medicine, it is perfectly possible for applications of the statistical method to arrive at high quality generalized conclusions about groups and high quality inferences about populations but low quality predictions for individual members of the groups or populations. For example, individual patients may not respond to a treatment in the same way that most patients in a group respond to the treatment.

The first fundamental limitation of the statistical method has two parts. The first part of the first limitation is that the statistical method is not well suited to be applied during investigations of unique individuals. Individuals can be unique either because they are so particular or unique because they are so inclusive. Individual patients with particular genomes and histories are unique because they are so particular. The world economy, the worldwide investment market, and the worldwide health-related environmental system are each unique because each is so inclusive.

The second part of the first fundamental limitation of the statistical method is that the statistical method is not well suited to reveal that which may make individual group members different with respect to associations between and among variables. Without recognizing that which may make individual group members different, it is difficult to develop the classification systems that help make the statistical method useful. The classification systems at issue are, for example, classifications of medical disorders that can be applied to form more homogeneous groups of individuals for investigations and to predict responses of individual patients to treatments.

The second fundamental limitation is that the statistical method is not well suited to arrive at high quality generalized conclusions about longitudinal associations or to make high quality predictions about longitudinal associations. Longitudinal associations are quantified within individuals. The quantification of longitudinal associations would help enable investigations of dynamic functioning including the internal and external control of individuals.

The statistical method is well suited to arrive at high quality generalized conclusions about cross-sectional associations. Cross-sectional associations are quantified across individuals for particular variables effectively at particular times. But generalizations about associations do not have to be generalizations across individuals for particular variables to be generalizations. Generalizations about associations can be generalizations across variables and over time for particular individuals. For example, it is a generalization for an individual to conclude that her allergy symptoms generally get worse after she pets a cat and rubs her eyes.

Biotechnology is making rapid progress in identifying that which makes individuals different in terms of genetic characteristics that are relatively stable over time. It could also be valuable to identify that which makes individuals different in terms of dynamic functioning, functioning that can involve longitudinal associations between the products of genetic expression that fluctuate in level over time.

The limitation of the statistical method for quantifying longitudinal associations, together with the almost exclusive role of the statistical method as a computational method of empirical induction, appears to be the reason why there are so few investigations of longitudinal associations in, for example, the medical literature.

The third fundamental limitation is that the statistical method is not well suited to investigate complexity and multidimensionality. The capability to investigate multidimensionality would allow simultaneous investigations of many variables that can affect generalized conclusions and predictions. The clinical research literature makes references to the curse of multidimensionality. Researchers seeking to satisfy the needs of decision-makers for more detailed information often bemoan situations in which there seem to be more variables that need to be investigated than research subjects to investigate. For areas of research and practice such as medicine, the differences among patients that affect outcomes are more apt to be identified when many variables are examined in detail. Complexity often appears to increase the need to investigate individuals directly as individuals.

Rapidly emerging discoveries are increasing the need for more detailed information about associations and predictors of association. For example, many genetic polymorphisms affect the ways drugs act on bodies and the way bodies act on drugs.

The fourth fundamental limitation of the statistical method can be considered as a corollary of the first three limitations. The statistical method is not well suited for detailed investigations of changing individuals and the emergence of individuals that are unique. Change and emergence often becomes evident in the detailed ways that individuals function, in the ways that individuals are controlled, and in the ways that individuals control themselves.

Aging is one way that individuals change. "Aging" often refers to a variety of changes including changes in dynamic functioning. Although the statistical method is well suited to investigate certain differences between and among groups of individuals of different ages, it is not well suited to investigate change, emergence, and changes of dynamic functioning within individuals.

There are other ways that individuals can change. Individuals develop. Patients may become sensitized or desensitized to the effects of drugs or dependent on the effects of drugs. People may adapt or make the most of disabilities. Animals habituate to stimuli. People learn.

Emergence is change that creates unique entities. Individuals such as people, economies, and investment markets can change to become emergent entities that are unique and function in new ways. As examples, a person may come to function in new ways after a unique lifetime of learning, experience, and thought. People acting on knowledge about predictive associations may change the way economies and investment markets function. Discovery and knowledge of some associations can affect the associations themselves as people act on the knowledge.

In brief, the statistical method is limited as a means to perform empirical induction for individuals. The statistical method is of limited value for investigations of unique individuals and to help reveal that which may make individuals different. The statistical method is limited for investigations of how individuals control themselves and how environments control the dynamic functioning of individuals. The statistical method also is limited for detailed investigations of complexity and of how individuals change in the way they function.

These limitations, together with the prevailing role of the statistical method as a computational and scientific means to perform empirical induction, lead to a nexus of many specific limitations, problems, and needs. The concept of a nexus is used to indicate that the specific limitations, problems, and needs should be considered as a set of related members that can be addressed by a common solution.

This document will identify and address some components of the nexus of problems and needs in the context of applying correlation coefficients and other statistical measures of association to perform empirical induction directly for individuals, which is the first research strategy. This document also will identify and address additional components of the nexus in the context of group clinical trials which investigate individuals indirectly as members of groups, which is the second research strategy.

Here is a prime example of how the nexus of problems and needs hinders progress in science, professions such as medicine that tend to be grounded in science, and the advancement of human welfare.

Conventional clinical research procedures that use the statistical method almost exclusively as a computational method of empirical induction are not well suited to help realize the full potential of biotechnology. Emerging developments related to biotechnology include genotyping and gene expression monitoring, combinatorial chemistry, and rational drug design. Such developments can be viewed as tools for creating biotechnology products that can be targeted more effectively to meet specific medical needs that have been identified for individual patients.

Biotechnology is creating many potential therapeutic products that need to be evaluated. Biotechnology also is setting new milestones for identifying that which makes individuals different and unique in terms of genetic and other characteristics that are relevant and important to treatment decisions. In contrast, clinical research, which currently uses the statistical method almost exclusively as a computational method of empirical induction, works best to investigate that which individual group members have in common. As a result of emphasizing commonality, the statistical method is not well suited to exploit one of the major strengths of biotechnology, namely the capability of biotechnology to provide information about that which makes individuals different or unique.

Conventional clinical research study designs and procedures, which are best suited to investigate that which individual group members have in common, are not effective and efficient for targeting the development and use of biotechnology products to patients who could benefit and away from patients who could be harmed. This problem with conventional clinical research study designs and procedures currently may well be the major correctable factor limiting the achievement of biotechnology's potential to improve human welfare.

Despite its limitations, the statistical method itself is not the problem. The problems herein addressed generally occur for one of two reasons. First, the statistical method is applied to investigations for which it is not best suited, generally for lack of a computational method of empirical induction for investigating individuals directly. Second, the statistical method is applied without also applying a computational method and system specifically designed to provide high quality measures of longitudinal association for individuals as well as for conducting investigations of changing and emergent entities.

1.2.1.1. Limitations of Correlation Coefficients

Correlation coefficients and other conventional measures of association are part of the statistical method. Conventional measures of association are best suited to perform empirical induction for groups. Statistical measures of association were developed primarily to provide quantitative descriptions of cross-sectional associations between variables measured on single occasions for each individual belonging to a group of two or more individuals. Often, the groups are considered to be samples and statistical tests are used to make inferences about associations in populations.

Statistical measures of association are of limited value when there is need to analyze repeated measures data to investigate longitudinal associations for individuals. One limitation is that correlation coefficients can have their maximum absolute value when there are only two repeated measurements of the variables. It is a problem for two measurements to yield the maximum absolute value of 1 because two repeated measurements can provide only a very limited amount of evidence for a longitudinal association.

Correlation coefficients often are tested statistically to investigate evidence for associations. But another limitation is that it is a problem to statistically test correlation coefficients to investigate longitudinal associations using repeated measures data because repeated measurements of particular variables often are themselves correlated. Because such limitations are widely recognized and for lack of a better alternative, longitudinal associations often are investigated by subjective impressions rather than analyzed with statistical measures of association such as correlation coefficients.

The term "subjective impressions" is used in this document to refer to ideas about associations between and among variables that are based on experience but not obtained by applying computational methods of empirical induction to data. People often form subjective impressions about longitudinal associations for individuals.

Here are two examples in which investigators often rely on subjective impressions about longitudinal associations for individuals. These examples support the need for a new computational method of empirical induction. First, clinicians usually rely on subjective impressions about the responses of individual patients to treatments used to manage or control chronic disorders. Current computerized medical records and systems that present patient monitoring data from intensive care often chart the values of multiple treatment and health related measures for individual patients on graphs with a common time axis. But clinicians are left to form subjective impressions about the longitudinal associations that may be investigated to guide treatment decisions and to make prognostic statements.

The second example is that people often form subjective impressions about longitudinal associations involving time-series data for investment markets and economies, individuals that are unique because of their inclusiveness. Current investment charting software often graphs multiple time-series data but investors, advisors, fund managers, and researchers are left to form subjective impressions about longitudinal associations that can be investigated to guide investment decisions and provide knowledge about how economies and investment markets work.

Many problems arise when associations are investigated solely by forming subjective impressions. Subjective impressions seldom are precise. In addition, subjective impressions have limited repeatability by the same investigators and limited reproducibility across investigators forming the subjective impressions.

Subjective impressions can be based either on subjective experience or data. Subjective impressions that are based on data are soft analyses. Soft analyses are carried out with procedures not specified in detailed protocols that specify computational procedures, protocols that can be shared to make the procedures transparent and procedures that can be performed using computers to obtain the same results in a repeatable and reproducible manner.

Many common conditions make it difficult for people to achieve high precision, repeatability, and reproducibility while forming subjective impressions about longitudinal associations. These conditions include the need for impressions to account for episodes of events as well as delays and persistencies in associations between and among variables.

Another common condition that makes it difficult to form precise, repeatable, and reproducible subjective impressions occurs when target outcomes such as health have many components, components that can vary in importance in ways that may be unspecified. For example, internists may consider the blood pressure lowering effects of a drug to be most important, psychiatrists may consider the effects of the same drug on human functioning and mental health to be most important, and patients may use still other importance weights based on their hopes and personal preferences.

It also is difficult to achieve high precision, repeatability, and reproducibility by subjective impressions when many independent variables or predictors have an effect on target events or dependent variables, when the individual predictors vary in predictive power, and when independent variables or predictors interact in various ways.

Additional problems arise from reliance on subjective impressions about longitudinal associations. Preparation to form impressions requires valuable time. The quality of subjective impressions, and those affected by subjective impressions, may suffer when experts are not readily available. Reliance on subjective impressions may limit accountability for services such as medical care. In some cases such as medicine, reliance on subjective impressions may forestall collecting and analyzing data that could contribute to the development of the cumulative systematic experience that is a hallmark of science.

Many problems cited in this and the following sections about clinical trials can be traced to a lack of adequate computational methods and systems to quantify, discover, analyze, and describe longitudinal associations between and among variables. This lack of adequate measures of longitudinal association appears to be a major impediment to progress in many sciences and professions. Here are two examples.

Many complex systems, including living things, regulate themselves internally and adapt to their environments. Yet there do not appear to be any widely accepted methods for measuring internal control and adaptation in many contexts, as internal control becomes evident in the form of longitudinal associations between and among variables measured repeatedly over time for individuals. This lack of adequate measures limits scientific progress, the evaluation of interventions that affect internal control, and the value achieved from measurement and information technologies that are emerging in areas such as health monitoring and serial functional imaging.

The second example involves behavior. Behavior can be conceptualized as a means of system regulation and control that involves associations between stimuli and responses. Learning and conditioning, both forms of behavior modification, can be viewed as changes in these associations between stimuli and responses as individual systems adapt to environmental contingencies. There is need for new options to quantify such associations and contingencies as they become evident over time for individuals.

1.2.1.2. Limitations of Conventional Group Clinical Trial Designs and Procedures This document uses group clinical trials as an example of a rather highly developed application of the statistical method to an important area of investigation. Clinical trials herein represent the way the statistical method is applied for additional areas of experimental investigation.

The groups referred to by "group clinical trials" are collective entities, classes of two or more individuals. The individuals in the groups or classes are expected to meet certain conditions specified in inclusion and exclusion criteria, criteria that generally make reference to classifications of medical disorders.

Group clinical trials are an example of the second research strategy identified in Section 1.2.1. Individuals are investigated indirectly as members of groups.

Conventional group clinical trials are conducted without also applying the computational method and system for empirical induction that is the object of this document. Statistics in conventional group clinical trials are used to test measures of health. The alternative is to test measures of apparent benefit and harm with respect to health measures. Measures of benefit and harm can be computed by quantifying longitudinal associations between treatment and health for individual patients.

Group clinical trials that are conducted without also applying the present invention are subject to the limitations of the statistical method that were identified in Section 1.2.1. As a result, clinical trials for many treatments are unnecessarily limited in achieving their primary objectives.

The primary objectives of clinical trials are to help develop safe and effective treatments such as drugs and to provide information that can be used to improve care and outcomes for individual patients in clinical practice. Group clinical trials are a good example for presenting this invention because one important function of group clinical trials is to guide decision-making for individual patients.

Conventional clinical trial designs and procedures embody a nexus of many related problems and needs. This nexus hampers achievement of the objectives for many clinical trials. This nexus of problems and needs can be largely overcome for a large and important class of clinical trials, namely trials of many treatments such as drugs that are used to manage or control chronic physical and mental disorders.

Drug treatments to manage or control chronic disorders are distinguished herein from treatments intended to cure. These two classes of treatments are distinguished by a characteristic of best use that helps determine whether or not this invention can be applied to major advantage for the conduct of clinical trials. This characteristic is whether or not the treatments can be made to vary over time for individuals or, similarly, if there are repeated episodes of treatment.

Drugs such as antibiotics that are intended to cure usually are administered in single relatively short episodes for purposes such as eliminating pathogens. Drugs intended to cure, especially after single relatively short episodes of treatment, generally would not be evaluated with this invention. Similarly, the present invention would not be suitable for primary evaluations of surgical procedures.

In contrast, treatments for the management and control of chronic disorders usually are administered over relatively long periods of time to provide ongoing control of signs, symptoms, or pathogens. The present invention offers major advantages for evaluating treatments for the management and control of chronic disorders.

The doses of treatments for the management of chronic disorders often are changed to some degree for gathering information to help determine if treatment should be continued with higher doses, lower doses, or if treatment should be continued at all. Information about how health changes in relation to how treatments change for individual patients can be used to quantify longitudinal associations that indicate treatment effects.

All subsequent sections of this document that address clinical trials address clinical trials in the context of treatments to manage or control chronic disorders.

1.2.1.2.1. The Targeting Problem in Clinical Trials

One major limitation that conventional group clinical trial designs and procedures have in achieving their primary objectives will be referred to as the targeting problem. Targeting consists of identifying the indications and the contraindications for specific treatments. Poor targeting is a problem both for drug development and for clinical practice.

The targeting problem often makes it difficult to target potential treatments to the right patients during drug development. Poor targeting hinders drug development and can prevent marketing approval of drugs that might be approved if the drugs could be targeted more effectively.

Poor targeting in clinical practice means that too many patients receive treatments that are harmful and not enough patients receive the most beneficial treatments. Poor targeting in clinical practice often results because patients' treatments are not individualized or personalized when individual patients are treated as if they were average patients in heterogeneous groups.

Targeting during both treatment development and clinical practice is especially important when patients and disorders are heterogeneous and when treatment options are numerous and diverse. Many chronic disorders and the patients who experience these disorders are unique or different from average patients in ways that affect responses to treatments.

The failure to target more effectively during drug development and clinical practice is costly, both economically in terms of the costs of drug development and ineffective treatment as well as in terms of human welfare.

1.2.1.2.1.1. The Need to Identify Treatment Responders, Placebo Responders, and Predictors of Differential Response Responders, in the context of clinical trials, are patients for whom changes in health are associated with changes in treatment. Associations may not indicate that treatments under investigation cause the changes in health. In addition, associations can be weak. Some responders may be treatment responders. Treatment responders are patients for whom it is reasonable to conclude that a specific treatment causes a specific response.

Some responders may be placebo responders. Placebo responders are patients who have responded to variables other than the treatments being evaluated. It is important to remember that placebo responders are responders even though the category "placebo responder" generally is used as a wastebasket for patients considered to be problems because they appear to have responded to variables other than the treatments of interest. Investigators seldom specify, control, and account for variables that cause placebo response.

One major factor that contributes to the targeting problem is that conventional group clinical trial designs and procedures do not distinguish treatment responders from placebo responders. Here is an example of this problem that involves drug treatments for clinical depression.

There are many antidepressant drugs that could be expected to have different effects for various classes of patients because the drugs appear to work by several quite different mechanisms of action. Yet it is often noted that many clinical trials that evaluate different antidepressants appear to yield quite similar results. About ⅓ of the patients appear to be placebo responders, about an additional ⅓ appear to be treatment responders, and about the remaining ⅓ do not appear to respond at all. This means that the responders are a heterogeneous group. About ½ of the responders are placebo responders and ½ of the responders are treatment responders.

The problems created by the failure of conventional group clinical trial designs and procedures to distinguish treatment responders from placebo responders are compounded by other important facts. Health is multidimensional, health is affected by many variables including treatments, and there often is more than one way to bring about a particular health response. It is perfectly possible for a patient to be a treatment responder with respect to one health variable, a placebo responder with respect to another health variable, and to be both a treatment responder and a placebo responder with respect to a particular health variable. As an example of the latter, it is perfectly possible for both a patient's relationship with his psychiatrist and the antidepressant prescribed by the psychiatrist to be therapeutic. The answers to many questions about treatment and placebo response are likely to be treatment, patient, and health variable specific, all at the same time.

Without answering questions about which patients respond to which treatments with which responses, it is difficult to identify predictors of treatment response, predictors of placebo response, and predictors that differentiate treatment response from placebo response. Failures to answer questions about which patients respond to which treatments with which responses are major contributors to the targeting problem in clinical trials.

1.2.1.2.1.2. The Need for Both Detailed and Comprehensive Information

In order to address the targeting problem more effectively, clinical trials need to provide information about treatment effects that is both detailed and comprehensive. The information needs to be detailed in order to match specific effects of different treatments with specific signs, symptoms, and other indications and contra-indications for individual patients.

The information for targeting also needs to be comprehensive because decision-makers pick and choose treatments rather than the effects of treatments. Choosing a treatment for an individual generally means choosing all of its effects for that individual, both beneficial and harmful. More comprehensive treatment evaluations provide information about more of the effects of particular treatments.

Unfortunately, conventional clinical trial designs and procedures make it difficult for treatment evaluations to be both detailed and comprehensive. The more comprehensive evaluations tend to lack detail. Evaluations that provide detail tend to lack comprehensiveness.

Conventional procedures that limit the number of health variables that can be evaluated in particular trials foster controversy about which health variables should be measured or, if measured, which variables should be analyzed as primary variables. The lack of widely accepted comprehensive measures of responses to treatments provides opportunities for those who conduct or sponsor clinical trials to pick and choose health variables in accord with any interests in making treatments look good or bad. In addition, conventional designs and procedures are not well suited to identify treatment effect factors, which are clusters of health variables that are affected similarly by treatments. Identification of such factors could support more rational decisions about how to use scarce resources for measuring health in clinical trials.

The following sections identify four strategies to address the targeting problem as these strategies involve the need for detailed and comprehensive information from treatment evaluations. Each of these strategies has certain problems and limitations. Some strategies raise additional related problems.

1.2.1.2.1.2.1. The Need for Many Analyses and the Problem of Many Tests

The first strategy for achieving treatment evaluations that are both detailed and comprehensive is to perform many statistical tests as part of particular clinical trials. For example, a statistical test may be performed on each of many health variables. This strategy creates problems. The use of many statistical tests in the conduct of particular trials makes it difficult to interpret the statistical significance of any of the tests.

The need for many analyses goes beyond the need to evaluate the effects of treatments on many health variables. In addition, it often would be helpful to evaluate dose-response relationships, delays and persistencies in responses to treatments, episodes of treatments and of responses, as well as Boolean independent events and Boolean dependent events. Such additional analyses can be problematic when they call for many statistical tests.

1.2.1.2.1.2.2. Some Problems with Multivariate Analyses

The second strategy for achieving treatment evaluations that are both detailed and comprehensive is to apply multivariate analyses that evaluate several health variables with one statistical test. One problem is that multivariate analyses, such as analyses based on the multivariate normal distribution, often require that certain assumptions be met in order for the statistical tests to yield valid results. Very often these assumptions are difficult to evaluate and unlikely to be met.

Multivariate analyses appear to have other limitations. They may not be appropriate when many health measures vary in importance and when the measures are used in attempts to achieve more comprehensive evaluations of both efficacy and safety. In addition, multivariate analyses may not be appropriate to evaluate dose-response relationships, delays and persistencies in responses to treatments, episodes of treatments and responses, as well as complex independent and dependent events that can be defined with Boolean operators.

1.2.1.2.1.2.3. The Aggregation Problem with Composite Health Measures

The third strategy for achieving treatment evaluations that are both detailed and comprehensive is to develop composite health measures, which have multiple health components. One use of composite measures is to evaluate treatments for heterogeneous disorders for which diagnostic requirements often include statements of the following form: The patient must experience at least 5 of 8 specific symptoms. Composite health measures include rating scales for disorders such as clinical depression and anxiety.

Current composite health measures for particular indications tend to achieve a degree of comprehensiveness that is limited primarily to efficacy. One problem is that this comprehensiveness is achieved by aggregating information across components before the information is analyzed. Aggregation across components before analysis of treatment effects tends to obscure detail about benefit and harm with respect to the different components and for different patients and subgroups of patients.

1.2.1.2.1.2.3.1. The Weighting Problem for Composite Health Measures

Composite health measures also raise a very important cluster of problems in treatment evaluation that will be called the weighting problem. The weighting problem involves the relative importance of the various effects of treatments. Section 1.2.1.1 includes an illustration of the weighting problem for a blood pressure lowering drug. The weighting problem will be introduced by identifying two primary issues that need to be distinguished in treatment evaluations.

Treatment evaluations generally involve two primary issues. These issues can be addressed by answering two distinct questions. The first question addresses the basic scientific issue: What are the health effects of particular treatments? The second question addresses the applied scientific or valuation issue: How do decision-makers and patients value the various health effects of particular treatments? The valuation issue can be addressed with importance weights, which quantify the relative value of treatment effects with respect to different health variables. Importance weights may vary by person, culture, society, and medical specialty in accord with things such as personal values and preferences, assessments of clinical significance, and social values such as functioning well in social roles including productivity of patients at work.

One problem derives from the fact that conventional clinical trial procedures are not well suited to use explicit importance weights. This lack of usefulness of explicit importance weights with conventional procedures tends to limit research on the best ways to elicit or otherwise determine importance weights, the determination of the importance weights themselves, and the use of importance weights or preference measures that are available.

Very often, investigators use implicit importance weights. Implicit importance weights add a major subjective component to treatment evaluations and appear to be a source of much controversy about the benefit and harm of particular treatments (Section 1.2.1.2.3).

Conventional designs and procedures for treatment evaluation tend to confound the basic scientific issue with the valuation issue. This confounding can occur when implicit importance weights drive the basic scientific investigation by affecting, for example, what health variables are measured or what variables are the objects of primary analyses in clinical trials. One factor that contributes to this confounding is that conventional designs and procedures are limited in their ability to use many dependent or health variables simultaneously to achieve more comprehensive treatment evaluations. Because of this limitation, the selection of health variables may be more restrictive and dependent on importance weights than it may need to be for other reasons such as limited time or resources to measure health. Also, because conventional procedures for simultaneous analyses of repeated measures data for many health variables are limited, many clinical trials use scarce resources to collect much data in attempts to be more comprehensive without extracting much value from these data during analyses.

Another problem is that scoring procedures for composite health measures generally use importance weights that are explicit but fixed. Fixed weights make it difficult to rerun analyses of treatment effects using different importance weights for different decision-makers, individual patients, or groups of patients.

1.2.1.2.1.2.4. Some Problems Involving Hierarchies of Health Measures

The fourth strategy involving comprehensiveness and detail in treatment evaluations concerns hierarchical levels for measuring health and treatment effects. One example of a hierarchy of health measures has the following levels from low to high: laboratory measures, signs and symptoms, mental and physical functioning, general health perceptions, and quality of life.

Conventional clinical trial procedures tend to confound issues concerning comprehensiveness and detail in treatment evaluations with issues concerning levels of measurement of health and treatment effects. This confounding of issues can occur when investigators shift to different levels of health measurement in order to achieve treatment evaluations that are either more detailed or more comprehensive. The alternative to this shifting is to achieve more detail or comprehensiveness at a particular level of measurement. This confounding of issues involving levels of health measurement with degrees of detail and comprehensiveness derives from the notion of a hierarchy itself.

Higher levels in health measurement hierarchies often are thought to encompass and summarize the combined contributions of multiple components at lower levels. For example, general quality of life measures often are considered to provide common metrics that encompass the combined beneficial and harmful effects of diverse treatments with respect to measures at lower levels in the hierarchy such as many signs, symptoms, and laboratory measures. Thus one way to achieve more comprehensive treatment evaluations is to shift to health measures at higher levels in the hierarchy. While often useful for achieving more comprehensive evaluations, this strategy has important limitations. One limitation is that treatment evaluations that are more comprehensive because they use higher levels of health measurement often do not provide the detailed information about specific signs and symptoms that is needed to address the targeting problem (Section 1.2.1.2.1).

Another limitation of using higher-level health measures in medical treatment evaluations is that higher-level measures often are affected by variables outside the domain of medicine. For example, environmental, social, economic, spiritual and personality factors may affect scores obtained with quality of life rating scales. Variability in these factors during the course of treatment can add variability to the measures used in treatment evaluation. This variability appears to make it more difficult to achieve statistical significance with the higher level measures as compared to the lower level health measures.

A related problem is that conventional clinical trial procedures are not well suited to investigate relationships involving health measures at different levels in a hierarchy. Without elucidating relationships among health measures at different levels, it is difficult to determine the extent to which, for example, quality of life is related to more traditional health measures such as laboratory values and ratings of symptom severity.

Some measures are identified as measures of health-related quality of life. To some extent, these measures often require patients to judge how much their quality of life is affected by health as distinct from other conditions that can affect quality of life. Without more adequate procedures for investigating across-level relationships involving more traditional health measures as well as other factors that affect quality of life, it is difficult to determine the accuracy of patient impressions about how health affects their quality of life. The accuracy of these impressions may affect the validity of some health-related quality of life measures.

1.2.1.2.1.2.5. Some Problems Involving the Separation of Safety and Efficacy Evaluations Conventional clinical trial procedures and regulatory agency guidelines for drug development often separate safety evaluations from efficacy evaluations of particular treatments. This conventional practice appears to be a problem for at least four primary reasons.

The first reason why the separation of safety and efficacy evaluations appears to be a problem is that this practice can impede the development of classification systems for medical disorders. It would appear those medical classification systems intended primarily to guide treatment evaluations and treatment decisions should account for variables predictive of both benefit and harm. This consideration appears to call for more comprehensive medical classification systems. For example, such classifications may need to account for genetic polymorhpisms that affect drug metabolism.

The second reason why separation of safety and efficacy evaluations appears to be a problem is that this practice tends to limit fair and comprehensive treatment evaluations. The reason for this problem is that the conventional practice tends to neglect beneficial effects with respect to health variables considered for safety evaluations. A number of treatments have been developed for new indications, said treatment development projects being initiated by observations of side effects.

The third reason why separation of safety and efficacy evaluations appears to be a problem is that conventional procedures for safety evaluations generally set lower standards for data collection and data analysis than the standards for efficacy evaluations.

Conventional safety evaluation procedures tend to limit the collection of standardized and detailed data about treatment effects. Standardization would be facilitated by systematic elicitation of information about signs, symptoms and other measures that may be affected by treatment. Failure to use systematic elicitation during collection of data on health can introduce variability into treatment evaluation procedures. This variability derives from differences in the personalities, motivations, and diligence of patients and investigators who may or may not provide, elicit, and report information about adverse events. Paradoxically, systematic elicitation and collection of information often is sought and encouraged for efficacy evaluations but avoided and discouraged for safety evaluations.

Standards of data analysis for safety evaluations often are lower than standards for efficacy evaluations. For example, one or a few efficacy variables often are analyzed by inferential statistical analyses while multitudes of safety variables are partially analyzed and presented for descriptive purposes only. In addition, limitations in the methods for analyzing safety data often limit procedures for eliciting data about safety variables. A primary reason systematic elicitation often is discouraged during evaluations of safety is that the data are analyzed by examining event rates. Systematic elicitation tends to produce higher event rates than spontaneous report. High event rates in conventional safety evaluations tend to make treatments look bad.

The fourth reason why separation of safety and efficacy evaluations appears to be a problem is that conventional procedures for combining generalized conclusions about efficacy with generalized conclusions about safety are quite limited. For this reason, the overall benefit and harm of treatments often is evaluated by subjective impressions (Section 1.2.1.2.3).

1.2.1.2.1.3. The Need to Use Early Responses to Predict Later Responses

There often is need in treatment evaluations to use the limited information that is currently available to predict longer-term responses. Such predictions can be used both during clinical practice and clinical trials to help minimize harm and maximize benefit. Here are three examples of this need.

Benefits with respect to primary target symptoms for some treatments are delayed substantially. In such cases, benefit with respect to some other measures may occur earlier and predict longer-term improvement. Many treatments, such as those used to lower blood pressure and change the concentrations of lipid fractions including cholesterol components are administered primarily to reduce longer-term risks of events such as major cardiovascular events or death. Particular short-term changes in liver enzymes may or may not predict longer-term events such as liver failure.

Quantitative monitoring procedures that can be applied sequentially are needed to predict the benefit and harm of treatments, procedures that are less reliant on subjective impressions and human vigilance.

1.2.1.2.1.4. The Classification Problem

Classifications of medical disorders are useful tools for matching individual patients with particular treatments in clinical practice and for targeting the development of new treatments. However, classifications such as the Diagnostic and Statistical Manual for Mental Disorders need to be used with caution while developing treatments for many heterogeneous chronic disorders. A potential problem will be briefly illustrated in the context of clinical depression and anxiety.

Clinical depression and anxiety are syndromes that involve many symptoms that often vary over time within patients. In addition, although the two diagnoses often are sufficiently distinct to be useful, there appear to be many patients with mixed varieties of anxiety and depression in which symptoms of the two diagnoses overlap. This state of affairs can complicate and hinder the development of new treatments such as drugs.

The classification problem can become evident in drug development because established treatments with particular profiles of benefit/harm across the spectrum of anxiety and depression symptoms tend to validate diagnostic conventions. This can impose a bias against regulatory agency approval of new drugs that have non-conventional profiles of benefit/harm across the same range of symptoms. This bias against new treatments can arise if new treatments with comparable or superior benefit/harm over or across a particular range of health measures are also required to demonstrate comparable or superior benefit/harm in accord with conventional diagnostic conventions. This problem can be illustrated with a simple hypothetical example.

Suppose symptoms A and B are part of the conventional requirements of an indication for treatment of depression and that symptoms C and D are part of the conventional requirements of an indication for treatment of anxiety. Suppose drug X was approved for the treatment of depression based on clinical trials that used a composite efficacy measure based on symptoms A and B. Similarly, drug Y was approved for the treatment of anxiety based on clinical trials that used a composite efficacy measure based on symptoms C and D. Now comes drug Z that is effective for the treatment of symptoms B and C. Assume that all four symptoms are equally important, that the beneficial effects of each drug on the symptoms it is effective in treating are equal in magnitude, that the three treatments are comparable in all other respects, and that there are many patients who need treatment for the combination of symptoms B and C. Further suppose that drug X has no effect on symptoms C and D, that drug Y has no effect on symptoms A and B, and that drug Z has no effect on symptoms A and D. Conventional drug evaluation procedures and guidelines could make it difficult to gain regulatory agency approval of drug Z because its profile of benefit/harm across symptoms is novel.

1.2.1.2.2. The Efficiency Problem in Clinical Trials

Another cluster of difficulties in the broader nexus will be called the efficiency problem. This problem involves the efficiency of using scarce resources to achieve clinical trial objectives such as obtaining statistical significance for treatments that have clinically significant effects as well as identifying subgroups of responders and indicators of differential response. Resources that often need to be used efficiently include patients, tests, money, and time.

The efficiency problem often involves tradeoffs between using resources for intensive versus extensive clinical trial designs. Conventional clinical trials rely primarily on what have been called extensive clinical trial designs. Designs tend to be extensive when they rely on relatively large numbers of patients and gain value from relatively small amounts of data from each patient. In contrast, intensive designs collect and gain value from more data, including larger numbers of repeated measurements, from each patient and tend to rely on smaller numbers of patients. Both types of design have important roles in clinical research.

One problem is that conventional extensive clinical trial designs are seldom an efficient way to achieve clinical trial objectives for treatments intended for the management and control of chronic disorders. Conventional extensive designs are particularly problematic when there is need to evaluate treatments for rare disorders and unusual patients. Patients with particular genomes and histories are unusual individuals. Treatments for rare disorders include orphan drugs.

The efficiency problem involves several components including unreliable measures of treatment and health, using independent variables as within patient variables, baselines, and missing data.

1.2.1.2.2.1. Problems that Derive from Unreliable Measures of Treatment and Health A major factor contributing to the efficiency problem is that most measures of treatment and health have limited reliability. The limited reliability of health measures increases clinical trial sample size requirements when health measures are tested statistically. The limited reliability of treatment measures hinders exploratory analyses involving actual doses as well as the amounts of drug and drug metabolites in bodily fluids.

Despite careful and extensive development efforts, many health measures at all levels of health measurement hierarchies have limited reliability. One conventional way to increase the reliability of measures that are tested statistically is to test other measures whose values are computed from values of repeated measurements obtained with the relatively unreliable health measures. For example, some clinical trials test means of repeated health measurements, one mean for each individual. Another example is to test the slopes of regression lines through series of repeated health measurements obtained for each of the individuals from baseline through endpoint. One problem is that such procedures treat the variability of the repeated health measures as random error of measurement, which may not be true. For example, variability might be due to delayed responses to changes in treatments and other independent variables.

1.2.1.2.2.2. Problems Related to Limitations in Using Independent Variables as Within Patient Variables Another major part of the efficiency problem is that conventional procedures for using repeated measurements to increase the reliability of health measures are not appropriate for evaluating treatment effects when independent variables such as dose are changing over time within patients. This, in turn, contributes to other problems such as the failure of conventional clinical trial designs and procedures to yield valid within patient measures of apparent benefit and harm.

Additional problems derive from limitations in using independent variables as within patient variables. For example, this limitation makes it difficult to evaluate dose-response relationships for individual patients by computational methods. It also results in failures to use potentially valuable information about dose when patients are gradually increased to higher doses because of safety concerns. Similarly, the limitation in using independent variables as within patient variables makes it difficult to develop scientifically rigorous clinical trial designs that allow optimization of doses for individual patients.

Limitations in using independent variables as within patient variables also make it difficult to conduct various exploratory analyses that have the potential to yield valuable information. Here are two examples. Very often, actual doses consumed by patients vary from the planned doses specified in clinical trial protocols. In addition, concentrations of drug and drug metabolites in bodily fluids often vary substantially even when different patients actually consume the same dose. Conventional clinical trial procedures make it difficult to reanalyze clinical trial results after substituting actual doses or concentrations of drug or of drug metabolites in bodily fluids for the planned doses specified in clinical trial protocols.

1.2.1.2.2.3. The Baseline Problem

Investigators using conventional clinical trial designs and procedures often attempt to identify or establish stable baselines. Values of dependent variables measured at baselines often become reference points for evaluating subsequent health effects of treatments. Here are two examples. Efficacy evaluations often involve multiple comparisons of a dependent variable measured for a patient at various time points during treatment with one value of the dependent variable obtained at baseline. Safety evaluations often involve analyses of treatment emergent signs and symptoms in which the signs and symptoms are considered to emerge from stable baseline health states.

One problem with designs and procedures that depend on stable baseline states is that stable baseline states often are elusive in a world of persistent and pervasive change. Attempts to find or establish stable baselines are especially problematic for certain disorders such as manic-depressive disorder, disorders for which manifestations are inherently variable over time.

Another problem derives from the fact that chronic disorders and treatments for chronic disorders generally are ongoing dynamic processes. Measurements at any particular times including baselines provide only static snapshots of information about dynamic functioning over portions of patient lifetimes. Similarly, as described in Section 1.2.1.2.6, measures of change between time points provide limited information about dynamic functioning.

Baselines tend to make certain measurements in a series more important than other measurements. It can be more difficult to obtain quality measures of apparent treatment effect if certain repeated measurements in a series for a particular patient are considered to be more important than other measurements in the series.

1.2.1.2.2.4. The Problem of Missing and Erroneous Data

Another consideration that tends to limit the use of intensive clinical trial designs, which use many repeated measurements, is that it may not be appropriate to apply statistical procedures such as analysis of variance to analyze repeated measures data when there are more than a few missing measurements. Missing data are common in clinical research.

Erroneous data also are not unusual in clinical research. The results of statistical analyses such as those based on means can be distorted severely by outliers. There is need for analytic procedures that are less apt to be distorted by outliers and more tolerant of missing data.

1.2.1.2.3. Problems Involving Soft Analyses of Clinical Trial Data

Treatment development programs typically yield vast amounts of rigorous scientific data, many high quality generalized conclusions based on many statistical tests, many subjective impressions based on soft analyses particularly of safety data, and many subjective impressions based on subjective experience. Regulatory agencies typically combine this material by complex subjective and social processes to arrive at generalized conclusions that may or may not support approval of particular treatments for marketing. Similarly, managed health care providers often combine this material by complex subjective and social processes to arrive at generalized conclusions that may or may not support approval of particular treatments for inclusion on formularies.

As a result of processes and procedures just described, some of the most important decisions about treatments are highly dependent on subjective impressions including subjective impressions resulting from soft analyses of clinical trial data. This dependence is a problem because subjective impressions have limited precision, repeatability, and reproducibility. Subjective impressions and soft analyses are defined in Section 1.2.1.1. Subjective impressions and soft analyses do not meet the criteria for high quality generalized conclusions as these criteria were defined in Section 1.2.

A major reason why important decisions about treatments are more dependent on soft analyses than these decisions need to be is that the statistical method is limited in its ability to investigate multidimensionality (Section 1.2.1). The generalized conclusions arrived at by conventional applications of the statistical method really are quite specific. For example, one statistical test may be applied to arrive at a generalized conclusion about the effects of a particular dose of treatment on a particular health variable. Problems often arise because it takes many statistical tests to analyze the effects of various doses on many health variables. In addition, problems arise because of a lack of computational procedures to combine the results of many statistical tests involving different variables to arrive at generalized conclusions about the overall benefit and harm of treatments for populations of patients, all variables considered.

In addition, conventional applications of the statistical method often limit extraction of value from data actually collected in clinical trials and often limit collection of data themselves. Typical group clinical trials yield more data than the amount of data that can be analyzed by conventional applications of the statistical method to arrive at high quality generalized conclusions. Still more potential data are not collected because the data can not be analyzed productively with conventional procedures. For example, most clinical trial investigators limit the collection of data from many repeated measurements of many health variables.

Here are some examples of how conventional clinical trial procedures foster reliance on subjective impressions during treatment evaluations. The first examples are for particular clinical trials. Subsequent examples are for sets of clinical trials for a particular treatment.

Conventional clinical trials, often in accord with regulatory agency guidelines for drug development, generally separate efficacy from safety evaluations (Section 1.2.1.2.1.2.5). Statistical testing often is reserved for efficacy evaluations. These conventions and guidelines increase reliance on subjective impressions in various ways. For example, it is not unusual for efficacy evaluations in particular trials to involve more than one statistical test at a particular level in a hierarchy of health measurement. Each of these tests may yield somewhat different results. Efficacy across multiple health measures often is evaluated by forming subjective impressions about the results of these multiple tests because of the lack of any widely accepted procedure that is defined in sufficient operational detail to be performed by computation.

Conventional clinical trial procedures and guidelines foster reliance on subjective impressions about the effects of treatment in particular trials in additional ways. The results of safety evaluations often are presented descriptively without statistical testing. Thus safety evaluations often are more reliant on subjective impressions than efficacy evaluations. Multiple subjective impressions about efficacy and safety then are combined to form more generalized subjective impressions about benefit and harm across all the efficacy and safety measures that were included in a particular trial.

Conventional clinical trial procedures also foster many clinical trials for particular treatments, multiple trials that are not true replications. The different trials may, for example, focus on different signs, symptoms, and other health measures. Subjective impressions about the overall effects of treatment from each of many trials often are combined to form still more generalized subjective impressions about the overall benefit and harm of particular treatments. All of these situations that involve forming more generalized subjective impressions from less generalized subjective impressions may further reduce the precision, repeatability, and reproducibility as well as the transparency of treatment evaluations.

1.2.1.2.4. Problems Related to Incompatibilities between Procedures for Rigorous Science and Quality Clinical Care Conventional group clinical trial designs and procedures tend to be incompatible with procedures for optimizing care and outcomes for individual patients. As examples, trial patients may be randomized to groups that receive placebo only, sub-optimal doses, or potentially excessive doses. In addition, group clinical trial patients often are randomized to particular fixed dose groups. In contrast to the demands of conventional group clinical trial designs and procedures, doses often are adjusted in clinical practice in accord with the needs of particular patients. The primary reason why conventional group clinical trials use placebo only groups and fixed doses rather than doses optimized to meet the needs of individual patients is that the statistical method is not well suited to use independent variables as within patient variables (Section 2.3).

The incompatibility of conventional clinical trial and quality patient care procedures is widely acknowledged. It often is noted that group clinical trials are conducted primarily to gain knowledge for the benefit of patients other than those who participate in the trials.

The incompatibility of conventional clinical trial and patient care procedures creates often-avoidable conflicts between demands for scientific rigor in treatment evaluations and quality patient care. This incompatibility becomes evident in two important ways. The first and by far the most widely recognized problem is the ethical problem. For example, many people would question the ethics of assigning patients to placebo only groups when there are other viable options for achieving scientifically rigorous treatment evaluations. Concerns about ethical issues may deter some physicians from enrolling patients into group clinical trials and some patients from agreeing to participate in such trials. The second problem is that the incompatibility of procedures tends to limit the acquisition of cumulative scientific experience from quality patient care.

1.2.1.2.5. The Failure to Reveal Longitudinal Associations: An Example

Another problem is that conventional clinical trial procedures based on analyses of cross-sectional associations may fail to reveal important longitudinal associations between variables. This has been demonstrated with a two-part example using hypothetical data. This example involves concentrations of a hormone and values of a health variable that both always occur at some nonzero value for each patient. Suppose that each patient in two groups is measured or assessed at two points in time, baseline and endpoint. Also suppose that a treatment such as hormone supplementation doubles both the concentration of the hormone and the value of the health variable between baseline and endpoint for each patient in the treatment group. This doubling between the time points will be called the doubling effect of treatment. Also suppose that placebo has no effect on either hormone concentrations or values of the health variable for any patient in a placebo group that is otherwise identical to the treatment group.

Given the conditions of this hypothetical example, conventional clinical trial procedures would have little difficulty revealing a treatment effect by comparing the two groups. This comparison could involve either values of the health variable at endpoint or changes in the health variable from baseline to endpoint.

Assume that a secondary objective of the clinical trial in this hypothetical example is to examine any association that may exist between hormone concentrations and values of the health variable. Presumably if a treatment such as hormone supplementation has an effect on health, there should be an association between hormone concentrations and values of the health variable. Failure to reveal such an association could call into question trial results favorable to treatment. This example will continue by showing how detection of the association between hormone concentrations and values of the health variable may depend both on conditions at baseline and the method used for analyzing the data. In this example, the doubling effect of treatment means that there is an association between hormone concentrations and health variable values for each patient in the treatment group. This association is an example of a longitudinal association. Longitudinal associations may be present in the absence of cross-sectional associations.

The two parts of the example just introduced correspond to two extreme conditions and will focus on the treatment group only. For the first part of the example, assume that there is a straight-line relationship, indicated by a correlation coefficient with a value of 1, between hormone concentrations and health variable values across patients in the treatment group at baseline. After the doubling effect of treatment, straight-line relationships also will be evident across patients between hormone concentrations and health variable values at endpoint, between changes in concentrations and changes in health variable values, and between the mean concentrations and mean health variable values from the two measurements for each patient. The absolute value of the benefit/harm score (B/H score) for each patient is 1, the maximum value possible for this within patient measure when there are only two repeated measurements per patient. All of these analytic options provide evidence of an association between hormone concentrations and health variable values when the association is present both across and within patients.

For the second part of this example, assume that there is no association, indicated by a correlation coefficient with a value of 0, between hormone concentrations and health variable values across patients in the treatment group at baseline. After the doubling effect of treatment, no associations will be evident across patients between concentrations and health variable values at endpoint, between changes in concentrations and changes in health variable values, or between the mean concentrations and mean health variable values from the two measurements for each patient. In contrast, the absolute value of the B/H score for each patient still is 1.

Of all these across and within patient analytic options for the second part of this example, only the B/H score option provided evidence of the association between hormone concentrations and health variable values. This longitudinal association is present in this example because of what has been called the doubling effect of treatment. Analyzing longitudinal associations when there was no association between the same variables across patients revealed the association between the variables within patients. The second part of this example raises the intriguing possibility that certain important associations between variables that may exist within individual patients may not be revealed by conventional cross-sectional clinical trial data analysis procedures.

It is not clear how often conventional cross-sectional analyses fail to reveal important longitudinal associations between variables within patients. Quite often, correlation coefficients between variables that are part of internal control processes appear to be surprisingly weak when analyzed across patients. One possible explanation for this is that internal control processes tend to work at different values of the variables for different patients. If internal control processes within individuals can be likened to spoken communications among people, it is as if loud voices can compensate for insensitive hearing and sensitive hearing can compensate for weak voices. Compensation is one mechanism that might account for longitudinal associations that regulate in the absence of strong cross-sectional associations.

Treatments used to manage or control chronic disorders frequently involve internal control mechanisms. Chronic treatments for chronic disorders often may be considered to involve the use of exogenous agents to modify or restore natural internal control mechanisms. Failures of conventional clinical trial procedures to quantify, discover, analyze, and describe internal control mechanisms with analytic options that are sensitive to longitudinal associations that may be present in the absence of strong cross-sectional associations can hinder the development of treatments and the care of patients.

1.2.1.2.6. The Need to Investigate Dynamic Functioning Including Internal Control Dynamic functioning is functioning in which both independent and dependent variables vary over time for an individual. Longitudinal associations indicate dynamic functioning.

Health, a multidimensional construct, is controlled by a dynamic interplay of internal and external agents. These agents are independent variables that actually affect health. Conventional clinical trial designs and procedures are limited in their ability to deal both with the multidimensionality and the dynamism of this interplay.

Most previous clinical trial sections, particularly those about the need for both detailed and comprehensive information from clinical trials, identified problems and needs related to multidimensionality. This section is about problems involving dynamism.

One reason why conventional clinical trial procedures are limited in their capacity to investigate dynamic functioning is that the conventional procedures do not provide high quality measures of dynamic functioning. Furthermore, conventional clinical trial procedures are limited in their capacity to measure and investigate change. Dynamic functioning involves changes.

Conventional clinical trial procedures often investigate change by computing differences between numbers obtained from repeated health measurements. For example, some clinical trials analyze differences between endpoint and baseline measurements. Differences between numbers from repeated measurements are of limited quality as measures of change or dynamic functioning for at least two reasons. The first reason is that two repeated measurements do not provide reliable measures of change or dynamic functioning when the measures have limited reliability.

The second reason why differences are of limited value for investigations involving change or dynamic functioning is that the number of differences increases rapidly with the number of repeated measurements. For example, the number of differences for one dependent variable increases rapidly as $n(n-1)/2$ where n equals the number of repeated measurements. Thus when there are 10 repeated measurements there are 45 differences in which the results of an earlier measurement are subtracted from a later measurement. The statistical method does not provide a means for dealing with large numbers of differences for individuals. Much information in data from clinical trials that collect more than two repeated measurements is underutilized because of such limitations.

High quality measures of dynamic functioning call for use of information from repeated measurements of both independent and dependent variables for an individual. The reason why conventional clinical trial designs and procedures are limited from going beyond the measurement of change to the measurement of dynamic functioning is that the statistical method is not well suited to use independent variables as within individual measures (Section 2.3). Independent variables need to vary and be measured together with dependent variables, preferably during applications of the experimental method, in order to quantify dynamic functioning and to explicate cause and effect relationships between and among the variables.

Dynamic functioning includes internal control. Internal control is dynamic functioning in which the independent variable is internal to the individual. For example, it is normal for a person's body to produce insulin which can help control glucose values. Internal control often is called regulatory control if it involves physiological mechanisms, self-control if it involves psychological mechanisms, or social control if it involves social mechanisms for groups.

Dynamic functioning also includes external control. External control is dynamic functioning in which the independent variable is external to the individual. Clinical trials of many treatments for the management of chronic disorders essentially are trials of external agents that may supplement, restore, enhance, or modify internal control mechanisms that involve health measures. For example, treating diabetic patients with exogenous insulin may help restore control of glucose values.

Many treatments for the management of chronic disorders work by affecting internal control mechanisms. As examples, some drugs for the treatment of adult onset diabetes work by sensitizing body tissues to the effects of insulin, normally an internal agent. Treatments for mental disorders often consist of exogenous agents considered to up-regulate or down-regulate components of disordered neurotransmitter systems. Knowledge about internal control mechanisms can contribute to rational drug development and use.

A fundamental problem of conventional clinical trial designs and procedures for treatments intended to manage chronic disorders is that the trials proceed without measuring longitudinal associations that quantify dynamic functioning. Measures of dynamic functioning that quantify external control are needed to evaluate the benefit and harm of treatments. Measures of dynamic functioning that quantify internal control often are needed to investigate how treatments work and how bodies function.

1.2.2. Citations

The present invention is a major improvement on work that the author has published. The article by C. A. Bagne and R. L. Lewis entitled "Evaluating the Effects of Drugs on Behavior and Quality of Life: An Alternative Strategy for Clinical Trials", JOURNAL OF CONSULTING AND CLINICAL PSYCHOLOGY, 1992, Vol. 60. No. 2, 225–239 describes a method for quantifying the benefit/harm of treatment, as benefit/harm becomes evident in the form of longitudinal associations between repeated measurements of one treatment variable and measures of health. B/H scores are longitudinal association scores (LASs) that may have had their signs may have been changed so that all positive LASs indicate benefit and all negative LASs indicate harm. Benefit/harm in this publication is quantified only as functions of level of an independent variable, levels of dependent variables, and delay.

The author of this document was the author or co-author of several abstracts that presented early versions of some aspects of the current invention. These abstracts are (1) R. C. Berchou and C. A. Bagne, "Quantifying treatment effects in the elderly", DRUG INTELLIGENCE AND CLINICAL PHARMACY, 1986, Vol. 20, 460 (2) C. A. Bagne, "Group comparison and follow-up evidence: Two sources of information about treatment effects", JOURNAL OF CLINICAL RESEARCH AND DRUG DEVELOPMENT, 1988, Vol. 2, 200 (3) C. A. Bagne, "Clinical Pharmacoepidemiology and Benefit Scoring", CLINICAL RESEARCH AND PHARMACOEPIDEMIOLOGY, Vol. 4, 115–116 (4) C. A. Bagne and D. F. Kraemer, "The use of benefit/harm scoring to evaluate longitudinal associations between treatment and quality of life: Application to clinical trials", DRUG INFORMATION JOURNAL, Vol. 27, 876–877 and (5) D. F. Kraemer and C. A, Bagne, "Monte Carlo simulation study of benefit/harm scoring in clinical trials that evaluate the effects of treatment on quality of life", DRUG INFORMATION JOURNAL, Vol. 27, 877. In addition, the author of this document has given presentations that have been abstracted in meeting programs. These abstracts are (1) C. A. Bagne, "Measurement of dysregulation", Society of Biological Psychiatry, May 6–10, 1987 (2) C. A. Bagne, "Outcome assessment can be improved by using measures of longitudinal association between treatment and health", Society for Clinical Trials, May 17–20, 1987, and (3) C. A. Bagne, "Evaluating overall drug utility without multiplicity: The case for benefit/harm scoring", Drug Information Association, March 29–31, 1992.

Several patents are potentially related to the present invention. U.S. Pat. No. 5,715,451 involves a method and system for constructing formulae for processing time-indexed medical values.

U.S. Pat. No. 5,742,811 involves a method and system for mining generalized sequential patterns from a large database of data sequences.

U.S. Pat. No. 5,251,126 presents an automated diabetes data interpretation method.

U.S. Pat. No. 5,672,154 presents a method and device for giving patients individualized medication advice that includes inductive data analyses for spotting relationships between various events and symptoms.

U.S. Pat. No. 5,640,549 presents an apparatus and method for determining the course of a patient's illness and response to treatment.

U.S. Pat. No. 5,262,943 presents a system that manages patient information and assessment information associated with those patients.

U.S. Pat. No. 5,544,281 appears to address the problem of predicting values of a time-series variable by comparing an emerging pattern with stored knowledge of previously observed patterns for the same variable. Prediction is based on an "unfolding" of a previously observed pattern for the same variable.

U.S. Pat. No. 5,563,983 predicts an output result using a learning system that involves a neural network. In addition, the prediction from this invention is based on the past history of the predicted variable. One problem is that it may be very difficult or impossible to precisely identify conditions within the data that account for the successful prediction. This makes if difficult to learn about the nature of things.

U.S. Pat. No. 5,412,769 involves the retrieval of time-series information, particularly non-numeric data. "IF-THEN" statements are used to make predictions.

U.S. Pat. No. 5,267,139 estimates parameters for "black box" systems whose interior dynamics are known to be linear, autonomous (time-invariant) and defined uniquely by parameters.

U.S. Pat. Nos. 5,504,569 and 5,694,129 address earthquake prediction and distance-velocity predicting.

BRIEF SUMMARY OF THE INVENTION

The object of this invention is a computational method and system to perform empirical induction. The method will be called the Method for the Quantitative Analysis of Longitudinal Associations (MQALA, pronounced M-QA-LA). MQALA has both essential and many optional features.

This brief summary of the invention presents an overview of MQALA's features, applications, and uses before describing how MQALA is distinct from the statistical method. Following subsections describe how MQALA and the statistical method often are complementary methods of empirical induction, how MQALA can increase opportunities to apply the experimental method, and how MQALA provides new strategies for conducting epidemiologic investigations. Additional sections describe how MQALA often can be used alone or together with the statistical method to help address the limitations, problems, and needs presented in the description of related art.

2.1. Overview of MQALA's Features

Longitudinal associations are patterns of relationship between and among variables that become evident over time for individuals. MQALA includes procedures for defining independent and dependent events as well as computing longitudinal association scores (LASs) and B/H scores. MQALA also includes procedures for computing derivative measures that are computed from LASs, B/H scores, and information used to compute LASs and B/H scores. Derivative measures include the three measures of strength of longitudinal association, overall B/H scores, and predictive indices.

MQALA is applied to repeated measures data including multiple time-series. MQALA can be implemented on various computerized information systems including the Internet.

Longitudinal associations are quantified between at least one variable that functions as an independent variable and at least one variable that functions as a dependent variable. The independent variable(s) are used to define independent events that may be present or absent on the occasions of repeated measurements. Independent events can be renamed in accord with the terminology that prevails in a discipline or area of investigation in which MQALA is being applied. As examples, independent events may be called exposures, treatments, interventions, stimuli, tasks, or predictors.

The dependent variable(s) used to quantify longitudinal associations are used to define dependent events. Dependent events also can be renamed in accord with prevailing conventions in a field of investigation or practice. As examples, dependent events can be called outcomes, responses, or predicted events. A variable that functioned as a dependent variable in one analysis can function as an independent variable in another analysis and visa versa.

Together, independent and dependent events are determined to be either present or absent for individuals on the occasion of each measurement in a series of two or more repeated measurements. These determinations form dichotomous representations of information in repeated measures data. These dichotomous representations of information in repeated measures data can be very extensive and detailed depending on the data and the MQALA analytic options that are selected. These dichotomous representations of information from repeated measures data are used to quantify, discover, analyze, and describe longitudinal associations with MQALA.

Longitudinal associations are quantified in part by (LASs). A LAS specifies both the positive or negative direction of any longitudinal association and quantifies the amount of evidence that obtains in the data for any association.

The direction and amount of evidence for a longitudinal association can be quantified when the presence and absence of an independent event and the presence and absence of a dependent event are measured or assessed repeatedly on two or more occasions for one individual. A positive LAS indicates that the dependent event is more likely to be present when the independent event is present. A negative LAS indicates that the dependent event is less likely to be present when an independent event is present. Each LAS is one LAS from its own distribution of all LASs that are possible given the particular marginal frequencies of a 2×2 table that is formed as part of the procedure of computing a LAS. These distributions of all possible LASs are standardized to have a mean of zero and a specified standard deviation such as 1 so that each LAS is one score from such a distribution. A LAS with a value of zero indicates no evidence for a longitudinal association. The absolute value of a LAS can increase indefinitely as the amount of evidence for a longitudinal association increases.

In some areas of application such as health and medicine, the signs of LASs can be reversed as necessary so that all positive LASs indicate benefit and all negative LASs indicate harm. Such LASs are called B/H scores.

This document makes an important distinction between the amount of evidence for longitudinal associations and the strength of evidence for longitudinal associations. This distinction can be illustrated with a simple example. For this example, assume that there are repeated assessments of both a dichotomous independent event and a dichotomous dependent event. Suppose that the results of the assessments were obtained during rigorous application of the experimental method. The first part of the example is based on two repeated assessments of both types of events. On the occasion of one of the assessments, both the independent and the dependent of events were present and on the occasion of the other assessment both types of events were absent.

The first part of this example provided a small amount of evidence for a strong association. The amount of evidence for the association is small because the evidence is based on only two repeated assessments. The association is strong because the dependent event always was present when the independent event was present and the dependent event always was absent when the independent event was absent.

The second part of this example is based on 100 repeated assessments of independent and dependent events. For 50 of the assessments, both types of event always were present and for 50 of the assessments both types of events always were absent. In contrast to the first part of this example, the second part of the example provided a substantial amount of evidence for a strong association.

Between and beyond the extremes represented by the two parts of this example, MQALA provides a means for quantifying the direction, amount, and strength of evidence for longitudinal associations.

The strength of longitudinal associations is quantified with three measures. Each of the three measures quantifies both the direction and the strength of longitudinal associations. The numerator for each of the three measures is an observed LAS or B/H score. The denominator also is a LAS or B/H score. The three measures can have different values depending on how the denominator is obtained from the 2×2 table that yielded the observed LAS or B/H score. Unlike LASs, values of the strength of longitudinal association measures can range in value from −1 to 1 inclusive.

LASs are computed directly from dichotomous series of independent and dependent events. A series is dichotomous when the results obtained or derived from two or more repeated measurement or assessment occasions result in only two values such as present (1) or absent (0). However, MQALA can be applied to dimensional series and yield detailed quantitative descriptions of longitudinal associations between or among dimensional variables. A series of measurement values is dimensional when it results in more than two values at an ordinal, interval, or ratio level of measurement.

MQALA can be applied to dimensional series after they are converted into sets of dichotomous series. This conversion forms a dichotomous representation of information about levels of the variables in data from repeated measurements. Users of MQALA would have various options for accomplishing this conversion. For example, users could select to retain information in the dimensional series at the ordinal, interval, or ratio levels of measurement. To illustrate, all information about values in a series of values for an interval measure could be converted with a set of dichotomous series or some of the information could be converted with a generally smaller set of dichotomous series at the ordinal level.

Users would have additional options while converting information in dimensional series into sets of dichotomous series. As examples, users could set dimensional resolution to control the amount of detail in level of the dimensional variable that is retained after the conversion. For example, investigators could retain information by rounding measured values to the nearest whole number, the nearest tenth, et cetera. Investigators could form dichotomous series based on minimally important differences in, for example, health measures. In contrast to dimensional resolution, temporal resolution is determined primarily by the frequency of repeated measurements.

In addition, users could select to transform dimensional series by applying various mathematical operations before a dimensional series is converted into a set of dichotomous series. For example, users who are evaluating investment market or economic time-series data could select to base the conversion on residuals from regression lines through values in dimensional series in order to focus on relatively short-term fluctuations relative to longer term trends. Users who are evaluating the effects of hormones on internal control could select to base the conversion on successive differences between values in dimensional series rather than the hormone values themselves. Users could select to investigate several options simultaneously. Such conversions and transformations can help reveal information in dimensional series.

In general, the conversion of a dimensional series into a set of dichotomous series forms an analysis parameter called level of the dimensional variable. One dichotomous series would correspond to each level of the dimensional variable. Users could target only specific dichotomous series or levels for additional analyses.

Sets of dichotomous series are used to form arrays of LASs or B/H scores. Each LAS or B/H score in the array for an individual corresponds to the combination of one dichotomous series of independent events with one dichotomous series of dependent events. Suppose, for example, that the independent variable for a particular analysis is dose of a drug for hypertension and that dose yields 5 levels for one patient. Further suppose that the dependent variable is some measure of blood pressure and that blood pressure yields 10 levels. The longitudinal association between dose and blood pressure for the individual would be described in some detail by an array of 50 B/H scores (5 columns x 10 rows).

Since each B/H score in the array of 50 B/H scores is one score from its own standardized distribution, the array can be easily summarized. For example, identifying the B/H score with the largest absolute value in each column would summarize benefit/harm as a function of dose—a dose-response relationship. Identifying the B/H score in the entire array with the largest absolute value would summarize the longitudinal association still further with a single B/H score. The location of this most extreme value in the array would identify the conditions (dose level and blood pressure level) that provided the most evidence for the longitudinal association.

Analyses of details such as dose-response relationships can be important aspects of treatment evaluations. MQALA provides valuable tools for analyses of many other important details.

One way to investigate other important details in patterns of longitudinal association is to select additional analysis parameters and levels of these parameters. Extending the treatment for hypertension example, additional analysis parameters can be applied to the dichotomous series for dose and blood pressure levels to form additional dichotomous series that may be associated longitudinally. The analysis parameters called episode length and episode criterion can be applied to analyze longitudinal associations involving episodes of treatment and/or response. The analysis parameters called delay and persistence can be applied to the dichotomous series for the independent variable, dose, to analyze temporal aspects of the association. Users of MQALA could select multiple analysis parameters, multiple levels for all of these analysis parameters, and investigate them all simultaneously. An extensive array of LASs thus generated could be summarized as described above for the 50-member dose and blood pressure array.

The detailed analyses described so far could be conducted for each combination of one independent variable with one dependent variable for an individual.

Independent variables such as drugs seldom operate in isolation. Different drugs, for example, may interact in various ways or have similar effects and be substituted for each other. Other independent variables quantifying aspects of things such as diet or smoking, each of which could be converted into a set of ichotomous series, also may influence the effects of drugs. Similarly, independent variables such as drugs often have characteristic patterns of effect that can be specified in terms of two or more dependent variables such as symptoms. MQALA analyzes such important details by applying Boolean operators (such as AND, OR, NOR, XOR, NOT) to sets of dichotomous series for two or more independent variables and/or for two or more dependent variables to form additional dichotomous series that may be associated longitudinally.

"Petting cat" and "rubbing eyes" is a type of Boolean independent event and "allergy symptoms" is a type of dependent event for the example in Section 1.2.1. Delays and persistencies of response after Boolean independent events also can be investigated.

Multiple Boolean operators can be applied simultaneously to any of the dichotomous series representing independent events or dependent events. This yields additional components to the LAS or B/H score array for an individual. These components and the entire array for an individual can be summarized to various degrees as described before by identifying extreme values. The location of the most extreme value in the entire array identifies the conditions that provide the most evidence for a treatment effect. Naming the analysis parameters, identifying the analysis parameter levels, and identifying the Boolean event can specify these conditions.

There are additional ways that MQALA can provide detailed yet easy to summarize quantitative descriptions of longitudinal associations. Additional dichotomous series for transition-on (indicating that an event has started) and/or transition-off (indicating that an event has stopped) events can be formed on any previously formed dichotomous series. In general, applying a rule or set of rules to previously formed series can form additional dichotomous series that may be associated longitudinally.

Additional analysis parameters, analysis parameter levels, and sets of Boolean operators can be selected or created and added to analyses in attempts to account for all variation in the occurrence of recurrent dependent events or all variation in dependent variables. The addition of analytic options could be terminated when all this variation has been accounted for, which would be indicated when the absolute value of one or more of the three strength of longitudinal association measures is 1.

As has been seen, a number of the features of MQALA can be applied to yield very detailed descriptions of longitudinal associations for individuals. These detailed descriptions are said to describe patterns of longitudinal association.

The more analysis parameters, analysis parameter levels, and Boolean events that a particular component of a LAS array or a B/H score array is summarized across, the more generalized is the generalized conclusion about the component's events for the individual. More generalized conclusions about a component for an individual simultaneously account for more of the details about the component for the individual.

The converse of summarizing detailed LAS or B/H score arrays is to drill down into the arrays to view details that already have been analyzed and summarized. Users of the statistical method often can drill down from group statistics to data for individuals. In contrast, users of MQALA can drill down beyond the original data to information revealed in the dichotomous series that are analyzed by MQALA.

The features of MQALA that have been covered so far in this overview have been presented in the context of quantifying longitudinal associations between one independent variable or one set of independent variables used to define Boolean independent events and one dependent variable or one set of dependent variables used to define Boolean dependent events. MQALA includes additional features. One is designed to provide comprehensive measures of treatment effect across two or more dependent variables or sets of dependent variables. Another feature is designed to allow use of two or more independent variables or sets of independent variables to predict a recurrent target event or a dependent variable.

MQALA can provide comprehensive measures of, for example, treatment effects. Consider the example of drug treatment for clinical depression. Such treatments typically affect many aspects of health. Evaluations of antidepressants usually include a number of variables, often included in composite rating scales, to evaluate efficacy and another set of dependent variables to evaluate safety.

MQALA can provide comprehensive measures of efficacy, of safety, or of safety and efficacy combined. Each measure would be a single overall B/H score for an individual and could be computed across many dependent variables or sets of dependent variables used to define Boolean dependent events. Measures of overall benefit/harm can be obtained as follows. First, the benefit/harm of treatment with respect to each dependent variable or set of dependent variables used to define Boolean dependent events would be analyzed to any desired level of detail. The detailed analyses for each type of dependent event would be summarized with a single B/H score. This procedure would provide a profile of apparent benefit/harm across all the dependent variables and/or sets of dependent variables. The B/H scores in such a profile would in turn be averaged with explicit weights to obtain an overall measure of benefit/harm for the individual across all scores in the profile. The individual B/H scores in such profiles could be differentially weighted using importance weights in accord with measures or ratings of clinical significance, societal values, or personal preferences before they are averaged.

Another feature of MQALA provides predictive indices. Predictive indices are designed so that two or more independent variables or predictors or sets of independent variables used to define Boolean independent events can be used simultaneously to predict a recurrent target event or dependent variable. For example, data for the variables used to obtain values of the index of leading economic indicators can be analyzed with MQALA to provide an alternative index to predict gross national product. Values of predictive indices are computed by applying LASs and information used to calculate LASs. The procedures for obtaining the LASs used to calculate values of predictive indices can include any or all of the previously described procedures for analyzing longitudinal associations in detail including the analysis parameter called delay as well as Boolean events to investigate things such as interactions between or among predictors.

Most analytic features described so far would be conducted at the end of data collection for an individual. An alternative would be to apply another feature of MQALA to analyze longitudinal associations sequentially, perhaps after each additional repeated measurement, to monitor the emergence of evidence either for particular longitudinal associations including treatment effects or for changing longitudinal associations. Sequential analyses also could be conducted using moving windows consisting of a specified number or repeated measurements, each window ending with the most recent measurement.

2.2. Overview of MQALA's Applications and Uses

MQALA can be used to arrive at generalized conclusions and make predictions for and about a broad range of individuals that are either real or conceptual entities. Examples of individuals to which MQALA can be applied include individual people and other living things, populations of people or other living things, many machines, businesses and other social enterprises, environmental systems, economies, and investment markets. Populations are individual conceptual entities with two or more individual members, said members all meeting classification criteria.

The minimum conditions for applying MQALA are comprised of having data for one individual resulting from two repeated measurements of both one variable functioning as an independent variable and one variable functioning as a dependent variable. More repeated measurements can provide more evidence for longitudinal associations. More independent events and/or variables, when analyzed as sets through the application of Boolean operators, allow definition of more complex independent events. When analyzed with predictive indices, more independent events and/or variables allow predictions to be based on more of the conditions that may affect predicted events or variables. Similarly, more dependent events and/or variables, when analyzed as sets through the application of Boolean operators, allow definition of more complex dependent events. When analyzed with treatment effect profiles and overall B/H scores, more dependent events and/or variables allow more detailed and comprehensive treatment evaluations.

MQALA can be applied most meaningfully for a broad but limited range of events and variables. MQALA works best for events that can recur and variables that can fluctuate in level over time for individuals. Examples of suitable variables include drug doses, laboratory measures, ratings of symptom severity and quality of life, death rates, measures of electrical activity, temperatures, measures of atmospheric pollution, periodic measures of business performance, economic and investment market time-series, as well as potentially recurrent types of historic and news events.

On the other hand, MQALA has limited value when independent or dependent variables can not meaningfully recur or fluctuate in level over time for the individual being studied. For example, MQALA would be of limited value for evaluating the effects of a splenectomy on an individual because this event can not recur for an individual. However, separate MQALA analyses could be used to investigate how an individual's body functions before and after a splenectomy as if the individual becomes a somewhat different individual after the operation. Similarly, MQALA is limited in its ability to directly investigate non-recurrent dependent events such as an individual's death.

Real individuals can be part of individual conceptual entities. This realization affects determinations about the applicability of MQALA. For example, MQALA would be of little value for directly investigating whether atmospheric pollution values affect the likelihood of a real individual's death because death is not a recurrent event for an individual person. However, MQALA could be used to investigate the effects of atmospheric pollution values on the number of deaths per unit time in urban populations because both measures can be measured repeatedly and can fluctuate in level over time for individual urban populations.

Given these conditions, MQALA can be applied to address many important unsolved problems for a number of sciences, enterprises, and professions. Applications include analyses of economic and investment market data, the benefit and harm of many treatments and other exposures for people and other individuals, internal and external control in natural and man-made systems, and longitudinal associations involving serial functional images. The present invention also can be applied to analyze longitudinal associations involving stimuli and responses that can be used to describe behavior as well as changes in the strength of these associations that indicate behavior modification including learning in natural and man-made systems.

MQALA can be used for data mining. MQALA can help transform vast amounts of available medical, investment market, and economic time-series data into information that is valuable for prediction and knowledge acquisition.

Additional uses of the present invention include use in the conduct of group clinical trials of treatments for the management and control of chronic disorders; use for the conduct of health-effect monitoring; uses to monitor internal control and measure it under standardized test conditions; and use to discover, quantify, analyze, and describe individual differences in responsiveness to behavior modification. Other uses include databases, knowledge bases, and images created at least in part by applying MQALA as well as man-made systems and devices whose behavior can be modified by implementation of MQALA.

MQALA can be applied to a wide variety of individuals in various areas of investigation, thereby fostering interdisciplinary study, cross-fertilization, and synergies.

2.3. How MQALA 1S Distinct from the Statistical Method

The procedures for calculating LASs include formulae that are commonly used in statistics (Section 4.1.1). This makes it all the more important to distinguish MQALA from the statistical method. This section draws several important distinctions using broad strokes. The significance of these distinctions is amplified in subsequent sections including sections on how MQALA addresses the nexus of limitations, problems, and needs that is described in the related art sections.

The fundamental distinction between MQALA and the statistical method for arriving at generalized conclusions about associations between variables can be illustrated with a simple example. This example appears to illustrate the simplest yet most fundamental way to distinguish MQALA from the statistical method. Although the statistical literature includes many apparent within-the-box attempts to work around two distinctions illustrated by this example, the distinctions appear to remain and continue to be the underlying reason for the fundamental limitations of the statistical method that were presented in Section 1.2.1.

Generalization or induction is the process of going from the particular to the general. In the context of computational methods of empirical induction, the particulars are the results of particular measurements. A particular measurement is the result of a particular measure measured at a particular time for a particular individual.

Generalized conclusions about associations between variables require a minimum of four particular measurements. For LASs and MQALA, the four particular measurements consist of two repeated measurements of one independent variable and two repeated measurements for one dependent variable, all four measurements being for one individual.

Analyses of associations between variables for which the statistical method is best suited can be illustrated with correlation coefficients. Computation of the value of a correlation coefficient also requires a minimum of four particular measurements. The four measurements consist of one measurement of a particular independent variable and one measurement of a particular dependent variable for each of two individuals.

Applications of both MQALA and the statistical method generally benefit from the results of information from more than four measurements. The statistical method benefits from measurements about more individuals from the same population. MQALA benefits from more repeated measurements of the same individual.

The fundamental differences between the minimum requirements for computing a LAS and the minimum requirements for computing the value of a correlation coefficient are two in number. First, the LAS is limited to data for one individual while the correlation coefficient is best suited for data from two or more individuals. Second, the LAS requires data from measurements repeated over time while time is not effectively considered in analyses for which correlation coefficients are best suited.

The following differences between MQALA and the statistical method derive from or are related to the fundamental differences illustrated by the preceding example.

Section 1.2.1 presented two major research strategies for investigating individuals. The first strategy is to investigate individuals directly as individuals. MQALA is a computational method of empirical induction for conducting the first research strategy. The second strategy is to investigate individuals indirectly as members of groups. The statistical method is a computational method of empirical induction best suited for conducting the second research strategy. Descriptive statistics describe groups. Statistical inferences are for populations. Individuals are investigated and described indirectly.

The direct object of investigation for MQALA is an individual real or conceptual entity investigated directly as a whole. The statistical method is best suited for investigations in which the object of investigation is a group. Users of the statistical method effectively investigate individuals as parts of wholes and as a means for arriving at generalized conclusions about groups.

MQALA quantifies longitudinal associations for individuals. LASs and arrays of LASs quantify patterns of longitudinal association between and among variables, variables that have been measured or assessed repeatedly over time for one individual. A LAS or LAS array is said to provide a quantitative description of a longitudinal association for an individual.

In contrast to MQALA, the statistical method is best suited to quantify associations between variables either by comparing groups or by applying statistical measures of association across individuals within one or more groups. The associations investigated in this manner are cross-sectional associations.

An additional distinction between MQALA and the statistical method makes it possible to quantify longitudinal associations within individuals. MQALA uses independent variables as within individual variables. In contrast, the statistical method is best suited to use independent variables as across individual or across group variables. For example, parallel group clinical trials that rely primarily on the statistical method effectively use treatment only as an across group variable.

In addition to MQALA's use of independent variables as within individual variables, MQALA also uses dependent variables as within individual variables. The statistical method includes procedures for analyzing repeated measures data. Statistical procedures for analyzing repeated measures data generally only require repeated measurements of one or more dependent variables. In contrast, MQALA requires repeated measurements of both independent and dependent variables. Furthermore for MQALA, both independent and dependent variables must vary over time for an individual in order to provide any evidence for longitudinal associations as indicated by nonzero LASs.

Another distinction between MQALA and the statistical method is that inferential statistical procedures are best suited for investigating only one or a few independent variables and only one or a few dependent variables in any one analysis. In contrast, MQALA allows analyses of many independent variables and/or many dependent variables in one analysis.

The features of MQALA that allow use of many independent variables in one analysis are Boolean independent events and predictive indices. The features of MQALA that allow use of many dependent variables in one analysis are Boolean dependent events and measures of overall benefit/harm.

Users of MQALA and the statistical method proceed to analyze data in fundamentally different ways. Users of the statistical method generally proceed by aggregating data. For example, statistical measures of central tendency such as group means may be computed across individuals. In contrast to the statistical method, users of MQALA proceed by converting information in repeated measures data about an individual into sets of dichotomous series.

The dichotomous series that users form with MQALA consist of temporal sequences of only two values such as 1, indicating the presence of an event, and 0, indicating the absence of an event. Members of a series correspond to the occasions of repeated measurements. Here are several examples illustrating the distinct way that users of MQALA can proceed to define events in great detail before computing LASs, B/H scores, or any measures or indices that are derived from LASs and B/H scores.

Users of MQALA convert information in dimensional series for each independent and dependent variable as a set of dichotomous series. Each member of a set for a dimensional series corresponds to a level of a dimensional variable. As described in Section 2.1, users could select to retain information in the dimensional series at the ordinal, interval, or ratio levels of measurement. Higher levels of measurement and higher dimensional resolution generally would require more dichotomous series, each dichotomous series representing a different level of one variable.

Individual dichotomous series may include additional information about patterns of events. For example, events may occur in episodes. Such information can be analyzed by applying analysis parameters such as episode length and episode criterion to form additional dichotomous series that may be associated longitudinally with other series.

When considered jointly, dichotomous series for independent and dependent events may include information about temporal aspects of any association that may exist between the events. This information can be analyzed by applying analysis parameters such as delay and persistence to form additional dichotomous series that may be associated longitudinally with other series.

Boolean operators can be applied to dichotomous series for multiple independent variables or multiple dependent variables to form additional dichotomous series that portray the occurrence and non-occurrence of complex events that may be associated longitudinally with other series. Complex events are defined with Boolean operators on more than one primary variable. Primary variables are variables in the database being analyzed.

MQALA's portrayal of information in repeated measures data by dichotomous series needs to be distinguished from the binary numbering system that is used routinely to help enable computation by electronic means. Both MQALA's portrayal and the binary numbering system rely on 0s and 1s. Although MQALA may act on computerized data expressed with a binary numbering system, MQALA includes specific and distinct procedures, illustrated above, for portraying information in repeated measures data as dichotomous series. MQALA uses the term "dichotomous series" rather than "binary series" to help maintain the distinction between the two systems for portraying information.

Relationships between MQALA's portrayal of information in repeated measures data by dichotomous series and neural functioning need further investigation.

The distinction between how users proceed to analyze data with MQALA and with the statistical method has important implications for investigations of associations. When the statistical method is used to compare groups, data are aggregated before and in order to investigate associations. Information about detail in the data is obscured before the information is analyzed and before arriving at generalized conclusions about associations.

In contrast, users of MQALA can choose to emphasize details that may affect associations by defining independent and dependent events in great detail as illustrated above. Detailed event definitions generally require many dichotomous series. Users of MQALA generally would cross-classify all dichotomous series for independent variables with all dichotomous series for dependent variables and compute LASs or B/H scores for each cross-classification. These procedures can yield extensive and detailed LAS or B/H score arrays that quantify patterns of longitudinal association for individuals. These arrays can be summarized as illustrated in Section 2.1.

Summarization of arrays is an important part of generalization with MQALA. Arrays are summarized after the data have been analyzed to yield the arrays. Summarization of arrays achieves generalization without aggregation. Arrays can be summarized across analysis parameters, across sets of primary independent variables used to define Boolean independent events, and across sets of primary dependent variables used to define Boolean dependent events. In addition, the procedures for computing values of predictive indices and overall B/H scores, said procedures further generalizing longitudinal associations, rely on summary LASs and summary B/H scores.

Users of MQALA can drill down onto the arrays that have been summarized with summary LASs or summary B/H scores to obtain more detailed information about longitudinal associations.

Users of MQALA can conduct very detailed and very generalized investigations as part of one analysis within a domain of phenomena that are of interest. In contrast, users of the statistical method generally require many analyses to investigate different details and different levels of detail and generalization within a domain of interest.

Statistical tests can be applied to compute probabilities that quantify the strength of evidence for cross-sectional associations with measures based on data for groups. In contrast MQALA offers three strength of longitudinal association measures (Sections 2.1 and 4.1.6) that are based on data for individuals.

The strength of evidence for a cross-sectional association depends, other things being equal, on the number of individuals in a group or the groups. In contrast, the value of one of the three measures that quantifies the strength of evidence for a longitudinal association depends, under certain conditions, on the extent to which the presence and absence of independent events accounts for the presence and absence of dependent events for one individual.

Each LAS and B/H score is one score from a distribution of potential scores that has a mean of 0 and a specified standard deviation such as 1. If a LAS is considered as a random variable, according to the Chebyshev Inequality the probability of the LAS must be less than or equal to $1/LAS^2$. Probabilities resulting from applying the Chebyshev Inequality appear to be very conservative estimates of the probability of achieving a LAS of a particular magnitude by chance alone. For example, if LAS=5 and the standard deviation of the distribution is 1, P(LAS)<0.04. If the LAS=10, P(LAS)<0.01. In most cases, computer simulations suggest that the actual probabilities of achieving a LAS or B/H score of a particular magnitude by chance alone would be considerably smaller.

Both MQALA and the statistical method help reveal potentially repetitious patterns in data. For MQALA, any patterns would be repetitious over time within individuals. For the statistical method, any patterns would be repetitious across individuals. Neither method is of much value for investigations of nonrecurrent events in unique individuals.

Generalized conclusions arrived at by the statistical method are generalized across the individuals that comprise groups. Generalized conclusions arrived at by MQALA are generalized over the results of measurements repeated for individuals.

With the statistical method, predictions for individuals are made indirectly from generalized conclusions about groups and inferences about populations, said groups and populations representing the individual to various degrees. With MQALA, predictions for individuals are made directly from generalized conclusions based on data collected from the same individual for which the prediction is made. This distinction is amplified and illustrated in Section 2.6.

2.4. MQALA and the Statistical Method often are Complementary

MQALA and the statistical method are two valuable, distinct, and often complementary methods to perform empirical induction. The two computational methods of empirical induction generally can be used in a complementary manner by performing statistical tests on the LASs, B/H scores, and derivative measures that are obtained from each individual in one or more groups.

LASs, B/H scores, and derivative measures provide generalized quantitative conclusions about longitudinal associations for particular individuals. In contrast, the statistical method provides generalized quantitative conclusions, namely descriptive statistics, about groups. The descriptive statistics can be about attributes (e.g., height and/or weight) of the individuals or about cross-sectional associations between attributes (e.g., the correlation between height and weight) across the individuals. Descriptive statistics about statistical samples can be used to make inferences about populations.

The statistical method itself does not include measures of longitudinal association. But the statistical method, including both descriptive and inferential statistics, can be applied to measures of longitudinal association provided by MQALA. Application of the statistical method to LASs, B/H scores, and derivative measures provides generalized conclusions across individuals about generalized conclusions about longitudinal associations investigated within individuals. For example, the generalized conclusions and inferences provided by the statistical method can be about the benefit and harm of particular treatments.

For the example just cited, MQALA and the statistical method would be used together to provide generalized conclusions and inferences about benefit/harm through a two-phase analytic procedure. First, MQALA would be used to quantify benefit/harm for each individual patient in a statistical sample. Second the B/H scores, one from each patient in the sample, would be analyzed statistically.

Some authors refer to generalization of the type for which the statistical method is best suited as inductive nomothetic generalization. Nomothetic relates to or involves abstract or universal statements or laws. Nomothetic often is contrasted with idiographic. Idiographic relates to or involves something concrete, individual, or unique. Within this context, MQALA can be considered to be a computational method of inductive idiographic generalization that can be applied to data about particular individuals.

Generalized conclusions across individuals about generalized conclusions about particular individuals often appear to bridge the gap between idiographic and nomothetic generalization. This bridging is achieved by applying the statistical method, which quantifies cross-sectional associations across individuals in the spatial dimensions, together with MQALA, which quantifies longitudinal associations within individuals in the time dimension.

MQALA and the statistical method can be used together as part of the second research strategy, which is to investigate individuals indirectly as members of groups. The two methods generally can be used together for investigations that involve events that can recur and variables that can fluctuate in level over time for individuals.

The complementarity between MQALA and the statistical method is valuable for at least two major reasons. First, MQALA and the statistical method can be used together to arrive at generalized conclusions about things for which people need to make predictions and decisions. For example, clinicians could use generalized conclusions about benefit/harm to make predictions that help guide treatment decisions. The following section shows how B/H scores computed from data obtained from well-designed experimental investigations of individual patients are valid measures of the effects of treatment on health, not just measures of health.

The second major reason why it often is valuable to apply MQALA and the statistical method together is that the quality of generalized conclusions obtained by applying the statistical method depends on the quality of the measures that are analyzed statistically. MQALA can improve the quality of measures that are analyzed statistically. For example, B/H scores can be more reliable and comprehensive than any of the measures of health that were used to compute the B/H scores.

The complementarity between MQALA and the statistical method can be so valuable that it is easy to anticipate academic departments of empirical induction with courses both in statistics and MQALA.

2.5. MQALA, the Statistical Method, and the Experimental Method

The experimental method helps assure that generalized conclusions about associations between variables that are arrived at from data are generalized conclusions about cause and effect relationships. Aspects of the experimental method include randomization, control of independent variables, masking of observers, and intent-to-treat analyses.

MQALA helps provide opportunities for applying the experimental method in addition to the opportunities provided by comparing groups with the statistical method. These additional opportunities consist of applying aspects of the experimental method within individuals. For example, observers could be masked not only with respect to which patients are on a particular treatment but also masked as to when individual patients are on particular treatments. Many scientific investigations can be made more rigorous by also applying aspects of the experimental method within individuals.

The use of the experimental method both within and across individuals will be illustrated in the context of clinical trials of treatments used to manage or control chronic disorders. Applications of MQALA in other areas of investigation also could use the experimental method both within and across individuals.

The present invention can be applied to data collected from randomized trials in individual patients to help obtain valid within patient measures of response to treatment. An article by Guyatt et al titled "Determining Optimal Therapy—Randomized Trials in Individual Patients," NEW ENGLAND JOURNAL OF MEDICINE, 1986, 314, 889–892 presents procedures for collecting data from randomized trials in individual patients. These trials often are called N-of-1 trials where N is an abbreviation for the number of patients in a particular trial. This article describes how treatments can be randomized to different periods of time for individual patients. It also shows how more rigorous scientific procedures for the collection of data from individuals can help optimize therapy and outcomes for individual patients.

N-of-1 clinical trials embody application of the experimental method to individuals. N-of-1 clinical trials formalize the oft-expressed idea that every therapeutic maneuver is an experiment of sorts.

The present invention would extend the designs and procedures presented in the Guyatt et al article by providing a more comprehensive computational method and system to arrive at generalized conclusions and predictions about the benefit/harm of treatments directly for individuals. MQALA would make it feasible to investigate more than two doses during an N-of-1 trial and to investigate multiple independent variables with Boolean operators. In addition, MQALA would make it feasible to investigate complex outcomes with multiple dependent variables and Boolean operators as well as to quantify benefit and harm across many dependent variables with overall B/H scores.

Furthermore, the sequential analysis feature of MQALA would enable he conduct of adaptive N-of-1 clinical trials. Adaptive N-of-1 clinical trials are N-of-1 clinical trials in which treatment for an individual patient is modified over time in accord with feedback about the results of sequential monitoring of benefit and harm conducted while treatment changes or fluctuates in value. Adaptive N-of-1 clinical trials could be used to help achieve and maintain dynamic precision dosing for particular patients. Dynamic precision dosing is dosing in which doses of a treatment for the control or management of a chronic disorder can be frequently adjusted for a particular patient in accord with sequential monitoring of B/H scores for the particular patient.

In addition, MQALA would make it feasible to conduct group clinical trials by conducting coordinated sets of randomized clinical trials in individual patients. Such group clinical trials are called multiple N-of-1 clinical trials.

Multiple N-of-1 clinical trials can apply aspects of the experimental method such as randomization, control, and masking both within and across patients. The use of the experimental method within individuals helps assure that LASs and values of the strength of longitudinal association measures are valid indicators of the effects of treatment(s). Multiple N-of-1 clinical trial designs are an option for the evaluation of many treatments for the management or control of chronic disorders.

Multiple N-of-1 clinical trials would apply MQALA together with the statistical method. MQALA would provide B/H scores and values of measures of strength of longitudinal association for each individual in a sample. These scores and values would, in turn, be analyzed statistically to make inferences about populations.

The N-of-1 clinical trials in a multiple N-of-1 clinical trial would need to be coordinated in several primary respects in order for it to be meaningful to analyze the set of results statistically to make inferences about populations. First, an N-of-1 trial should be conducted for each patient in a sample that is representative of some population. Second, each N-of-1 trial in a group would account for the same independent variables including the same type of treatment(s). Third, each N-of-1 trial should use the same health measures and these measures should be able to recur or fluctuate in level over time. Fourth, the B/H scores or values of the strength of longitudinal association measures for all individuals in the group(s) should be computed in accord with the same scoring protocol.

Here are two related examples illustrating both single group and multiple groups multiple N-of-1 clinical trials. Both examples assume that the various treatments and/or doses can be delivered in a form such as capsules that are identical in appearance to facilitate masking.

For the first example, assume that the primary objective of a clinical trial is to evaluate the overall benefit/harm of a drug across many health variables used to evaluate safety and efficacy for a particular population of patients. Secondary objectives of the trial are to examine evidence for differential response across patients as well as dose-response relationships. An additional secondary objective is to investigate any delay and persistence with respect to a sentinel efficacy measure using a temporal resolution of one day.

Both examples will evaluate five doses including a zero dose that is placebo. Also assume that two-week treatment periods are sufficiently long to accommodate any delays and persistencies of responses to treatments.

The objectives for the first example can be achieved with a randomized, placebo controlled, double-masked multiple N-of-1 clinical trial in a single group of patients. Such a trial could be designed and conducted as follows assuming that the sample of patients is representative of the population of interest. Both examples are relatively simple compared to what is possible and the presentations focus only on certain options and key details.

Assuming that objectives of both examples include evaluation of each of the five doses including placebo in each patient and given that the treatment periods are two weeks long, the study interval for each patient would be at least 10 weeks. The five doses would be randomly assigned to the treatment periods with the restriction that each dose would be assigned at least once for each patient. Suppose that all of the health variables used to measure overall benefit/harm are measured at the end of each week. In addition, suppose that a sentinel efficacy measure such as symptom severity or a physiological variable monitored at home with an Internet-enabled device is measured every day.

Data for multiple N-of-1 trials are analyzed in two primary phases. The first phase consists of computing B/H scores and values of any derivative measures for each patient in accord with one scoring protocol. The second phase consists of statistical analyses of the B/H scores and values of any derivative measures for the group.

Here are some key options that need to be specified in benefit/harm scoring protocols. For these examples assume that information in all data for each patient is portrayed by dichotomous series at an ordinal level of measurement. The decision to transform the health variable data before each of these variables is converted into a set of dichotomous series depends on whether or not investigators want to evaluate short-term treatment effects relative to any longer-term trends in the health variables over the entire study interval. For these examples, delay with respect to the health measures used to evaluate overall benefit/harm would have two levels, 0 and 1 week. Delay and persistence with respect to the sentinel efficacy measure would be investigated with six levels each, 0 through 5 days. Scoring protocols also would specify importance weights, or a procedure for obtaining importance weights, for each health variable used to evaluate overall benefit/harm.

Given the B/H score arrays that result from applying the scoring protocol to the data for each patient, each of the objectives of the first example would be achieved as follows.

The primary objective is to evaluate the overall benefit/harm of the drug across many health variables used to evaluate safety and efficacy. Here are the steps for achieving this objective. First, form the benefit/harm profile for each patient. Identifying the B/H score in the array with the largest absolute value for each health measure does this. In other words the B/H score array for each health measure for each patient is summarized across dose, health variable level, and delay. Second, compute the overall B/H score across all health measures for each patient by obtaining a weighted average of all the scores in the patient's profile. The scores in each patient's profile would be weighted by their importance weights. Third, conduct the statistical analysis by performing a two-tailed single group t-test on the mean of the overall B/H scores. In other words, attempt to reject the null hypothesis that the mean of the overall B/H scores is zero. Rejection of the null hypothesis in the negative direction would indicate that the treatment is harmful. Rejection of the null hypothesis in the positive direction would indicate that the treatment is beneficial.

Note what can be achieved by the complementary use of MQALA and the statistical method. The overall benefit/harm of a treatment for a specified population of patients can be evaluated in a randomized, placebo controlled, double-masked clinical trial across many health variables, doses, and delays with one single group t-test on mean overall B/H score. Single group multiple N-of-1 clinical trials obviate concern about the comparability of treatment groups. This general research strategy, which has many variations and additional options, could be applied for a wide variety of scientific investigations.

The secondary objectives of the first example can be achieved as follows. Evidence for differential response in overall benefit/harm can be evaluated by examining the shape of the distribution of the overall B/H scores across individuals. For example, a bimodal distribution would suggest two subgroups of patients. In addition, the benefit/harm profiles for all patients in the group could be analyzed statistically to identify patient clusters and benefit/harm factors.

Dose-response relationships can be obtained for each patient and for the group as a whole by summarizing the B/H score arrays and by averaging the summaries. Beginning with a quite detailed level of examination for each patient, dose-response relationships can be examined for each health variable by summarizing the arrays across health variable level, and delay for each of the four nonzero dose levels. The dose-response relationship for overall benefit/harm for each patient can be obtained by applying the importance weights while averaging the health variable specific dose-response relationships for each patient.

Dose-response relationships can be obtained for each health variable for the group as a whole by averaging the health variable specific dose-response relationships across patients. The dose-response relationship for overall benefit/harm for the group as a whole can be obtained by averaging the dose-response relationships for overall benefit/harm across patients.

All analyses that have been described to achieve the primary and secondary objectives in these examples use planned dose as the independent variable in accord with intent-to-treat. All of these analyses could be repeated for exploratory investigations using data about adherence to the therapeutic regimen and/or concentrations of drug in blood. These exploratory investigations would depend primarily on collecting the data during the course of the trial, the quantification of benefit/harm using an interval level of measurement for the independent variable(s), and interpolation between levels of the independent variables while averaging "dose-response" relationships.

The secondary objective involving delay and persistence with respect to a sentinel health variable could be achieved with several options. Benefit/harm as a function of delay would be examined by first summarizing the array for each patient across dose, health variable level, and persistence. These summaries would be averaged across patients to examine benefit/harm as a function of delay for the group. Benefit/harm as a function of persistence would be examined in an analogous manner except that the summaries would be obtained across dose, health variable level, and delay. In addition, benefit/harm can be examined as functions of delay and persistence simultaneously by summarizing across dose and health variable level for each patient and averaging these summaries across patients.

The second example is a multiple group, multiple N-of-1 clinical trial that is double randomized, placebo controlled, and double-masked. Suppose that the primary objective of the second example is to compare overall benefit/harm across many health variables for two different drugs for the same indication. Secondary objectives are to evaluate overall benefit/harm for both of the individual treatments. In addition, all of the secondary objectives that were identified for the first example would be evaluated for both types of treatment. Such a trial could be designed and conducted as follows.

The second example is a double randomization design. Double randomization means both that interventions are randomized to individuals that are members of groups and that amounts of one intervention are randomized to periods for each individual.

Patients in the multiple groups, multiple N-of-1 clinical trial for the second example would be randomized to a separate group for each of the two drugs. For the second example, suppose that the trial for each group is designed and analyzed exactly as the group in the first example. This means that each patient is randomized both to one of the groups for different drugs and to various doses of one of the drugs for different periods.

The null hypothesis of no difference in mean overall benefit/harm between the treatments in the second example could be evaluated with a two-tailed t-test for two groups. Rejection of the null hypothesis would indicate that one of the treatments is either more beneficial or at least less harmful.

Special precautions need to be taken while interpreting the results of statistical tests that compare LASs or B/H scores for different groups. These precautions derive from the fact that LASs and B/H scores quantify the amount of evidence for longitudinal associations between the independent and the dependent variable(s). The amount of this evidence is affected by several factors including not only the strength of the associations but also the number of repeated measurements used to compute the LASs or B/H scores. Differences between amount and strength of evidence for longitudinal associations are illustrated in Section 2.1.

The need for this precaution can be illustrated in the context of the second example. Suppose that the results of the statistical analysis indicated that treatment A was significantly more beneficial than treatment B. Care must be taken in interpreting this result because it could support two somewhat distinct reasons for the conclusion. First, it could be assumed that the longitudinal association between treatment and health is stronger for treatment A than for treatment B. In the alternative, it is possible that more patients dropped out of the trial in treatment group B, possibly because of unpleasant or harmful treatment effects. Other things being equal, the dropouts would reduce the magnitudes of the B/H scores for the group that received treatment B. Both reasons would tend to favor treatment A. Determination of the correct reason(s) for the conclusion would be facilitated by statistical tests on the strength of longitudinal association measures and the denominators of these measures in addition to the overall B/H scores themselves. Statistical testing of strength of longitudinal association measures alone generally is not apt to be an efficient option because the strength measures can yield the maximum value of 1 with only two repeated measurements, thus not taking advantage of information from larger numbers of repeated measurements.

Single group t-tests could be performed for both groups in the second example as described for the first example. These tests would evaluate the overall benefit/harm of both treatments in a randomized, placebo controlled, double-masked clinical trial. In addition, all the secondary objectives could be evaluated in the same way for both groups and the results for the two treatments could be compared.

Multiple N-of-1 clinical trials, which involve the complementary use of MQALA and the statistical method, constitute a new strategy for the conduct of group clinical trials. Subsequent sections include descriptions of how the multiple N-of-1 clinical trial strategy can address the previously identified limitations, problems, and needs that derive from conventional clinical trial designs and procedures.

2.6. MQALA, the Statistical Method, and Epidemiologic Investigations: An Example This hypothetical example illustrates how MQALA often can be applied either alone or together with the statistical method to create four novel research strategies relevant to the conduct of epidemiologic investigations. Three of these strategies address populations as individual conceptual entities. Epidemiology is one of several important areas of non-experimental investigation of groups in which these new research strategies often could be applied to advantage.

All four research strategies in this example are novel because the strategies are based on the quantification of longitudinal associations over time with MQALA. In contrast, most conventional epidemiologic investigations of humans quantify cross-sectional associations across persons and places in space effectively at one time. For example, cohort and case-control studies quantify relative risk between exposed and non-exposed groups. In addition, epidemiologists often examine secular trends to investigate associations over time. However, the conventional analytic tools used by epidemiologists appear to be limited for the quantification of longitudinal associations.

This four-part example also illustrates how predictions that are based on data and experience and are about associations can be either direct or indirect. This section discusses some issues of direct versus indirect prediction in the context of generalized conclusions arrived at by applying computational methods of empirical induction, either MQALA or the statistical method. The issues of direct versus indirect prediction also could be considered in the context of subjective experience and subjective impressions.

Direct predictions are made from generalized conclusions arrived at by investigating individuals directly as wholes. In addition, to be direct a prediction must be based on a generalized conclusion that describes the same individual for which the prediction is made.

The first part of this example will illustrate how MQALA can be applied to support direct predictions about longitudinal associations, the predictions being for real individuals. The third part of this example will illustrate how MQALA can be applied to support direct predictions about longitudinal associations, the predictions being for individual conceptual or collective entities, namely populations. Because the actual repeated measurements analyzed by MQALA are not considered to be samples of possible repeated measurements, the predictions supported by MQALA are not indirect by virtue of being from sample data.

The statistical method also can support direct predictions. For example, the correlation between height and weight that is based on data for all members of a population can support a direct prediction about the correlation between the same variables and for the same population in the future. Such predictions are about cross-sectional associations. The statistical method is not well suited to make predictions about longitudinal associations because the statistical method is not well suited to quantify longitudinal associations. In addition, the statistical method is not well suited to support direct predictions that are for real individuals because descriptive statistics describe groups and because statistical inferences are inferences about collective entities.

Indirect predictions either are based on sample data or are based on generalized conclusions that describe different individuals than the individuals for which the predictions are made. A different individual can be of the same or of a different type with respect to being a real individual versus being a conceptual or collective entity. For example, if a prediction is for a particular depressed patient and the generalized conclusion is about another depressed patient, the prediction is indirect because the two individuals are different but of the same type. If a prediction is for a particular depressed patient and the generalized conclusion is about a class or population of depressed patients, the prediction is indirect because the two individuals are of different types, a real individual versus a collective entity.

Indirect predictions generally are based on membership in collective entities. The quality of indirect predictions is dependent on the extent to which the individual for which a prediction is made is represented by the collective entity. Indirect predictions are most apt to be of high quality when the entity for which a prediction is made is a member of a homogeneous group such as a population of clones with identical histories.

Doubly indirect predictions are both based on sample data and are for different individuals than the individuals described by the generalized conclusions. Group clinical trials and epidemiologic investigations generally support predictions that are doubly indirect for particular patients and other individuals.

Direct, indirect, and doubly indirect predictions are all based on the assumption that associations described by generalized conclusions arrived at from available data by applying MQALA, the statistical method, or both will continue to obtain in the future.

In the context of medicine, clinical prediction often is distinguished from statistical prediction. Similarly, clinical epidemiology often is distinguished from epidemiology. Within the context of medicine, MQALA can be considered in part to be a method and system of clinical prediction and of clinical epidemiology because it can support direct predictions for individual patients. This example also demonstrates how MQALA can be applied in epidemiology to conduct direct investigations of longitudinal associations in populations.

This four-part example involves associations between three primary variables for three types of individuals. The first of the three types of individual in this example is a real entity, an individual person, residing in a United States urban area with a population of more than 500,000 persons. The last two types of individuals are conceptual entities. The second type of individual is the population of a particular United States urban area with a population of more than 500,000 members, said members being individual persons. The third type of individual is a population of populations, a population in which each member is a United States urban area with a population of more than 500,000 individual persons.

The three types of individuals differ substantially in the sizes of their memberships. For the first type, individual persons are considered individually, meaning a membership of one. The second type of individual is a particular United States urban area that has a large membership, more specifically a membership of more that 500,000 persons. The third type of individual has a small number of members, one member for each United States urban area with a population of more than 500,000 persons.

For this example, the term "sample" is used to indicate both that a sample has two or more members from a population and that a sample is not exhaustive. A sample that is not exhaustive has fewer members than the population.

The three primary variables for this example are air pollution values in urban areas, the severity of respiratory distress, and death rates. Certain assumptions about these three measures apply to all four parts of this example. Air pollution can be one independent variable or it also can be one set of air pollution variables used to define Boolean independent events or to compute values of an index predictive of either respiratory distress or death rates. For this example, assume that the measure of air pollution for a particular urban area is representative of air pollution for all persons residing in that particular urban area.

The severity of respiratory distress is measured and/or rated for individual persons. The severity of respiratory distress for this example will be used as a dependent variable when investigating the effects of air pollution and as an independent variable to explore one potential mechanism by which air pollution values may be associated with death rates. When used as a dependent variable, the severity of respiratory distress can be one sign or one symptom or it can be one set of signs and/or symptoms used to define Boolean dependent events or to compute values of overall B/H scores. When used as an independent variable, the severity of respiratory distress can be one sign or one symptom or it can be one set of signs and/or symptoms used to define Boolean independent events or to compute values of an index that is predictive of death rates. One advantage of the four novel research strategies in this example is that many air pollution variables and/or many components of respiratory distress could be investigated simultaneously.

Death rates, which can be investigated for each of the two types of conceptual entity in this example, are number of deaths per 1,000,000 persons per day. Assume all three primary variables in this example are measured daily yielding a temporal resolution of one day. The epidemiologic research strategies illustrated, in this example can have higher temporal resolution than most conventional epidemiologic research strategies. Higher temporal resolution often improves analyses of longitudinal associations.

The first of the four related parts in this example is to use MQALA to arrive at generalized conclusions about longitudinal associations between air pollution values and the severity of respiratory distress for an individual person in one urban area. The generalized conclusions for the first part of this example, which can be generalized over many of the daily repeated measurements, consist of a B/H score array that quantifies longitudinal associations between air pollution values and the severity of respiratory distress for an individual person. This array for an individual person can be extensive and detailed and would be easy to summarize.

Predictions for the first part of this example can be based either on the B/H score array or on values of a predictive index that can be computed from components of the array if there is more than one air pollution variable. The predictions would be direct if the predictions are for the same individual person that is described by the data. The predictions would be indirect if the predictions are for other individual persons, the same urban population of which the individual is a member, a different urban population, or the population of urban populations.

The first part of this example illustrates a strategy that could be used for clinical prediction or in clinical epidemiology. Although the first part of this example may not be considered a strategy for conventional epidemiologic research because it addresses real individuals rather than populations, the procedures for the first part could be applied to many epidemiologic investigations. This is illustrated by the second part of this example.

The second part of this example is to use MQALA together with the statistical method to arrive at generalized conclusions and make predictions about longitudinal associations between air pollution values and the severity of respiratory distress for the population of persons residing in one urban area.

Analyses for second part of this example involve three major steps. The first major step is to use MQALA to quantify longitudinal associations between air pollution values and the severity of respiratory distress for each person in a sample of persons from an urban population. This first step is identical to the first part of this example except that it is repeated for each person in the sample. The first major step includes summarizing the B/H score array for each person with a single B/H score, computing the overall B/H score for each person if there are two or more variables of respiratory distress, or computing a value of a predictive index for each person in the sample. As before, values of a predictive index can be computed if there are two or more air pollution variables.

The second major step for the second part of this example is to compute values of descriptive statistics such as means and standard deviations across individual persons in the sample. These descriptive statistics could be computed either for the summary B/H scores, overall B/H scores, or values of the predictive index. The descriptive statistics would describe longitudinal associations between air pollution values and the severity of respiratory distress for the sample of persons.

The third major step for the second part of this example is to use the descriptive statistics resulting from the second step to conduct a statistical test such as a single group t-test on the mean. The null hypothesis could be that the mean of the summary B/H scores, the mean of the overall B/H scores, or the mean of the values of the predictive index is zero for the population in the particular urban area that was sampled. Rejection of the null hypothesis in the negative direction would indicate that higher values of air pollution are associated with higher values of the severity of respiratory distress. Rejection of the null hypothesis in the positive direction would indicate that higher values of air pollution are associated with lower values of the severity of respiratory distress.

Assume that the null hypothesis in the preceding paragraph was rejected in the negative direction. The generalized conclusion would be that higher values of air pollution are associated with higher values for the severity of respiratory distress in the urban area that was sampled. Note that this generalized conclusion is not, in itself, detailed. Information about detail for the sample could be obtained by drilling down into the B/H score arrays that yielded the summary B/H scores, the overall B/H scores, or the values of the predictive index that were tested statistically.

The generalized conclusion that higher values of air pollution are associated with higher values for the severity of respiratory distress in the urban area that was sampled can be used to make predictions. A prediction for the same urban population that the data are about would be indirect because the prediction is based on sample data. Several types of prediction would be doubly indirect. For example, a prediction for a particular person in the same urban population would be doubly indirect first because the prediction is based on sample data and second because the prediction is for a different individual than the data was about, a person as distinct from a population. Similarly, predictions for persons in other urban populations, for other urban populations, and for the population of urban populations would be doubly indirect.

The third part of this example is to use MQALA to arrive at generalized conclusions and make predictions about longitudinal associations between air pollution values and death rates for the population of persons residing in one urban area. The third part of this example proceeds in a manner parallel to the first part in that both the first and third parts investigate individuals directly. The individual in the first part is an individual person investigated directly as an individual. The individual in the third part is one conceptual entity, namely one urban population, investigated directly as a whole.

The generalized conclusions for the third part of this example, which also can be generalized over many daily repeated measurements, consist of a LAS array that quantifies longitudinal associations between air pollution values and death rates for an individual urban population. This array for an individual population can be extensive and detailed and would be easy to summarize.

Predictions for the third part of this example can be based either on the LAS array or on values of a predictive index that can be computed from components of the array if there is more than one air pollution variable. The predictions would be direct if the predictions are for the same urban population that provided the data. The predictions would be indirect if the predictions are for individual persons, a different urban population, or the population of urban populations.

The fourth part of this example is to use MQALA together with the statistical method to arrive at generalized conclusions and make predictions about longitudinal associations between air pollution values and death rates for the population of United States urban populations. The fourth part of this example proceeds in a manner parallel to the second part in that both the second and fourth parts conduct investigations using samples. The second part sampled individuals. The fourth part samples United States urban populations.

Analyses for fourth part of this example also involve three major steps. The first major step is to use MQALA to quantify longitudinal associations between air pollution values and death rates for each urban population in a sample of urban populations. This first step is identical to the third part of this example except that it is repeated for each urban area in the sample. The first major step includes summarizing the LAS array for each urban population with a single LAS or computing a value of a predictive index for each urban population in the sample. As before, values of a predictive index can be computed if there are two or more air pollution variables.

The second major step for the fourth part of this example is to compute values of descriptive statistics such as the mean and standard deviation across individual urban areas in the sample. These descriptive statistics could be computed either for the summary LASs or values of the predictive index. The descriptive statistics would describe longitudinal associations between air pollution values and death rates for the sample of urban areas.

The third major step for the fourth part of this example is to use the descriptive statistics resulting from the second step to conduct a statistical test such as a single-group t-test on the mean. The null hypothesis could be that mean of the summary LASs or the mean of the values for the predictive index is zero for the population of urban populations. Rejection of the null hypothesis in the negative direction would indicate that higher values of air pollution are associated with lower death rates. Rejection of the null hypothesis in the positive direction would indicate that higher values of air pollution are associated with higher death rates.

Assume that the null hypothesis in the preceding paragraph was rejected in the positive direction. The generalized conclusion would be that higher values of air pollution are associated with higher death rates in the population of United States urban areas. Note that this generalized conclusion is not, in itself, detailed. Information about detail for the sample could be obtained by drilling down into either the LAS arrays that yielded the summary LASs or the values of the predictive index that were tested statistically.

The generalized conclusion that higher values of air pollution are associated with higher death rates in the population of urban populations that was sampled can be used to make predictions. A prediction for the same population of urban populations that the data are about would be indirect because the prediction is based on sample data. Several types of prediction would be doubly indirect. For example, predictions for particular persons who reside in a United States urban population would be doubly indirect because the prediction is based on sample data and because the prediction is for a different individual than the data was about, a person as distinct from a population of populations. Similarly, predictions for particular United States urban populations would be doubly indirect.

An additional component of the fourth part of this example would be to use the average daily severity of respiratory distress across persons in the sample of persons for each of the urban populations in the sample of urban areas as an independent variable to investigate potential mechanisms by which higher values of air pollution may increase death rates. A conclusion that higher death rates are caused by higher air pollution values would tend to be supported if higher values of air pollution are associated over time with both higher values of respiratory distress for individual persons and higher death rates for populations. The same conclusion also would tend to be supported if higher daily average values of respiratory distress also are associated over time with higher death rates. In addition, the same conclusion would tend to be supported if all of these longitudinal associations are in the appropriate temporal order for a causal relationship as investigated with the MQALA analysis parameter called delay.

As an adjunct to this example, predictive indices such as those that could be used to investigate a set of air pollution variables as described in this example also could be used to investigate the apparent effects of other sets of independent variables on various outcomes including death rates.

The four parts of this example have demonstrated how MQALA can be applied, either alone or together with the statistical method, for many non-experimental investigations.

2.7. How MQALA Addresses the Nexus of Limitations, Problems, and Needs

The underlying reasons for the nexus of many related limitations, problems, and needs are that conventional applications of measurement, the experimental method, and computational methods of empirical induction are too limited.

The sections about MQALA's features, applications, uses, the complementary roles of MQALA and the statistical method, and use of experimental and non-experimental methods of investigation have laid the foundation for addressing the nexus of limitations, problems, and needs that was presented in Section 1.2.1 and all its subsections. In general, the limitations, problems, and needs are addressed by exploiting features of MQALA that tend to make it distinct from the statistical method as described in Section 2.3.

The keys for understanding how MQALA addresses the nexus of problems presented in this document are to understand that 1) the heart of the nexus is a measurement problem, not a statistical problem, 2) MQALA addresses the measurement problem by quantifying longitudinal associations within individuals and, 3) MQALA and the statistical method often are complementary computational methods of empirical induction.

2.7.1. Addressing the Fundamental Limitations of the Statistical Method

This section describes how MQALA addresses the four fundamental limitations of the statistical method that were presented in Section 1.2.1.

The first fundamental limitation is that the statistical method is not well suited to perform empirical induction for individuals. MQALA addresses this limitation because MQALA is applied directly to data about individuals investigated individually as wholes. MQALA can be applied to arrive at generalized conclusions about longitudinal associations, said conclusions being generalizations over time and across variables and being about the particular individual that was investigated.

MQALA also can be used to make direct predictions for particular individuals as explicated in Section 2.6. In addition, MQALA offers the predictive index feature (Sections 2.1 and 4.1.17) for making predictions for individuals when there are two or more independent variables or two or more sets of independent variables used to define Boolean independent events.

An additional feature of MQALA that is particularly relevant to prediction is the analysis parameter called delay. When generalized conclusions and predictive indices are based on positive, non-zero levels of delay, presently available values of independent variables and presently available information about independent events can be used to make direct predictions about future values of dependent variables and the future occurrence of dependent events.

The first part of the two-part first limitation is that the statistical method is not well suited to be applied during investigations of unique individuals. The reason for this limitation is that groups can not represent that which makes individuals unique. MQALA is well suited to investigate associations involving unique individuals because it investigates individuals directly rather than indirectly as members of groups.

The suitability of MQALA to investigate individuals directly is especially valuable for investigating individuals that are unique because they are so inclusive. The statistical method appears to be less suitable for investigating inclusive entities because it may not be feasible to obtain statistical samples of inclusive entities from sufficiently homogeneous populations of inclusive entities. For example, it may not be feasible to sample investment markets and economies.

The second part of the first fundamental limitation of the statistical method is that the statistical method is not well suited to reveal that which may make individual group members different with respect to associations between and among variables. There are two primary reasons for this limitation. First, the statistical method proceeds by aggregating data across individuals as part of the procedures to arrive at generalized conclusions about groups. Aggregation obscures detail about individuals.

The second reason why the statistical method is not well suited to reveal that which may make individual group members different is that the statistical method does not provide generalized conclusions about longitudinal associations between and among variables for individuals. For example, without high quality generalized conclusions about individuals that distinguish placebo responders from responders to alternative treatments under investigation, it is difficult to identify that which makes treatment responders different from placebo responders. Without identifying such differences, it is difficult to develop the classification systems that could be applied to form more homogeneous groups that could be used to investigate individuals indirectly as members of groups and to support high quality indirect predictions for individuals.

The general strategy that users of the statistical method apply to avoid the problems of aggregation is to conduct investigations with more homogeneous groups. This strategy is limited. Here are two primary reasons. First, the quest for homogeneous groups rapidly becomes more difficult with increasing numbers of characteristics that may distinguish individuals. For example, it is difficult to form homogeneous groups that account for diversity in many genes. The number of groups required to investigate homogeneous groups can exceed the number of research subjects available.

The second reason why the strategy of investigating individuals indirectly with more homogeneous groups is limited is that this strategy depends on classification systems to form the more homogeneous groups but does not provide much of the information needed to form these classification systems. MQALA addresses this limitation because it can provide high quality generalized conclusions about longitudinal associations for individuals. For example, high quality generalized conclusions about the responses of individual patients to treatments can be used to develop classification systems for more efficient group investigations and higher quality indirect predictions.

Biotechnology is offering an alternative means of forming more homogeneous groups that are better suited to provide high quality generalized conclusions and predictions with the statistical method, namely clones. By reducing or eliminating genetic variability, clones make it easier to investigate the effects of differences in individual histories. Such investigations would be similar to studies of identical twins raised together or apart. But investigations of groups of clones are of limited value for identifying the specific genetic characteristics that are relevant to the selection of more homogeneous groups from general populations.

The second fundamental limitation is that the statistical method is not well suited to arrive at high quality generalized conclusions about longitudinal associations or to make high quality predictions for longitudinal associations. MQALA is the method for the quantitative analysis of longitudinal associations. The major distinction between MQALA and the statistical method that makes this possible is that MQALA can use information from many repeated measurements that are obtained while both independent variables and dependent variables vary over time for individuals.

The third fundamental limitation is that the statistical method is not well suited to investigate complexity and multidimensionality. MQALA addresses this multidimensionality problem in three primary ways, the last two ways being dependent upon the first.

First MQALA's capacity to address the multidimensionality problem derives from the fact that MQALA proceeds by portraying information in data in the form of dichotomous series as described in Section 2.3. This portrayal of information in data in the form of dichotomous series is required for MQALA to analyze longitudinal associations involving dimensional independent and dependent variables. Thus, if an independent variable were treatment and if treatment involved more than two doses, dose generally would become a variable or analysis parameter analyzed by MQALA. Dose often is an important variable in treatment evaluations.

Further to address the multidimensionality problem, once data have been converted into sets of dichotomous series, MQALA offers many analytic options that can be applied to the dichotomous series to investigate details involving additional variables. These analytic options include application of optional analysis parameters, analysis parameter levels, and defining Boolean independent and Boolean dependent events. These analytic options are applied before the computation of LASs, B/H scores, predictive indices, and overall B/H scores.

Data for individuals can be analyzed with MQALA in greater detail by applying more analysis parameters and analysis parameter levels, by defining more Boolean events while analyzing data for individuals, and by forming additional dichotomous series. Analyses that use such options and can account for more details that can make individuals different are more discriminating analyses. The primary advantage of more discriminating analyses is that discriminating analyses may account for more of the variation in the occurrence of dependent events or in values of dimensional dependent variables. The primary disadvantage of more discriminating analyses is that discriminating analyses increase the amount of computation required to perform analyses.

The second way that MQALA addresses the multidimensionality problem is with predictive indices. Predictive indices offer a procedure in addition to Boolean independent events to account for the effects of multiple independent variables. Predictive indices can use information from two or more independent variables and/or sets of independent variables used to define Boolean independent events to account for variation in the occurrence of dependent events or values of dimensional dependent variables.

The third way that MQALA addresses the multidimensionality problem is with overall B/H scores. Overall B/H scores offer a procedure in addition to Boolean dependent events to account for the effects of one independent variable or one Boolean independent event on two or more dependent variables and/or non-overlapping sets of dependent variables used to define Boolean dependent events. In addition, each overall B/H score is computed from a benefit/harm profile for the individual that quantifies the apparent effect of one independent variable or one type of Boolean independent event on all the dependent variables and/or sets of dependent variables used to define Boolean dependent events.

Together, overall B/H scores and benefit/harm profiles deal with multidimensionality and reveal detail. For example, an overall B/H score can deal in one analysis with the multidimensionality of evaluating the effects of a treatment on many dependent variables used to evaluate safety and efficacy while the benefit/harm profile reveals detail about benefit or harm for each dependent variable.

The fourth fundamental limitation of the statistical method is that it is not well suited to investigate changing individuals and the emergence of individuals that are unique. MQALA can address this limitation by quantifying longitudinal associations sequentially for individuals as described at the end of Section 2.1 and in Section 4.1.15. For example, a weakening in the strength of longitudinal associations between insulin and glucose values for an individual person could, indicate that the person is developing adult onset diabetes, especially if the longitudinal associations are quantified under standardized test conditions.

This section has described how MQALA addresses four fundamental limitations of the statistical method. The quality of generalized conclusions obtained by applying the statistical method depends on the availability and quality of the measures that are analyzed statistically. MQALA provides new high quality measures of longitudinal association for individuals, measures that can be analyzed statistically. As described in Section 2.4, the complementary use of MQALA and the statistical method increases the value of computational methods and systems of empirical induction, each of the two methods overcoming major limitations of the other method.

2.7.1.1. Addressing the Limitations of Correlation Coefficients

MQALA addresses the limitations of correlation coefficients for analyses of repeated measures data by providing a computational method and system of empirical induction specifically designed to quantify, discover, analyze, and describe longitudinal associations. Unlike correlation coefficients, the absolute values of LASs and B/H scores can increase indefinitely with the amount of evidence for longitudinal associations. MQALA also provides separate measures, computed from LASs or B/H scores, to quantify the strength of longitudinal associations (Sections 2.1 and 4.1.6).

MQALA provides a computational alternative to relying on subjective impressions about the benefit and harm of many treatments for individual patients and for assessing longitudinal associations involving investment market and economic time-series data. Longitudinal associations often are assessed to help evaluate interventions, to make predictions, and to learn how things work. MQALA includes features that address many common conditions that make if difficult to form subjective impressions that are precise, repeatable by the same investigator and reproducible by other investigators. In addition, computational protocols can help make the procedures transparent.

MQALA can help overcome the limitations of subjective impressions, including subjective impressions resulting from soft analyses. Compared to the cost of time for highly trained professionals to perform soft analyses, computation can be relatively inexpensive. In addition, analyses performed by computation from data may contribute more rapidly to the cumulative shared experience that is the hallmark science.

MQALA can be applied to provide new measures including measures of internal control, associations between stimuli and responses that guide behavior, and changes in these associations that constitute learning and conditioning. Advances in measurement often bode well for scientific progress.

2.7.1.2. Addressing the Limitations of Conventional Group Clinical Trial Designs and Procedures MQALA can address the nexus of related limitations, problems, and needs that derive from conventional clinical trial designs and procedures by being able to provide B/H scores. B/H scores are within patient measures, the measures being of good quality because they are precise, repeatable, reproducible, easy to summarize, and suitable for statistical analyses and when investigators accept responsibility for making B/H scores valid, detailed, and comprehensive.

B/H scores need to be distinguished from measures of health. B/H scores are measures of longitudinal association between treatment and health. The B/H scores used in clinical trials measure benefit and harm with respect to health variables. Group clinical trials that apply MQALA would be distinct from conventional clinical trials because the new clinical trials would measure and test the benefit and harm of treatment. Benefit and harm could be measured across one or more health variables.

B/H scores are within individual measures as described in Section 2.7.1. In the context of clinical trials, the individuals usually are patients.

B/H scores are precise, repeatable by the same investigators, and reproducible by other investigators when the scores are obtained by computation from data in accord with detailed computational protocols that are shared.

B/H score arrays are easy to summarize because B/H scores are standardized as described in Sections 2.1 and 4.1.1. Standardization also helps make B/H scores and overall B/H scores suitable for statistical analyses. A particular statistical test would be performed on the B/H scores for all the patients in a particular sample, one B/H score for each patient. Overall B/H scores computed for many health variables and with many repeated measurements are especially apt to meet assumptions for applying parametric statistical tests.

The validity of B/H scores depends primarily on the conditions under which data are collected from individual patients. Section 2.5 describes how data can be collected while applying the experimental method in the form of well-designed N-of-1 clinical trials.

The extent to which B/H scores are detailed depends primarily on extent to which investigators collect data on all variables that are relevant to their investigations and apply appropriate analytic options. Section 2.1 provides an overview of some of the analytic options that can be applied by investigators, options including various analysis parameters, multiple analysis parameter levels, and applications of Boolean operators to define Boolean independent events and Boolean dependent events.

The extent to which B/H scores are comprehensive depends primarily on the extent to which investigators collect systematic data on all dependent variables that are affected by treatment.

Section 2.4 describes how MQALA and the statistical method often could be used together in a complementary manner. In the context of group clinical trials, MQALA and the statistical method would be used in a complementary manner when statistical tests are performed on B/H scores or measures derived by computation from B/H scores. In other words, the statistical method would provide generalized conclusions for groups, the generalized conclusions for groups being about generalized conclusions for individual patients.

The quality of the generalized conclusions and predictions obtained by applying the statistical method during the conduct of group clinical trials depends on the quality of measures that are tested statistically. MQALA can improve the quality of group clinical trials by improving the quality of measures that are tested statistically.

The following sections describe how MQALA can address each of the previously identified limitations, problems, and needs. All these limitations, problems, and needs are addressed in the context of clinical trials of treatments used to manage or control chronic disorders.

2.7.1.2.1. Addressing the Targeting Problem in Clinical Trials

In general, MQALA addresses the targeting problem in clinical trials by providing a means for computing quality B/H scores, which are within patient measures. The next ten sections describe how MQALA addresses different aspects of the targeting problem.

2.7.1.2.1.1. Addressing the Need to Identify Treatment Responders, Placebo Responders, and Predictors of Differential Response MQALA can help address the need to identify treatment responders, placebo responders, and predictors of differential response by providing valid B/H scores that are patient, treatment, and health variable specific. Valid B/H scores identify treatment responders and can be used to distinguish treatment responders from placebo responders. Validity is more apt to be achieved when data are collected while the experimental method is applied in the form of well-designed N-of-1 clinical trials as described in Section 2.5.

The distinction between MQALA and the statistical method that is crucial to the validity of B/H scores is that MQALA uses independent variables as within patient variables. Each patient in a group clinical trial could receive placebo and any number of nonzero doses. Within patient variation in the independent variables allows the within patient contrasts between and among doses, including zero-dose placebos, contrasts that are required to distinguish treatment and placebo responders. Concerns about the lengths of treatment periods in N-of-1 clinical trials, delays of responses, and carry over effects can be addressed with MQALA in studies that investigate analysis parameters such as episode length, delay, and response.

MQALA also can address the need to identify placebo responders. Placebo responders are the responders who are not treatment responders. In the context of multiple N-of-1 clinical trials, placebo responders are patients whose health changes during the course of trails but for which the changes are not due to the treatments under investigation as indicated by valid B/H scores with substantial absolute values.

Identification of placebo responders could facilitate studies of the determinants of placebo response. Determinants could include things such as patient personalities, clinician care styles, and types of interaction between patients and clinicians.

The validity of B/H scores and measures derived from B/H scores is the key to identifying predictors of treatment response, placebo response, and differential response. Once treatment responders and placebo responders are identified and distinguished, conventional procedures can be used to identify predictors of differential response. For example, distributions of B/H scores can be examined for evidence of two or more distributions being combined. A bimodal distribution of B/H scores would suggest two subgroups of patients. Statistical procedures such as discriminative analysis could be applied to help identify potential predictors of response. Potential predictors include demographic characteristics, aspects of patient history, initial values of health measures, assessments of genetic polymorphisms, measures of gene expression, and measures if internal control.

Identification of subgroups would be facilitated by relatively large samples of heterogeneous patients. This means that the samples of patients used in clinical trials during drug development could be more representative of the populations likely to receive treatments after drugs are approved for marketing.

2.7.1.2.1.2. Addressing the Need for Both Detailed and Comprehensive Information MQALA addresses the need for clinical trials to provide detailed information by making it feasible to obtain B/H scores that are patient, treatment, and health variable specific. In addition, MQALA can be applied to conduct detailed examinations of particular characteristics of treatments, conditions under which treatments are used, characteristics of the health response, and temporal characteristics of any longitudinal associations between treatment and health.

B/H scores are patient specific because they are within patient measures. In contrast to the statistical method, MQALA retains detailed information about individuals because MQALA does not aggregate data across individuals (Section 2.3).

MQALA can be applied to provide detailed information about the apparent effects of treatment across each of two or more health variables in one analysis. The results are benefit/harm profiles that show evidence for benefit/harm for each dependent variable for each patient (Section 2.5). As examples, benefit/harm can be profiled across each item, sub-scale, and scale in composite rating scales (Section 1.2.1.2.1.2.3) and across each item in safety evaluations conducted by systematic elicitation (Section 1.2.1.2.1.2.5).

A distinctive characteristic of MQALA that allows it to provide detailed information is that MQALA proceeds by portraying information in repeated measures data with sets of dichotomous series (Section 2.3). Analyses of these dichotomous series with MQALA can yield extensive B/H score arrays (Section 2.1). The dimensions of these arrays correspond to analysis parameters such as dose, levels of dependent variables, episode length, episode criterion, delay, and persistence.

Boolean independent events (Section 2. 1) can be used to account for the conditions under which treatments are used. For example, Boolean independent events could be used to help account for the way concomitant medications, diet, and smoking may affect the benefit and harm of particular treatments under investigation.

Various features of MQALA can be applied in many combinations to achieve virtually unlimited amounts of detail in many treatment evaluations. Although such detailed evaluations are useful for targeting, scientific exploration, and precise identification of conditions that provide the most evidence for benefit/harm, the detail could be overwhelming if the detail could not be easily summarized to provide more generalized conclusions and comprehensive treatment evaluations.

MQALA addresses the need for comprehensive treatment evaluations in two primary ways. First, MQALA includes a feature to summarize B/H score arrays and components of B/H score arrays to various degrees. Easy summarization derives from the fact that each B/H score is one score from a distribution of potential scores that has a mean of 0 and a specified standard deviation such as 1 (Section 2.1).

Second, MQALA addresses the need for comprehensive treatment evaluations by including a feature to compute overall B/H scores across any number of dependent events and/or variables used to quantify treatment effects at a particular level of a hierarchy of treatment effects (Section 1.2.1.2.1.2.4). This feature can use differential importance weights to account for the fact that benefit/harm can vary in importance depending on the dependent event or variable, the patient, and the decision-maker. The extent to which MQALA can provide comprehensive measures of the effects of treatments depends primarily on the extent to which data are collected for all dependent variables that are affected by the treatment.

2.7.1.2.1.2.1. Addressing the Need for Many Analyses and the Problem of Many Tests MQALA addresses aspects of the need for many analyses and the problem of many tests with overall B/H scores. By applying this feature, benefit/harm can be evaluated across any number of health variables with one statistical test. Overall B/H scores can be applied to evaluate many beneficial and harmful effects simultaneously.

Evaluations with overall B/H scores do not preclude examinations of benefit and harm with respect to particular health variables or particular dependent events including Boolean dependent events. Overall B/H scores are computed from benefit/harm profiles that can be examined to reveal the effect of treatment on each particular outcome. These profiles can be examined for individual patients and profiles for individual patients can be averaged to examine benefit and harm for particular outcomes for groups or subgroups of patients.

Investigators would have the option of conducting additional statistical tests of benefit/harm with respect to any individual health measure or any subset of health measures. These additional tests would tend to reintroduce the problem of multiple statistical tests. However, the problem of multiple tests could be alleviated by gains in statistical power that can be achieved with MQALA by analyzing data with larger numbers of repeated measurements.

As described in Section 2.7.1.2.1.2, MQALA also addresses the need for many detailed analyses in addition to detail that can be provided by benefit/harm profiles. Such additional detailed analyses include evaluations of benefit/harm as functions of analysis parameters such as dose, health variable level, episode length and episode criterion, and delay and persistence. These additional analyses can be conducted insofar as the analysis parameters and analysis parameter levels were included in the original MQALA analysis that yielded the overall B/H scores that were tested statistically. These additional analyses can be conducted for individual health variables, Boolean dependent events, and overall B/H scores.

Additional examinations of analysis parameters and analysis parameter levels can be conducted by simply drilling down into the B/H scores arrays to reveal detail that was summarized in order to obtain the B/H scores that were tested statistically. Detailed examinations for groups with respect to analysis parameters and analysis parameter levels need not raise the problem of multiple statistical tests because the analyses can be descriptive rather than inferential.

In summary, the results of a group clinical trial with many health variables, said trial being for the evaluation of a treatment used to manage or control a chronic disorder, often could be presented in terms of the results of a single statistical test of overall benefit/harm together with many descriptive statistical examinations. The descriptive examinations could include the average benefit/harm profile across patients, benefit/harm profiles for individual patients and average profiles for subgroups of patients, and the detailed B/H score array for each patient. MQALA makes this possible because MQALA proceeds by using a dichotomous representation of information in repeated measures data rather than by aggregating information as described in Section 2.3.

2.7.1.2.1.2.2. Addressing Some Problems with Multivariate Analyses

MQALA addresses the problem of meeting the assumptions that should be met in order to conduct multivariate analyses by offering investigators the option of conducting statistical tests on B/H scores. B/H scores are apt to meet the assumptions that should be met in order to conduct parametric statistical tests. In addition, MQALA offers investigators the option of evaluating the benefit and harm of treatment with respect to many health variables by conducting univariate statistical tests on overall B/H scores. Section 2.5 illustrated use of relatively simple and widely understood t-tests of means to analyze results for randomized and controlled multiple N-of-1 clinical trials with many health variables and either one or two groups.

As described in Section 2.7.1.2.1.2.1, MQALA can be applied to conduct many other descriptive examinations of clinical trial results, examinations that may not be feasible with multivariate analyses.

2.7.1.2.1.2.3. Addressing the Aggregation Problem with Composite Health Measures MQALA addresses the aggregation problem with composite health measures by being able to yield benefit/harm profiles across all components of composites. This facilitates examination of how the effects of treatment may vary by component for different individual patients and how average profiles may vary by component for different subgroups of patients.

For example, benefit/harm can be profiled across all items in a rating scale for clinical depression. Benefit/harm profiles for individual patients could be examined to help determine if all patients who benefit benefit in the same way. In addition, benefit/harm profiles for individual patients can be averaged to help determine if different subgroups of patients who benefit benefit in the same way. This same approach can be extended to all health measures used to assess safety and efficacy in clinical trials whether or not the measures are components of particular indications.

2.7.1.2.1.2.3.1. Addressing the Weighting Problem for Composite Health Measures MQALA addresses the weighting problem by separating the basic scientific issue of quantifying treatment effects with B/H scores from the applied scientific issue of evaluating these effects with procedures that include explicit importance weights. B/H scores and either equal or differential weights can be combined mathematically to yield overall B/H scores (Sections 2.1 and 4.1.19).

Overall B/H scores can be easily recomputed with different importance weights to consider how changing the weights could affect the results of clinical trials. Re-analyses with different importance weights could be used to reflect the interests of different decision-makers.

2.7.1.2.1.2.4. Addressing the Problems Involving Hierarchies of Health Measures MQALA addresses the problems involving hierarchies of health measures by making it feasible to evaluate the overall benefit/harm of treatments across the large number of health variables that may be required to obtain comprehensive evaluations at a particular level of measurement in health measurement hierarchies. Overall B/H scores and measures of average overall benefit/harm can be computed from detailed benefit/harm profiles. These profiles provide detail for addressing the targeting problem, detail that is not available from high-level health measures.

It may be easier to achieve statistical significance in clinical trials that use more comprehensive evaluations at lower levels of health measurement than with high-level health measures. The reason for this is that the higher level measures are more apt to be affected by variables outside the traditional domain of medicine. For example, it may be easier to achieve statistical significance with comprehensive evaluations at the level of symptoms or at the level of physical and mental functioning than at the level of quality of life. In this example, unmeasured personality and environmental factors that affect adaptation to symptoms and disabilities may influence quality of life.

In addition, MQALA is well suited to explicate relationships involving health measures at different levels of health measurement, either directly through longitudinal associations across levels or indirectly through correlations between and among the quality within patient measures of benefit/ harm that are measures of longitudinal association. The same investigative procedures also could be used to elucidate the effects of factors such as environmental, social, economic, spiritual, and personality considerations that can affect measures such as quality of life.

2.7.1.2.1.2.5. Addressing the Problems Involving the Separation of Safety and Efficacy Evaluations MQALA addresses the problems involving the separation of safety and efficacy evaluations because MQALA can be applied to quantify both benefit and harm with respect to all health variables that are used in safety and efficacy evaluations. MQALA can address this problem to the extent that the health variables can be evaluated be quantifying longitudinal associations. Unlike conventional procedures, treatment evaluations using MQALA would include beneficial effects with respect to health variables used in safety evaluations.

MQALA also helps eliminate a major impediment to systematically eliciting information for safety evaluations because B/H scores are largely independent of event rates. Systematic elicitation would not tend to make treatments look bad because of higher event rates when the data are analyzed with MQALA.

2.7.1.2.1.3. Addressing the Need to Use Early Responses to Predict Later Responses MQALA addresses the need to use early responses to predict later responses by offering procedures that make special use of the analysis parameter called delay (Sections 2.1 and 4.1.9), the predictive indices feature (Sections 2.1 and 4.1.17), and the sequential analysis feature (Sections 2.1 and 4.1.15).

B/H scores obtained preferably under standardized conditions and using short delays can be correlated across patients with B/H scores obtained from the same patients using longer delays. The resultant correlation coefficients could be used to predict longer-delay responses of other patients as soon as the shorter delay B/H scores become available from these other patients.

B/H scores and benefit/harm profiles also could be used to predict major health events. For example, profiles that show B/H scores with respect to various lipid fractions including cholesterol components could be evaluated for their ability to predict heart attack, stroke, and death.

Applications of MQALA's predictive indices feature could extend these strategies by using information from two or more independent variables or predictors. Applications of MQALA's sequential analysis feature also could extend these strategies and reduce reliance on subjective impressions and human vigilance.

2.7.1.2.1.4. Addressing the Classification Problem

MQALA addresses the classification problem when overall benefit/harm is evaluated across a range of symptoms or other health measures without also requiring profiles of benefit/harm to conform to familiar profiles or expectations based on conventional classifications.

2.7.1.2.2. Addressing the Efficiency Problem in Clinical Trials

MQALA addresses the efficiency problem in clinical trials by providing new options for using scarce resources more efficiently to achieve clinical trial objectives. In general, these new options involve the use of more intensive clinical trial designs. Intensive designs are particularly valuable for evaluating orphan drugs and when there is need to identify subgroups of responders and indicators of differential response.

Improvements in the efficiency of clinical research have the potential to reduce the costs and increase the speed of drug development. MQALA can improve the efficiency of many conventional group clinical trials even though conventional trial designs are not well suited to address the targeting problem (Section 1.2.1.2.1).

2.7.1.2.2.1. Addressing Problems that Derive from Unreliable Measures of Treatment and Health MQALA can address the problem of unreliable measures of treatment and health because users largely can compensate for unreliable measures by increasing the number of repeated measurements used to compute B/H scores. In contrast and other things being equal, users of MQALA can achieve B/H scores of a particular absolute value with fewer repeated measurements when the measures of treatment and health are reliable.

The significance of being able to use larger numbers of repeated measurements to compensate for unreliable health measures can be illustrated in the context of a single group randomized multiple N-of-1 clinical trial (Section 2.5). More repeated measurements can be used to achieve B/H scores with larger absolute values. B/H scores with larger absolute values make it easier to reject a null hypothesis of no benefit or harm or, more specifically, to reject the null hypothesis that the mean B/H score for the group equals zero.

One way to increase the efficiency of many clinical trials is to reduce sample size requirements by performing statistical tests on B/H scores computed from more repeated measurements rather than on measures of health that have limited reliability. In addition, MQALA can increase the efficiency of many exploratory analyses whether or not the exploratory analyses use statistical tests.

As described in Section 1.2.1.2.2.1, some clinical trials increase efficiency when the reliability of health measures is limited by testing the means of series of health measurements for individual patients. This strategy is fundamentally different from the way users of MQALA can improve efficiency by using more repeated measurements. The former strategy works best when the repeated measurements of health are obtained under stable conditions. The latter strategy can work only when treatment changes in some manner such as dose while health is measured repeatedly.

Also as described in Section 1.2.1.2.2.1, some portion of variability in measures that is usually considered to be measurement error really is due to variability in other potential measures that have not been accounted for in analyses. MQALA provides a number of features such as the various analysis parameters and Boolean operators that can be applied in attempts to account for variability that is systematic.

2.7.1.2.2.2. Addressing Problems Related to Limitations in Using Independent Variables as Within Patient Variables Using independent variables as within patient variables is not a problem with MQALA. In fact, MQALA requires two or more different values of one or more independent variables in order to obtain a nonzero B/H score. In other words, the treatment of a patient must change in order to provide evidence for a longitudinal association between treatment and health. MQALA's use of independent variables as within-individual variables helps distinguish MQALA from the statistical method (Section 2.3).

Additional advantages that derive from being able to use independent variables as within patient variables include being able to analyze data from multiple N-of-1 clinical trials and evaluation of dose-response relationships within patients including when doses are increased gradually due to safety concerns. Being able to use independent variables as within patient variables also facilitates exploratory analyses in which actual consumed doses as well as concentrations of drugs and drug metabolites in bodily fluids are substituted for intended doses.

2.7.1.2.2.3. Addressing the Baseline Problem

MQALA addresses the baseline problem by not requiring measurements under stable conditions at baseline or at any other time. With MQALA, the results from all repeated measurements are equally important in the computation of B/H scores.

Instead of measuring changes from stable baselines, MQALA quantifies longitudinal associations that indicate health responses to changing treatment signals. Quantification of the effects of treatments for the measurement of chronic disorders is similar to the quantification of internal control in biological systems (Section 2.7.1.2.6). MQALA is most effective when both independent and dependent variables change or fluctuate in level over time.

Conventional experimental investigations that rely upon the statistical method as the sole computational method of empirical induction often attempt to establish stable baselines from which to evaluate the effects of interventions. In contrast, experimental investigations that include MQALA as a computational method of empirical induction would introduce controlled within-individual variation for the independent variables in order to quantify longitudinal associations.

It often may be more feasible to evaluate treatment effects by introducing variable treatment effect signals that investigators can control than by achieving stable baselines with respect to independent and dependent variables that the investigator may not be able to control.

2.7.1.2.2.4. Addressing the Problem of Missing and Erroneous Data

MQALA addresses the problem of missing data in analyses of repeated measures data by being more tolerant of missing data than the statistical method. Missing data would tend to decrease the magnitudes of B/H scores, increase the variance of B/H score distributions for groups, and increase sample size requirements. However, all patients could be included in statistical analyses of B/H scores. Patients who dropped out of an investigation before completing at least two repeated measurements or before any change in the level of treatment could be included in statistical analyses with B/H scores of zero. This inclusion of patients with B/H scores of zero facilitates statistical analyses based on the principle of intent-to-treat. Missing data would make it more difficult to reject the null hypothesis of no benefit/harm in statistical analyses of single groups and to reject the null hypothesis of no difference in benefit/harm for group comparisons.

MQALA addresses the problem of erroneous data because B/H scores are less apt to be seriously distorted because of occasional outliers. For example, a summary B/H score will not be affected if the most extreme value for a dependent variable is 1 point or 1,000 points higher than the second most extreme value in a dimensional series.

2.7.1.2.3. Addressing Problems Involving Soft Analyses of Clinical Trial Data

MQALA can help address problems involving subjective impressions about treatment effects, including subjective impressions resulting from soft analyses of clinical trial data, by providing a computational method and system of empirical induction that can be applied to quantify the benefit and harm of a treatment across many efficacy and safety health variables with a single score for a particular patient.

Overall B/H scores obtained by applying MQALA can be analyzed in turn with the statistical method to yield more comprehensive evaluations of particular treatments (Section 2.4). Statistical analyses of overall B/H scores provide generalized conclusions that are more generalized than conclusions provided by statistical tests of particular health variables. This reduces the need to perform many statistical tests and yields treatment evaluations that are more precise, repeatable, and reproducible.

Particular features of MQALA address needs in addition to comprehensiveness, additional needs that often are meet only partially by conducting many statistical tests and by arriving at generalized conclusions by forming subjective impressions. As examples, MQALA can provide detailed and comprehensive information, including information about dose and the effects of additional independent variables, which is needed to address the targeting problem (Section 2.7.1.2.1). These features include use of explicit importance weights while evaluating the various effects of treatment (Section 2.7.1.2.1.2.3.1) as well as procedures for explicating relationships between levels in health measurement hierarchies (Section 2.7.1.2.1.2.4).

A quantitative method called meta-analysis has been developed for pooling information from two or more clinical trials that, at least to some reasonable degree, are replications. B/H scores would facilitate meta-analyses.

2.7.1.2.4. Addressing Problems Related to Incompatibilities between Procedures for Rigorous Science and Quality Clinical Care MQALA addresses problems related to incompatibilities between procedures for rigorous science and quality clinical care by making rigorous science compatible with quality clinical care. More specifically, procedures for obtaining quality within patient measures of apparent benefit and harm during the conduct of multiple N-of-1 clinical trials (Section 2.5) can be the same as the procedures for conducting N-of-1 clinical trials to optimize therapy and outcomes for individual patients.

In addition, multiple adaptive N-of-1 clinical trials can be used in attempts to reject the null hypothesis of no benefit or harm for particular types of treatment, regardless of dose. Individual patients could receive two or more doses including zero dose placebos and different patients could receive different doses as they often do in clinical practice. Multiple adaptive N-of-1 clinical trials that test the overall benefit and harm of treatments, rather than specific doses of treatments, would be consistent with the expectation that clinicians should employ procedures to optimize doses as needed for individual patients in clinical practice.

Given that it is feasible to conduct randomized, multiple N-of-1 placebo-controlled clinical trials designed to provide quality within patient measures of apparent benefit/harm, placebo only groups generally appear to be relatively uninformative, costly, and questionable from an ethical perspective. Placebos can be used in controlled clinical trials without placebo only groups when the trials are to evaluate treatments for many chronic medical disorders.

Adoption of procedures that make rigorous science compatible with quality clinical care could help make scientific treatment evaluation an integral part of patient care. Adoption of these procedures has the potential both to speed scientific progress and to improve clinical care.

2.7.1.2.5. Addressing the Failure to Reveal Longitudinal Associations

The examples presented in Section 1.2.1.2.5 demonstrated that MQALA might reveal important associations between variables that can be missed by conventional analytic procedures. Revealing such associations is one way that MQALA can be said to help discover longitudinal associations. Associations revealed by MQALA that are apt to missed by conventional analytic procedures often are important because they provide information about mechanisms of action by which treatments have there effects.

2.7.1.2.6. Addressing the Need to Investigate Dynamic Functioning

MQALA addresses the need for new measures of internal control because one application of MQALA is the measurement of internal control. Internal control can be quantified and analyzed as functions of analysis parameters such as levels of the controlling and controlled variables, delay and persistency of response to the controlling variable, and episode length and episode criterion. In addition, Boolean operators could be applied to account for additional factors that may affect internal control. An option is to collect data under standardized test conditions. These new procedures would make it easier to make internal control an object of investigation in clinical trials.

Treatments for chronic disorders often involve modification or restoration of the body's natural control mechanisms that may not be stable or fluctuate in level over time. Optimization of treatment for such disorders may require dynamic precision dosing that could be achieved by adaptive N-of-1 clinical trials. Compared to fixed dosing, dynamic precision dosing may more closely achieve by external control what the body normally achieves by internal control.

MQALA adds dynamism to the enterprise of empirical science by emphasizing time during investigations of individuals both as individuals investigated directly as individuals and as collective entities.

2.8. Using MQALA and the Statistical Method to Best Advantage in the Age of the Internet MQALA is a new paradigm to perform empirical induction by computation. Unlike some new paradigms that affect investigations, MQALA is not intended to displace but rather to supplement and complement an established paradigm, in this case the statistical method. This section and its subsections provide general guidelines and forward looking-statements about using both MQALA and the statistical method to best advantage. The guidelines are for investigators and decision-makers that need to arrive at generalized conclusions and make predictions from data.

Many factors can affect forward-looking statements. In this case, MQALA provides new measures that enable novel experimental (Section 2.5) and non-experimental (Section 2.6) research strategies for many areas of investigation. In addition, MQALA helps solve a nexus of analytic problems that impedes scientific investigations and practical evaluations of various courses of action. The novel research strategies and solutions provided by MQALA need to be evaluated in practice. In addition to uncertainties about the specific results of many possible evaluations, MQALA is coming early in a rapidly changing new age of information, measurement, and communications technologies—the age of the Internet.

MQALA is an invention that can help shape the development of the Internet. The Internet can help make novel investigative strategies and information services feasible and useful, especially strategies and services that can help many users and benefit from many repeated measurements from anywhere anytime.

The following subsections address some relative advantages of MQALA and the statistical method from the epistemological, practical, and historical perspectives. The discussion will use medicine and health care as primary examples of the many areas of investigation and practice in which computational methods of empirical induction can be applied. By focusing on medicine and health care, the discussion emphasizes the complementary roles of MQALA and the statistical method (Section 2.4). MQALA also could be the primary computational method of empirical induction for investigations of individuals such as economies and investment markets that tend to be unique because of their inclusiveness (Section 1.2.1). In short, this document focuses on the use of MQALA to promote health rather than to promote wealth.

2.8.1 Using MQALA and the Statistical Method to Best Advantage from an Epistemological Perspective From an epistemological perspective, the statistical method is presented as the computational method of empirical induction for describing groups as collective entities, for making inferences about collective entities, and for investigating individuals indirectly as members of collective entities. In contrast, MQALA is presented as the method of empirical induction for describing longitudinal associations for individuals investigated directly as individuals and for collective entities investigated as wholes. These distinctions have important implications for applying MQALA and the statistical method in various disciplines and fields of investigation and practice.

Some disciplines focus on investigations of collective entities. Such investigations often are intended to arrive at generalized conclusions that can be used to make predictions for collective entities. Sociology focuses on groups and classes. Epidemiology, a branch of medicine, focuses on populations. The statistical method can be applied to describe and make inferences about such collective entities. As illustrated in Section 2.6, MQALA also can be applied to investigate longitudinal associations for collective entities investigated as wholes.

Some disciplines focus on investigations of individuals and arriving at generalized conclusions that can be used to make predictions for individuals. Psychology focuses on individuals, often persons. Clinical medicine and clinical research could be expected to focus on individual patients. The statistical method can be applied to investigate individuals indirectly as members of collective entities. In contrast, MQALA can be applied to investigate individuals directly as individuals.

Many problems in performing empirical induction derive from investigating individuals indirectly as members of collective entities without also investigating individuals directly as individuals. For example, all 20 subsections of Section 1.2.1.2 describe problems involving the conduct of clinical trials of treatments for the management and control of chronic disorders. All of these problems derive from investigating individuals indirectly as members of collective entities without also investigating individuals directly as individuals.

The invention of MQALA addresses problems that derive from investigating individuals indirectly without also investigating individuals directly. The ways in which MQALA addresses the clinical trial problems are illustrated by the 20 subsections of Section 2.7.1.2. MQALA also is a computational method and system for investigating unique entities and provides an improved means for measuring dynamic functioning, change, and emergence. MQALA is the common solution for the nexus of limitations, problems, and needs that was introduced in Section 1.2.1.

MQALA is not an analytic option for all phenomena. MQALA is an analytic option when both independent and dependent variables involve events that can recur and/or variables that can change or fluctuate in level over time for individuals. The statistical method remains the method of choice when, for example, the indirect objects of inquiry are real individuals and the dependent variable is being either alive or dead.

Despite the just mentioned death example, MQALA could be applied to investigate predictors of death. For example, disordered regulatory control among measures of vital signs could be expected to be predictive of death. This topic could be investigated as follows. Specific measures of regulatory control could be quantified with MQALA for each patient in a group. The measures of regulatory control could be analyzed statistically to identify any disordered longitudinal associations that may be predictive of death in the group. Thus although MQALA can not be applied to investigate death in individual patients, MQALA could provide measures that are predictive of death.

Many advantages of MQALA derive from the fact that MQALA addresses the fundamental limitations of the statistical method that were introduced in Section 1.2.1 and addressed in Section 2.7.1. MQALA often can be applied to investigate individuals directly. If that which makes an individual unique or different is relevant to a generalized conclusion or prediction and the phenomena allow, MQALA generally would appear to be the method of choice for investigating the individual whether the individual is, as examples, a person, an economy, or an investment market. Because of the complementarity between MQALA and the statistical method that was described in Section 2.4, the statistical method could be applied to the quantitative generalized conclusions arrived at with MQALA to investigate the individual as a member of a collective entity.

MQALA generally would appear to be the method of choice when the phenomena under investigation can be addressed by quantifying longitudinal associations. Such phenomena consist of dynamic functioning, which includes internal control as well as external control that is quantified with B/H scores. For such examples, the advantages of MQALA derive primarily from MQALA being able to measure or quantify the phenomena under investigation. Again, MQALA and the statistical method generally can be applied together to also investigate individuals as members of collective entities.

MQALA offers advantages when applied either alone or in conjunction with the statistical method for investigations that involve complexity and multidimensionality. These advantages derive primarily from MQALA being able to investigate many independent and dependent variables in one analysis.

MQALA also offers advantages for investigations involving change and emergence. These advantages derive primarily from MQALA being able to account for time in a more detailed and systematic manner than the statistical method. MQALA and the statistical method generally can be applied together to also investigate the way individuals change as members of collective entities.

Here are three additional considerations that affect how MQALA can be advantageous from an epistemological perspective. The first of these considerations was illustrated in the context of group clinical trials in Section 2.7.1.2. For this and many other areas of investigation, the quality of generalized conclusions obtained by aggregation and inference with the statistical method often can be improved by improving the quality of the measures that are aggregated. MQALA can provide measures of longitudinal associations for individuals that are of high quality because the measures are precise, repeatable, reproducible, valid, detailed, easy to summarize, comprehensive, and suitable for statistical analyses. This consideration generally calls for the application of MQALA whenever there is uncertainty about important predictions and whenever the phenomena allow.

The second of the group of three epistemological considerations derives from the fact that predictions based on generalized conclusions arrived at by application of the statistical method often are doubly indirect (Section 2.6). Both the conduct of such investigations and the use of their generalized conclusions to make predictions are dependent on the existence of high quality systems for classifying the individuals under investigation. For example, both the conduct of group clinical trials and the use of their generalized conclusions to make predictions about individual patients are dependent on quality systems for classifying medical disorders.

Medical classification systems are in their infancy in part because they do not account for all differences in genomes, gene expression, and measures of internal control that are relevant and important to treatment decisions. As presented in discussions about addressing the targeting problem (Section 2.7.1.2.1 and its 10 subsections), the high quality measures of longitudinal association for individuals that can be provided by MQALA can help make these classification systems possible. This consideration also generally calls for the application of MQALA whenever there is uncertainty about important predictions and whenever the phenomena allow.

The third of the group of three epistemological considerations is that MQALA can contribute to the development of the cumulative systematic experience that is a hallmark of science because MQALA makes, for example, the procedures of good clinical practice more consistent with the procedures for good clinical research. MQALA makes it more feasible to conduct clinical research while practicing quality individualized health care. MQALA can help clinicians and patients function as investigators. This consideration also generally calls for the application of MQALA whenever there is uncertainty about important predictions and whenever the phenomena allow.

2.8.2. Using MQALA and the Statistical Method to Best Advantage from a Practical Perspective The advantages of computational methods of empirical induction compared to non-computational methods and the relative advantages of MQALA and the statistical method also can be considered from a practical perspective. This practical perspective involves decision-making. Many decisions are based on predictions that if certain conditions exist or are created then certain events, outcomes, or consequences will follow. Such predictions are about associations between and among independent and dependent variables.

This section addresses the quality of predictions as well as ten considerations that affect the relative practical values of MQALA and the statistical method in the context of making decisions about the treatment of patients with chronic disorders. This section also identifies some ways in which MQALA and the Internet can have an impact on health care as well as the information technologies that support health care. The presentation emphasizes the novel advantages of MQALA.

High quality predictions for both real individuals and collective entities are based on high quality generalized conclusions. High quality predictions about associations are statements that particular associations already observed and described by high quality generalized conclusions will continue to obtain in the future. Section 1.2 includes the definition of quality for generalized conclusions and predictions that is used in this document. This definition of quality includes a transparency criterion that distinguishes the proprietary expertise of persons from generalized conclusions and predictions that are of high quality in part because they can be shared in the same way that scientific knowledge can be shared.

Many decisions are based on predictions about associations. Actions guided by decisions based on high quality predictions are more apt to achieve intended outcomes in a reproducible manner. A shared capacity to make accurate predictions and achieve intended outcomes indicates that the generalized conclusions that supported these predictions and achievements were of high quality.

The quality of predictions depends on the quality of the materials upon which the predictions are based. Using the terminology of this document, the materials upon which predictions are based are subjective experience, data, subjective impressions, and generalized conclusions. Data are recorded observations and experiences. Subjective impressions and generalized conclusions are both about associations between and among variables. As described in Section 1.2.1.1, subjective impressions about data are soft analyses that are subject to all the limitations of subjective impressions. Generalized conclusions are obtained from data by applying computational methods of empirical induction. MQALA can be applied to obtain generalized conclusions about individuals. The statistical method is best suited to yield generalized conclusions about collective entities.

One reason why predictions that are based on data and generalized conclusions are of higher quality than predictions based on subjective materials is that generalized conclusions are repeatable and reproducible. A generalized conclusion based on a particular set of data and a particular detailed computational protocol is as repeatable and reproducible as the result of a computation. Both MQALA and the statistical method offer a means for arriving at high quality generalized conclusions that can support high quality predictions.

Five of the ten considerations that affect the relative practical values of MQALA and the statistical method involve the precedence of direct versus indirect predictions. Section 2.6 distinguishes direct from indirect predictions. Here are examples of precedence in the context of conventional clinical practice.

Clinicians often change treatments, including doses of treatments, for individual patients. Changes in treatments for particular patients often are based on subjective impressions arrived at over time about the way individual patients have responded to previous treatment. These subjective impressions often include soft analyses of data in patients' medical records. As examples, clinicians may increase doses in attempts to increase efficacy. Clinicians also may stop drug treatments because of adverse reactions, lack of efficacy, or both.

In such examples of how precedence often affects treatment decisions, direct predictions based on previous experience with particular patients investigated individually often take precedence over doubly indirect predictions based on group clinical trials. For example, the direct prediction may be that continued treatment would be harmful or of little benefit for a particular patient. The indirect prediction, which may be expressed in treatment guidelines based on clinical trial results, may be that the particular treatment is the best treatment for patients in a particular diagnostic class.

Direct and indirect predictions may agree and support the same courses of action for treating particular patients. However, it is not unusual for direct and indirect predictions to disagree. Precedence of direct versus indirect predictions becomes an issue when the two types of predictions disagree.

Clinicians can be held accountable for decisions made when direct and indirect predictions disagree and call for different courses of action. For example, clinicians can be held accountable for using treatments recommended by treatment guidelines when the clinicians do not respond to evidence that the treatments are causing adverse reactions.

The invention of MQALA and the development of the Internet recast the old and important issue concerning the precedence of direct versus indirect predictions. Until the invention of MQALA, a primary choice while making treatment decisions for individual patients has been between quality predictions supported by the statistical method versus lower quality predictions supported by subjective impressions including subjective impressions resulting from soft analyses. After the implementation of MQALA, a primary choice in clinical decision-making will be between quality direct predictions supported by MQALA and quality indirect predictions supported by statistical method. MQALA provides the means for analyzing data for individual patients, including medical record data, and for making direct predictions that are of higher quality than subjective impressions.

The five precedence considerations help determine the best use from a practical perspective of direct predictions based on MQALA compared to indirect predictions based on the statistical method in supporting decision-making for various practical endeavors including clinical medicine.

The relative practical values of MQALA and the statistical method for making high quality actionable predictions about the benefit and harm of treatments generally depend on the (1) amount, (2) quality, (3) specificity, (4) applicability, and (5) accessibility of evidence in the materials upon which predictions are based. The first five considerations, which involve precedence, often are particularly important while clinicians make urgent decisions throughout episodes of health care.

The relative practical values of MQALA and the statistical method also depend on (6) the timeliness and impact of educational feedback provided to those who rely on the methods, (7) ways in which experience, insight, and intuition can improve computational methods of empirical induction, and (8) the efficiency of conducting investigations when there is uncertainty about important predictions. The last two considerations discussed here are (9) the power of predictions to motivate action and (10) the extent to which the two methods can be used to empower individuals and groups to conduct investigations that lead to actionable predictions that are apt to be supported by new experience including data.

The first consideration affecting the precedence of direct versus indirect predictions is the amount of evidence in the materials upon which predictions are based. The amount of evidence for direct predictions that are based on subjective materials and are about individual patients involves factors such as the credentials of decision-makers and the amount of experience of decision-makers with particular patients. The amount of evidence for direct predictions that are based on objective materials involves factors such as the amount of data in the medical records of particular patients. The amount of data depends on a number of factors such as the number of relevant variables recorded, the number of repeated measurements, and the proportion of measurement occasions when a treatment event was present. Bagne and Lewis discussed the latter consideration in Appendix B of their publication cited in Section 1.2.2.

The amount of evidence for indirect predictions that are based on subjective materials involves factors such as the credentials of decision-makers and the amount of experience of decision-makers with patients similar to patients for which predictions and decisions are being made. The amount of evidence for indirect predictions that are based on objective materials involves factors such as the number of relevant clinical trials. The amount of evidence from particular group clinical trials involves factors such as the comprehensiveness of the trial and the size of the sample of patients in relation to the size of a treatment effect that is clinically significant.

The second consideration affecting the precedence of direct versus indirect predictions is the quality of evidence in the materials upon which predictions are based. For both direct and indirect predictions, the quality of subjective experience and subjective impressions for decision-makers involves credentials. Data, including data about subjective experience, contributes more to high quality than subjective experience alone because data can be shared and analyzed by computational methods of empirical induction.

Major reasons for recording data in medical records have been that it often is easier to recall, to review, and to share data that have been recorded. The invention of MQALA adds a major new reason for recording data in computerized medical records, particularly repeated measures data. This new reason is that much of data resulting from repeated measurements of individual patients now can be analyzed by computational methods of empirical induction. MQALA can be applied to help overcome the limitations of soft analyses so that data in the medical records of individual patients can be used more effectively to improve patient care and to contribute more effectively to the cumulative shared experience that is scientific knowledge.

The quality of evidence in medical records and databases is dependent on the conditions under which the data were collected. Data are more apt to be of high quality when the data are collected while the experimental method is carefully applied during N-of-1 and group clinical trials (Section 2.5).

Generalized conclusions about benefit and harm contribute more to quality than subjective impressions about benefit and harm because generalized conclusions can be arrived at by applying transparent computational methods of empirical induction that can be specified in protocols and shared. This consideration applies both to analyses of data for individuals with MQALA and data for groups with the statistical method.

The third consideration affecting the precedence of direct versus indirect predictions is the specificity of evidence in the materials upon which predictions are based.

More specific predictions address and account for more of the details that may affect predictions. Section 2.7.1.2.1.2 and its subsections illustrate how MQALA can help account for many details that are relevant to health care. Relevant details include doses, delays and persistencies of responses, the effects of other independent variables such as concomitant treatments, and effects on many dependent variables used to evaluate safety and efficacy.

Specificity of predictions in medicine is becoming more important as it becomes possible to identify and measure differences in genomes, gene expression, and internal control that affect the benefit and harm of treatments. High specificity often makes it more difficult to make quality predictions that account for such differences, especially when predictions are based on conventional means for making predictions. As examples of such difficulties, new measures provided by biotechnology often measure variables that are beyond subjective experience and provide more data than people can reliably process with soft analyses.

The statistical method is limited as a means of supporting specific predictions because the statistical method emphasizes that which individuals in collective entities have in common rather than all variables that affect benefit and harm including that which may make individuals different. It is difficult to achieve high specificity for diverse patients with the statistical method because the required number of clinical trials increases rapidly as the number of patient characteristics, independent variables, and dependent variables increases.

MQALA can support highly specific predictions with extensive B/H score arrays for individual patients. In contrast, data aggregation can make it difficult to achieve high specificity with the statistical method (Section 2.3).

The fourth consideration affecting the precedence of direct versus indirect predictions is the applicability of evidence in the materials upon which predictions are based. In clinical medicine, the materials upon which predictions are based are applicable when the materials adequately represent the individual patients for which the predictions are made. The applicability of materials about a particular patient for a direct prediction generally is assured because the materials are about the same individual for which the prediction is made.

Applicability is a major issue for indirect predictions because the predictions are based on materials about entities that are different from the individual patients for which the predictions are made. Applicability for indirect predictions is highly dependent on classification systems. Medical classification systems help decision-makers apply generalized conclusions that adequately represent individual patients. Classification systems work best when they account for all details that are relevant to particular predictions and when the classification systems are properly applied.

Indirect predictions based on the statistical method also are more apt to be of high quality when statistical samples used in investigations adequately represent well-specified populations and when assignments of patients to treatment groups, preferably by randomization, yield comparable treatment groups. The need to consider classification systems, the representativeness of samples, and the comparability of treatment groups is what makes indirect predictions indirect. The risk of indirect predictions is that indirect predictions may not account for all patient characteristics that affect the benefit and harm of treatments.

Decision-makers often may recognize, for example, that the subjective impression that a particular patient has failed to respond to an antidepressant need not falsify the generalized conclusion that the antidepressant has a statistically significant beneficial effect in a class of depressed patients considered as a collective entity. The two conclusions are, after all, about different entities. Given this observation, it is not surprising that decision-makers may give precedence to direct predictions over indirect predictions, perhaps prematurely and with inadequate evidence. In other words, treatments may be stopped too soon.

The fifth consideration affecting the precedence of direct versus indirect predictions is the accessibility of evidence in the materials upon which predictions are based.

A primary advantage of subjective experiences and subjective impressions to persons making decisions about treatment is that subjective materials are highly accessible to decision-makers that have them. High accessibility often appears to give subjective materials undue precedence over data and generalized conclusions while making predictions. Health care often can be improved by making data and high quality generalized conclusions more accessible.

The Internet has the potential to help make data and high quality generalized conclusions both possible and more accessible. Internet-enabled home and hospital health monitoring devices and health rating scales can help make observations and patient experience more accessible to clinicians as data. The Internet also has the potential to improve access to the means for performing empirical induction, both MQALA and the statistical method. Data that are analyzed and data and generalized conclusions that are accessible are more apt to be used to improve health outcomes.

Decisions to change or not to change treatments during episodes of care for particular patients often are affected by the amount, quality, specificity, applicability, and accessibility of evidence in the materials upon which predictions are based. Indirect predictions, which emphasize that which particular patients have in common with other patients, often are the highest quality predictions by default early during episodes of health care. Direct predictions, which account for all characteristics of patients including that which may make particular patients different from other patients, often should gain relative precedence especially if the materials about the individual patients are extensive, of high quality, specific, and accessible. In other words, precedence generally should shift over an episode of care from indirect to direct predictions as illustrated above with the examples of changing or stopping treatments in conventional clinical practice.

MQALA helps provide the means for arriving at high quality generalized conclusions about individual patients. These conclusions can improve patient care by supporting high quality direct predictions and improved decision-making.

There are circumstances when indirect predictions may take precedence over direct predictions. This may occur when prediction involves changes in dynamic functioning. Consider an example in which aging may affect some aspect of dynamic functioning. The direct prediction would be that the individual would continue to function in a particular way with advancing age. The indirect prediction may be that the function will change because the individual is a member of a group that has been found to change functioning in a particular way with advancing age. Under such circumstances, indirect predictions may be of higher quality than direct predictions.

The sixth consideration concerning the relative practical values of MQALA and the statistical method involves the timeliness and impact of educational feedback provided to those who rely on MQALA and the statistical method.

The results of group clinical trials conducted in accord with the demands of the statistical method often are taught and disseminated to educate clinicians and patients. Group clinical trials seldom have due impact in a timely manner. In contrast, MQALA could be expected to be educational in a manner that is more timely and compelling because of its immediate relevance to practical clinical problems at hand.

The manner in which MQALA can be educational can be illustrated by example. Suppose that a clinician is well into an episode of treating a particular patient with a drug for a chronic disorder. Also suppose that the episode of care is well documented with repeated measures data collected while applying the experimental method. At this point, the clinician could be expected to have subjective impressions about the benefit and harm of treatment. These subjective impressions could be based on subjective experience and/or soft analyses of data in the patient's medical record.

The clinician's subjective impressions about the benefit and harm of treatment in this example could be compared with the generalized conclusions obtained by applying MQALA. The educational value of MQALA derives from the results and consequences of this comparison. If the subjective impressions and the generalized conclusions agree, both the subjective impressions and the generalized conclusions would tend to be validated.

If the subjective impressions and the generalized conclusions disagree, a process could begin that involves both the educational value of the methods and consideration number seven, namely ways in which experience, insight, and intuition can improve computational methods of empirical induction. Perhaps either the subjective impressions or the generalized conclusions do not account for relevant independent or dependent variables. Perhaps either the subjective impressions or the generalized conclusions use different importance weights while accounting for benefit and harm with respect to different dependent variables. Perhaps either the subjective impressions or the generalized conclusions are not accounting for relevant analysis parameters such as delay and persistence and/or episodes of treatment or response.

Clinician investigators who pursue discrepancies between their subjective impressions and the results of MQALA could be rewarded in at least two distinct ways. On the one hand, they could be educated about what they had not adequately accounted for while forming their subjective impressions. As a result, clinician investigators could learn how to form subjective impressions more adequately and come to function more effectively as professionals. On the other hand, clinician investigators could use their experience, insight, and intuition to improve data collection and the computational protocols used to arrive at generalized conclusions. As a result, clinician investigators could contribute both to cumulative scientific procedures and knowledge as well as the development of their professions.

Part of what makes this vision of the clinician investigator compelling is that MQALA helps make it possible to achieve the vision as an integral part of providing quality patient care (Section 2.7.1.2.4).

The eighth consideration concerning the relative practical values of MQALA and the statistical method is the efficiency of conducting investigations that can yield high quality predictions when there is uncertainty about important predictions.

Groups that have been investigated may not adequately represent individuals that need to be treated. For example, consider treatment with a drug for clinical depression that has been approved for marketing on the basis of several extensive group clinical trials. Now comes an elderly woman with clinical depression who also is being treated for arthritis and high blood pressure. Although not unique with respect to being an elderly woman with clinical depression, arthritis, and high blood pressure, this woman may be sufficiently different from the average patient in any of the group clinical trials to raise important questions about treatment. Such common situations offer choices about investigating individuals directly versus investigating individuals indirectly as members of collective entities.

Given uncertainties and choices such as those just described, clinician researchers often have the option of investigating individuals either directly or indirectly as members of groups. A direct option would be investigate the individual with an adaptive N-of-1 clinical trial, analyze the data sequentially with MQALA, and continuously guide treatment with high quality direct predictions. An option to investigate the individual indirectly would be to mount a group clinical trial of the antidepressant in similar elderly women. The direct analytic option would appear to arrive at generalized conclusions that are timelier and more assuredly relevant to the important prediction about the patient's treatment. In addition, with proper coordination of multiple N-of-1 clinical trials, the patient and clinician could be a contributor to a cumulative and systematic body of experience that could be shared with others. This experience could be used to improve health outcomes for patients that may not be adequately represented by the group clinical trials that lead to drug approval.

The ninth consideration concerning the relative practical values of MQALA and the statistical method is the relative power of direct versus indirect predictions to motivate individuals and decision-makers to take action in accord with predictions. Individuals may tend to feel that they are unique or different and that indirect predictions do not apply to themselves. Similarly, decision-makers may feel or conclude that indirect predictions upon which treatment guidelines are based to not apply to the particular patients that they need to treat. MQALA can supply direct predictions that may be more effective in motivating individuals to comply with therapeutic regimens and to make life style changes. Similarly decision-makers could be more motivated to comply with treatment guidelines or be armed with high quality generalized conclusions to disregard or change the guidelines.

The tenth consideration concerning the relative practical values of MQALA and the statistical method in practical affairs is the relative usefulness of MQALA and the statistical method for empowering individuals to conduct investigations that lead to predictions that are actionable and not apt to be falsifiable by new experience. For example, individuals concerned about allergens, chemical sensitivities, natural remedies, or other treatments could conduct investigations of themselves or others that could yield actionable direct predictions. Such investigations could apply health-effect monitoring; a use of MQALA to evaluate benefit and harm associated with treatments and other environmental exposures (Sections 2.2 and 4.2.2.2).

Communities of Internet users could agree to participate in coordinated investigations that would arrive at B/H scores that could be analyzed with descriptive, probably not inferential, statistics to yield hypotheses for more rigorous scientific investigations. The results of such investigations could be useful to the participants themselves or others with similar health concerns.

In summary, indirect predictions based on applications of the statistical method have great practical value particularly when high quality direct predictions are not available and for addressing issues of public health policy. The invention and implementation of MQALA can provide direct predictions that have potential to improve care and treatment of individual patients with chronic disorders. Because of the complementary roles of MQALA and the statistical method, MQALA has potential to improve the quality of generalized conclusions obtained by applying the statistical method. In addition, MQALA has potential to help educate and empower clinicians and patients, both as investigators and as change agents, and to help motivate clinicians and patients to take actions that promote health.

2.8.3. The Impact of the Statistical Method and the Promise of MQALA from a Historical Perspective The impact of the statistical method, the promise of MQALA, and the advantages of implementing both methods on the Internet will be examined briefly from a historical perspective in the context of clinical medicine.

Until the latter part of the nineteenth century, subjective experience and subjective impressions were the primary guides for clinical medicine. Much of the benefit of clinical medicine and its predecessors was derived from what modern investigators might call the placebo response (Section 1.2.1.2.1.1). Substances used as treatments generally consisted of natural agents that often conferred some benefit and generally did not cause great harm.

Modern medicine has seen the rise of the experimental method including group clinical trials as well as the development of potent new treatment agents capable of both great benefit and great harm. The statistical method has been central to the development of modern medicine.

The rise of potent new treatment agents capable of great harm helped prompt government regulation of new treatments. Current guidelines and procedures for the regulation of drugs and biotechnology products are largely subject to limitations of the statistical method that were presented in Section 1.2.1.

Here are some examples of how limitations of the statistical method affect the regulation of drugs and biotechnology products by government agencies. Drug regulation is conducted from a public health policy perspective that focuses on collective entities, namely diagnostic classes and populations, without also addressing the needs of clinical medicine to target treatments to individual patients (Section 1.2.1.2.1). For example, drugs are evaluated with conventional group clinical trial designs and procedures that generally fail to distinguish placebo responders from responders to alternative treatments.

Here are some additional examples of how limitations of the statistical method affect regulation of drugs and biotechnology products by government agencies. Treatments for the management and control of chronic disorders are evaluated without quantifying longitudinal associations that measure the benefit and harm of treatment for individual patients (Section 1.2.1.2). Guidelines for the conduct of pivotal clinical trials call for inefficient designs (Section 1.2.1.2.2). Clinical trial guidelines often call for placebo only groups that are questionable from an ethical perspective when there are viable alternative investigative strategies (Section 1.2.1.2.4). Final regulatory decisions to approve or disapprove drugs for marketing are highly dependent on subjective impressions largely because evaluations of different health effects, safety, and efficacy are fragmented (Sections 1.2.1.2.1.5 and 1.2.1.2.3).

The recent development of evidence-based medicine appears to have had an important salutary effect on clinical practice. Much of the work of evidence-based medicine can be viewed as attempts to bring generalized conclusions from conventional group clinical trials to bear more effectively on the practice of medicine.

The achievements of evidence-based medicine appear to be limited by the evidence itself. These limitations derive from limitations of the statistical method (Section 1.2.1) upon which conventional group clinical trials are based. Evidence-based medicine has yet to provide much help to clinicians that need to arrive at high quality generalized conclusions and predictions when individual patients are investigated directly. As examples, evidence-based medicine has yet to address the problem of analyzing associations involving repeated measures data in medical records of individual patients including the data that results from monitoring patients during intensive care (Section 1.2.1.1). Evidence-based medicine has yet to take full advantage of the potential of N-of-1 clinical trials to achieve benefit, to avoid harm, and to avoid costly ineffective treatment. Efforts to make clinical practice more scientific are still in their infancy.

Managed health care has emerged in part as an attempt to achieve favorable health outcomes more consistently and in part to control costs. Cost control has become an important issue because many new treatments are more costly than older treatments and because money for treatment is limited.

The rise of managed health care primarily in the last several decades also has been subject to the limitations of the statistical method (Section 1.2.1). One of the great but incomplete achievements of managed care has been to place more emphasis on the epidemiologic or public health aspect of medicine. In some important respects, the limitations of managed care are more evident in the clinical aspects of medicine, which treat individuals directly as individuals, than in the epidemiologic aspects of medicine, which focus on collective entities.

Some clinical aspects of managed care appear to be objectionable for the same reason that racial discrimination is objectionable. More specifically, some clinical aspects of managed care are objectionable because it often is objectionable to investigate and treat individual patients indirectly as members of groups without also investigating and treating patients directly as individuals. Section 1.2.1 introduced the distinction between investigating individuals directly as individuals versus investigating individuals indirectly as members of groups.

Members of managed health care plans are members of groups. Sick members are members of diagnostic subgroups. Members often benefit from shared resources and being treated in accord with that which they have in common with other members. But members are not clones with identical histories, needs, and hopes (Section 1.2.1). It is not always enough to treat members or subgroups of members in accord with the means or other averages of collective entities. Members also want and need to be treated in accord with that which may make them different or unique.

Managed care could do more to improve health in a cost-effective manner. Various stakeholders—patients, clinicians, managers, and payers—are not as satisfied as they could be. Many of managed care's shortcomings and sources of dissatisfaction involve decision-making about treatments; accountability for prevention, treatment, and outcomes; and access of stakeholders to information and information processing resources.

One important aspect of the managed care problem involves the participation of clinicians and mangers in decision-making about the care and treatment of individual patients. This problem often is perceived to be a conflict between the authority of clinicians versus the authority of managers in health care provider organizations. Clinicians, who are bound by professional pride, professional identity, and professional accountability for the health outcomes of decisions based on predictions that are direct for individual patients, may resist the participation of managers in health care decision-making. Managers, armed with generalized conclusions from statistical investigations about groups, may become impatient with the resistance of clinicians to attempts by managers to improve the cost-effectiveness of patient care.

The apparent conflict of authority between clinicians and managers can be seen in a fundamentally new way when viewed from a historical perspective and given the way issues are analyzed in this document. Much of what may be perceived as a conflict between the authority of clinicians and the authority of managers can be recognized as resulting from the fact that the statistical method was developed and widely implemented before MQALA. Managed care currently is in the pre-MQALA period.

As a result of the historical circumstance of the statistical method being developed and widely implemented before MQALA, clinicians' subjective impressions that are direct and about individual patients often are pitted against generalized conclusions about groups, conclusions that are valuable but indirect for individual patients. Despite the precedence considerations and the advantages of direct predictions (Section 2.8.2), clinicians are in a defensive position with respect to their decision-making authority about treatments because subjective impressions are less apt than generalized conclusions to withstand scientific scrutiny. Subjective impressions often fail to withstand scientific scrutiny not because they are wrong but because they are not based on data, data collected while applying the experimental method and analyzed with transparent computational procedures.

One reason why subjective impressions about the benefit and harm of treatments for individual patients often do not withstand scientific scrutiny is that the subjective impressions often are based on subjective experience rather than data. A second reason is that when data are collected for individual patients, the data often are collected without applying the experimental method (Section 2.5). A third reason why subjective impressions about the benefit and harm of treatments for individual patients often do not withstand scientific scrutiny is that when data are collected, the data are subject to soft analyses that yield subjective impressions rather than generalized conclusions about the benefit and harm of treatment. Subjective impressions about benefit and harm, including subjective impressions resulting from soft analyses (Section 1.2.1.2) of medical record data, do not meet the criteria for high quality generalized conclusions and predictions that are included in Section 1.2. Subjective experience, data, subjective impressions, and generalized conclusions, which are the materials for making predictions that guide decisions, are defined and distinguished in Section 2.8.2.

Managers often rely on the development and application of treatment guidelines to help manage treatment decisions. These guidelines currently are based largely on generalized conclusions from conventional group clinical trials. As such, these guidelines are subject to the limitations of conventional group clinical trials (Section 1.2.1.2 and its 20 subsections). As examples, treatment guidelines seldom account for all the detailed information that is needed to target treatments effectively to individual patients. The targeting problem is apt to grow increasing difficult, as more genetic polymorhpisms, measures of gene expression, and measures of internal control need to be considered while targeting treatments to individual patients.

Here are some additional limitations of treatment guidelines based on conventional clinical trials. The use of fixed importance weights makes it difficult to treat in accord with the preferences of individual patients. Fragmented evaluations of different efficacy and safety variables mean that treatment guidelines often are highly dependent on subjective impressions and social consensus. Incompatibilities between conventional trial designs and procedures for rigorous science and quality clinical care make it difficult to develop a cumulative body of experience that can be used to guide patient care without large separate research budgets. And perhaps most important of all at this time and for the foreseeable future, the role of treatment guidelines is important but limited because the guidelines are based on predictions that are indirect for individual patients and do not account for all factors relevant to treatment outcomes. Such limitations generally are not addressed by having clinicians participate in the development of treatment guidelines.

There are fundamental reasons why clinicians and managers could be expected to disagree quite often about the benefit and harm of treatments, disagreements that can exacerbate their apparent conflict of authority. As examples of reasons for disagreement, clinicians, compared to managers, have better access to subjective experience and subjective impressions about longitudinal associations between treatment and health, associations that indicate benefit and harm of treatments for individual patients. The subjective impressions of particular clinicians often are based on rather small samples of patients, samples that may not be representative of diagnostic groups based on medical classification systems and investigated with group clinical trials. In addition, clinicians are apt to pay more attention to detailed information needed to target treatments to individual patients while managers are apt to pay more attention to comprehensive information needed to evaluate costs and outcomes for heterogeneous groups.

As stated earlier in this section, some clinical aspects of managed care are objectionable because it often is objectionable to investigate and treat individual patients indirectly as members of groups without also investigating and treating patients directly as individuals. In methodological terms and in the context of applying computational methods of empirical induction to arrive at high quality generalized conclusions and predictions that can be used to guide decision-making, this statement translates into applying the statistical method without also applying its complement, MQALA. Section 2.4 describes the complementary use of MQALA and the statistical method.

The apparent conflict of authority between clinicians and managers about treatment decision-making was described as an example of problems that arise when the statistical method is applied without also applying MQALA and when stakeholders have difficulty sharing information. Clinicians and managers could be expected to disagree quite often because their evaluations of treatments often are based on different islands of information and because their evaluations often are for different entities, individual patients versus heterogeneous groups of members including patients.

When clinicians and managers disagree, any party relying on subjective impressions is at a disadvantage if the other party can rely on high quality generalized conclusions, which are obtained from data with computational methods of empirical induction. If both parties can rely on high quality generalized conclusions, the party that can rely on a direct prediction rather than an indirect prediction enjoys the advantage because of precedence considerations (Section 2.8.2).

Viewing the apparent conflict of authority between clinicians and managers as a matter involving access to information and access to means for arriving at high quality generalized conclusions that can guide decision-making suggests that this and some other important problems involving managed care are amenable to technological solutions.

The development of the Internet as a major tool for health practice and research began only a few years ago. The Internet offers many frequently visited health sites. The primary function of some Internet health sites is to collect data. Most Internet health sites provide information that is valuable to help make indirect predictions, to facilitate the sharing of subjective materials, and to deal with the administrative business of health care. Most Internet health sites provide an alternative means to perform services that historically have been provided by other less efficient means such as printed journals, printed forms, frequent follow-up visits, and telephones.

Now come MQALA and the implementation of MQALA on the Internet to help solve the nexus of problems that has been described and addressed in this document. These developments can facilitate the acquisition of knowledge and the use of high quality generalized conclusions and predictions to support decision-making. Health care is but one area where these developments can be applied to advantage.

Sections 2.8.1 and 2.8.2, which address aspects of empirical induction from the epistemological and the practical perspectives, as well as this document as a whole suggest new strategies that can be used to improve government regulation of drugs and biotechnology products, evidenced-based medicine, and managed health care. This section closes with a few statements indicating the roles of various parties in the health care arena could play in the implementation of MQALA on the Internet and how these parties could benefit.

Implementation of MQALA on the Internet would help patients receive health care that can yield better outcomes and is more satisfying because the health care is individualized. Biotechnology is making an important contribution to individualized health care by making it ever more possible and important to account for biological variability.

Here are several keys to providing and receiving high quality individualized health care. The first key is to implement MQALA, which is the computational method of empirical induction designed specifically to provide high quality generalized conclusions and predictions when individuals are investigated directly as individuals, the first of the two major research strategies identified in Section 1.2.1. Implementation of MQALA on the Internet also is a key to providing and receiving high quality individualized health care because the Internet makes it feasible to acquire vast amounts of repeated measures data from anywhere anytime, to analyze the data to arrive at high quality generalized conclusions, and to facilitate communications between and among patients, clinicians, and other health care parties. Another key is for patients and significant others to participate in health care by providing data and expressing preferences for different health outcomes.

Other keys make it possible to provide and receive health care that is individualized when it is necessary to rely on indirect predictions because, for example, individual patients are being introduced to treatments for the first time. The first of these keys is to develop databases and knowledge bases concerning the benefit and harm of treatments for groups of patients. The knowledge bases would include generalized conclusions (B/H scores) for patients together with data on patient characteristics that are predictive of the benefit and harm of treatment. Still another key to individualized health care is the implementation of the statistical method on the Internet so that the databases and knowledge bases could be reanalyzed in accord with the importance weights of individual patients and other decision-makers (Section 2.7.1.2.1.2.3.1).

Growing numbers of elderly patients that have chronic disorders and access to the Internet are especially apt to benefit from health-effect monitoring services (Sections 2.2 and 4.2.2.2). Another advantage of implementing MQALA on the Internet is that people would be empowered to take more responsibility for their own health and the health of their loved ones, thereby both improving health and controlling costs.

Implementation of MQALA on the Internet would empower clinicians to provide better outcomes because more treatment decisions would be based on data and high quality generalized conclusions that are direct for individual patients. Clinicians also would be empowered to function more effectively as investigators. Clinician investigators could use their experience, insight, and intuition (Section 2.8.2) to develop and refine data collection and benefit/harm scoring protocols. These protocols, together with the data and generalized conclusions about the particular patients that clinicians have treated, could be important contributions to the cumulative knowledge that supports the medical profession.

MQALA would help support a vision of an Internet-enabled seamless integration of patient care and clinical research. Data and generalized conclusions arrived at during the course of providing quality clinical care to individual patients could become part of the cumulative knowledge that would be available to improve the treatment of patients in the future. This integration is possible because MQALA is specifically designed as a computational method of empirical induction that can be applied to investigate individuals directly as individuals and because MQALA is complementary to the statistical method.

There are other ways that clinicians and patients would benefit from implementation of MQALA on the Internet. Clinicians are burdened with needs to record and form subjective impressions about ever increasing amounts to data that can affect treatment decisions. Clinicians would have more time to relate personally with patients when more of the data is collected with Internet-enabled measurement devices and patient rating scales and when more data are analyzed automatically with computational methods of empirical induction to yield high quality generalized conclusions about the benefit and harm of treatment.

Health care provider organizations could benefit from implementation of MQALA on the Internet by providing better health outcomes cost-effectively. They could increase the satisfaction of both their members and their clinicians. A primary role of health care provider organizations would be to develop and support the Internet based information systems that would empower clinician investigators to function more effectively and to communicate more effectively with patients and other parties involved in providing health care. Health care provider organizations also would help coordinate data collection and benefit/harm scoring protocols to grow their cumulative knowledge for providing quality patient care.

Pharmaceutical and biotechnology companies, as sellers and patent holders for treatments, could participate in and benefit from implementation of MQALA on the Internet. One way they could do this would to provide value-added information-based services to patients and health care providers, services that would help gain knowledge about and optimize use of their treatments. Pharmaceutical and biotechnology companies also could package and otherwise provide products in a manner that would facilitate N-of-1 clinical trails and dynamic precision dosing. Clinical research organizations could help make the enabling technologies available to pharmaceutical companies.

Increased reliance on accessible data and high quality generalized conclusions could be used to help foster scientific medicine and accountability for all parties involved with health care. Accountability could include accountability for collecting data while applying the experimental method in ways that are consistent with quality patient care when there is uncertainty about important predictions. Data, the experimental method, data collection and benefit/harm scoring protocols, transparency, and computational methods of empirical induction would all contribute to high quality health care.

If the objectives of health care are clear, data analyzed with transparent computational methods of empirical induction can be the authority for health care decision-making.

2.8.4. Conclusion

The Internet has been referred to as the digital nervous system, capable of gathering, storing, and communicating experience as data. The brains of this system could be the seats of empirical induction where the complementary methods of MQALA and the statistical method are applied to data to help users to acquire knowledge and to make decisions that are supported by high quality generalized conclusions and predictions. These developments will help let data speak and empower users to achieve intended outcomes.

2.9. Definitions

Adaptive N-of-1 clinical trials are N-of-1 clinical trials in which treatment for an individual patient is modified over time in accord with the results of sequential monitoring of benefit and harm conducted while treatment changes or dose fluctuates. To illustrate possible modifications of treatment, negative B/H scores that are increasing in magnitude over time could prompt dose reductions in attempts to reduce harm. Similarly, positive B/H scores that are decreasing in magnitude over time could prompt dose escalations in attempts to increase benefit.

Adaptive systems are entities capable of some degree of internal control and adjustment to environmental conditions.

Many of the entities to which the present invention can be applied are adaptive systems. People, animals, populations, and ecosystems generally are considered to be examples of natural adaptive systems. Businesses, national economies, investment markets, and many machines and devices are examples of man-made adaptive systems.

Analysis parameters are used to quantify various aspects of independent variables, dependent variables, or associations between independent and dependent variables. Analysis parameters are said to have different levels. Different levels of analysis parameters can be used to describe longitudinal associations in detail. For example, dose can be an aspect of an independent variable, namely a particular treatment. Dose is an analysis parameter that can be applied to help describe longitudinal associations between treatment and health in detail.

Some analysis parameters, namely levels of dimensional independent and dependent variables, are formed during the process of converting dimensional series into sets of dichotomous series. This conversion is required to analyze dimensional series with MQALA. Other analysis parameters are optional and can be selected for the conduct of analyses with MQALA. Examples of optional analysis parameters include episode length and episode criterion.

Delay and persistence are analysis parameters that can be used to describe temporal aspects of associations between independent and dependent variables and events. Optional analysis parameters may be selected in an attempt to account for as much variation as possible in the levels of dependent variables or the occurrence of dependent events. Analysis parameters correspond to dimensions of LAS arrays, B/H score arrays, or components of these arrays.

Benefit/harm score arrays or B/H score arrays are ordered sets of B/H scores for an individual in which dimensions represent analysis parameters, rows and columns represent levels of analysis parameters, and components represent different combinations of independent variables, dependent variables, Boolean independent events, and Boolean dependent events. B/H score arrays can be computed for real individuals and for collective entities investigated directly as wholes.

Benefit/harm scores or B/H scores are LASs for which the signs may have been reversed so that all positive scores indicate benefit and all negative scores indicate harm associated with higher levels of the independent variable(s) or the occurrence of independent events. B/H scores often are useful for health applications.

Health is one area of investigation that often uses dependent variables that have different directionality. For example, higher values of one health measure can indicate more energy (positive directionality) while higher values of another health measure can indicate more fatigue (negative directionality). Single evaluations of treatments often involve dependent variables that have both positive and negative directionality so that higher values of dependent variables in one evaluation are both better and worse, depending on the variable. A positive LAS with respect to a measure of energy generally would be considered to indicate a benefit of treatment while a positive LAS with respect to a measure of fatigue generally would be considered to indicate harm.

Differences in directionality can be confusing and preclude computation of overall B/H scores. These difficulties can be avoided by reversing the signs of LASs for any dependent variables for adverse events and for variables for which higher values are less favorable. The directionality of dependent variables and any sign reversals would be specified in benefit/harm scoring protocols.

Boolean dependent events are defined with Boolean operators on a set of two or more dependent variables.

Boolean independent events are defined with Boolean operators on a set of two or more independent variables.

Component of a LAS array or a benefit/harm score array for an individual corresponds to the combination of one independent variable or one set of independent variables used to define Boolean independent events with one dependent variable or one set of dependent variables used to define Boolean dependent events.

Complex events are defined with Boolean operators on more than one primary variable. Complex independent events are defined on more than one independent variable. Complex dependent events are defined on more than one dependent variable.

Conversion of information in dimensional series means the procedure by which any rule or sets of rules is applied to convert a series of values for a dimensional variable (a dimensional series) into a set of dichotomous series. Conversion of a dimensional series forms an analysis parameter identified as level of the dimensional variable.

Data are observations and experiences that have been recorded so that the observations and experiences can be shared and analyzed by computational methods of empirical induction.

Dependent events means events defined on one or more dependent variables. Dependent events are present or absent on measurement occasions. Dependent events can be renamed in accord with the terminology that prevails in a discipline or area of investigation. For example, dependent events may be called health events, outcome events or outcomes, response events or responses, or controlled events. Dependent events can, in turn, function as independent events for analyses involving other dependent events.

Derivative measures are derived by computation from LASs, B/H scores, and information used to compute LASs and B/H scores. Examples of derivative measures include measures of the strength of longitudinal association, denominators of the strength of longitudinal association measures, overall B/H scores, and predictive indices.

Dichotomous portrayal of information in repeated measures data means the results of applying MQALA's procedures that convert information for independent variables, sets of independent variables, dependent variables, or sets of dependent variables into sets of dichotomous series.

Dichotomous series means a sequence of values for an individual, said sequence having only two different values such as present (1) or absent (0). Members of the series represent repeated measurement occasions. For example, a patient could be said to have either experienced a seizure or not experienced one or more seizures during the period of time covered by each measurement occasion.

MQALA is applied directly to dichotomous series. Dimensional series are converted into sets of dichotomous series so they can be analyzed by MQALA.

Dimensional series means a temporal sequence of values for an individual, said sequence having more than two different values. Members of the series represent repeated measurement occasions. For example, a within patient rate such as a count of the number of seizures experienced by a patient during the period of time covered by each measurement occasion could form a dimensional series. Repeated measurements of dimensional variables such as blood pressure, pain severity, investment market indices, monthly sales volumes, and hormone concentrations generally result in dimensional series.

MQALA can be applied to dimensional series after each dimensional series is converted into a set of dichotomous series. Any or all of the information in a dimensional series can be retained during this conversion.

Dimensional resolution means the amount to detail in level for a dimensional measure. For example, values of a measure can be recorded to the nearest whole number, the nearest tenth, or the nearest hundredth. Users of MQALA may or may not select to reduce dimensional resolution recorded in a dimensional series when a dimensional series is converted into a set of dichotomous series. High dimensional resolution can provide more detailed results from applications of MQALA but increases the amount of computation required to perform analyses.

Direct predictions are (1) made from generalized conclusions that are arrived at by investigating individuals directly as wholes and are (2) made for the same individuals that are described by the generalized conclusions.

A prediction for an individual real or conceptual entity that is made from a generalized conclusion arrived at by investigating the same individual directly as a whole is direct.

Dose-response relationships, in the context of health investigations, are functional relationships between dose and some type of measure used to indicate the effects of treatments on health. With conventional procedures for investigating dose-response relationships in treatment evaluations, mean values of health measures often are used to indicate the effects of treatments. With MQALA, B/H scores or measures computed from B/H scores such as group means of the B/H scores indicate the effects of treatments.

Various types of relationships are analogous to dose-response relationships. For example, MQALA can be used to investigate exposure-response relationships or relationships between stimulus intensity and response.

Double randomization means both that interventions are randomized to individuals that are members of groups and that amounts of one intervention are randomized to periods for each individual.

Doubly indirect predictions are both based on sample data and are for different individuals than the individuals described by the generalized conclusions. Here is an example. A prediction for an individual patient, said prediction being based on a statistical inference arrived at through a group clinical trial, is doubly indirect. In this example, the doubly indirect prediction is based both on sample data and is for a different individual (a particular individual patient) than the generalized conclusion was about (a population).

Dynamic functioning is functioning in which both independent and dependent variables vary over time for an individual. Longitudinal associations indicate dynamic functioning.

Dynamic precision dosing is dosing in which doses of a treatment for the control or management of a chronic disorder can be frequently adjusted for a particular patient in accord with sequential monitoring of B/H scores for the particular patient.

Emergence is change that creates unique entities.

Empirical means the results of measurement, observation, and experience as represented in data that can be shared.

Evaluation means to determine the value of a course of action by investigation. MQALA uses explicit importance weights to evaluate the overall benefit/harm of treatments when there are two or more dependent variables or sets of dependent variables.

External control is a type of dynamic functioning in which the independent or controlling variable(s) is external to the individual.

Functioning means any of a group of related actions contributing to a larger action of an individual. As examples for a person, functioning can be physiological, psychological, and social or it can be physical and mental.

Health-effect monitoring is a method and system that uses MQALA to arrive at generalized conclusions and direct predictions about the effects of drugs and other exposures on the health and well-being of individuals.

Importance weights are numbers representing the importance of longitudinal associations such as B/H scores quantifying treatment effects relative to other effects or potential effects. Importance weights quantify things such as clinical significance, personal or societal values, economic impact, and personal preferences.

Importance weights also can be used to indicate the predictive power of one independent variable or set of independent variables relative to other independent variables or sets of independent variables when computing values of predictive indices.

Independent events means events defined on one or more independent variables. Independent events are present or absent on measurement occasions. Independent events can be renamed in accord with the terminology that prevails in a discipline or area of investigation. As examples, independent events may be called exposure events or exposures, treatment events or treatments, stimulus events or stimuli, task events or tasks, controlling events or controllers, and predictive events or predictors.

Indirect predictions are made from generalized conclusions based on sample data or are made for different individuals than the individuals described by the generalized conclusions.

Predictions for particular population members that are based on data about a population investigated directly as a whole are indirect because the population member and the population investigated as a whole are different individuals. Predictions for whole populations that are based on sample data are indirect.

Individual means something that has separate and distinct existence and objective or conceptual reality.

Real individuals such as persons have objective reality. Populations of individuals have conceptual reality. Populations investigated directly as wholes are considered to be individuals in this document.

Each LAS and B/H score is obtained from data about an individual. The score or the score array computed from data for an individual provides a quantitative description of the longitudinal association(s) for the individual. Each such description is a generalized conclusion about the longitudinal association(s) for the individual described by the data.

Induction is the process of arriving at generalized conclusions from particular instances.

For MQALA, the instances are the results of particular repeated measurements of at least one independent variable and one dependent variable for one individual. Each generalized conclusion is a quantitative description of a longitudinal association for the individual described by the data. The induction is empirical because MQALA is applied directly to repeated measures data that can be shared.

Internal control is a type of dynamic functioning in which the independent or controlling variable(s) is internal to the individual. Internal control also may be called self-control or regulatory control.

Internal control monitoring is a method and system that uses MQALA to measure internal control repeatedly.

Investigation is observation conducted by close examination and systematic inquiry for the purpose of arriving at generalized conclusions.

"LAS" is the acronym for longitudinal association score. "LASs" is the plural of LAS.

LAS arrays and arrays of LASs are ordered sets of LASs for an individual in which dimensions represent analysis parameters, rows and columns represent levels of analysis parameters, and components represent different combinations of independent variables, dependent variables, Boolean independent events, and Boolean dependent events.

Longitudinal associations are relationships between and/or among variables that become evident when the variables are measured on two or more occasions for one individual. The computational procedures for obtaining LASs, LAS arrays, and values of the strength of longitudinal measures operationally define longitudinal associations.

Positive LASs indicate that events defined on dependent variables are more likely to be present when events, defined on independent variables, are present. Negative LASs indicate that events defined on dependent variables are less likely to be present when events, defined on independent variables, are present. The magnitudes of LASs quantify the amount of evidence for longitudinal associations.

Method for the Quantitative Analysis of Longitudinal Associations means all procedures used to obtain LASs and B/H scores from data including mathematical transformations of dimensional series before conversion into sets of dichotomous series, the conversion of any dimensional series into sets of dichotomous series, the cross-classification of dichotomous series for independent and dependent variables to form 2×2 tables, and all steps for computing standardized LASs and B/H scores from the 2×2 tables. MQALA also includes all procedures used to form additional dichotomous series that may be associated longitudinally including applications of optional analysis parameters, Boolean operators, transition events, and other procedures for defining additional dichotomous series. Furthermore, the method includes procedures for summarizing LAS arrays, LAS array components, B/H score arrays, and B/H score array components across rows, across columns, and across all rows and columns. MQALA also includes procedures for computing values of the strength of longitudinal association measures; computing values of predictive indices; sequential analyses of LASs, B/H scores, and the measures of strength of longitudinal association; setting signs of LASs; differential weighting of variables with importance weights as well as procedures for averaging B/H scores to obtain overall B/H scores.

MOALA is the acronym for Method for the Quantitative Analysis of Longitudinal Associations.

Multiple N-of-1 clinical trials are group clinical trials composed of coordinated sets of N-of-1 clinical trials or coordinated sets of adaptive N-of-1 clinical trials.

N-of-1 clinical trials are clinical trials in which each trial is conducted using one patient. N-of-1 clinical trials can be randomized, controlled, double-masked, and analyzed in accord with the principle of intent to treat.

Objective materials for making predictions mean data and generalized conclusions based on computational methods of empirical induction.

Overall benefit/harm scores or overall B/H scores are computed over or across two or more B/H scores for one individual. An overall B/H score can be computed for the combination of one independent variable or for any one set of independent variables used to define Boolean independent events with two or more dependent variables or non-overlapping sets of dependent variables used to define Boolean dependent events. Any one dependent variable generally would not be used to compute more than one of the B/H scores used to compute an overall B/H score.

Overall B/H scores are obtained by computing a weighted average of two or more B/H scores for one individual. The weights are importance weights that can be equal or different.

Populations are individual conceptual entities with an individual population having two or more individual members, said members all meeting classification criteria.

Population of populations is an individual conceptual entity in which each individual member is a population. The population of all United States urban areas with populations of more than 500,000 each, each member of said population being an individual United States urban area with a population of more than 500,000 persons, is a population of populations.

Predictive index is a measure for an individual that is computed from LASs and information used to compute LASs, said index being used to predict a dependent variable or the occurrence of a particular Boolean dependent event defined on two or more dependent variables. Predictive indices would be computed in accord with a protocol that would operationally define all computational procedures. This protocol would include identification of the dependent variable or Boolean dependent event to be predicted, the independent variables or sets of independent variables that would be used to compute the index, and the periods of time during which the repeated measurements used for computing the index would be obtained. In addition, the protocol would specify all analysis parameters and analysis parameter levels that would be used in computing the LAS arrays.

Primary variables are variables in the database being analyzed. Primary variables are distinguished from analysis parameters.

Real individuals have objective, as distinct from conceptual, reality. For example, an individual patient is a real individual who has objective reality. A population or diagnostic class of patients has conceptual reality.

Repeated measures data means data obtained when attributes of an individual or the individual's environment are measured repeatedly or when events for the individual or in the individual's environment are assessed repeatedly on two or more occasions.

Samples are subsets of statistical populations that are investigated to make inferences about whole populations.

Serial pixel variables represent the values of measures of functioning for corresponding pixels in a series of two or more repeated images. Correspondence of pixels could be achieved by aligning a series of two or more structural images. Consider the example of glucose utilization in various brain structures. Serial pixel variables could represent the amount of glucose utilization over time in the same part of the brain structure on repeated measurement or imaging occasions. There could be one serial pixel variable for each pixel in an image and one value for each serial pixel variable for each image in the series.

Serial region of interest variables are similar to serial pixel variables except that values of a serial region of interest variable represent some measure, usually of central tendency, obtained across two or more pixels in a region of interest. In brain imaging, for example, a serial region of interest variable could represent the average value of glucose utilization across pixels in a brain region corresponding to a particular brain structure such as the visual cortex.

Set of dependent variables means two or more dependent variables used either to define a Boolean dependent event or to measure overall benefit/harm.

Set of independent variables means two or more independent variables used either to define a Boolean independent event or to compute values of a predictive index.

Soft analyses are carried out with procedures not specified in detailed protocols that specify computational procedures, protocols that can be shared to make the procedures transparent and procedures that can be repeated using computers to obtain the same results. Examples of soft analyses are analyses of data in patient medical records and investment market data that are carried out by forming subjective impressions.

Standardization means the process by which distributions of raw LASs are adjusted so that each LAS is one score from a distribution of LASs that has a mean of 0 and a specified standard deviation such as 1. Each distribution of LASs comprises all LASs that are possible given the observed marginal frequencies of the 2×2 table from which the LAS was computed. Standardization facilitates procedures for comparing and combining LASs and summarizing arrays of LASs. B/H scores also can be standardized.

Strength of longitudinal association measures quantify the direction and strength of longitudinal associations. Values of strength of longitudinal association measures can range between −1 and 1 inclusive.

Subjective experience is the act or process of directly perceiving or observing events or reality. Subjective experience can be recorded as data and analyzed with computational methods of empirical induction.

Subjective impressions are ideas about associations between and among variables that are based on experience but not obtained by applying computational methods of empirical induction to data. People often have subjective impressions about how things work and about the benefit and harm of treatments and other exposures.

Subjective materials for making predictions mean subjective experience and subjective impressions including subjective impressions resulting from soft analyses.

System for the quantitative analysis of longitudinal associations means any regularly interacting group of components that implement the essential features and any of the optional features of MQALA. These systems could be implemented on various types of computer systems, in various computing environments, and with various operating systems and programming languages. A system for the quantitative analysis of longitudinal associations also could include various features that make it more convenient to apply the MQALA to a broad variety of problems. Such features include targeting subsets of dichotomous series for additional analyses and changing how variables function in analyses before re-analyses.

Temporal resolution refers to the number of repeated measurements covering an interval of time. Repeated measurements could cover periods of time such as seconds, minutes, hours, days, weeks, months, quarters, or years. Higher temporal resolution for an interval of time would require more repeated measurements and would provide more detailed analyses of longitudinal associations. Higher temporal resolution increases the amount of computation required to perform analyses.

Time-series data means data consisting of the results of periodic measurements repeated at fixed intervals of time. Time-series usually implies that the data are obtained on many occasions.

Unique means one of a kind, being the only one.

The above objects and other objects, features, and advantages of the present invention are readily apparent from the following detailed description of the best mode for carrying out the invention when taken in connection with the accompanying drawings.

BRIEF DESCRIPTION OF THE SEVERAL VIEWS OF THE DRAWING

FIGS. 2a and 2b summarizes the steps in Stage 2 of analyses performed with the present invention.

DETAILED DESCRIPTION OF THE INVENTION

Figure 1A:
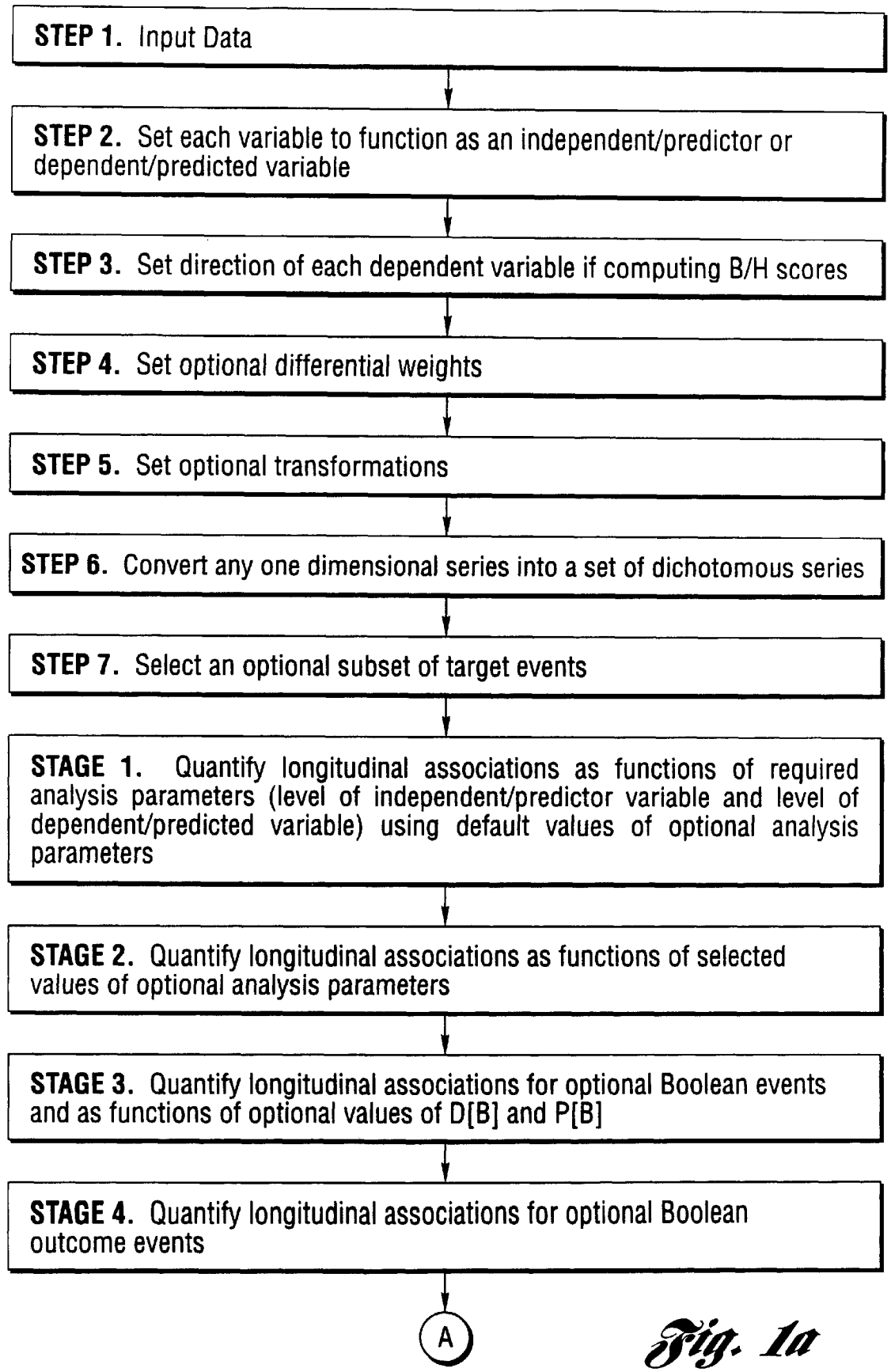
FIGS. 1a and 1b are block diagram flow charts that provides an overview of the steps and stages for implementing the present invention with a computer or a computer system.

After an introduction, the description of this invention will be presented in four sections. Section 4.1 is a detailed description of the features needed to understand MQALA.

Section 4.2 describes the applications and uses of MQALA. Section 4.3 identifies a subset of the features, applications, and uses of MQALA that are the major improvements of this invention. Section 4.4 is a detailed step by step description of the preferred embodiment that corresponds to the figures in the Section 3, the brief description of the several views of the drawing. The preferred embodiment includes demonstrations of many of the features of MQALA.

The present invention provides a computer-based method and system to perform empirical induction. As described in Sections 2.1 and 2.2, this invention provides an extensive set of measurement and data analysis features for addressing a broad but well-defined range of difficult, unsolved problems in various disciplines, professions, and enterprises such as medicine, health care, science, and business.

Induction refers to procedures for arriving at generalized conclusions from particular instances. The present invention addresses generalized conclusions about longitudinal associations between and among variables and events. The term "empirical" in empirical induction emphasizes the fact that induction performed by the present invention originates in or is based directly upon observations and experience as these are recorded in data as distinct from theories or knowledge bases. The "particular instances" are the results of particular measurements or assessments of particular individuals at particular times.

The present invention performs empirical induction by quantifying, discovering, analyzing, and describing associations, including cause and effect relationships, for individuals of many types. The associations that are quantified by the present invention are longitudinal associations between independent events, defined on one or more independent variables, and dependent events defined on one or more dependent variables. LASs quantify longitudinal associations, together with other measures based on LASs.

The magnitudes of LASs quantify the amount of evidence for longitudinal associations. The signs (positive or negative) of LASs indicate the direction of the longitudinal associations. Data collected while applying the experimental method, which includes control of independent variables, randomization, and masking of observers, would help assure that LASs are valid measures of cause and effect relationships.

The present invention can be used to arrive at generalized conclusions and to make predictions. Generalized conclusions are about associations between independent and dependent events for individuals. Predictions are based on generalized conclusions about associations and are based on the assumption that generalized conclusions obtained from available data may continue to obtain into the future. Predictions often involve temporal analysis parameters.

Longitudinal associations are quantified between events and variables over time for particular individuals rather than across individuals at a particular time. Time is represented by the occasions of the repeated measurements. The temporal resolution of an analysis increases with the number of repeated measurements within a particular interval of time, especially when the repeated measurements are periodic.

The present invention is applied to repeated measures data including multiple time-series. Repeated measurements for independent variable(s) may measure or assess attributes of an individual's environment that may affect the individual or attributes of an individual herself, himself, or itself. Repeated measurements for dependent variable(s) may measure or assess attributes or behaviors of an individual herself, himself, or itself as well as attributes of an individual's environment that may be affected by the individual.

The present invention can be applied to problems that can be addressed with data consisting of the results of two or more repeated measurements or assessments of at least one variable designated to function as an independent variable and at least one variable designated to function as a dependent variable for a particular individual. Larger numbers of repeated measurements or assessments can provide more evidence for longitudinal associations. This invention can be applied meaningfully when the variables measure or assess events that have the potential to recur for an individual and/or when the variables have the potential to fluctuate in level over time for an individual.

This invention can be applied after the data are entered into an appropriate data processing system. Opportunities for collecting, analyzing, and accessing data for repeated measurements are increasing rapidly with the development of various Internet-enabled devices.

The present invention is applied directly to dichotomous series. A dichotomous series results when the presence (shown herein by a 1 in a dichotomous series) or absence (shown herein by a "0" in a dichotomous series) of an event is measured or assessed repeatedly over time on two or more occasions for a particular individual. Dimensional series can be analyzed with the present invention after each dimensional series is converted into a set of dichotomous series. The sets of dichotomous series for an individual form a dichotomous representation of information in repeated measures data for the individual.

4.1. Detailed Descriptions of the Features Needed To Understand MQALA 4.1.1. Computing LASs for Dichotomous Series A procedure for computing LASs is an essential feature of the present invention. The procedure for computing a LAS is applied to a pair of dichotomous series, as described in the preceding paragraph, and consists of: (1) cross-classification of the values for occasions of a dichotomous series for an independent variable with values for the corresponding occasions of a dichotomous series for a dependent variable to form a 2×2 table in which the entry in each cell is a count of the number of occasions on which members of the pair of dichotomous series yield each of the four combinations: 1,1; 0,1; 1,0; 0,0, (2) a computational method and system for calculating a LAS, the LAS having six important and valuable characteristics. Table 1 illustrates the labeling conventions for 2×2 tables used to compute LASs.

TABLE 1

CONVENTIONS FOR LABELING COUNTS OF OCCASIONS FOR 2 × 2 TABLES USED TO COMPUTE LASs AND B/H SCORES

|  |  | Independent Events | |  |
|---|---|---|---|---|
|  |  | Present 1 | Absent 0 |  |
| Dependent Events | Present, 1 | 1, 1<br>a | 0, 1<br>b | a + b |
|  | Absent, 0 | 1, 0<br>c | 0, 0<br>d | c + d |
|  |  | a + c | b + d | n |

The six important and valuable characteristics of a LAS are (1) a LAS with a value of zero indicates no evidence for a longitudinal association between the dichotomous series for an independent variable and the dichotomous series for a dependent variable, (2) a positive LAS indicates the amount of evidence for a positive association between the dichotomous series for an independent variable and the dichotomous series for a dependent variable, (3) a negative LAS indicates the amount of evidence for a negative association between the dichotomous series for an independent variable and the dichotomous series for a dependent variable, (4) the absolute value of a LAS can increase indefinitely as the total number repeated measurement occasions covered by the 2×2 table increases, (5) each LAS is one LAS from a distribution of all LASs that are possible given the particular marginal frequencies of the observed 2×2 table and, (6) said distribution of all possible LASs is standardized to have an expected value of 0 and a specified standard deviation such as 1 unless one or more of the marginal frequencies of the 2×2 table is 0. If any of the marginal frequencies of the 2×2 table is 0, the table can provide no evidence for a longitudinal association and the single possible LAS is 0 by definition indicating no evidence for a longitudinal association. The expected value of the standard deviation of the distribution of all possible LASs for a particular 2×2 table for all LASs presented in this document is 1.

Here is a specific embodiment of a computation for LASs with the six characteristics stated in the preceding paragraph. The computation is presented in nine steps. A version of this procedure for computing B/H scores was included in the previously cited article by Bagne and Lewis. B/H scores are LASs for which the signs may have been changed so that all positive scores indicate benefit and all negative scores indicate harm.

Step 1. If any one or more of the marginal frequencies (a+b, c+d, a+c, or b+d) of the observed 2×2 table equals zero, LAS=0 by definition, indicating no evidence for a longitudinal association. If none of the marginal frequencies equals zero, continue with additional steps.

Step 2. Compute the expected value of a, E(a).

$$E(a) = \frac{(a+b)(a+c)}{n}$$

If the observed value of a equals E(a), LAS=0. If LAS does not equal zero because a equals E(a), continue with additional steps.

Step 3. Identify all values of a that are possible given the marginal frequencies of the observed 2×2 table. As indicated in the fifth of six important and valuable characteristics of an LAS, each LAS is one LAS in distribution of all LASs that are possible given the marginal frequencies of the observed 2×2 table.

Step 4. Compute the magnitude or absolute value of the raw or unstandardized LAS, $|LAS_{raw}|$, for each possible value of a as follows.

$$|LAS_{raw}| = \frac{(n(ad-bc))^2}{(a+b)(c+d)(a+c)(b+d)}$$

Step 4 is a novel use of the formula for computing values of the chisquare distribution.

Step 5. Determine the sign of $LAS_{raw}$, corresponding to each value of a by comparing E(a) with the value of a and applying a two-part rule. If a<E(a), $LAS_{raw}=-|LAS_{raw}|$. If a>E(a), $LAS_{raw}=|LAS_{raw}|$.

Step 6. Compute the probability of obtaining each possible value of $LAS_{raw}$ by chance alone if there is no association between independent events and dependent events.

$$P(LAS_{raw}) = \frac{(a+b)!(c+d)!(a+c)!(b+d)!}{n!a!b!c!d!}$$

Step 6 is a novel use of the formula applied to conduct the Fisher exact probability test.

Step 7. Compute the mean or expected value of the discrete probability distribution consisting of the values of $LAS_{raw}$ together with their probabilities as follows.

$$E(LAS_{raw}) = \Sigma (LAS_{raw}) P(LAS_{raw})$$

Step 8. Compute the variance $\sigma^2$, of the discrete probability distribution consisting of the values of $LAW_{raw}$ together with their probabilities as follows.

$$\sigma = \sqrt{\Sigma [LAS_{raw} - E(LAS_{raw})]^2 P(LAS_{raw})}$$

Step 9. Compute the LAS corresponding to the $LAS_{raw}$ for the observed value of a as follows.

$$LAS = \frac{LAS_{raw} - E(LAS_{raw})}{\sigma}$$

4.1.2. Converting Dimensional Series into Sets of Dichotomous Series

The present invention can be applied to dimensional series when the computer is programmed to convert the information provided by each dimensional series into a set of dichotomous series. This can be accomplished by applying integrated scales. For example, suppose that the dimensional series is composed of the values 0, 1, 2, and 3. The first dichotomous series in the set would distinguish values of 0 from values of 1 or more. The second dichotomous series in the set would distinguish values of 0 and 1 from values of 2 or more. The third dichotomous series in the set would distinguish values of 0, 1, and 2 from values of 3.

There are a number of alternative procedures to convert a dimensional series into a set of dichotomous series. Users of the invention could select or develop rules for this conversion in accord with their interests and needs. Users could control the dimensional resolution of the conversion. For example, the user could decide to accomplish the conversion using the nearest whole number, the nearest tenth, the nearest hundredth, et cetera. Users could select to preserve information in the dimensional series at an ordinal or at an interval level of measurement. Greater dimensional resolution and representation of information at an interval level of measurement generally would require larger sets of dichotomous series to represent the information in a dimensional series.

As a result of converting a dimensional series into a set of dichotomous series, an analysis parameter is formed that represents levels of each dimensional variable so converted. The longitudinal association between two dimensional variables is described most basically by a two dimensional array of LASs. By convention, one column of the array would correspond to each level of the analysis parameter for the independent variable and one row would correspond to each level of the analysis parameter for the dependent variable.

The previously cited article by Bagne and Lewis presents a simple example of converting dimensional series into sets of dichotomous series as does Section 4.4.3.1.

4.1.3. Summarizing LAS Arrays

Arrays of LASs can be summarized to various degrees by selecting the LAS with the most extreme absolute value to represent any column or row. The fact that LASs are standardized measures facilitates summarization.

As examples of summarization, the most extreme LAS in each column of the two-dimensional array described in the previous section would represent the longitudinal association between the two variables as a function of level of the analysis parameter for the independent variable. The most extreme LAS in each row would represent the longitudinal association between the two variables as a function of level of the analysis parameter for the dependent variable. The most extreme LAS in the entire array would summarize the longitudinal association between both the independent variable and the dependent variable. The location of the most extreme LAS in the entire array would identify the conditions that yielded the most extreme LAS. These conditions would be described by identifying the levels of both analysis parameters that yielded the most extreme LAS.

It is possible for the most extreme absolute value to occur at more than one location within an array, often identifying very similar conditions. It also is possible for the magnitude of the most extreme positive value in an array to equal the magnitude of the most extreme negative value in the same array. By convention, the summary B/H score for an array in which the most extreme LASs or B/H scores have equal magnitudes but opposite signs is 0.

This procedure for summarizing LAS arrays can be extended to arrays that have additional dimensions because of the use of additional analysis parameters and to arrays that have multiple components because of the use of Boolean events.

The previously cited article by Bagne and Lewis includes an example in which this feature was used to summarize B/H scores.

4.1.4. Mathematical Transformations of Dimensional Series Before Converting into Sets of Dichotomous Series This feature of MQALA provides the option of allowing users to apply mathematical transformations of dimensional variables before the variables are converted into sets of dichotomous series that might be associated longitudinally. Here are some examples of transformations and their uses.

One type of transformation would be to obtain the residuals from a linear or a nonlinear regression line. The sets of dichotomous series would be formed from the residuals. This type of transformation could be used to focus analyses on relatively short-term fluctuations in values of variables rather than longer-term trends. Separation of fluctuations from trends can be very valuable when, for example, the present invention is applied to economic and investment market time-series and for investigations of the effects of short term treatments superimposed on longer term changes in health.

Another type of mathematical transformation of dimensional series would be to obtain and analyze differences between values of measures for successive measurement occasions. This transformation could be of special value, for example, in studies involving hormones when response is more sensitive to changes in hormone concentrations than the hormone concentrations themselves. The author used this transformation in the previously cited presentation to the Society of Biological Psychiatry.

Still another type of useful transformation is to apply a z-score transformation to the values in a dimensional series. The transformed scores would have a mean of 0 and a specified standard deviation. Sets of dichotomous series would be formed to represent intervals of z scores. This transformation can be used as a tool for controlling dimensional resolution. For most problems, a dimensional series could be portrayed with 7 to 13 levels of the analysis parameter without substantial loss of predictive power or precision in specifying the conditions that yield the most evidence for a longitudinal association.

Various transformations can be used in combination. For example, the z-score transformation could be applied to successive differences.

4.1.5. Set and Change Signs of LASs to Form Benefit/Harm Scores

This feature provides the option of allowing users to set and change the signs of LASs so that all positive associations would be considered favorable and all negative associations could be considered unfavorable. For example, B/H scores can be used for health applications. This is done during the computation of LASs by applying rules based on a specification of whether the occurrence of dependent events is to be considered favorable or unfavorable and/or by specifying whether higher values for dimensional dependent variables are considered favorable or unfavorable.

The previously cited article by Bagne and Lewis illustrated this feature.

4.1.6. Measures of Strength of Longitudinal Association

This optional feature of MQALA provides three different measures of strength of longitudinal association. The magnitudes of the three measures of of longitudinal association quantify the strength of longitudinal associations. The signs (positive or negative) of measures of strength of longitudinal association indicate the direction of associations. Section 2.1 includes an illustration of the important distinction between the amount of evidence that data provide for longitudinal associations between independent and dependent events and the strength of evidence for longitudinal associations.

The magnitudes of the strength of longitudinal association measures are proportions. The numerator used to compute each of the measures of strength of longitudinal association is the observed LAS. Each of the three measures of strength of longitudinal association corresponds to a different way of conceptualizing strength of longitudinal association. The three different ways of conceptualizing strength of longitudinal association may yield identical values for all three of the strength of longitudinal association measures.

The denominator for each of the measures of strength of longitudinal association is the absolute value of a particular LAS. There are three optional ways of conceptualizing strength of longitudinal association. Each conceptualization corresponds to a different procedure for specifying the marginal frequencies of the 2×2 table used to compute the denominator LAS. Table 2 illustrates computation of the strength of longitudinal association measures for the three conceptualizations when the marginal frequencies for the observed 2×2 table are as follows: a+b=3, c+d=5, a+d=2, and b+d=6. Table 2 shows LASs and values of the three measures of strength of longitudinal association for all three values of a that are possible given the specified marginal frequencies.

The first conceptualization of strength of longitudinal association is based on the marginal frequencies of the observed 2×2 table. The denominator is the absolute value of the most extreme LAS in the same positive or negative direction from the distribution of potential LASs for the observed LAS. Values of the strength of longitudinal association measure calculated according to this conceptualization are labeled S. Values of S always can be calculated from the distribution of potential sores that is computed as part of the procedure for obtaining the observed LAS. S can have a value of 1 or —1 even if one series of associated events does not account for all variation in the occurrence of the other series.

With the second conceptualization, the denominator for the strength of longitudinal association measure is the absolute value of a LAS that would result if all variation in the occurrence of dependent events had been accounted for by variation in the occurrence of independent events. According to this conceptualization, both numerator and denominator LASs are calculated from 2×2 tables with the same marginal frequencies for dependent events, namely a+b and c+d. If the observed LAS is positive, insert zeros in the bc diagonal of the 2×2 table. If the observed LAS is negative, insert zeros in the ad diagonal of the 2×2 table. Then complete the 2×2 table and compute values of both the denominator LAS and the strength of longitudinal association measure.

When applying the second conceptualization, the a+c and b+d marginal frequencies of the 2×2 table formed as specified in the preceding paragraph may differ from the marginal frequencies of the observed 2×2 table. Since the second conceptualization considers the marginal frequencies for dependent events to be fixed as observed, the resulting strength of longitudinal association measure will be labeled $S_D$.

With the third conceptualization of strength of longitudinal association, consider the marginal frequencies for independent events to be fixed as observed but the marginal frequencies for outcome events may be changed. For this reason, the measure of strength of longitudinal association will be labeled $S_I$. $S_I$ would facilitate comparisons of how effective various independent events are in accounting for variation in the occurrence of specified dependent events. According to the third conceptualization, both numerator and denominator LASs are calculated from 2×2 tables with the same a+c and b+d marginal frequencies. As for the second conceptualization, if the observed LAS is positive, insert zeros in the bc diagonal of the 2×2 table. If the observed LAS is negative, insert zeros in the ad diagonal of the 2×2 table. Then complete the 2×2 table and compute values of both the denominator LAS and $S_I$.

TABLE 2

EXAMPLE ILLUSTRATING COMPUTATION OF VALUES OF THE THREE
MEASURES OF THE STRENGTH OF LONGITUDINAL ASSOCIATION

When a = 0

| 0 | 3 | 3 |
|---|---|---|
| 2 | 3 | 5 |
| 2 | 6 | 8 |

LAS = −0.917

Values of the three measures of strength of longitudinal association for the above
2 × 2 table and the 2 × 2 tables for the denominators from which they were derived.

| 0 | 3 | 3 |
|---|---|---|
| 2 | 3 | 5 |
| 2 | 6 | 8 |

$S = -0.917/0.917 = -1.000$

| 0 | 3 | 3 |
|---|---|---|
| 5 | 0 | 5 |
| 5 | 3 | 8 |

$S_D = -0.917/4.277 = -0.214$

| 1 | 2 | 3 |
|---|---|---|
| 1 | 4 | 5 |
| 2 | 6 | 8 |

$S_I = -0.917/4.5000 = -0.204$

When a = 1

| 1 | 2 | 3 |
|---|---|---|
| 1 | 4 | 5 |
| 2 | 6 | 8 |

LAS = 0.102

Values of the three measures of strength of longitudinal association for the above
2 × 2 table and the 2 × 2 tables for the denominators from which they were derived.

| 2 | 1 | 3 |
|---|---|---|
| 0 | 5 | 5 |
| 2 | 6 | 8 |

$S = 0.102/2.546 = 0.040$

| 3 | 0 | 3 |
|---|---|---|
| 0 | 5 | 5 |
| 3 | 5 | 8 |

$S_D = 0.102/4.277 = -0.024$

| 2 | 0 | 2 |
|---|---|---|
| 0 | 6 | 6 |
| 2 | 6 | 8 |

$S_I = 0.102/4.5000 = 0.023$

When a = 2

| 2 | 1 | 3 |
|---|---|---|
| 0 | 5 | 5 |
| 2 | 6 | 8 |

LAS = 0.546

Values of the three measures of strength of longitudinal association for the above
2 × 2 table and the 2 × 2 tables for the denominators from which they were derived.

TABLE 2-continued

EXAMPLE ILLUSTRATING COMPUTATION OF VALUES OF THE THREE
MEASURES OF THE STRENGTH OF LONGITUDINAL ASSOCIATION

| 2 | 1 | 3 |
|---|---|---|
| 0 | 5 | 5 |
| 2 | 6 | 8 |

$S = 2.546/2.546 = 1.000$

| 3 | 0 | 3 |
|---|---|---|
| 0 | 5 | 5 |
| 3 | 5 | 8 |

$S_D = 2.546/4.277 = 0.595$

| 2 | 0 | 2 |
|---|---|---|
| 0 | 6 | 6 |
| 2 | 6 | 8 |

$S_I = 2.546/4.5000 = 0.566$

A somewhat different procedure for calculating values of strength of longitudinal association measures was illustrated for two of the three measures in the previously cited article by Bagne and Lewis.

4.1.7. Episode Length

Episode length is an optional analysis parameter of MQALA that specifies the number of consecutive repeated measurement occasions over which the occurrence or non-occurrence of an episode would be investigated. Episode length can be applied to the dichotomous series for independent and/or dependent variables. For example, consider applying episode length equals 5 to a series of daily closing values for a stock market index. First, it would be necessary to convert the series of stock market index values into a set of dichotomous series (Section 4.1.2). Suppose one of these dichotomous series is for values equal to or greater than 2415. Episode length could be applied to this dichotomous series to identify, for example, events composed of 5 consecutive days on which the stock market index had values of 2415 or more. The presence or absence of this event would be determined for each successive day in the 2415 dichotomous series to form an additional dichotomous series that represents the episode length equals 5 event.

Episode length usually would be applied by selecting a range of levels for analysis. The minimum or default level of episode length is 1. The dichotomous series for episode length 1 is identical to the dichotomous series to which it is applied. Levels of episode length that can be investigated meaningfully are substantially less than the total number of repeated measurements in the data.

Application of episode length to a particular variable adds an additional dimension to the resulting array of LASs. Suppose the above mentioned stock index is being used as a dependent variable to analyze a longitudinal association with a dimensional independent variable. Application of multiple levels of episode length to the stock index would yield a LAS array with three dimensions—independent variable level, dependent variable level, and level of episode length. This array could be summarized across levels of the independent and dependent variables to describe the longitudinal association between the variables as a function of episode length. The LAS in this LAS array that has the most extreme absolute value would summarize the three-dimensional array. The location of this extreme value in the array would identify the level of episode length, the level of the independent variable, and the level of the stock market index that yielded the most evidence for a longitudinal association between the variables.

4.1.8. Episode Criterion

Episode criterion is another optional analysis parameter of MQALA. When applied, episode criterion needs to be applied together with episode length. Episode criterion can be applied to independent and dependent variables. The minimum level of episode criterion is 1 and the maximum level is the level of episode length. The default level of episode criterion is the level of episode length, which is equivalent to not investigating episode criterion.

Episode criterion usually would be investigated with a series of integrated scales, each specifying the number or proportion of occasions constituting an episode on which an event is present. To illustrate, refer to the episode length stock market index example introduced in Section 4.1.7. Five levels of episode criterion could be selected for analysis in this example: $\geq 1$, $\geq 2, \geq 3, \geq 4$, and 5. When episode criterion is $\geq 3$, for example, the stock index equal to or greater than 2415 event would have to be present on 3 or more of the 5 measurement occasions for the new event to be present. Each level of episode criterion would yield an additional dichotomous series that could, in turn, be associated longitudinally with another dichotomous series.

Episode criterion would yield an additional dimension to the array of LASs and/or arrays of the strength of longitudinal association measures. For the stock index example, the parameters presented so far would yield a four-dimensional array of LASs descriptive of the longitudinal association between the independent and dependent variables.

The procedure for adding analysis parameters and levels of analysis parameters to analyses illustrates how the present invention can be applied to analyze longitudinal associations in an almost unlimited degree of detail. Use of multiple analysis parameters and levels would add to the precision of identifying conditions that yield the most evidence for longitudinal associations and/or the conditions that yield the strongest longitudinal associations. At the same time, detailed analyses that yield large multi-dimensional arrays of LASs can be summarized with a single LAS.

Episode length and episode criterion could be used, for example, in studies of drug treatment to deal with missing data and patient noncompliance. An episode of treatment, for example, could be said to be present if the patient consumed at least a specified dose on 5 of 7 consecutive days. Dose, episode length, and episode criterion all could have a range of levels to help identify the conditions that yield the most evidence for a treatment effect.

4.1.9. Delay

Delay or delay of apparent response is another optional analysis parameter of MQALA. The term "response" is used to identify a dependent event that is associated with an independent event. The term "apparent" is used to emphasize the fact that any association between independent and dependent events does not, by itself, indicate that the independent event caused the dependent event. This feature is particularly important when MQALA is applied to calculate values of predictive indices that could be used in forecasting.

Delay and persistence are temporal analysis parameters that can be investigated most meaningfully when repeated measurements are obtained periodically at fixed intervals of time. The present invention is not effective for evaluating delays or persistencies that are less than the temporal resolution of the data. Delay and persistence are investigated by applying procedures to the dichotomous series for independent events to form additional dichotomous series of independent events that may, in turn, be associated longitudinally with dichotomous series of dependent events.

Assume that more recent events are shown to the right in series of measurements or in dichotomous series. Delay is applied by shifting the dichotomous series for the independent variable to the right relative to the dichotomous series for the dependent variable. In other words, the independent series is shifted toward more recent measurements. Levels of delay correspond to shift size, the number of measurement occasions shifted. Delay usually would be applied by selecting a range of delay levels for analysis.

The default level of delay is 0, which is equivalent to not evaluating delay as an analysis parameter. When delay is 0, independent events are associated with dependent events on the same occasion. When the level of delay is 0, the LAS for a pair of dichotomous series will be the same regardless of which series functions as the independent variable.

Nonzero levels of delay can be used together with changing the functions of the variables in the analysis to determine which variable in a pair is the better predictor of the other. Suppose one has two economic time-series of monthly data and one wants to determine which of the two variables is a better predictor of the other. This could be accomplished as follows. First, select Series 1 to function as the independent variable and investigate delay for a range of levels such as 0 through 6 months. Next, select Series 2 to function as the independent variable and investigate delay for a range of levels such as 1 through 6 months. Next, summarize the LASs as a function of delay. The results can be presented as a graph in which the summary LASs for levels of delay when Series 2 functioned as the independent variable are presented as if they were negative levels of delay. This graph would be investigated for asymmetry centered around 0 delay. If, for example, the summary LASs were larger for levels of delay when Series 1 functioned as the independent variable, Series 1 would be the better predictor of the other series. The most extreme LAS in the graph would identify the level of delay that provides the most predictive power.

Delay can be used as a tool to help determine which variables should function as independent variables in analyses and to help investigate the temporal criterion of causal relationships.

Bagne and Lewis illustrated delay in the previously cited article.

4.1. 10. Persistence

Persistence is an optional analysis parameter of MQALA that can be used to investigate apparent responses that may persist beyond a particular occasion. Levels of persistence are counts of the number of measurement occasions. The default level of persistence is 0, which is equivalent to not evaluating persistence as an analysis parameter. Persistence usually is investigated after delay.

4.1.11. Boolean Events

Three optional features of MQALA—Boolean events, Boolean event scope, and Boolean event criterion—are alternative procedures for defining Boolean events. These procedures can be applied to the dichotomous series for two or more independent variables to form additional dichotomous series of independent events that may be associated longitudinally with dependent series. These procedures also can be applied to the dichotomous series for two or more dependent variables to form additional dichotomous series of dependent events that may be associated longitudinally with independent series.

Boolean events is a procedure in which the computer is programmed to allow users to apply one or more Boolean operators (such as AND, OR, NOR, XOR, and NOT) to define Boolean independent events and/or Boolean dependent events. For example, the AND operator can be used to investigate interactions between independent events. Interaction would be indicated if the longitudinal association with a series of dependent events is much stronger when both of two independent events are present than when either of the events is present alone. Multiple Boolean operators can be applied simultaneously to many variables to define very complex events.

Boolean event scope and Boolean event criterion provide optional ways to define certain Boolean independent events and/or Boolean dependent events. The resultant Boolean events may be used to form additional dichotomous series that may be associated longitudinally with other dichotomous series. Boolean event scope is the number of specified variables, each variable portrayed by a specified dichotomous series, across which the Boolean event is defined. Boolean event criterion is the number or proportion of specified variables covered by Boolean event scope for which an event must be present in order for the Boolean event to be present.

Boolean event criterion usually is applied by selecting a range of levels and using integrated scales. Here is an example of one type of Boolean event that could be more easily defined by using Boolean event scope and Boolean event criterion than by using Boolean events directly. A Boolean dependent event would be said to be present if any combination of the daily closing prices for 10 or more (Boolean event criterion) of 15 (Boolean event scope) specified stocks were above a level specified for each stock.

4.1.12. Delay and Persistence after Boolean Events

Delay and persistence after a Boolean event are optional analysis parameters of MQALA that are similar to delay and persistence response. The crucial difference is that delay and persistence after Boolean events are applied to the dichotomous series of Boolean events after these series are formed.

4.1.13. Transition Events

The optional feature of MQALA, transition events, can be applied when the computer is programmed to allow the user to form additional dichotomous series of "transition-on" events and "transition-off" events on any specified dichotomous series. A "transition-on" event indicates the start of an event. A "transition-off" event indicates that an event has stopped. Transition events can be conceptualized as a change from one state to another state for an individual or its environment.

A "transition-on" event is identified as being present on the occasion corresponding to the second of a pair of consecutive values in the specified series when the first member of the pair in the specified series is "0" and the second member of the pair is "1. " A "transition-off" event is identified as being present on the occasion corresponding to the second of a pair of consecutive values in the specified series when the first member of the pair in the specified series is "1" and the second member of the pair is "0." Dichotomous series representing the presence or absence of transition events may be associated longitudinally with other dichotomous series.

Bagne and Lewis mentioned transition events in the previously cited article.

4.1.14. Other Procedures Applied to Form Additional Dichotomous Series

Several of the optional features of MQALA that have been described so far are examples of specific types of rules that can be applied to form additional dichotomous series that may be associated longitudinally. This optional feature of MQALA specifies more general guidelines that can be applied to identify other types of events that can be used to form additional dichotomous series that may be associated longitudinally with other series.

The first component of this feature consists of a procedure for defining events on the dichotomous series representing one or more independent variables, said procedure consisting of the application of a rule or set of rules to said dichotomous series in a manner that yields additional dichotomous series that may, in turn, be associated longitudinally with one or more dichotomous series based on one or more dependent variables. The second component of this feature consists of a procedure for defining events on the dichotomous series representing one or more dependent variables, said procedure consisting of the application of a rule or set of rules to said dichotomous series in a manner that yields additional dichotomous series that may, in turn, be associated longitudinally with one or more dichotomous series based on one or more independent variables.

Here are several examples of events that could be applied to form dichotomous series using this feature. The applications of both episode criterion and Boolean event criterion have been described using integrated scales. An alternative would be to specify exact levels. Another alternative is to define new events such as every other event or every third event of a specified kind. Still another option is to define new events by specifying particular sequences or schedules of other events.

This feature can be applied to any of the dichotomous series resulting from the application of other features of MQALA. Taken together, all these features can capture much of the diversity of events that have the potential to recur for individuals, operate in nature or in the man-made world, and may be associated longitudinally. The present invention provides measurement and analysis tools to help quantify, discover, analyze, and describe longitudinal associations between such events.

A version of this feature was included in the previously cited article by Bagne and Lewis.

4.1.15. Sequential Analysis of LASs and the Strength of Longitudinal Association Measures This feature is a computer-based method and system for analyzing LASs, B/H scores, and the measures of strength of longitudinal association sequentially over the occasions of repeated measurements for dichotomous series. LASs and values of the strength of longitudinal association measures may be computed after the addition of data for the most recent measurement and presented as functions of time or occasion. The first value of LAS in a sequential analysis, corresponding to the first occasion, would be zero by definition because measurements on one occasion can not provide any evidence for longitudinal associations. The last values of LAS and strength of longitudinal association measures in a sequential analysis would be the same values that result from a single analysis of the data as a whole. Intermediate values would show the emergence over time of evidence for any longitudinal associations or changes in longitudinal associations.

Individual or summary LASs and values of the strength of longitudinal association measures can be graphed as functions of measurement occasion or time. Positive and negative inflections in these graphs would indicate either increases or decreases in the amount of evidence for longitudinal associations or strengthening or weakening of longitudinal associations.

When associations tend to remain constant over time, it generally would be adequate to examine the associations across all periods at the end of an investigation as illustrated in the primary demonstration. However, it is not unusual for the strength of longitudinal associations to vary over time.

Drug studies provide many examples in which longitudinal associations vary over time. For example, patients may adapt to side effects. The side effects may be most evident early during the course of therapy and then dissipate. In other situations, patients may be sensitized to drug effects after prolonged or repeated treatments. Possibilities of this sort can be examined with sequential LASs of B/H scores.

In general, there would be little reason to examine sequential LASs or B/H scores when the strength of longitudinal association measures at the ends of investigations have magnitudes (absolute values) of 1. More informative applications of sequential analyses could occur when values of the strength of longitudinal association measures at the ends of investigations have magnitudes less than 1. If, for example, a patient first experienced and then ceased to experience a side effect of drug over time, a graph of B/H score as a function of time would first increase in magnitude and then be deflected toward the abscissa as the patient began to adapt to the side effect. If, on the other hand, the patient did not respond at first, but then became sensitized and did respond, the B/H scores would first remain close to the abscissa and then be deflected away from the abscissa. In other words, inflections in graphs relating sequential LASs or B/H scores to period or time can provide evidence that the strength of longitudinal associations vary over the course of investigations.

Table 3 shows an extreme example in which a patient first experienced and then ceased to experience an adverse side effect. During the first 14 periods, an adverse health event occurred only with each of the 7 treatment events. The B/H score for the first 14 periods is −7.674 and S=−1.000. During the last 14 periods, the adverse health event never occurred even though there were 7 treatment events. Data of the type illustrated in Table 3 could be obtained if the periods were days and the patient received placebo on weeks 1 and 3 and drug on weeks 2 and 4. Data for the last 14 days can provide no evidence for a longitudinal association because one of the marginal frequencies in the 2×2 table is 0.

TABLE 3

DATA FOR ILLUSTRATING SEQUENTIAL B/H SCORES

| First 14 periods | | | Last 14 periods | | | All 28 periods | | |
|---|---|---|---|---|---|---|---|---|
| 7 | 0 | 7 | 0 | 0 | 0 | 7 | 0 | 7 |
| 0 | 7 | 7 | 7 | 7 | 14 | 7 | 14 | 21 |
| 7 | 7 | 14 | 7 | 7 | 14 | 14 | 14 | 28 |
| B/H Score = −7.674 | | | B/H Score = 0 | | | B/H Score = −5.351 | | |
| S = −1.000 | | | — | | | S = −0.339 | | |

Table 3 includes the 2×2 table for all 28 repeated assessments. Compared to data for the first 14 periods, the B/H score decreases in magnitude from −7.674 to −5.351 and S decreases in magnitude from −1.000 to −0.339. The graphs of values of both B/H score and S as a function of time would be deflected toward the abscissa after the patient ceased to experience the adverse side effect. Sequential B/H score procedures can be an important tool for examining associations that change over time.

An alternative procedure for applying sequential analyses is to compute sequential values of LASs, B/H scores, and the measures of strength of longitudinal association using moving windows of data, the windows of data consisting of specified numbers of repeated measurement occasions. When monitoring sequential values, each successive window would end with the most recent measurement.

4.1.16. Analyzing Time-Series Data with MQALA

This feature of MQALA consists of analyzing time-series data with MQALA. Time-series data means data consisting of the results of periodic measurements repeated at fixed intervals of time. Examples of periods or intervals include seconds, minutes, hours, days, weeks, months, quarters, and years. Periodic data facilitate the analysis of delay and persistence. Periodic data also gives episode length a more clearly defined temporal meaning. Time-series also can result from the application of Fourier analysis to data descriptive of phenomena that have duration.

Frequent measurements increase temporal resolution. Large numbers of repeated measurements also can increase the amount of evidence for longitudinal associations if any longitudinal associations are present. Examples of time-series data include economic time-series, much investment market data, periodic measures of business and organizational performance, and much of the health monitoring data collected while patients are in intensive care.

4.1.17. Predictive Indices

This feature of MQALA consists of a computer-based method and system for calculating values of predictive indices. Predictive indices would live up to their name most clearly when used with delay. When MQALA is applied with the analysis parameter called delay, data used to define events that have already occurred can be used in attempts to predict events that have not yet occurred.

Values of predictive indices calculated in accord with procedures that are part of the present invention are based on LASs and other information generated while calculating LASs. This feature allows information from two or more individual independent variables and/or sets of independent variables to be used simultaneously to make predictions about a single dependent variable or set of dependent variables. This feature is demonstrated in Section 4.4.3.8.

4.1.18. Statistical Analysis of LASs and Measures Based on LASs

Section 2.3 describes how MQALA is distinct from the statistical method. Section 2.4 describes how MQALA and the statistical method can be used in a complementary manner when measures yielded by MQALA for groups of two or more individuals are analyzed statistically. Examples of measures obtained by the present invention that can be analyzed with the statistical method include LASs obtained under particular conditions, summary LASs, overall B/H scores, B/H scores, predictive indices based on LASs, values of the three strength of longitudinal association measures, and denominators of the strength of longitudinal association measures.

The previously cited article by Bagne and Lewis illustrated the statistical analysis of B/H scores.

4.1.19. Differential Weighting of LASs for Various Events and Variables

This feature of MQALA provides the option of allowing users to differentially weight LASs for various events and/or variables. The weights could reflect measures or impressions about importance. For example, interest rates might be associated longitudinally with various dependent variables indicating favorable and unfavorable effects of higher interest rates. The LASs indicating these apparent effects could be differentially weighted before they are averaged. Similarly, different independent variables could be differentially weighted while calculating values of predictive indices.

Bagne and Lewis illustrated the differential weighting of B/H scores in their previously cited article.

4.1.20. Averaging B/H Scores to Obtain Overall B/H Scores

This feature of MQALA provides the option of allowing users to average B/H scores and/or summary B/H scores for different dependent variables and/or different Boolean dependent events. An average B/H score obtained in this manner is called an overall B/H score. Overall B/H scores summarize B/H scores across dependent variables for one individual. Thus, for example, interest rate levels might be associated longitudinally with a number of favorable and unfavorable effects that could be differentially weighted and averaged to obtain an overall measure of the apparent effects of relatively high interest rates on the dependent variables for a national economy. Overall B/H scores are most meaningful when B/H scores for the different dependent variables are based on the same number of repeated measurements.

Bagne and Lewis illustrated the averaging of B/H scores in the previously cited article.

4.1.21. Protocols for Scoring Longitudinal Associations

As has been seen, there are many options for scoring longitudinal associations. Protocols for scoring longitudinal associations would specify options that would be applied in a particular application of the present invention. Scoring protocols could include, but are not limited to, specifications of which variables are to function as independent and dependent variables, any transformations of dimensional series, procedures for converting dimensional series into sets of dichotomous series, any optional analysis parameters and levels of analysis parameters that would be applied, how any Boolean events would be defined, the extent and manner in which LAS arrays would be summarized, and differential weights for the various dependent variables and events.

Protocols for scoring longitudinal associations could be important parts of entire protocols for research investigations. Entire research protocols for group studies involving LASs would have additional parts including parts that address inclusion and exclusion criteria for subjects, study design, how primary variables would be measured, and how specified LASs, B/H scores, or derivative measures would be analyzed statistically.

In addition, protocols for scoring longitudinal associations would be important parts of protocols for any tests that use LASs or any measures based on LASs as results.

4.1.22. Targeting Subsets of Dichotomous Series for Additional Analyses

The procedures for converting dimensional series into sets of dichotomous series can result in large sets of dichotomous series and, in turn, large arrays of LASs and strength of longitudinal association measures. These large sets and arrays might tax computational resources. In addition, users might be interested in analyzing longitudinal associations only when the events involve values of variables or changes in values of variables above specified thresholds.

Targeting subsets of dichotomous series for additional analyses, an optional feature of systems that implement MQALA, provides the option of allowing users to limit analyses by targeting analyses to selected subsets of the dichotomous series in the set of dichotomous series representing a variable. For example, one application of this feature is to target an analysis consisting of several stages to a specific subset of events so that the analysis can be terminated automatically when a specified strength of longitudinal association measure reaches a specified threshold. Analysis of a specified series of dependent events could be terminated when the strength of longitudinal association measure reaches a value of 1 indicating that the analysis had accounted for all variation in the occurrence of the targeted dependent events.

4.1.23. Changing how Variables Function in Analyses before Re-analyses of Data MQALA calls for the analyzed variables to function either as independent variables or as dependent variables. A feature of systems that implement MQALA would provide the option of allowing the functions of variables to be changed before re-analyses of data. As described in Section 4.1.9 for the analysis of delay, this feature can be used to determine which primary variables in data sets can serve as the best predictors or be the best candidates to be causes in cause and effect relationships.

4.1.24. Implementation of MQALA on the Internet

This feature covers the option of implementing MQALA on the Internet. Implementation on the Internet would facilitate data collection, data analysis, reporting, and the rapid acquisition of cumulative experience.

4.2. Detailed Descriptions of the Applications and Uses of MQALA

This section presents detailed descriptions of areas of investigation in which the method and system for the quantitative analysis of longitudinal associations can be applied. One application, broadly defined, will be illustrated by five more particular applications.

This section also presents various ways in which these applications can be used. Three uses will be presented for the broadly defined application together with fourteen particular uses of the five more particular applications.

4.2.1. The Application of MQALA Broadly Described

The present invention can be described broadly as a computational method and system to perform empirical induction by conducting quantitative analyses of longitudinal associations, associations that may become evident for individuals in repeated measures data including multiple time-series. The applications and uses of MQALA can be illustrated as follows.

4.2.1.1. Use of MQALA to Monitor Changing Longitudinal Associations and the Emergence of New Entities Section 1.2.1 includes examples of how emergence can create entities that come to function in new ways. Change and emergence can become evident in longitudinal associations that quantify dynamic functioning. One use of MQALA is to monitor changing longitudinal associations and the emergence of new entities through use of the sequential analysis feature that is presented in Section 4.1.15.

4.2.1.2. Use of MQALA for Data Mining

The term "data mining" has been used to describe the discovery of predictive information in databases.

Taken together, the essential and optional features of the present invention provide a powerful set of measurement and data analysis tools that can be applied in a wide variety of investigations to quantify, discover, analyze, and describe recurrent patterns in data that are being called longitudinal associations. These tools include predictive indices (Section 4.1.17) that are computed from LASs.

4.2.1.3. The Use of MQALA to Form Databases and Knowledge Bases

LASs, arrays of LASs, and measures derived from LASs and B/H scores are generalized conclusions about longitudinal associations. As such, they can be stored in databases and knowledge bases to help users make predictions, support decision-making, and contribute to the cumulative experience that is part of scientific knowledge.

4.2.2. Application of MQALA for the Quantification and Analysis of the Benefit and Harm of Many Treatments and Other Exposures This application covers the use of the present invention for many important investigations in health and medicine.

For this application, events defined on the independent variables might be called treatment or exposure events and the labels for certain analysis parameters may include the term "treatment" or "exposure". Boolean treatment or exposure events might be defined when there are two or more independent variables. The independent variables might be measures of treatments, environmental pollutants, dietary components, health practices, behaviors, and other variables that may affect health.

Events defined on dependent variables for the health application might be called health or outcome events and the labels for certain analysis parameters might include the term "health" or "outcome". Boolean outcome events can be defined when there are two or more dependent variables. The dependent variables would be measures of health broadly defined to include virus load, disease status, physiological factors, symptoms, functioning, general health perceptions, and quality of life. The present invention can be applied most meaningfully to investigate health when both independent and dependent events can recur over time for particular individuals.

For the health application, the signs of LASs generally are set so that positive LASs indicate apparent benefit and negative LASs indicate apparent harm. The measures of benefit and harm are more likely to be valid measures of cause and effect relationships when data are collected while applying the experimental method (Section 2.5).

4.2.2.1. Use of the Health Application on the Internet to Conduct Group Clinical Trials of Treatments for the Management of Chronic Disorders Group clinical trials often are used to evaluate drugs and other treatments. Many clinical trials could be conducted using MQALA and the Internet because the trials evaluate the apparent effects of treatments for the management and control of chronic disorders, treatments that can be given repeatedly and/or doses that can vary over time.

Section 2.7.1.2 introduces the presentation of how MQALA addresses the limitations of conventional clinical trial designs and procedures. Section 2.8 and its subsections include some advantages of implementing health applications, which includes the conduct of group clinical trials, on the Internet.

4.2.2.2. Use of the Health Application for Health-Effect Monitoring

Health-effect monitoring systems collect repeated measures data for both independent variables that may affect health and dependent health variables. In addition, health-effect monitoring systems can repeatedly report apparent benefit and harm of the independent variables with respect to the health variables for particular individuals.

The information that results from health-effect monitoring could be used to guide decision-making intended to help optimize the health of participating individuals. Many individuals including patients, clinicians, and caregivers could use health-effect-monitoring systems.

Health-effect monitoring should be distinguished from health monitoring. Health monitoring is the monitoring of dependent variables that could be included in health-effect monitoring systems. Health-effect monitoring goes beyond health monitoring by including collection of data for independent variables and providing quantitative information, based on the monitored individual's data, about the health effects of these independent variables.

There is an important distinction between group clinical trials and health-effect monitoring applied to treatments. The primary objectives of conventional group clinical trials are to gather data from groups of individuals, data that can be analyzed statistically to develop treatments and to provide information that might be used to guide the treatment of other patients. The primary intent of health-effect monitoring is to gather data from particular individuals to provide information about the apparent effects of treatments and other exposures, information that might be used directly to guide the continued treatment of the same particular individuals. A secondary objective of health-effect monitoring is to gather information that may benefit other patients.

4.2.3. Application of MQALA for the Quantification and Analysis of Internal Control in Adaptive Systems This application covers the use of MQALA to investigate internal control in adaptive systems. Internal control includes feedback and feed-forward mechanisms. The present invention may be applied to quantify, discover, analyze, and describe internal control as it becomes evident for individuals in the form of longitudinal associations between controlling events defined on independent variables and controlled events defined on dependent variables.

For this application, both the independent and the dependent variables generally would be attributes and behaviors of the individual rather than attributes of the individual's environment. This application emphasizes internal mechanisms that might allow the individual to maintain its internal functional integrity and to adapt to its environment.

4.2.3.1. Use of the Internal Control Application for Living Things

Internal control in living things often involves the functioning of the nervous and endocrine systems as well as hormones, neurotransmitters, and receptors. This use covers MQALA to quantify, discover, analyze, and describe internal control in living things.

Internal control can be investigated within types of measures that various disciplines such as biology and psychology apply to living things. For example, longitudinal associations involving hormones and receptors could be investigated to investigate internal control at the biological level. In addition, internal control can be studied across hierarchies of measures used by various disciplines such as medicine (Section 1.2.1.2.1.2.4). For example, medical and health studies could apply the present invention to investigate longitudinal associations between and among glucose concentrations, symptoms, measures of functioning, and quality of life as measured, for example, with the SF-36 Health Survey.

4.2.3.2. Use of the Internal Control Application for Machines and/or Devices

Many machines and devises have internal mechanisms that help control the way they function. For example, internal combustion engines might have exhaust sensors and devices to help control fuel-air mixtures. This use covers MQALA to quantify, discover, analyze, and describe internal control in machines and/or devices. This use includes monitoring the integrity of control mechanisms.

4.2.3.3. Use of the Internal Control Application to Monitor Internal Control

The internal control application can be used for monitoring internal control. For example, monitoring longitudinal associations between blood pressure and pulse rate may provide useful information beyond the information provided by monitoring both measures individually.

4.2.3.4. Use of the Internal Control Application for Standardized Tests

Internal control can be investigated under standardized test conditions that involve control and measurement of independent variables. For example, a test could involve the administration of exogenous insulin to a patient under standardized test conditions to quantify and describe internal control as it may become evident in longitudinal associations between the patient's insulin and glucose levels. Protocols for such tests would include identification of the variables and how they would be measured, how the independent variable(s) would be controlled, and a protocol for scoring longitudinal associations between or among the variables.

4.2.4. Application of MQALA for Analyses Involving Serial Functional Images

This application covers the use of MQALA for the quantification and analysis of longitudinal associations involving serial functional images.

Functional images image functions or activities rather than structures. When contrasted with structures, activities are more apt to exhibit recurrent events and involve measures that can fluctuate in level over time. For example, electroencephalograms can image electrical activity in brains. Some variables are imaged to indicate functions or activities. For example, glucose and oxygen utilization are imaged to measure brain activity with machines for Positron Emission Tomography and functional magnetic resonance imagining. Serial images refer to two or more images taken of the same individual on different measurement occasions.

The images for this application consist of arrays of pixels that are image elements. Each pixel in each image has a color and/or brightness that represents the value of some variable. In some cases, the series of functional images is obtained while the individual is restrained in a fixed position relative to the sensors of the machine. When the entire series of images is taken while an individual is adequately restrained, the images are automatically aligned. When the images are aligned, one variable can represent each pixel. Each image in the series would contribute one value to each of these variables. In other words, there would be the same number of variables as pixels and each variable would have one value for each image in the series. This forms a database of repeated measures data. Similar procedures could be applied to voxels or volume elements.

If the individual is not restrained throughout the series of images, the images need to be aligned, perhaps with the aid of information from a structural image, so that one variable represents each of the corresponding pixels in a series of aligned images.

Variables representing individual pixels in a series of aligned images will be called serial pixel variables. The value of each serial pixel variable for each measurement occasion is a measurement of a function, an indicator of a function, or activity for one pixel across a series of two or more images. High-resolution images tend to have large numbers of pixels and can yield a correspondingly large number of variables.

Investigators may be primarily interested in particular regions within images. Such regions might correspond, for example, with particular brain structures. Such regions often are called regions of interest. Selecting subsets of pixels can identify regions of interest. Each region of interest may be represented by a single variable when, for example, measures of activity are averaged across pixels in the region of interest. A serial region of interest variable represents the measure of activity or function for one region of interest across a series of two or more images.

This application covers the use of MQALA when the independent variable(s), the dependent variable(s), or both the independent and the dependent variables are serial pixel variables and/or serial region of interest variables.

4.2.4.1. Use of the Imaging Application to Image Apparent Responses to Stimuli, Tasks, and Exposures For this use of the imaging application, the independent variable(s) would be measures of stimuli, tasks, and exposures including treatments. The independent events may be called stimulus events, task events, exposure events, or treatment events. Tasks could include mental and/or motor tasks when the brain is imaged.

The dependent variables for this use of MQALA would be serial pixel variables and/or serial region of interest variables. The dependent events defined on these variables may be called response events.

4.2.4.2. Use of the Imaging Application to Image Apparent Internal Control

For this use of the imaging application, both the independent and the dependent variables would be serial pixel variables and/or serial region of interest variables. One or one set of serial pixel or serial region of interest variables would be designated to function as an independent variable and one or more of the remaining serial pixel or serial region of interest variables would function as dependent variables.

The various measures of longitudinal association that result from this use would quantify associations between activity in one region of the imaged object and other areas of the imaged object. When these associations are studied systematically with the analysis parameter called delay, they could be interpreted as measures of possible internal control within the object that is imaged. Positive LASs at some delay could indicate that higher levels of activity in the designated region of the image might have apparent excitatory effects on activity in other regions of the image. Negative LASs at some delay could indicate that higher levels of activity in the designated region of the image might have apparent inhibitory effects on activity in other regions of the image.

4.2.4.3. Use of the Imaging Application to Investigate the Apparent Control of Imaged Activity on Behavior For this use of the imaging application, the independent variables would be serial pixel variables and/or serial region of interest variables. The dependent variable(s) would be measures of the individual's behavior and/or effects that the individual has on its environment.

The various measures of longitudinal association that result from this use of MQALA are potential measures of how the imaged object controls behavior. Positive LASs would indicate that higher levels of activity in a region of interest are associated with behavior that is stronger or more likely to occur. Negative LASs would indicate that higher levels of activity in a region of interest are associated with behavior that is weaker or less likely to occur.

4.2.4.4. Use of the Imaging Application to Create Images that Display LASs, Measures Derived from LASs, and Levels of Analysis Parameters The imaging application can be used to create images that display LASs, measures derived from LASs, and levels of analysis parameters applied during the calculation of LASs. LASs include individual LASs, summary LASs, and overall B/H scores. Measures derived from LASs include the strength of longitudinal association measures, denominators of the strength of longitudinal association measures, and predictive indices. Analysis parameters include levels of independent and dependent variables, episode length and episode criterion, delay, and persistence.

Several types of images that involve LASs can be created. Here are some examples. The first set of examples is for the following case. For this case, a dichotomous series of independent events represents the presence or absence of a stimulus on the occasion of each image in a series of brain images. The dependent variables are serial pixel variables, one variable for each pixel. Also suppose that there was one required analysis parameter, level for the dependent variables, and that the investigator selected delay and persistence as optional analysis parameters.

There would be several ways to image the results for this brain-imaging example. One type of image would show the summary LAS across analysis parameters for each pixel. For this type of image, one range of colors would portray the magnitudes of positive LASs and another range of colors would portray the magnitudes of negative LASs. Positive LASs show increased brain activity associated longitudinally with the presence of the stimulus. Negative LASs show decreased brain activity associated longitudinally with the presence of the stimulus. Such images could be used to help map how stimuli effect activity in areas of the brain.

Continuing with the brain-imaging example, a series of images would show LASs as a function of level of each analysis parameter. For example, one series of images would show summary LASs as a function of delay. Such a series of images would show the time course of how the stimulus apparently affects brain activity in different regions of the brain.

Consider another example in which the imaging application is used to map the apparent control that a measure of activity in a designated brain region of interest has on activity in the remaining areas of the brain. Assume that the dependent variables are serial pixel variables. For this example, there are two required analysis parameters, level of the independent variable and level for each of the dependent variables. Suppose that the investigator selected delay as an optional analysis parameter.

Results for this second example could be imaged in several ways. For example, the designated region of interest could be shown as a void in an overall image in which the remaining portions portray the summary LAS corresponding to each pixel. As before, two ranges of colors could represent the LASs. One range of colors for positive summary LASs would portray possible excitatory effects associated longitudinally with increased activity in the region of interest. Another range of colors for negative summary LASs would portray possible inhibitory effects associated longitudinally with increased activity in the region of interest.

As an alternative to showing the region designated to function as the independent variable as a void, this region could be color coded to show the level of any analysis parameter while the remaining portions of the image would show summary LASs across all other analysis parameters. For example, a series of such images could show excitatory and inhibitory effects as a function of delay.

4.2.5. Application of MQALA to Analyze Behavior

This application covers the use of MQALA to analyze behavior. MQALA provides an extensive set of measurement and data analysis tools that can be applied to quantify, discover, analyze, and describe longitudinal associations between stimulus events defined on independent variables and response events defined on dependent variables.

In general, the present invention provides a broad and systematic way to define stimulus and response events that may be associated longitudinally together with LASs and measures of strength of longitudinal associations that can be applied to describe and make inferences about these longitudinal associations. Stimuli and responses can be defined by applying the analysis parameters, procedures for defining Boolean events, and additional procedures for defining schedules and sequences of events that may be associated longitudinally.

More specifically, all features of MQALA can be applied to analyze behavior. For example, the measures of strength of longitudinal association can be applied to quantify the strength of associations between stimuli and responses. Episode length and episode criterion can be applied to help define stimuli and responses. Delay and persistence response can be investigated in relation to stimulus occurrence. The procedures for defining Boolean events can be used to define complex stimuli and responses. Transition events can be used to define changes of state that may constitute stimuli and responses. Predictive indices can be applied to make predictions about behavior. LASs and measures based on LASs from two or more individuals can be analyzed statistically.

4.2.6. Application of MQALA to Analyze Behavior Modification and Organization

This application covers the use of MQALA to analyze behavior modification and organization. Behavior modification includes learning, conditioning, extinction, and habituation.

Learning, conditioning, extinction, and habituation often are said to involve changes over time in associations between and among stimuli and responses. MQALA provides a fundamentally new way to quantify, discover, analyze, and describe these associations and changes in these associations.

Certain features of MQALA are particularly valuable for the analysis of behavior modification and organization. These features include the measures of strength of longitudinal association, sequential analyses of longitudinal associations, and analyses of delay. Features involving definitions of Boolean events can be applied to define complex stimuli and/or complex responses. Also, other procedures can be used to define additional sequences or schedules involving stimuli and responses.

The strength of longitudinal association measures can range in value between −1 and 1 inclusive (Section 4.1.6). LASs and strength of longitudinal association measures can be analyzed sequentially and graphed as functions of time or measurement occasion. Inflections in such graphs have special meaning when the independent variable(s) are stimuli and the dependent variable(s) are responses. Inflections toward larger positive values quantify stronger positive associations that would indicate learning, classical conditioning, or operant conditioning based on positive reinforcement. Inflections toward larger negative values would quantify stronger negative associations that would indicate operant conditioning based on negative reinforcement. Inflections toward zero would indicate extinction or habituation.

As described in Section 4.1.6, sequential analyses of the strength of longitudinal associations could be based on a continuously moving window covering a specified number of occasions and ending with the most recent occasion. Users of the present invention could set lengths of such windows by specifying particular values.

In addition to the sequential analyses just described, values of the strength of longitudinal association measures also could be calculated for continuous subsets of occasions. Differences in the strength measures between these subsets also would quantify and indicate learning, conditioning, extinction, or habituation.

It is important to distinguish the present application from the application of MQALA for the analysis of behavior (Section 4.2.5). The previous application is limited to quantification and analyses of longitudinal associations between stimuli considered as independent variables and responses considered as dependent variables. The present application includes analyses of longitudinal associations between stimuli and responses. Unlike the previous application, the present application also includes the quantification and analyses of three additional types of longitudinal associations in a manner that provides a method and system for the analysis of learning, conditioning, extinction, habituation, and the organization of behavior.

The three additional types of longitudinal association that are included in the present application are longitudinal associations between and among stimuli, longitudinal associations between responses as independent variables and stimuli as dependent variables, and longitudinal associations between and among responses.

In the context of behavior modification and organization, the analysis parameter called delay can be applied to describe the timing and sequencing of events involving stimuli and responses. Delay can be used to describe timing between and among stimuli, between stimuli as independent variables and responses as dependent variables, between responses as independent variables and stimuli as dependent variables, and between and among responses. For example, delays between responses and reinforcing stimuli describe delay of reinforcement.

Individuals provide evidence for learning and conditioning when the strength of longitudinal associations involving stimuli and responses change over time in the presence of some other longitudinal association(s) involving stimuli and responses. Individuals provide evidence of extinction when the strength of longitudinal associations involving stimuli and responses change over time when some other longitudinal association involving stimuli and responses weakens or no longer exists. The types of longitudinal association involved in these processes depend on the type of learning, conditioning, or extinction that is being described.

Several major forms of learning and conditioning are frequently recognized. These include classical conditioning, operant conditioning, paired-associate learning, and associative learning. Each of these types of learning can be addressed by particular applications of the present invention. Again, for the present application, learning and conditioning involve changes in one type of longitudinal association in the presence of another type of longitudinal association.

Classical conditioning is conditioning in which the conditioned stimulus is paired with and precedes the unconditioned stimulus until the conditioned stimulus alone is sufficient to elicit the response. Many people are familiar with the example in which the conditioned stimulus is a bell, the unconditioned stimulus is food, and the response is salivation of a dog.

Classical conditioning involves two types of longitudinal association. First, it involves longitudinal associations between conditioned stimuli and responses. Second, classical conditioning involves longitudinal associations between conditioned stimuli and unconditioned stimuli. Classical conditioning can be said to occur when the strength of longitudinal associations between conditioned stimuli and responses increase in the presence of particular types of longitudinal association between conditioned stimuli and unconditioned stimuli. Namely, conditioned stimuli should be paired with and precede unconditioned stimuli to some degree.

Extinction of classically conditioned responses can be said to occur when the strength of longitudinal associations between conditioned stimuli and responses decrease when the strength of longitudinal associations between conditioned stimuli and unconditioned stimuli decrease or are no longer present.

The present invention can be applied in experimental studies of classical conditioning that involve control of longitudinal associations between conditioned and unconditioned stimuli in ways that may modify longitudinal associations between conditioned stimuli and responses. The present invention also can be applied to help quantify, discover, analyze and describe both types of longitudinal association in nature. It also can be applied to describe the changes in behavior that can be said to constitute classical conditioning, namely how the strength of longitudinal associations of the first type are affected by changes in the strength of longitudinal associations of the second type.

Operant conditioning is conditioning in which desired responses or increasingly close approximations thereof are followed by rewarding or reinforcing stimuli. Operant conditioning generally is considered to involve two classes of stimuli. One class comprises discriminative stimuli that may control or elicit appetitive or avoidance responses. The other class comprises stimuli that may reward or reinforce responses.

Operant conditioning also involves two types of longitudinal association. First, it can be said to involve longitudinal associations between discriminative stimuli and responses. Second, operant conditioning involves longitudinal associations or contingencies between responses and reinforcers. Operant conditioning can be said to occur when the strength of longitudinal associations between discriminative stimuli and responses change in the presence of particular types of longitudinal association between responses and reinforcers. Namely, reinforcers should be paired with and follow responses to some degree.

There are two classes of stimuli that may reinforce responses. Positive reinforcing stimuli or reinforcers such as presentation of food or termination of electric shock strengthen longitudinal associations between discriminative stimuli and responses. Negative reinforcers such as removal of desired stimuli or presentation of undesired stimuli weaken the strength of longitudinal associations between discriminative stimuli and responses.

Extinction of operant conditioning can be said to involve reductions in the strength of longitudinal associations between discriminative stimuli and responses when the strength of longitudinal associations between responses and reinforcers decrease or are no longer present.

Within the context of the present conceptual system, persistence of conditioned responses such as responses to discriminative stimuli can be described as resistance to extinction and/or the effects of negative reinforcement.

The present invention can be applied in experimental studies of operant conditioning that involve control of longitudinal associations between responses and reinforcers in ways that may modify the strength of longitudinal associations between discriminative stimuli and responses. As with classical conditioning, the present invention can be applied to help quantify, discover, analyze, and describe both types of longitudinal association in nature. It also can be applied to describe the changes in behavior that can be said to constitute operant conditioning, namely how the strength of longitudinal associations of the first type are affected by changes in the strength and direction of longitudinal associations of the second type.

Paired-associate learning is the learning of syllables, digits, or words in pairs so that one member of the pair evokes recall of the other. For example, an English speaking person could attempt to learn French by pairing English words with French words. In this example, words are considered to be stimuli that may have cognitive content.

Associative learning is learning in which discrete ideas, concepts, and percepts become linked or associated to one another. Associative learning is similar to paired-associate learning except that the pairing may not be as explicit and the "stimuli" often are ideas and concepts that are presented symbolically, as with language.

Again, both paired-associate and associative learning can be considered to involve two types of longitudinal association. First, they involve longitudinal associations between stimuli and responses that indicate recall. Second, the varieties of associative learning involve longitudinal associations between stimuli as they appear or are presented. Associative learning can be said to occur when the strength of longitudinal associations between stimuli and responses that indicate recall increase in the presence of longitudinal associations between and among the stimuli. Insight, within this formulation of learning, could be viewed as a rapid increase in a measure of strength of longitudinal association between stimuli and responses that indicate recall.

The opposing processes of generalization and discrimination play important roles in learning and conditioning. The present invention provides a systematic way to investigate these processes. Here are some examples. In classical conditioning, the strength of longitudinal associations between conditioned stimuli and responses can be investigated in terms of analysis parameters such as intensity, color, tone, and concentration of conditioned stimuli. In operant conditioning, the strength of longitudinal associations between discriminative stimuli and responses can be investigated in terms of analysis parameters for stimuli as well as analysis parameters that describe the amount or nature of reinforcers. In addition, strength of longitudinal associations can be investigated across Boolean events that vary in degree of similarity.

Novel stimuli often elicit exploratory or alerting responses. The present invention can be applied for the sequential analyses of the strength of longitudinal associations between such stimuli and responses. Habituation can be described as a reduction in the strength of longitudinal associations between such stimuli and responses when, for example, the conditions of learning are not appropriate for the novel stimuli to become conditioned or discriminative stimuli.

MQALA provides useful tools for investigating longitudinal associations between and among various responses, associations that can investigated to describe the organization of behavior. In part, the organization of behavior is due to the stimulus properties of responses. For example, motor responses can produce proprioceptive stimuli that in turn elicit and guide other responses. Another example is when physiological and emotional responses produce stimuli that may in turn elicit and guide other responses. For example, fear may elicit escape and relaxation may elicit approach. The organization of behavior involves chains and sequences of responses that may have stimulus properties. These chains and sequences can be investigated by analyzing longitudinal associations.

The term "response" as used in descriptions of behavior, behavior modification, and behavior organization is intended to cover responses that may have any combination of motor, emotional, or cognitive components.

4.2.6.1. Use of the Behavior Modification and Organization Application for Living Things This use covers MQALA for the quantification, discovery, analysis, and description of behavior modification and organization in living things.

4.2.6.2. Use of the Behavior Modification and Organization Application for Machines, Devices, and Software Systems This use covers MQALA for the quantification, discovery, analysis, and description of behavior modification and organization for machines, devices, and software systems. Examples would be the use of the application to investigate learning in machines, devices, and software systems that employ neural networks.

4.2.6.3. Use of the Behavior Modification and Organization Application to Quantify, Discover, Analyze, and Describe Individual Differences in Responsiveness to Behavior Modification Varieties of conditioning and learning have been presented in terms of pairs of different types of longitudinal association (Section 4.2.6). Classical conditioning and extinction were described in terms of changes in the strength of longitudinal associations between conditioned stimuli and responses in the presence or absence of longitudinal associations between conditioned and unconditioned stimuli. Operant conditioning and extinction were described in terms of changes in the strength of longitudinal associations between discriminative stimuli and responses in the presence or absence of longitudinal associations between responses and reinforcers. Associative learning and extinction were described in terms of changes in the strength of longitudinal associations between stimuli and responses that indicate recall in the presence or absence of longitudinal associations between and among stimuli.

The members of each of these pairs of longitudinal associations can be identified as the first member and as the second member. Values of the strength of longitudinal association measures can be computed sequentially for both members.

This use covers an extension of the forms of analyses for learning, conditioning, and extinction that were presented in the previous section. For this extension, consider sequential values of strength of longitudinal association measure for the second member of each pair to function as an independent variable. Consider sequential values of strength of longitudinal association measure for the first member of each pair to function as a dependent variable. Use MQALA to analyze the longitudinal associations between these independent and dependent variables. The results would describe the responsiveness of individuals to conditioning, learning, and extinction.

Individuals of the same or different species often show large differences in responsiveness to conditioning, learning, and extinction within and across various types of stimuli and responses. The current use of the behavior modification and organization application would facilitate the quantification, discovery, and characterization of these differences.

4.2.6.4. Use of the Behavior Modification and Organization Application to Create Machines, Devices, and Software Systems Whose Behavior Can Be Modified The use covers the implementation of MQALA to create machines, devices, and software systems whose behavior can be modified to achieve all or any subset of the learning, conditioning, extinction, and habituation processes that were described for behavior modification and organization application (Section 4.2.6). Such machines, devices, and software systems can be embodied in many forms.

Learning robots represent a class of man-made systems whose behavior can be modified by using MQALA. The actual example described here would be best suited for demonstration purposes. The example will present some of the options available for the design of robots that can learn.

The description of the demonstration learning robot will begin by applying the principles of operant conditioning and extinction using a positive reinforcer. The presentation will include just enough specific detail to illustrate how the behavior modification application can be used to develop robots with a rather advanced capacity to modify their responses by operant conditioning and extinction. Exposures to discriminative and reinforcing stimuli could modify the behavior of such a robot.

The demonstration learning robot here described includes the following components. The robot would have a power supply, a programmable computer with a memory, a response capability, and sensory capabilities. The robot described here has sensors for two types of discriminative stimuli, lights and tones, and a sensor for one positive reinforcer.

Suppose the robot's sensors for discriminative stimuli comprise light sensors that can distinguish three colors and tone sensors that can distinguish two tones and measure the intensity of each tone as a dimensional variable. The temporal resolution of measures for all sensors would be one second. The robot's computer would be programmed to convert each tone intensity series into a set of dichotomous series (Section 4.1.2).

The robot would have a means to register dichotomous time-series data for potential discriminative stimuli in short-term memory. In addition to data for discriminative stimuli, short-term memory will register data for response events and reinforcer events. Short-term memory would store these data for a specified number of most recent seconds. The user of the robot could specify the length of short-term memory window by specifying a value such as 30 seconds. Too short of a window could impair behavior modification under certain circumstances such as long delayed reinforcers. Long windows would increase the demands for computational resources. Data stored in short-term memory will be used to define discriminative stimulus events, to define response events, and to modify behavior.

The dichotomous series for discriminative stimuli that are stored in short-term memory are applied to define a set of potential discriminative stimuli for operant conditioning and extinction. The presence or absence of discriminative stimuli on each second is identified by a program in the robot's computer that can be set by the user of the robot. This program would be set by selecting analysis parameters and optional levels of these parameters, any procedures for defining Boolean events, optional levels of delay and persistence after any Boolean events, dichotomous series that would be used to define any transition-on or transition-off events, and any other procedures to define additional dichotomous series.

Here are some examples of how additional dichotomous series of discriminative stimulus events could be formed using the time-series data for light color, tone pitch, and tone intensity. Episode length could be used to define a discriminative stimulus comprising a light of a particular color being on continuously for a specified number of seconds. Episode criterion could be used together with episode length to define a stimulus comprised of a particular tone of at least a particular intensity being on for at least any 3 of 5 seconds. Delay could be used to define a stimulus event consisting of a light of a specified color being followed in a particular number of seconds by a specified tone with a minimum intensity. Transition events could be used to identify additional stimulus events comprising the start and/or the stop of any previously defined stimulus events.

Boolean operators also could be used to form additional dichotomous series of discriminative stimulus events. The AND operator could be used to define an additional stimulus event comprising a specified light and a specified tone of at least a particular intensity being on at the same time. The OR operator could be used to define an additional stimulus event comprising either a specified light or a specified tone being on at the same time. Boolean operators could be applied to define the presence of a particular light in the absence of any tone.

The entire record of potential discriminative stimuli that is registered in short-term memory comprises the dichotomous series derived directly from the sensors for discriminative stimuli plus any additional dichotomous series representing the presence or absence on each second of discriminative stimulus events based on the user's selections. Robots could have a means for adding additional stimuli to their sets of discriminative stimuli.

The demonstration learning robot responds by pressing buttons on a keypad with 10 buttons, 1 button for each digit 0 through 9. This keypad would be similar to those on touch-tone telephones. The robot would have a means for pressing the buttons, either one press or no press on each second, a means that is controlled by its programmed computer and memory.

The robot would have a means for registering a record of its own responses in short-term memory. In this respect, the robot would be aware of its own responses. The record of responses would comprise a set of eleven dichotomous series, one dichotomous response series for each digit plus one series to contrast not pressing any digit with pressing any digit.

Response data in the robot's short-term memory would be input for the robot's computer that is programmed to define the robot's initial repertoire of responses that could be conditioned.

The robot's repertoire of conditionable responses is defined in a manner analogous to the definition of a set of stimuli the robot could be conditioned to discriminate. In brief, selecting and applying optional MQALA features would define the robot's repertoire of responses. Notice that a particular digit press or no press could be part of many responses in the robot's repertoire.

Here are some examples of how additional dichotomous series of response events could be formed. These additional series would be based on the eleven dichotomous response series, one series for each digit plus one series for not pressing any digit. Episode length could be used to define response events consisting of, for example, three consecutive fours. Episode criterion could be used together with episode length to define response events comprised, for example, of at least two sevens during four consecutive seconds. Delay could be used together with the Boolean AND operator to define a response event consisting, for example, of a five followed in three seconds by an eight. Other rules could be used to define particular sequences such as 357. Notice that individual responses based on the user's selections might consist of a series of key presses and/or the absence of key presses that requires more than one second.

The entire record of responses that is stored in short-term memory comprises the dichotomous series derived directly from the response mechanism plus any additional dichotomous series representing the presence or absence on each second of response events based on the user's selections. Robots could have a means for adding additional responses to their repertoires of responses.

Features of MQALA can be used to specify large sets of potential discriminative stimuli and large response repertoires. Larger sets of potential discriminative stimuli and larger response repertoires could allow robots to become more discriminating after appropriate conditioning.

The demonstration learning robot would have a long-term associative memory that affects the responses of the robot. This memory would register one probability for each combination of a response in the robot's repertoire with a discriminative stimulus in the robot's set of potential discriminative stimuli. The probabilities across responses for each discriminative stimulus would sum to 1. Recall that pressing no digit on a particular second is one response in the response repertoire.

The user of the robot could set the probabilities in long-term associative memory before the robot is activated to respond. An easy to implement option that will be used in this presentation is to set all the probabilities equal. Thus, if the robot had a repertoire of 1000 responses that could be conditioned, the probability for each response for each discriminative stimulus would be 0.001. Changing these probabilities by conditioning and extinction modifies the robot's behavior. A record of initial response probabilities could be maintained in long-term memory and used while changing the probabilities during conditioning and extinction.

The user of the robot would have the option of erasing the long-term associative memory when the robot is deactivated or of keeping this long-term memory so that its responses on subsequent uses would reflect the effects of prior conditioning. The robot could have a means for storing a record of how these probabilities change over occasion and/or of providing an output of any or all of these probabilities at any time.

After the demonstration robot is activated, the first response would be selected at random from all responses. During the last second of every response, the robot also would select its next response at random from all responses in the robot's repertoire. All responses would be weighted in accord with the probabilities stored in long-term associative memory before the random selection of the next response. For all responses after the first, the weight for each response would be the sum of the probabilities for that response across all discriminative stimuli registered in short-term memory.

Learning robots could be designed to allow the weights for the various discriminative stimuli to be adjusted before responses are selected at random. Any such adjustments could be used to adjust the conditioning process for frequency, recency, or primacy of occurrence of discriminative stimuli registered in short-term memory. Weights could be increased as a function of frequency or changed as a function of time of occurrence during the interval of time covered by short-term memory. For example, the robot could be programmed so those more recent discriminative stimuli have more effect on the selection of the next response than more distant stimuli.

For simplicity, the demonstration robot would have a sensor for one positively reinforcing stimulus identified to be either present or absent on each second. The data for the reinforcer, consisting of a single dichotomous time-series, also would be stored in the robot's short-term memory.

The robot's computer is programmed to implement operant conditioning and extinction by applying a process that begins by using the data in short-term memory to quantify longitudinal associations. The dichotomous series that functions as the independent variables for these longitudinal associations are obtained by applying the AND Boolean operator to the dichotomous series for the discriminative stimuli and the dichotomous series for the responses. Dichotomous series for Boolean AND events would be formed for every combination of each discriminative stimulus registered in short-term memory with every response registered in short-term memory.

The dichotomous series that functions as the dependent variable for all longitudinal associations used to condition and extinguish responses is the dichotomous series for the reinforcer. Longitudinal associations between the Boolean AND discriminative stimulus/response events and the reinforcer can be investigated with the analysis parameter called delay to account for delay of reinforcement. The resulting longitudinal association scores are used as part of processes for changing the probabilities that are registered in long-term associative memory.

A LAS between a Boolean AND event and a reinforcer quantifies the longitudinal association between a particular type of response that occurs in the presence of a particular type of discriminative stimulus and the reinforcer. When such a LAS is positive and particularly when it is large, the LAS indicates that the response was comparatively more often reinforced in the presence of the discriminative stimulus than in the absence of the discriminative stimulus. When such a LAS is negative and particularly when it is large, the LAS indicates that the response was comparatively less often reinforced in the presence of the discriminative stimulus than in the absence of the discriminative stimulus. In other words, the discriminative stimulus is a sign that the response either will or will not be reinforced.

LASs and values of the strength of longitudinal association measures for these LASs between the Boolean AND events and the reinforcer are used to change the probabilities in long-term associative memory. Changing these probabilities modifies the robot's behavior in a manner that achieves operant conditioning and extinction. Values of the strength measures that are less than 1 would indicate partial reinforcement and extinction.

Many computational algorithms can be developed that use the measures of longitudinal association to modify the behavior of the robot. The important characteristic of machines, devices, and software systems that are covered by this use is that LASs and/or measures based on LASs are used to modify the behavior of these man-made systems.

The computational algorithms for modifying behavior need to address two issues. The first issue is to identify which probabilities in long-term associative memory would be increased, which probabilities would be decreased, and any probabilities that would remain the same. The second issue is to determine how much the changing probabilities would change. Here are some guidelines and options for how the computational algorithms would work. These computational algorithms could include parameters whose levels would be set by users. The particular algorithm, together with levels of any parameters set by the user, would help control the conditioning properties of the robot. For example, the robot could be set to be conditioned relatively fast or slowly.

Operant conditioning with a positive reinforcer is achieved to some degree by increasing the probability of a response in the presence of a discriminative stimulus. Extinction of a previously positively conditioned response is achieved to some degree by decreasing the probability of the response in the presence of its discriminative stimulus to a level below a previously conditioned level. Extinction by itself would not reduce the probability of a response in the presence of the discriminative stimulus to a level below the initial level set in long-term associative memory.

The LAS between the Boolean AND event and the reinforcer quantifies the longitudinal association between a particular type of response that occurs in the presence of a particular discriminative stimulus and the positive reinforcer. If this LAS is positive and particularly if it is large, this indicates that the probability for this combination of a discriminative stimulus and a response should be increased in long-term associative memory. If this LAS is negative and particularly if it is large, this indicates that the probability for this combination of a discriminative stimulus and a response should be decreased.

After it is determined which probabilities in long-term associative memory should be increased, decreased, or remain the same, the next step is to determine how much these probabilities should be changed after each response. Here are some options and guidelines for this step.

The total of all increases in response probabilities for a particular discriminative stimulus should be offset by the total of all decreases in probabilities so that all the probabilities for a particular discriminative stimulus would continue to sum to 1. Changes would be proportionate of previous values. For example, a previous probability would be increased or decreased by 5%. The total of either all increases or all decreases is a parameter that could be set by the user of the robot. Large values would tend to produce relatively rapid conditioning and extinction. Both increases and decreases could be allotted evenly across the probabilities that are being changed or in proportion to some measure based on the LASs.

The behavior of the demonstration robot that has been described could be conditioned extensively by exposure to or control of discriminative stimuli and reinforcers. Suppose the robot had a set of 1000 discriminative stimuli and a repertoire of 1000 responses. After initial activation, the robot would respond at random with all responses having equal probabilities. After extensive conditioning, the robot could have a high probability of responding with a distinctive response to each of the discriminative stimuli. These associations between discriminative stimuli and responses would change automatically when there is change in the associations between the reinforcer and the Boolean AND events involving the discriminative stimuli and responses.

The demonstration robot is a relatively simple device whose behavior can be modified by operant conditioning and extinction. Such a robot could be made more sophisticated in many ways. The robot could have multiple positive and negative reinforcers each associated with distinctive or overlapping sets of discriminative stimuli and distinctive or overlapping response repertoires.

The demonstration robot used a positive reinforcer. Robots also could use negative reinforcers. Conditioning with a negative reinforcer is achieved to some degree by decreasing the probability of a response in the presence of a discriminative stimulus, either below an initial level or a previously conditioned level. Probabilities stored in long-term associative memory that have been reduced to nonzero values by negative reinforcement could again be increased either by extinction of the effects of negative reinforcement or by positive reinforcement.

Learning robots also could be made more sophisticated by adding sensors and response capabilities. These sensors could include artificial systems that could recognize visual patterns or speech. The robot could have multiple response capabilities including locomotive responses and synthetic speech.

Learning robots also could be equipped with clocks in such a way that, for example, passages of time could serve as stimuli and/or sensitivity and responsiveness to stimuli could vary as a function of time.

The demonstration robot also could be made more sophisticated by adding capabilities for classical conditioning and/or associative learning. Classical conditioning would be achieved in a manner that is consistent with the analysis presented in the behavior modification application and analogous to the methods employed for the robot whose behavior could be modified by operant conditioning.

The robot or robot component that could be conditioned classically would have one or more sensors for unconditioned stimuli that would elicit responses. The response(s) may or may not have a motor component. The robot also would have a set of one or more stimuli that would serve as potential conditioned stimuli. A record of the occurrence of both the unconditioned stimuli and the potential conditioned stimuli would be stored in short-term memory.

The long-term associative memory for classical conditioning would store probabilities for each combination of an unconditioned stimulus with a potential conditioned stimulus. The initial response probabilities would be set equal to 0, indicating that initially the robot has no classically conditioned responses.

The robot's computer would be programmed to use data from short-term memory to compute LASs between the unconditioned stimuli and the potential conditioned stimuli. A computational algorithm would use these LASs and measures derived from these LAS to change the probabilities in the long-term associative memory for classical conditioning. Changes in these probabilities would provide evidence for conditioning with or without motor responses. The robot could be designed so that classically conditioned responses could serve as discriminative stimuli for responses that could be conditioned by operant conditioning. For example, classically conditioned "fear" response could become a discriminative stimulus for a response that is reinforced by escape from the conditioned stimulus for "fear".

Learning robots, or associations of such robots with sensors that could recognize and respond to each other, could be used to examine how life-like such robots can become. In addition, they could be developed for practical functions. An example of a practical function would be a "help desk" type application in which the discriminative stimuli are keywords or phrases from problem descriptions, the response repertoire is a set of instructions for correcting problems, and the reinforcer is some measure of success in solving the problem. For such a "help desk" type application, success would increase the probabilities of successful responses in the presence of keywords that describe the problem. Learning robots also could be developed as toys or companions.

Machines, devices, and software systems whose behavior can be modified by learning, conditioning, and success in achieving tasks could be said to exhibit some degree of artificial intelligence.

4.3. Overview of the Features, Applications, and Uses of MQALA That Are Major Improvements This section identifies a subset of the features, applications, and uses of the method and system for the quantitative analysis of longitudinal associations that are the major improvements that constitute this invention.

The present invention can be described broadly as a computational method and system to perform empirical induction. This method and system utilizes a computer or computer system to perform three primary functions. First, the computer would convert any dimensional series of repeated measures data into sets of dichotomous series, the data being obtained by repeatedly measuring attributes or events for an individual entity or the individual's environment on two or more occasions over an interval of time, at least one variable functioning as an independent variable and being used to define independent events and at least one variable functioning as a dependent variable and being used to define dependent events.

Second, the computer would apply at least one feature to any dichotomous series and/or any set of dichotomous series to form additional dichotomous series of independent and/or dependent events that may be associated longitudinally, wherein the at least one feature is selected from the group consisting of episode length, episode criterion, persistence, Boolean events, Boolean event scope, Boolean event criterion, delay after Boolean events, and persistence after Boolean events.

Third, the computer would compute a LAS for each selected combination of one dichotomous series of independent events with one dichotomous series of dependent events, each LAS and any array of LASs being descriptive of the amount of evidence and the positive or negative direction of any longitudinal association that may obtain between the independent variable(s) and the dependent variable(s) for the individual.

Further, the broadly described method and system to perform empirical induction can be applied sequentially over measurement occasions to analyze LASs and/or any measures derived at least in part from LASs. Such a method and system can be used to monitor changing longitudinal associations and the emergence of new entities. Still further, LASs and intermediate results from calculating LASs can be used to calculate values of a predictive index or predictive indices.

The broadly described method and system to perform empirical induction can be applied to time-series data such as data often used to investigate the functioning and performance of economies, investment markets, and business enterprises. The broadly described method and system to perform empirical induction can be implemented on the Internet. The procedures for calculating or computing LASs and measures derived at least in part from LASs can be specified in scoring protocols. The broadly described method and system to perform empirical induction can be used for data mining and to create databases or knowledge bases that are completely or partially obtained by application of said computational method and system.

The broadly described method and system to perform empirical induction can be applied in many areas of investigation and for many uses. Five of these applications and fourteen additional uses are singled out for particular attention.

The first of the five applications is when the method and system of empirical induction is applied to medical and health data in which the data are about one or more individual patients or subjects, said data about each individual comprising values for one or more independent variables that may affect the health of the patient or subject, the data for the independent variable(s) being used to define exposure or treatment events, and values for one or more dependent variables that are measures of the patient's or subject's health, the data for the dependent variable(s) being used to define outcome or health events and in which the signs of LASs are set so that the LASs become B/H scores.

Two particular uses of the medical and health application are for the conduct of group clinical trials of treatments used to manage or control chronic disorders and for the conduct of health-effect monitoring. These and other uses of the medical and health application can be implemented on the Internet.

The second of the five applications is when the method and system of empirical induction is applied to measure and analyze internal control in adaptive systems in which the repeated measures data are about one or more individual adaptive systems, said data about each individual comprising values for one or more independent variables, each independent variable being a measure of an attribute of the individual or indicating the occurrence or non-occurrence of an event for the individual, the data for the independent variable(s) being used to define controlling events, and values for one or more dependent variables, each dependent variable being a measure of an attribute of the individual or indicating the occurrence or non-occurrence of an event for the individual, the data for the dependent variable(s) being used to define controlled events.

Four particular uses on the internal control application are to quantify internal control in living things, to quantify internal control in machines and/or devices, to monitor internal control, and to quantify internal control under standardized test conditions. These and other uses of the internal control application can be implemented on the Internet.

The third of the five applications is when the method and system of empirical induction is applied to analyze serial functional images in which the repeated measures data are about one or more individuals, said data about each individual including one or more serial pixel and/or serial region of interest variables.

The first of three particular uses of the imaging application is when the independent variable(s) are measures of stimuli, tasks, or exposures that are used to define stimulus, task, or exposure events and the dependent variable(s) are serial pixel and/or serial region of interest variables used to define response events. The second of three particular uses of the imaging application is when both the independent and dependent variables are serial pixel or serial region of interest variables so that the LASs provided by MQALA are used to indicate internal control in the object that is imaged. The third of three particular uses of the imaging application is when the independent variable(s) are serial pixel and/or serial region of interest variables and the dependent variables are measures of behaviors of the individual and/or events or variables in the individual's environment that may be affected by the individual so that MQALA is used to image activity in the object, activity that controls the behavior of the object or controls the effects of the object's behavior on its environment. These and other uses of the imaging application can be implemented on the Internet. In addition, the imaging application can be used to form an image or images that portray LASs, measures derived at least in part from LASs, or levels of analysis parameters.

The fourth of the five applications is when the method and system of empirical induction is applied to analyze behavior in which the repeated measures data are about one or more individuals, said data about each individual comprising values for one or more independent variables, each independent variable being a measure of a stimulus or potential stimulus that may affect the individual, the data for the independent variable(s) being used to define stimuli or stimulus events, and values for one or more dependent variables, each dependent variable being a measure of a behavior or potential behavior, the data for the dependent variable(s) being used to define responses or response events. This application also can be implemented on the Internet.

The last of the five applications is when the method and system of empirical induction is applied to analyze behavior modification and organization in which the repeated measures data are about one or more individuals, said data about each individual comprising values for at least two variables comprising any combination of stimulus and response variables, the data for the stimulus variable(s) being used to define stimuli or stimulus events and the data for the response variable(s) being used to define responses or response events.

Three particular uses of behavior modification and organization application are to investigate behavior modification and organization in living things, to investigate behavior modification and organization in machines, devices, and software systems, and to quantify, discover, analyze, and describe individual differences in responsiveness to behavior modification. These and other uses can be implemented on the Internet. In addition, the behavior modification and organization application can be used to create various machines, devices, or software systems whose behavior can be modified.

The procedures for calculating or computing LASs and measures derived at least in part from LASs can be specified in scoring protocols. The computer or computer systems that are programmed to implement MQALA could provide the option of changing how independent and dependent variables function in analyses before data are reanalyzed.

4.4. Description of the Preferred Embodiment
4.4.1. Introduction

The method and system for the quantitative analysis of longitudinal associations can be implemented in a series of stages and steps. The stages and steps will be illustrated with one primary and three supplementary demonstrations.

The primary demonstration is an example of data mining or data exploration. The primary demonstration will show that the method and system can successfully identify a known pattern of longitudinal association between treatment (independent) events and target health (dependent) events. This demonstration calls for evaluation of several analysis parameters and Boolean treatment events in order to identify the known pattern of longitudinal association. Normally for data exploration, the method and system would be applied to arrive at generalized conclusions about unknown longitudinal associations, quantify the associations, and precisely identify the independent and dependent events that are associated.

The first supplementary demonstration shows how the method and system can be extended to account for the occurrence of Boolean dependent events that are defined by applying Boolean operators across two or more dependent variables. The second supplementary demonstration illustrates the sequential analysis of LASs. The third supplementary demonstration illustrates aspects of procedure for calculating predictive indices.

In order to achieve full disclosure, the preferred embodiment includes features not required to analyze demonstration data. Once implemented, MQALA would be suitable for a broader range of applications and uses than illustrated by the specific demonstrations.

4.4.2. Primary Demonstration

The primary demonstration uses a small set of data to illustrate how the method and system for the quantitative analysis of longitudinal associations can be used for data mining or data exploration. For data mining, the user would specify an ordered set of data analysis options that would be performed either until all variation in the occurrence of target dependent events is accounted for or until all selected analysis options are exhausted. The present invention is well suited for the development of automated data mining systems that could be used in attempts to discover longitudinal associations in databases, associations that account for as much variation as possible in the occurrence of target dependent events and variation in dependent variables.

The data for the primary demonstration are shown in Table 4. The demonstration is for a health application. The independent events for this demonstration are defined using the drug data and will be called treatment events. The symptom data will be used to define dependent events that will be called health events. Because the primary demonstration illustrates a health application, the demonstration will use B/H scores.

The demonstration involves one symptom (the dependent variable) and two drugs (the independent variables). Drug use and symptom severity were rated and recorded daily for four weeks (28 days). The symptom was rated on a five-point (0 through 4) scale for which higher values indicate greater severity. The target health event for the primary demonstration is a severity rating of 3 or more. Target health events (the occurrence of a target health event on a particular day) occurred on 9 of the 28 days. These health events are marked in Table 4.

Doses of Drug 1 ranged from 0 to 40 on any given day. Drug 2 was either taken (1) or not taken (0) each day.

The primary demonstration, though brief and relatively simple, is designed so that most readers would have some difficulty identifying the analysis parameters, analysis parameter levels, and Boolean treatment events that account for all variation in the occurrence of the nine untoward target health events. The primary demonstration shows how the method and system for the quantitative analysis of longitudinal associations can be used to discover the conditions that account for all variation in the occurrence of target health events.

Treatment events defined as follows are known to be necessary and sufficient to account for all variation in the occurrence of target health events for the data in Table 4. Target health events occurred when and only when Drug 1 had been taken at doses of 30 or more (Level of Drug $1 \geq 30$) on at least 2 (Treatment Episode Criterion or TEC=2) of 3 consecutive days (Treatment Episode Length or TEL=3). In addition, target events occurred only when Drug 2 (Level of Drug 2=1) also had been taken on at least 2 (TEC=2) of 3 consecutive days (TEL=3). In other words, there was an interaction between Drug 1 and Drug 2 that can be defined by the Boolean AND operator. Target health events occurred with a Delay after the Boolean treatment event of 1 day (D[B]=1). Target health events persisted for 2 days after they were initiated (Persistence after Boolean treatment event, P[B]=2). This demonstration will continued until conditions within the data that are necessary and sufficient to account for all variation in the occurrence of the target health events have been identified. These conditions define the known pattern of longitudinal association that will be "discovered" by applying the present invention to the data in Table 4.

TABLE 4

DATA FOR THE PRIMARY DEMONSTRATION

| Day | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 |
|---|---|---|---|---|---|---|---|---|---|---|---|---|---|---|---|---|---|---|---|---|---|---|---|---|---|---|---|---|
| Drug 1 | 10 | 20 | 30 | 40 | 20 | 30 | 20 | 0 | 20 | 30 | 30 | 40 | 40 | 40 | 40 | 40 | 30 | 20 | 20 | 20 | 20 | 20 | 20 | 0 | 20 | 20 | 20 | 20 |
| Drug 2 | 1 | 1 | 1 | 1 | 1 | 0 | 0 | 0 | 0 | 0 | 0 | 0 | 0 | 1 | 1 | 1 | 1 | 1 | 1 | 1 | 1 | 1 | 1 | 0 | 1 | 1 | 1 | 1 |
| Symptom | 0 | 1 | 1 | 2 | 3 | 4 | 3 | 3 | 0 | 0 | 1 | 0 | 0 | 1 | 1 | 4 | 3 | 4 | 4 | 3 | 1 | 0 | 0 | 0 | 0 | 1 | 0 | 0 |

4.4.3. Overview of Steps and Stages of Analyses with MQALA

Figure 1B:
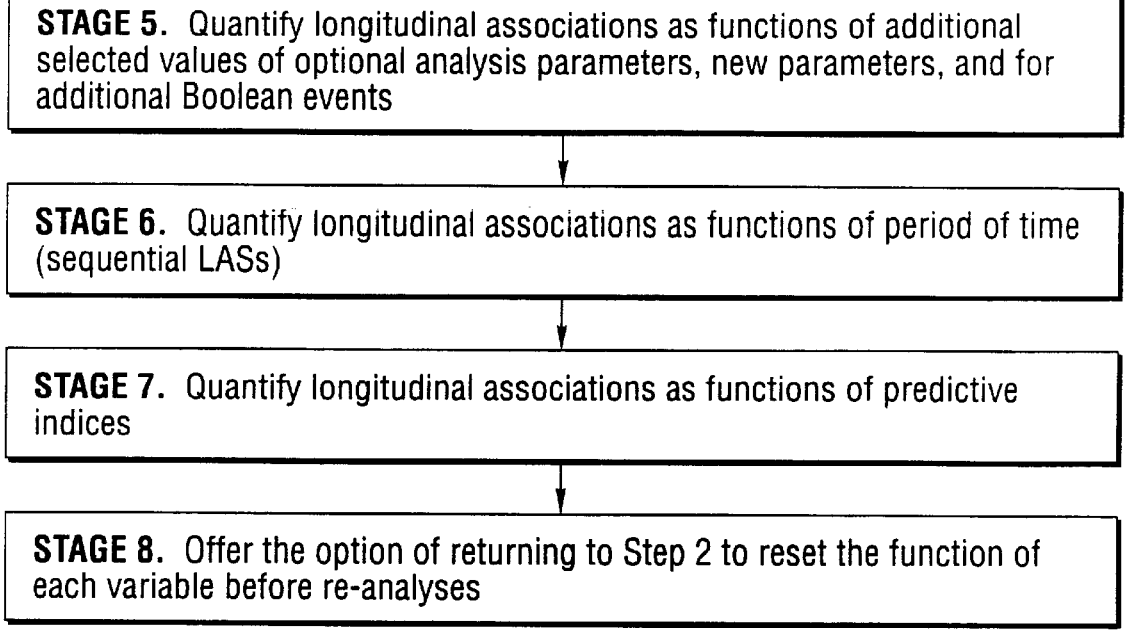

FIG. 1 provides an overview of the steps and stages for applying the present invention. The steps enumerated in this description of the preferred embodiment are designed to accommodate both required and optional analysis features described in Section 4.1. Steps 1 through 7 are identified as preliminary steps and will be described in Section 4.4.3.1. Table 5 shows on which steps a number of features can be applied depending on whether there is only one, or more than one, independent variable(s) and whether there is only one, or more than one, dependent variable(s). Analyses can be performed in eight stages. Some stages consist of several major steps. Table 5 includes information about which steps are included in each of the first four stages.

The stages shown in FIG. 1 and Table 5 start with simple analyses of required analysis parameters and tend toward more complex analyses that involve optional analysis features. An analysis could be stopped at the end of any stage if the analysis accounted for all variation in the occurrence of target health or dependent events. The stages begin after seven preliminary steps. Here is an overview of the stages.

Stage 1 consists of applying the required analysis parameters to analyze longitudinal associations between individual independent variables and individual dependent variables. Stage 1 is equivalent to using the default levels of each of the optional analysis parameters that can be investigated for individual variables. The default levels for all the analysis parameters shown in Table 5 are as follows: TEL=1, TEC=1, D=0, P=1, HEL=1, HEC=1, D[B]=0, P[B]=1, BHES=1, and BHEC=1. Levels of the temporal parameters (TEL, TEC, D, P, HEL, HEC, D[B], and P[B]), which are best investigated with periodic data, are expressed in period units (e.g., minutes, hours, days, weeks, months, quarters, years). Levels of BHES and BHEC are counts of dependent variables.

Stage 2 is an option that extends Stage 1 by allowing analyses of selected additional levels of all analysis parameters except those involving Boolean operators. The selected levels are in addition to the default levels analyzed during Stage 1.

Stages 1 and 2 are repeated for each combination of one independent variable and one dependent variable.

Stage 3 is an option that extends Stage 2 by allowing analyses to include Boolean independent or treatment events defined across two or more independent variables. In addition, Stage 3 includes the options of analyzing D[B] and P[B]. The Boolean independent or treatment events would be investigated for each dependent variable.

Stage 4 of analyses is an option when there is more than one dependent variable. Stage 4 consists of applying the Boolean operators or BHES and BHEC to define Boolean dependent or health events on two or more dependent variables. Stage 4 will be illustrated in the first supplementary demonstration.

TABLE 5

ANALYSIS FEATURES BY STAGE AND STEP OF ANALYSIS AND WHEN THEY CAN BE APPLIED

| | Only 1 Independent Variable (IV) | | Only 1 Dependent Variable (DV) | |
|---|---|---|---|---|
| | Analysis Feature | Stage, Step | Analysis Feature | Stage, Step |
| Required Analysis Parameter | IV Level | Stage 1, Step 8 | DV Level | Stage 1, Step 8 |
| Optional Analysis Parameters | Treatment Episode Length (TEL) | Stage 2, Step 10 | Health Episode Length (HEL) | Stage 2, Step 14 |
| | Treatment Episode Criterion (TEC) | Stage 2, Step 11 | Health Episode Criterion (HEC) | Stage 2, Step 15 |
| | Delay (D) | Stage 2, Step 12 | | |
| | Persistence (P) | Stage 2, Step 13 | | |

| | More than 1 Independent Variable | | More than 1 Dependent Variable | |
|---|---|---|---|---|
| | Analysis Feature | Stage, Step | Analysis Feature | Stage, Step |
| Required Analysis Parameters | IV Levels | Stage 1, Step 8 | DV Levels | Stage 1, Step 8 |
| Optional Analysis Parameters | TEL | Stage 2, Step 10 | HEL | Stage 2, Step 14 |
| | TEC | Stage 2, Step 11 | HEC | Stage 2, Step 15 |
| | D | Stage 2, Step 12 | | |
| | P | Stage 2, Step 13 | | |
| Optional Boolean Operators (AND, OR, XOR, NOR, NOT) | Boolean Treatment Events | Stage 3, Step 18 | Boolean Health Events | Stage 4, Step 23 |
| | Delay after Boolean Treatment Event (D[B]) | Stage 3, Step 19 | Boolean Health Event Scope (BHES) | Stage 4, Step 24 |
| | Persistence after Boolean Treatment Event (P[B]) | Stage 3, Step 20 | Boolean Health Event Criterion (BHEC) | Stage 4, Step 24 |

Stage 5 of analyses offers users the option of adding additional analysis parameters and analysis parameter levels to analyses performed during Stages 1 through 4. Stage 6 offers the option of analyzing sequential LASs or B/H scores. Stage 7 offers the option of calculating values of predictive indices. Stage 8 gives users the option of repeating analyses after changing which variables function as independent or dependent variables.

4.4.3.1. Preliminary Steps

The following steps are summarized in FIG. 1.

Step 1. Input data into a computer or computer system.

Computer programs should allow several modes for inputting data. One mode would be the direct entry of data for independent and dependent variables. Another mode of data input would be to extract data from established databases. Relatively sophisticated extraction procedures should allow analysis parameters such as delay and treatment episode length to influence what data are extracted. The intent of these relatively sophisticated extraction procedures would be to limit the number of periods that could not be investigated when the levels of delay and treatment episode length are greater than 1.

The third mode of data entry would be to enter values of cell frequencies that are used to calculate LASs or B/H scores. The cell frequencies are labeled as shown in Table 1, Section 4.1.1. When the cell entry option is selected, the program should display results from all steps of LAS or B/H score computations including all raw and standardized LASs or B/H scores that are possible given the entered cell frequencies, the probabilities of all possible LASs or B/H scores, and the expected value and the variance of the distribution of raw scores for each entered set of cell frequencies.

Step 2. Set each variable in the analysis to function as an independent/predictor or dependent/predicted variable.

For this demonstration, Drug 1 and Drug 2 in Table 4 will function as independent variables. The symptom will function as a dependent variable.

Step 2 would allow determination of the number of independent variables and the number of dependent variables. These numbers would be used in the program to assure that Stages 1 and 2 of analyses are repeated for each combination of one independent variable with one dependent variable.

Step 3. For each dependent variable, offer the option of specifying whether higher values are either "better" or "worse".

As explained in Section 4.1.5 his step would be important, for example, for health applications. Higher values for a health measure could, for example, indicate either more energy or more fatigue. Generally more energy would be considered "better" and more fatigue would be considered "worse." This information is used to set the signs of B/H scores.

In this demonstration, higher values of the measure of symptom severity are "worse."

Step 4. If there is more than one dependent variable, offer the option of differentially weighting the dependent variables. If "yes," specify the weight for each dependent variable before going to Step 5. If "no," set all weights equal to 1 and go to Step 5.

This demonstration has only one dependent variable so that differential weights are not an option.

Differential weights also are an option if there is more than one independent variable and if values of a predictive index are to be computed.

Step 5. Offer the option of performing any optional transformations on any or all of the input variables. If "yes," select one or more transformations from a menu of options for each input variable before going to Step 6. If "no," go to Step 6.

Section 4.1.4 gives some examples of possible transformations and how they could be used.

No transformations of this type are used in the primary demonstration.

Step 6. If the data for any variable are a dimensional series, convert each dimensional series into a set of dichotomous series as described in Section 4.1.2.

Table 6 shows the dichotomous series for Drug 1. Information in the data for Drug 1 is represented by four dichotomous treatment event series that will be labeled as shown in Table 6. These four dichotomous series will be referred to as the four levels of Drug 1. The levels of Drug 1 form a required analysis parameter.

Each of the dichotomous series levels in Table 6 represents the presence (1) or absence (0) of a defined treatment event on a given day. For example, the value of "1" for Day 3 in the series labeled $x \geq 30$ indicates that the individual met the criterion for treatment with Drug 1 at a dose of 30 or more on Day 3. This value is marked in Table 6.

The raw data for Drug 2 are a dichotomous series. Drug 2 will be referred to as having one level.

Table 7 shows the four dichotomous series for symptom severity, the dependent variable for the demonstration data in Table 4. The four dichotomous series in Table 7 will be referred to as the four levels of the symptom. These levels are labeled as shown in Table 7. These levels form a required analysis parameter.

The $y \geq 3$ dichotomous series representing the presence and absence of target health events for this demonstration is marked in Table 7. For expository purposes, this document will address all levels of symptom severity even though discussion of the demonstration will focus on the subset of target events.

The immediate objective of this demonstration is to produce a dichotomous treatment event series based on the drug data, a treatment event series that accounts for all variation in the dichotomous health event series that is marked in Table 7. The procedure for accomplishing this objective begins with the dichotomous series for Drug 1 that are shown in Table 6 and the dichotomous series for Drug 2 that is included in Table 4. These series will be used to form additional dichotomous series that represent the presence (1) and absence (0) of various treatment events. Applying analysis features for the independent variables, the features selected from Table 5, forms the treatment event series.

TABLE 6

DIMENSIONAL AND DICHOTOMOUS SERIES FOR DRUG 1

| | Day | | | | | | | | | | | | | | | | | | | | | | | | | | | |
|---|---|---|---|---|---|---|---|---|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 |
| Dimensional series for Drug 1 (levels of x) | | | | | | | | | | | | | | | | | | | | | | | | | | | | |
| | 10 | 20 | 30 | 40 | 20 | 30 | 20 | 0 | 20 | 30 | 30 | 40 | 40 | 40 | 40 | 40 | 30 | 20 | 20 | 20 | 20 | 20 | 20 | 0 | 20 | 20 | 20 | 20 |
| Dichotomous series for Drug 1 treatment events | | | | | | | | | | | | | | | | | | | | | | | | | | | | |
| $x \geq 10$ | 1 | 1 | 1 | 1 | 1 | 1 | 1 | 0 | 1 | 1 | 1 | 1 | 1 | 1 | 1 | 1 | 1 | 1 | 1 | 1 | 1 | 1 | 1 | 0 | 1 | 1 | 1 | 1 |
| $x \geq 20$ | 0 | 1 | 1 | 1 | 1 | 1 | 1 | 0 | 1 | 1 | 1 | 1 | 1 | 1 | 1 | 1 | 1 | 1 | 1 | 1 | 1 | 1 | 1 | 0 | 1 | 1 | 1 | 1 |
| $x \geq 30$ | 0 | 0 | 1 | 1 | 0 | 1 | 0 | 0 | 0 | 1 | 1 | 1 | 1 | 1 | 1 | 1 | 1 | 0 | 0 | 0 | 0 | 0 | 0 | 0 | 0 | 0 | 0 | 0 |
| $x = 40$ | 0 | 0 | 0 | 1 | 0 | 0 | 0 | 0 | 0 | 0 | 0 | 1 | 1 | 1 | 1 | 1 | 0 | 0 | 0 | 0 | 0 | 0 | 0 | 0 | 0 | 0 | 0 | 0 |

TABLE 7

DIMENSIONAL AND DICHOTOMOUS HEALTH EVENT SERIES FOR SYMPTOM SEVERITY

| | Day | | | | | | | | | | | | | | | | | | | | | | | | | | | |
|---|---|---|---|---|---|---|---|---|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 |
| Dimensional series for symptom (levels of y) | | | | | | | | | | | | | | | | | | | | | | | | | | | | |
| | 0 | 1 | 1 | 2 | 3 | 4 | 3 | 3 | 0 | 0 | 1 | 0 | 0 | 1 | 1 | 4 | 3 | 4 | 4 | 3 | 1 | 0 | 0 | 0 | 0 | 1 | 0 | 0 |
| Dichotomous series for symptom health events | | | | | | | | | | | | | | | | | | | | | | | | | | | | |
| $y \geq 1$ | 0 | 1 | 1 | 1 | 1 | 1 | 1 | 1 | 0 | 0 | 1 | 0 | 0 | 1 | 1 | 1 | 1 | 1 | 1 | 1 | 1 | 0 | 0 | 0 | 0 | 1 | 0 | 0 |
| $y \geq 2$ | 0 | 0 | 0 | 1 | 1 | 1 | 1 | 1 | 0 | 0 | 0 | 0 | 0 | 0 | 0 | 1 | 1 | 1 | 1 | 1 | 0 | 0 | 0 | 0 | 0 | 0 | 0 | 0 |
| $y \geq 3$ | 0 | 0 | 0 | 0 | 1 | 1 | 1 | 1 | 0 | 0 | 0 | 0 | 0 | 0 | 0 | 1 | 1 | 1 | 1 | 0 | 0 | 0 | 0 | 0 | 0 | 0 | 0 | 0 |
| $y \geq 4$ | 0 | 0 | 0 | 0 | 0 | 1 | 0 | 0 | 0 | 0 | 0 | 0 | 0 | 0 | 1 | 0 | 1 | 1 | 0 | 0 | 0 | 0 | 0 | 0 | 0 | 0 | 0 | 0 |

Each of the dichotomous series values in Table 7 represents the presence (1) or absence (0) of a defined health event on a given day. For example, the value of "1" for Day 4 in the series labeled $y \geq 2$ indicates that the individual met the criterion for a symptom severity rating of 2 or more on Day 4. This value is marked in Table 7.

Step 7. Offer the option of restricting the set of target dependent events for each dependent variable. If "yes," specify the target health events for each dependent variable by selecting any or all of the dichotomous series representing that variable before going to Step 8. If "no," proceed as if all levels of all dependent variables are target dependent events and go to Step 8.

A major reason for selecting target dependent events is to reduce demand for computer resources and the amount of analysis results.

Each of the dichotomous series representing the presence and absence of various treatment events will be paired with each of the dichotomous series for symptom severity that are shown in Table 7. A B/H score and values of the strength of longitudinal association measures would be computed for each pairing.

This demonstration will produce thousands of B/H scores. The B/H score produced by pairing the target health event series with a dichotomous series of treatment events that accounts for all variation in the occurrence of the health events will produce the most extreme B/H score (the B/H score with the largest absolute value) in this demonstration. In addition, this pairing will produce strength of longitudinal association measures that have a value of 1 indicating that the treatment events accounted for all variation in the occurrence of the target health events. The location of this most extreme B/H score in the array of B/H scores will identify the levels of all analysis parameters and the Boolean operator used to define the treatment event that accounts for all variation in the occurrence of the target health event.

4.4.3.2. Stage 1 Quantify Longitudinal Associations as Functions of Required Analysis Parameters Stage 1. Quantify longitudinal associations between individual independent variables and individual dependent variables using only the required analysis parameters.

The primary demonstration has three required analysis parameters. They are level of Drug 1, level of Drug 2, and level of symptom severity. The dichotomous series that show treatment events for the four levels of Drug 1 for the default levels of the optional analysis parameters are shown in Table 6. The dichotomous series that show Drug 2 for the default levels is included in Table 4. The dichotomous series that show symptom severity for the default levels of the analysis parameters are shown in Table 7.

Step 8. Pair the dichotomous series for each treatment (independent) event with the dichotomous series for each health (dependent) event. Form the 2×2 tables for these pairings and compute the LAS or B/H score for each pairing as shown in Section 4.1.1. Also compute values of the measures of strength of longitudinal association (Section 4.1.6) that correspond with each LAS or B/H score.

Table 8 illustrates the pairing of the dichotomous series representing Drug 2 treatment events with each of the four dichotomous series for symptom health events that are shown in Table 7. Table 8 includes the cell assignments for the 2×2 table used to compute the B/H score for each pairing.

TABLE 9

The 2 × 2 Table Pairing Drug 2 Treatment Events With $Y \geq 3$ Symptom Health Events

|  |  | Treatment Event | | |
|---|---|---|---|---|
|  |  | Present (1) | Absent (0) | |
| Health Event | Present (1) | 1, 1<br>a = 6 | 0, 1<br>b = 3 | a + b = 9 |
|  | Absent (0) | 1, 0<br>c = 13 | 0, 0<br>d = 6 | c + d = 19 |
|  |  | a + c = 19 | b + d = 9 | n = 28 |

Table 10 shows the B/H scores and values of the three strength of longitudinal association measures for all values of a that are possible given the marginal frequencies observed in Table 9. Because a+b equals b+d in Table 9, the values of $S_D$ and $S_I$ are identical.

TABLE 10

B/H SCORES AND VALUES OF THE THREE STRENGTH OF LONGITUDINAL ASSOCIATION MEASURES FOR ALL POSSIBLE VALUES OF a GIVEN THE MARGINAL FREQUENCIES OBSERVED IN TABLE 8

| α | B/H Score | S | $S_D$ and $S_I$ |
|---|---|---|---|
| 0 | 15.964 | 1.000 | 1.000 |
| 1 | 11.160 | 0.699 | 0.699 |
| 2 | 7.212 | 0.452 | 0.452 |
| 3 | 4.122 | 0.258 | 0.258 |

TABLE 8

PAIRS OF DICHOTOMOUS SERIES FOR DRUG 2 TREATMENT EVENTS AND SYMPTOM HEALTH EVENTS WITH CELL ASSIGNMENTS

| Day | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 |
|---|---|---|---|---|---|---|---|---|---|---|---|---|---|---|---|---|---|---|---|---|---|---|---|---|---|---|---|---|
| Dichotomous series for Drug 2 treatment events | | | | | | | | | | | | | | | | | | | | | | | | | | | | |
|  | 1 | 1 | 1 | 1 | 1 | 0 | 0 | 0 | 0 | 0 | 0 | 0 | 0 | 1 | 1 | 1 | 1 | 1 | 1 | 1 | 1 | 1 | 1 | 0 | 1 | 1 | 1 | 1 |
| The four dichotomous series for symptom health events with cell assignments | | | | | | | | | | | | | | | | | | | | | | | | | | | | |
| y ≥ 1 | 0 | 1 | 1 | 1 | 1 | 1 | 1 | 1 | 0 | 0 | 1 | 0 | 0 | 1 | 1 | 1 | 1 | 1 | 1 | 1 | 0 | 0 | 0 | 0 | 1 | 0 | 0 |
| Cell | c | a | a | a | a | b | b | b | d | d | b | d | d | a | a | a | a | a | a | a | c | c | d | c | a | c | c |
| y ≥ 2 | 0 | 0 | 0 | 1 | 1 | 1 | 1 | 1 | 0 | 0 | 0 | 0 | 0 | 0 | 1 | 1 | 1 | 1 | 1 | 1 | 0 | 0 | 0 | 0 | 0 | 0 | 0 | 0 |
| Cell | c | c | c | a | a | b | b | b | d | d | d | d | d | c | c | a | a | a | a | a | c | c | c | d | c | c | c | c |
| y ≥ 3 | 0 | 0 | 0 | 0 | 1 | 1 | 1 | 1 | 0 | 0 | 0 | 0 | 0 | 0 | 0 | 1 | 1 | 1 | 1 | 1 | 0 | 0 | 0 | 0 | 0 | 0 | 0 | 0 |
| Cell | c | c | c | c | a | b | b | b | d | d | d | d | d | c | c | a | a | a | a | a | c | c | c | d | c | c | c | c |
| y = 4 | 0 | 0 | 0 | 0 | 0 | 1 | 0 | 0 | 0 | 0 | 0 | 0 | 0 | 0 | 0 | 1 | 0 | 1 | 1 | 0 | 0 | 0 | 0 | 0 | 0 | 0 | 0 | 0 |
| Cell | c | c | c | c | c | b | d | d | d | d | d | d | d | c | c | a | c | a | a | c | c | c | c | d | c | c | c | c |

Table 9 shows the 2×2 table that results from pairing the dichotomous series for Drug 2 treatment events and the dichotomous series for $y \geq 3$ symptom health events.

TABLE 10-continued

B/H SCORES AND VALUES OF THE THREE STRENGTH
OF LONGITUDINAL ASSOCIATION MEASURES FOR ALL
POSSIBLE VALUES OF a GIVEN THE MARGINAL
FREQUENCIES OBSERVED IN TABLE 8

| α | B/H Score | S | $S_D$ and $S_I$ |
|---|---|---|---|
| 4 | 1.888 | 0.118 | 0.118 |
| 5 | 0.511 | 0.032 | 0.032 |
| 6 | −0.009 | −0.003 | −0.002 |
| 7 | −0.356 | −0.099 | −0.022 |
| 8 | −1.549 | −0.430 | −0.097 |
| 9 | −3.599 | −1.000 | −0.225 |

Table 9, for which a=6, provides virtually no evidence for a longitudinal association between Drug 2 and y≧3 health events.

As stated under Step 7, the "immediate objective of this demonstration is to produce a dichotomous treatment event series based on the drug data, a treatment event series that accounts for all variation in the dichotomous health event series that is marked in Table 7." The value of $S_D$ and $S_I$ would be 1 or −1 for a B/H score that accounts for all variation in the occurrence of y≧3 health events.

Stage 1 of the analysis of the demonstration data would produce 20 B/H scores. Of these, 16 would result from pairing each of the four levels of Drug 1 with each of the four levels of symptom severity and an additional four would result from pairing the one level of Drug 2 with the four levels of symptom severity.

Step 9. Did any of the LASs or B/H scores resulting from Stage 1 of the analysis account for all of the variation in the occurrence of any target health events? If "yes," stop the analysis for this dependent variable and, if there are any remaining unanalyzed dependent variables, return to Step 8 to begin analysis of the next dependent variable. If "no," offer the option of going to Stage 2, Step 10 to begin analysis of any selected levels of the optional analysis parameters.

None of the dichotomous series produced during Stage 1 of this analysis accounted for all of the variation in the occurrence of the target health events. The demonstration will be continued to Stage 2 of the analysis in an attempt to define additional treatment events that account for all variation in the occurrence of the target health events.

4.4.3.3. Stage 2—Quantify Longitudinal Associations as Functions of Selected Optional Analysis Parameters Stage 2. Extend analyses by adding selected optional levels of analysis parameters.

Figure 2A:
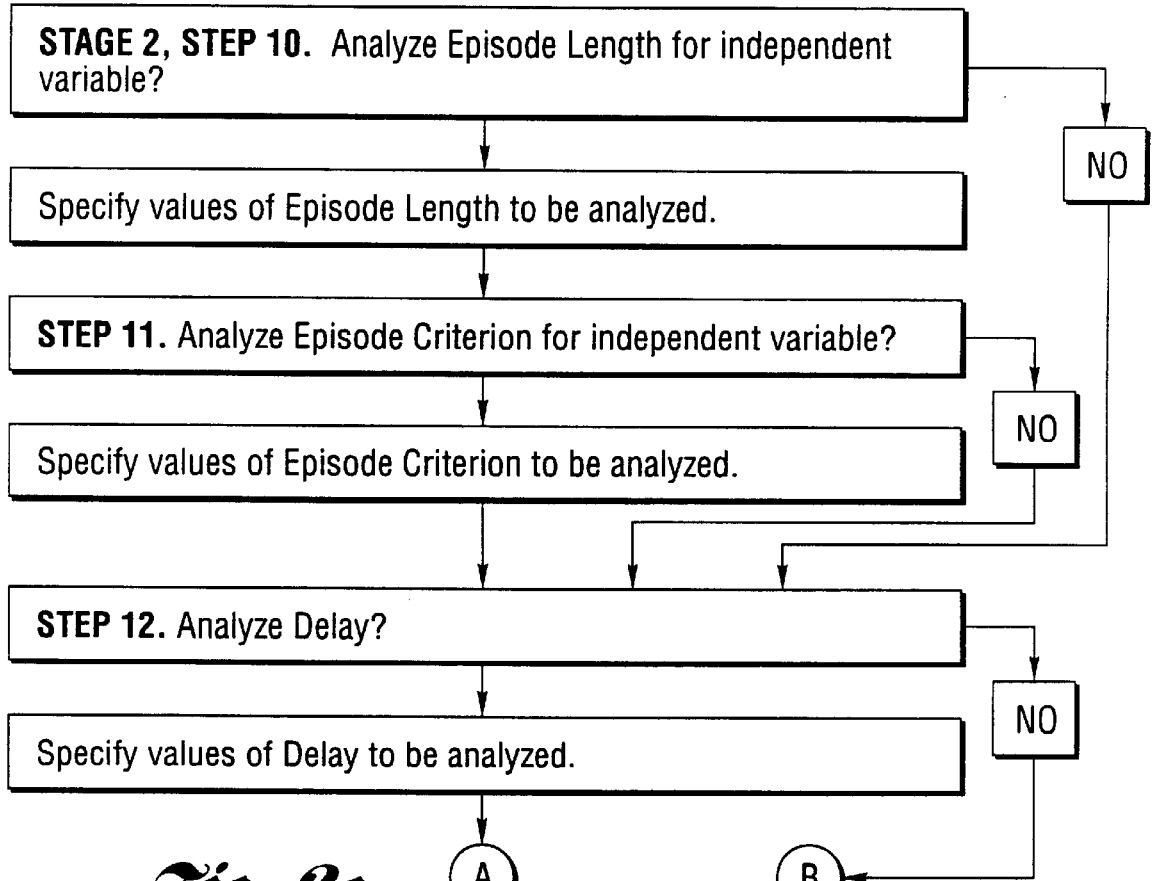

FIG. 2 summarizes the steps in Stage 2 of analyses performed with the present invention.

Step 10. The default level for Treatment Episode Length (TEL) is 1. Offer the option of analyzing additional levels of TEL for the independent variable(s). If "yes", specify the additional levels of TEL to be analyzed before going to Step 11. If "no", go to Step 12.

Analysis of TEL=1 is equivalent to not including TEL as an analysis parameter. Zero is not an acceptable level for TEL and should not be allowed. The maximum acceptable level of TEL would be the number of periods (days in this demonstration) minus 1. In general, TEL should be small in comparison to the number of periods.

This demonstration will investigate TEL levels 1, 2, 3, and 4 for both drugs.

Step 11. The default level of Treatment Episode Criterion (TEC) is 1. Offer the option of analyzing additional levels of TEC. If "yes", specify additional levels of TEC to be analyzed before going to Step 12. Acceptable levels of TEC range from 1 through the level of TEL. If "no", go to Step 12.

As indicated in Section 4.1.8, TEL and TEC are particularly well suited for investigations of diminished benefit and harm that may be associated with patient noncompliance with therapeutic regimens. TEL, TEC, HEL, and HEC also can be used to facilitate analyses of databases with missing data.

For the primary demonstration, the following 10 combinations of TEL and TEC will be analyzed for both drugs.

TEL=1, TEC=1 (This combination is equivalent to analyses conducted in Stage 1.)

TEL=2, TECs=1 and 2
TEL=3, TECs=1, 2, and 3
TEL=4, TECs=1, 2, 3, and 4

Step 12. The default level for Delay (D) is 0. Offer the option of evaluating additional levels of D. If "yes", specify levels for D before going to Step 13. If "no," go to Step 13.

This demonstration will investigate three levels for D: 0, 1, and 2. These levels will be investigated for all combinations of TEL and TEC.

Step 13. The default level for Persistence (P) is 1. Offer the option of evaluating additional levels of P. If "yes", specify additional levels of P before going to Step 14. If "no," go to Step 14.

Zero is not an acceptable level for P and should not be allowed.

This demonstration will investigate three levels of P: 1, 2, and 3. These levels will be investigated for all combinations of TEL, TEC, and D.

Table 11 shows selected dichotomous series for Drug 1 treatment events that result from Steps 10 through 13. The total number of treatment event dichotomous series for Drug 1 from these steps can be obtained by computing the number of factorial combinations of levels for all the analysis parameters for Stage 2. This number is 360 resulting from the combination of 4 levels of Drug 1, the 10 combinations of TEL and TEC, 3 levels of D, and 3 levels of P. The total number of 360 includes the 16 dichotomous series that result from the default levels for TEL, TEC, D, and P that were analyzed during Stage 1.

The dichotomous series in Table 11 are limited to those with the default levels of D and P except for the series for x≧30, TEL=3, and TEC=2 which includes all combinations of the selected levels for D and P. The values for some days in some dichotomous series are indeterminate. For example, values in dichotomous series for Days 1, 2, and 3 are indeterminate for the demonstration data when TEL=4.

TABLE 11

SELECTED DICHOTOMOUS SERIES FOR DRUG 1 TREATMENT
EVENTS FOR STAGE 2 OF THE ANALYSIS

| | Day | | | | | | | | | | | | | | | | | | | | | | | | | | | |
|---|---|---|---|---|---|---|---|---|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 |
| *Dichotomous series x ≥ 10 for Drug 1 treatment events* | | | | | | | | | | | | | | | | | | | | | | | | | | | | |
|  | 1 | 1 | 1 | 1 | 1 | 1 | 1 | 0 | 1 | 1 | 1 | 1 | 1 | 1 | 1 | 1 | 1 | 1 | 1 | 1 | 1 | 1 | 0 | 1 | 1 | 1 | 1 | 1 |
| *Treatment Episode Length (TEL) = 1* | | | | | | | | | | | | | | | | | | | | | | | | | | | | |
| *Treatment Episode Criterion (TEC):* | | | | | | | | | | | | | | | | | | | | | | | | | | | | |
| =1 | 1 | 1 | 1 | 1 | 1 | 1 | 1 | 0 | 1 | 1 | 1 | 1 | 1 | 1 | 1 | 1 | 1 | 1 | 1 | 1 | 1 | 1 | 0 | 1 | 1 | 1 | 1 | 1 |
| *Treatment Episode Length (TEL) = 2* | | | | | | | | | | | | | | | | | | | | | | | | | | | | |
| *Treatment Episode Criterion (TEC):* | | | | | | | | | | | | | | | | | | | | | | | | | | | | |
| ≧1 | — | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| =2 | — | 1 | 1 | 1 | 1 | 1 | 1 | 0 | 0 | 1 | 1 | 1 | 1 | 1 | 1 | 1 | 1 | 1 | 1 | 1 | 1 | 1 | 0 | 0 | 1 | 1 | 1 | 1 |
| *Treatment Episode Length (TEL) = 3* | | | | | | | | | | | | | | | | | | | | | | | | | | | | |
| *Treatment Episode Criterion (TEC):* | | | | | | | | | | | | | | | | | | | | | | | | | | | | |
| ≧1 | — | — | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| ≧2 | — | — | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| =3 | — | — | 1 | 1 | 1 | 1 | 1 | 0 | 0 | 0 | 1 | 1 | 1 | 1 | 1 | 1 | 1 | 1 | 1 | 1 | 1 | 1 | 0 | 0 | 0 | 1 | 1 | 1 |
| *Treatment Episode Length (TEL) = 4* | | | | | | | | | | | | | | | | | | | | | | | | | | | | |
| *Treatment Episode Criterion (TEC):* | | | | | | | | | | | | | | | | | | | | | | | | | | | | |
| ≧1 | — | — | — | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| ≧2 | — | — | — | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| ≧3 | — | — | — | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| =4 | — | — | — | 1 | 1 | 1 | 1 | 0 | 0 | 0 | 0 | 1 | 1 | 1 | 1 | 1 | 1 | 1 | 1 | 1 | 1 | 1 | 0 | 0 | 0 | 0 | 0 | 1 |
| *Dichotomous series x ≥ 20 for Drug 1 treatment events* | | | | | | | | | | | | | | | | | | | | | | | | | | | | |
|  | 0 | 1 | 1 | 1 | 1 | 1 | 1 | 0 | 1 | 1 | 1 | 1 | 1 | 1 | 1 | 1 | 1 | 1 | 1 | 1 | 1 | 1 | 0 | 1 | 1 | 1 | 1 | 1 |
| *Treatment Episode Length (TEL) = 1* | | | | | | | | | | | | | | | | | | | | | | | | | | | | |
| *Treatment Episode Criterion (TEC):* | | | | | | | | | | | | | | | | | | | | | | | | | | | | |
| =1 | 0 | 1 | 1 | 1 | 1 | 1 | 1 | 0 | 1 | 1 | 1 | 1 | 1 | 1 | 1 | 1 | 1 | 1 | 1 | 1 | 1 | 1 | 0 | 1 | 1 | 1 | 1 | 1 |
| *Treatment Episode Length (TEL) = 2* | | | | | | | | | | | | | | | | | | | | | | | | | | | | |
| *Treatment Episode Criterion (TEC):* | | | | | | | | | | | | | | | | | | | | | | | | | | | | |
| ≧1 | — | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| =2 | — | 0 | 1 | 1 | 1 | 1 | 1 | 1 | 0 | 1 | 1 | 1 | 1 | 1 | 1 | 1 | 1 | 1 | 1 | 1 | 1 | 1 | 0 | 0 | 1 | 1 | 1 | 1 |
| *Treatment Episode Length (TEL) = 3* | | | | | | | | | | | | | | | | | | | | | | | | | | | | |
| *Treatment Episode Criterion (TEC):* | | | | | | | | | | | | | | | | | | | | | | | | | | | | |
| ≧1 | — | — | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| ≧2 | — | — | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| =3 | — | — | 1 | 1 | 1 | 1 | 1 | 0 | 0 | 0 | 1 | 1 | 1 | 1 | 1 | 1 | 1 | 1 | 1 | 1 | 1 | 1 | 0 | 0 | 0 | 1 | 1 | 1 |
| *Treatment Episode Length (TEL) = 4* | | | | | | | | | | | | | | | | | | | | | | | | | | | | |
| *Treatment Episode Criterion (TEC):* | | | | | | | | | | | | | | | | | | | | | | | | | | | | |
| ≧1 | — | — | — | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| ≧2 | — | — | — | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| ≧3 | — | — | — | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| =4 | — | — | — | 1 | 1 | 1 | 1 | 0 | 0 | 0 | 0 | 1 | 1 | 1 | 1 | 1 | 1 | 1 | 1 | 1 | 1 | 1 | 0 | 0 | 0 | 0 | 0 | 1 |
| *Dichotomous series x ≥ 30 for Drug 1 treatment events* | | | | | | | | | | | | | | | | | | | | | | | | | | | | |
|  | 0 | 0 | 1 | 1 | 0 | 1 | 0 | 0 | 0 | 1 | 1 | 1 | 1 | 1 | 1 | 1 | 1 | 0 | 0 | 0 | 0 | 0 | 0 | 0 | 0 | 0 | 0 | 0 |
| *Treatment Episode Length (TEL) = 1* | | | | | | | | | | | | | | | | | | | | | | | | | | | | |
| *Treatment Episode Criterion (TEC):* | | | | | | | | | | | | | | | | | | | | | | | | | | | | |
| =1 | 0 | 0 | 1 | 1 | 0 | 1 | 0 | 0 | 0 | 1 | 1 | 1 | 1 | 1 | 1 | 1 | 1 | 0 | 0 | 0 | 0 | 0 | 0 | 0 | 0 | 0 | 0 | 0 |
| *Treatment Episode Length (TEL) = 2* | | | | | | | | | | | | | | | | | | | | | | | | | | | | |
| *Treatment Episode Criterion (TEC):* | | | | | | | | | | | | | | | | | | | | | | | | | | | | |
| ≧1 | — | 0 | 1 | 1 | 1 | 1 | 1 | 0 | 0 | 1 | 1 | 1 | 1 | 1 | 1 | 1 | 1 | 1 | 0 | 0 | 0 | 0 | 0 | 0 | 0 | 0 | 0 | 0 |
| =2 | — | 0 | 0 | 1 | 0 | 0 | 0 | 0 | 0 | 1 | 1 | 1 | 1 | 1 | 1 | 1 | 1 | 1 | 0 | 0 | 0 | 0 | 0 | 0 | 0 | 0 | 0 | 0 |
| *Treatment Episode Length (TEL) = 3* | | | | | | | | | | | | | | | | | | | | | | | | | | | | |
| *Treatment Episode Criterion (TEC):* | | | | | | | | | | | | | | | | | | | | | | | | | | | | |
| ≧1 | — | — | 1 | 1 | 1 | 1 | 1 | 0 | 1 | 1 | 1 | 1 | 1 | 1 | 1 | 1 | 1 | 1 | 1 | 0 | 0 | 0 | 0 | 0 | 0 | 0 | 0 | 0 |
| ≧2 | — | — | 0 | 1 | 1 | 1 | 0 | 0 | 0 | 1 | 1 | 1 | 1 | 1 | 1 | 1 | 1 | 1 | 0 | 0 | 0 | 0 | 0 | 0 | 0 | 0 | 0 | 0 |
| D0, P1 | — | — | 0 | 1 | 1 | 1 | 0 | 0 | 0 | 1 | 1 | 1 | 1 | 1 | 1 | 1 | 1 | 1 | 0 | 0 | 0 | 0 | 0 | 0 | 0 | 0 | 0 | 0 |
| D0, P2 | — | — | 0 | 1 | 1 | 1 | 0 | 0 | 0 | 1 | 1 | 1 | 1 | 1 | 1 | 1 | 1 | 1 | 0 | 0 | 0 | 0 | 0 | 0 | 0 | 0 | 0 | 0 |
| D0, P3 | — | — | 0 | 1 | 1 | 1 | 0 | 0 | 0 | 1 | 1 | 1 | 1 | 1 | 1 | 1 | 1 | 1 | 0 | 0 | 0 | 0 | 0 | 0 | 0 | 0 | 0 | 0 |
| D1, P1 | — | — | — | 0 | 1 | 1 | 1 | 0 | 0 | 0 | 1 | 1 | 1 | 1 | 1 | 1 | 1 | 1 | 1 | 0 | 0 | 0 | 0 | 0 | 0 | 0 | 0 | 0 |
| D1, P2 | — | — | — | 0 | 1 | 1 | 1 | 0 | 0 | 0 | 1 | 1 | 1 | 1 | 1 | 1 | 1 | 1 | 1 | 0 | 0 | 0 | 0 | 0 | 0 | 0 | 0 | 0 |

TABLE 11-continued

SELECTED DICHOTOMOUS SERIES FOR DRUG 1 TREATMENT EVENTS FOR STAGE 2 OF THE ANALYSIS

| | Day | | | | | | | | | | | | | | | | | | | | | | | | | | | |
|---|---|---|---|---|---|---|---|---|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 |
| D1, P3 | — | — | — | 0 | 1 | 1 | 1 | 1 | 1 | 0 | 0 | 1 | 1 | 1 | 1 | 1 | 1 | 1 | 1 | 1 | 1 | 0 | 0 | 0 | 0 | 0 | 0 | 0 |
| D2, P1 | — | — | — | — | 0 | 1 | 1 | 1 | 0 | 0 | 0 | 0 | 1 | 1 | 1 | 1 | 1 | 1 | 1 | 1 | 0 | 0 | 0 | 0 | 0 | 0 | 0 | 0 |
| D2, P2 | — | — | — | — | 0 | 1 | 1 | 1 | 1 | 0 | 0 | 0 | 1 | 1 | 1 | 1 | 1 | 1 | 1 | 1 | 0 | 0 | 0 | 0 | 0 | 0 | 0 | 0 |
| D2, P3 | — | — | — | — | 0 | 1 | 1 | 1 | 1 | 0 | 0 | 1 | 1 | 1 | 1 | 1 | 1 | 1 | 1 | 1 | 1 | 0 | 0 | 0 | 0 | 0 | 0 | 0 |
| =3 | — | — | 0 | 0 | 0 | 0 | 0 | 0 | 0 | 0 | 0 | 1 | 1 | 1 | 1 | 1 | 1 | 0 | 0 | 0 | 0 | 0 | 0 | 0 | 0 | 0 | 0 | 0 |
| | | | | | | | | | Treatment Episode Length (TEL) = 4 | | | | | | | | | | | | | | | | | | | |
| | | | | | | | | | Treatment Episode Criterion (TEC): | | | | | | | | | | | | | | | | | | | |
| ≧1 | — | — | — | 1 | 1 | 1 | 1 | 1 | 1 | 1 | 1 | 1 | 1 | 1 | 1 | 1 | 1 | 1 | 1 | 0 | 0 | 0 | 0 | 0 | 0 | 0 | 0 | 0 |
| ≧2 | — | — | — | 1 | 1 | 1 | 1 | 0 | 0 | 0 | 1 | 1 | 1 | 1 | 1 | 1 | 1 | 1 | 0 | 0 | 0 | 0 | 0 | 0 | 0 | 0 | 0 | 0 |
| ≧3 | — | — | — | 0 | 0 | 1 | 0 | 0 | 0 | 0 | 1 | 1 | 1 | 1 | 1 | 1 | 1 | 0 | 0 | 0 | 0 | 0 | 0 | 0 | 0 | 0 | 0 | 0 |
| =4 | — | — | — | 0 | 0 | 0 | 0 | 0 | 0 | 0 | 0 | 1 | 1 | 1 | 1 | 1 | 0 | 0 | 0 | 0 | 0 | 0 | 0 | 0 | 0 | 0 | 0 | 0 |
| | | | | | | | | Dichotomous series x ≧ 40 for Drug 1 treatment events | | | | | | | | | | | | | | | | | | | | |
| | | | | | | | | Treatment Episode Length (TEL) = 1 | | | | | | | | | | | | | | | | | | | | |
| | 0 | 0 | 0 | 1 | 0 | 0 | 0 | 0 | 0 | 0 | 0 | 1 | 1 | 1 | 1 | 1 | 0 | 0 | 0 | 0 | 0 | 0 | 0 | 0 | 0 | 0 | 0 | 0 |
| | | | | | | | | | Treatment Episode Criterion (TEC): | | | | | | | | | | | | | | | | | | | |
| =1 | 0 | 0 | 0 | 1 | 0 | 0 | 0 | 0 | 0 | 0 | 0 | 1 | 1 | 1 | 1 | 1 | 0 | 0 | 0 | 0 | 0 | 0 | 0 | 0 | 0 | 0 | 0 | 0 |
| | | | | | | | | | Treatment Episode Length (TEL) = 2 | | | | | | | | | | | | | | | | | | | |
| | | | | | | | | | Treatment Episode Criterion (TEC): | | | | | | | | | | | | | | | | | | | |
| ≧1 | — | 0 | 0 | 1 | 1 | 0 | 0 | 0 | 0 | 0 | 0 | 1 | 1 | 1 | 1 | 1 | 1 | 0 | 0 | 0 | 0 | 0 | 0 | 0 | 0 | 0 | 0 | 0 |
| =2 | — | 0 | 0 | 0 | 0 | 0 | 0 | 0 | 0 | 0 | 0 | 0 | 1 | 1 | 1 | 1 | 0 | 0 | 0 | 0 | 0 | 0 | 0 | 0 | 0 | 0 | 0 | 0 |
| | | | | | | | | | Treatment Episode Length (TEL) =3 | | | | | | | | | | | | | | | | | | | |
| | | | | | | | | | Treatment Episode Criterion (TEC): | | | | | | | | | | | | | | | | | | | |
| ≧1 | — | — | 0 | 1 | 1 | 1 | 0 | 0 | 0 | 0 | 0 | 1 | 1 | 1 | 1 | 1 | 1 | 0 | 0 | 0 | 0 | 0 | 0 | 0 | 0 | 0 | 0 | 0 |
| ≧2 | — | — | 0 | 0 | 0 | 0 | 0 | 0 | 0 | 0 | 0 | 0 | 1 | 1 | 1 | 1 | 1 | 0 | 0 | 0 | 0 | 0 | 0 | 0 | 0 | 0 | 0 | 0 |
| =3 | — | — | 0 | 0 | 0 | 0 | 0 | 0 | 0 | 0 | 0 | 0 | 0 | 1 | 1 | 1 | 0 | 0 | 0 | 0 | 0 | 0 | 0 | 0 | 0 | 0 | 0 | 0 |
| | | | | | | | | | Treatment Episode Length (TEL) =4 | | | | | | | | | | | | | | | | | | | |
| | | | | | | | | | Treatment Episode Criterion (TEC): | | | | | | | | | | | | | | | | | | | |
| ≧1 | — | — | — | 1 | 1 | 1 | 1 | 0 | 0 | 0 | 0 | 1 | 1 | 1 | 1 | 1 | 1 | 1 | 0 | 0 | 0 | 0 | 0 | 0 | 0 | 0 | 0 | 0 |
| ≧2 | — | — | — | 0 | 0 | 0 | 0 | 0 | 0 | 0 | 0 | 1 | 1 | 1 | 1 | 1 | 1 | 0 | 0 | 0 | 0 | 0 | 0 | 0 | 0 | 0 | 0 |
| ≧3 | — | — | — | 0 | 0 | 0 | 0 | 0 | 0 | 0 | 0 | 0 | 1 | 1 | 1 | 1 | 0 | 0 | 0 | 0 | 0 | 0 | 0 | 0 | 0 | 0 | 0 |
| =4 | — | — | — | 0 | 0 | 0 | 0 | 0 | 0 | 0 | 0 | 0 | 0 | 1 | 1 | 0 | 0 | 0 | 0 | 0 | 0 | 0 | 0 | 0 | 0 | 0 | 0 |

Table 12 shows the 10 dichotomous series for the treatment events that represent each combination of levels for TEL and TEC for Drug 2. The dichotomous series in Table 12 are for the default levels of D and P. Series for the additional selected levels of D and P would be formed in the same manner as illustrated in the section of Table 11 for x≧30, TEL=3, TEC=2.

The total number of dichotomous series for Drug 2 treatment events for Stage 2 of the analysis is 90 (10 combinations×3 levels of D×3 levels of P). The total number of 90 includes the 4 dichotomous series that result from the default levels for TEL, TEC, D, and P that were analyzed during Stage 1.

TABLE 12

SELECTED DICHOTOMOUS SERIES FOR DRUG 2 TREATMENT EVENTS FOR STAGE 2 OF THE ANALYSIS

| | Dichotomous series for Drug 2 treatment events | | | | | | | | | | | | | | | | | | | | | | | | | | | |
|---|---|---|---|---|---|---|---|---|---|---|---|---|---|---|---|---|---|---|---|---|---|---|---|---|---|---|---|---|
| | 1 | 1 | 1 | 1 | 1 | 0 | 0 | 0 | 0 | 0 | 0 | 0 | 0 | 1 | 1 | 1 | 1 | 1 | 1 | 1 | 1 | 1 | 0 | 1 | 1 | 1 | 1 | |
| | | | | | | | | | | Treatment Episode Length = 1 | | | | | | | | | | | | | | | | | | |
| | | | | | | | | | | Treatment Episode Criterion: | | | | | | | | | | | | | | | | | | |
| =1 | 1 | 1 | 1 | 1 | 1 | 0 | 0 | 0 | 0 | 0 | 0 | 0 | 0 | 1 | 1 | 1 | 1 | 1 | 1 | 1 | 1 | 1 | 0 | 1 | 1 | 1 | 1 | |
| | | | | | | | | | | Treatment Episode Length = 2 | | | | | | | | | | | | | | | | | | |
| | | | | | | | | | | Treatment Episode Criterion: | | | | | | | | | | | | | | | | | | |
| ≧1 | — | 1 | 1 | 1 | 1 | 1 | 0 | 0 | 0 | 0 | 0 | 0 | 0 | 1 | 1 | 1 | 1 | 1 | 1 | 1 | 1 | 1 | 1 | 1 | 1 | 1 | 1 | |
| =2 | — | 1 | 1 | 1 | 1 | 0 | 0 | 0 | 0 | 0 | 0 | 0 | 0 | 0 | 1 | 1 | 1 | 1 | 1 | 1 | 1 | 1 | 0 | 0 | 1 | 1 | 1 | |
| | | | | | | | | | | Treatment Episode Length = 3 | | | | | | | | | | | | | | | | | | |
| | | | | | | | | | | Treatment Episode Criterion: | | | | | | | | | | | | | | | | | | |
| ≧1 | — | — | 1 | 1 | 1 | 1 | 1 | 0 | 0 | 0 | 0 | 0 | 0 | 1 | 1 | 1 | 1 | 1 | 1 | 1 | 1 | 1 | 1 | 1 | 1 | 1 | 1 | |
| ≧2 | — | — | 1 | 1 | 1 | 1 | 0 | 0 | 0 | 0 | 0 | 0 | 0 | 0 | 1 | 1 | 1 | 1 | 1 | 1 | 1 | 1 | 1 | 1 | 1 | 1 | 1 | |

TABLE 12-continued

SELECTED DICHOTOMOUS SERIES FOR DRUG 2 TREATMENT EVENTS FOR STAGE 2 OF THE ANALYSIS

| =3 | — | — | 1 | 1 | 1 | 0 | 0 | 0 | 0 | 0 | 0 | 0 | 0 | 0 | 0 | 1 | 1 | 1 | 1 | 1 | 1 | 1 | 1 | 0 | 0 | 0 | 1 | 1 |

Treatment Episode Length = 4
Treatment Episode Criterion:

| ≥1 | — | — | — | 1 | 1 | 1 | 1 | 1 | 0 | 0 | 0 | 0 | 0 | 1 | 1 | 1 | 1 | 1 | 1 | 1 | 1 | 1 | 1 | 1 | 1 | 1 | 1 |
|---|---|---|---|---|---|---|---|---|---|---|---|---|---|---|---|---|---|---|---|---|---|---|---|---|---|---|---|
| ≥2 | — | — | — | 1 | 1 | 1 | 1 | 0 | 0 | 0 | 0 | 0 | 0 | 1 | 1 | 1 | 1 | 1 | 1 | 1 | 1 | 1 | 1 | 1 | 1 | 1 | 1 |
| ≥3 | — | — | — | 1 | 1 | 1 | 0 | 0 | 0 | 0 | 0 | 0 | 0 | 1 | 1 | 1 | 1 | 1 | 1 | 1 | 1 | 1 | 1 | 1 | 1 | 1 | 1 |
| =4 | — | — | — | 1 | 1 | 0 | 0 | 0 | 0 | 0 | 0 | 0 | 0 | 0 | 1 | 1 | 1 | 1 | 1 | 1 | 1 | 0 | 0 | 0 | 0 | 0 | 1 |

Step 14. The default level of Health Episode Length (HEL) is 1. Offer the option of evaluating additional levels of HEL for any or all of the dependent variables. If "yes", specify additional levels of HEL to be analyzed before going to Step 15. If "no", go to Step 16.

This option will not be selected for this demonstration.

Step 15. The default level of Health Episode Criterion (HEC) is 1. Offer the option of analyzing additional levels of HEC. If "yes", specify additional levels of HEC to be analyzed before going to Step 16. Acceptable levels of HEC range from 1 to the level of HEL. If "no", go to Step 16.

Step 16. Repeat Step 8. Namely, pair the dichotomous series for each treatment (independent) event with the dichotomous series for each health (dependent) event. Form the 2×2 tables for these pairings and compute the LAS or B/H score for each pairing as shown in Section 4.1.1. Also compute values of the measures of strength of longitudinal association (Section 4.1.6) that correspond with each LAS or B/H score.

Step 16 produces 1,440 (360×4) B/H scores for Drug 1 and 360 (90×4) B/H scores for Drug 2.

Step 17. Did any of the LASs or B/H scores resulting from Stage 2 of the analysis account for all of the variation in the occurrence of the target health events? If "yes," stop the analysis for this dependent variable and, if there are any remaining unanalyzed dependent variables, return to Step 8 to begin analysis of the next dependent variable. If "no" and if there are no remaining unanalyzed dependent variables, and if there is more than one independent variable, offer the option of going to Stage 3, Step 18.

Although the 1,800 (1,440+360) B/H scores that result from Stage 2 of the analysis have not been investigated, it is fully expect none of them will account for all the variation in the occurrence of the target health events. The reason for this is that Stages 1 and 2 of the analysis do not account for the interaction between the two drugs. One continues to Stage 3 to identify a less parsimonious, but complete, account for the variation in the occurrence of the target health events.

Stages 1 and 2 would be repeated for each combination of one independent variable with one dependent variable.

4.4.3.4. Stage 3—Quantify Longitudinal Associations for Optional Boolean Independent Events and Additional Temporal Analysis Parameters Stage 3. Extend analyses by including Boolean treatment (independent) events and the options for analyzing D[B] and P[B].

Stage 3 can be used to define new treatment events involving more than one independent variable. The new treatment events are applied to any dependent variable for which all variation in the occurrence of health events was not accounted for during Stages 1 and 2.

Step 18. If there is more than one independent variable, offer the option of applying Boolean operators to define Boolean treatment (independent) events involving more than one independent variable. If "yes," specify which Boolean operator(s) will be applied to which combinations of independent variables and go to Step 19. If "no," and if there is more than one dependent variable, offer the option of going to Stage 4, Step 23 to extend the analysis by including Boolean health (dependent) events.

This demonstration will apply the Boolean AND operator to investigate treatment events requiring the presence of both drugs (interactions) and the Boolean OR operator to investigate treatment events requiring only the presence of either drug. The AND and OR operators will be applied to the dichotomous series that were used to investigate all 10 combinations of TEL and TEC in Stage 2. Each of the 40 dichotomous series for Drug 1 (included in Table 11) will be paired each of the 10 series for Drug 2 (Table 12).

Step 19. The default level for Delay after a Boolean treatment event (D[B]) is 0. Offer the option of applying additional levels of D[B]). If "yes", specify levels for D[B] that will be investigated before going to Step 20. If "no," go to Step 20.

This demonstration will investigate three levels for D[B], namely 0, 1, and 2. When Boolean treatment events are being investigated, the procedure for forming the dichotomous series for different levels of D[B] is applied after the dichotomous series for the Boolean treatment events are formed.

Step 20. The default level for Persistence after a Boolean treatment event (P[B]) is 1. Offer the option of evaluating additional levels of P[B]. If "yes", specify levels for P[B] that will be investigated before going to Step 21. If "no," go to Step 21.

Zero is not an acceptable value for P[B] and should not be allowed.

This demonstration will investigate three levels for P[B], namely 1, 2, and 3. When Boolean treatment events are being investigated, the procedure for forming the dichotomous series for different levels of P[B] is applied after the dichotomous series for the Boolean treatment events are formed.

Table 13 shows selected dichotomous series for treatment events that result from the application of Steps 18, 19, and 20 to the demonstration data. The total number of dichotomous series that are possible, given the data and the analysis parameters and levels selected, can be calculated as follows for Stage 3 of this demonstration.

Drug 1 has 4 levels. Ten combinations of TEL and TEC were investigated for each combination. This resulted in the 40 dichotomous series included in Table 11. Drug 2 has 1 level and the same 10 combinations of TEL and TEC that were investigated for Drug 1 also were investigated for Drug 2. This resulted in the 10 dichotomous series shown in Table 12. Note that twelve of the dichotomous series shown in Table 11 could be dropped from further consideration because they have the same value (1) for all 28 days. Any LAS or B/H score involving any dichotomous series with no variation would be zero. The twelve invariant dichotomous series will be included in the count of dichotomous series investigated for the primary demonstration.

is not possible to investigate TEL=4, TEC=4 on Days 1, 2, and 3 for the data as shown in Table 4.

Table 13 shows 18 of the 6390 dichotomous series representing treatment events for Stage 3 of this demonstration.

TABLE 13

SELECTED DICHOTOMOUS SERIES REPRESENTING TREATMENT EVENTS FOR STAGE 3

| | Day |
|---|---|
| | 1 2 3 4 5 6 7 8 9 10 11 12 13 14 15 16 17 18 19 20 21 22 23 24 25 26 27 28 |

Dichotomous series x ≥ 30 for Drug 1, Treatment Episode Length = 3, Treatment Episode Criterion ≥ 2 treatment events

— — 0 1 1 1 0 0 0 0 1 1 1 1 1 1 1 1 1 0 0 0 0 0 0 0 0 0

Dichotomous series for Drug 2, Treatment Episode Length = 3, Treatment Episode Criterion ≥ 2 treatment events

— — 1 1 1 1 0 0 0 0 0 0 0 1 1 1 1 1 1 1 1 1 1 1 1 1 1 1

Drug 1 AND Drug 2

| | | | | | | | | | | | | | | | | | | | | | | | | | | | | |
|---|---|---|---|---|---|---|---|---|---|---|---|---|---|---|---|---|---|---|---|---|---|---|---|---|---|---|---|---|
| D[B]0, P[B]1 | — | — | 0 | 1 | 1 | 1 | 0 | 0 | 0 | 0 | 0 | 0 | 0 | 0 | 1 | 1 | 1 | 1 | 0 | 0 | 0 | 0 | 0 | 0 | 0 | 0 | 0 | 0 |
| D[B]0, P[B]2 | — | — | 0 | 1 | 1 | 1 | 1 | 0 | 0 | 0 | 0 | 0 | 0 | 0 | 1 | 1 | 1 | 1 | 1 | 0 | 0 | 0 | 0 | 0 | 0 | 0 | 0 | 0 |
| D[B]0, P[B]3 | — | — | 0 | 1 | 1 | 1 | 1 | 1 | 0 | 0 | 0 | 0 | 0 | 0 | 1 | 1 | 1 | 1 | 1 | 0 | 0 | 0 | 0 | 0 | 0 | 0 | 0 | 0 |
| D[B]1, P[B]1 | — | — | — | 0 | 1 | 1 | 1 | 0 | 0 | 0 | 0 | 0 | 0 | 0 | 0 | 1 | 1 | 1 | 1 | 0 | 0 | 0 | 0 | 0 | 0 | 0 | 0 | 0 |
| D[B]1, P[B]2 | — | — | — | 0 | 1 | 1 | 1 | 1 | 0 | 0 | 0 | 0 | 0 | 0 | 0 | 1 | 1 | 1 | 1 | 1 | 0 | 0 | 0 | 0 | 0 | 0 | 0 | 0 |
| D[B]1, P[B]3 | — | — | — | 0 | 1 | 1 | 1 | 1 | 1 | 0 | 0 | 0 | 0 | 0 | 0 | 1 | 1 | 1 | 1 | 1 | 0 | 0 | 0 | 0 | 0 | 0 | 0 | 0 |
| D[B]2, P[B]1 | — | — | — | — | 0 | 1 | 1 | 1 | 0 | 0 | 0 | 0 | 0 | 0 | 0 | 0 | 1 | 1 | 1 | 1 | 0 | 0 | 0 | 0 | 0 | 0 | 0 | 0 |
| D[B]2, P[B]2 | — | — | — | — | 0 | 1 | 1 | 1 | 1 | 0 | 0 | 0 | 0 | 0 | 0 | 0 | 1 | 1 | 1 | 1 | 1 | 0 | 0 | 0 | 0 | 0 | 0 | 0 |
| D[B]2, P[B]3 | — | — | — | — | 0 | 1 | 1 | 1 | 1 | 1 | 0 | 0 | 0 | 0 | 0 | 0 | 1 | 1 | 1 | 1 | 1 | 1 | 0 | 0 | 0 | 0 | 0 | 0 |

Drug 1 OR Drug 2

| | | | | | | | | | | | | | | | | | | | | | | | | | | | | |
|---|---|---|---|---|---|---|---|---|---|---|---|---|---|---|---|---|---|---|---|---|---|---|---|---|---|---|---|---|
| D[B]0, P[B]1 | — | — | 1 | 1 | 1 | 1 | 0 | 0 | 0 | 0 | 1 | 1 | 1 | 1 | 1 | 1 | 1 | 1 | 1 | 1 | 1 | 1 | 1 | 1 | 1 | 1 | 1 | 1 |
| D[B]0, P[B]2 | — | — | 1 | 1 | 1 | 1 | 1 | 0 | 0 | 0 | 1 | 1 | 1 | 1 | 1 | 1 | 1 | 1 | 1 | 1 | 1 | 1 | 1 | 1 | 1 | 1 | 1 | 1 |
| D[B]0, P[B]3 | — | — | 1 | 1 | 1 | 1 | 1 | 1 | 0 | 0 | 1 | 1 | 1 | 1 | 1 | 1 | 1 | 1 | 1 | 1 | 1 | 1 | 1 | 1 | 1 | 1 | 1 | 1 |
| D[B]1, P[B]1 | — | — | — | 1 | 1 | 1 | 1 | 0 | 0 | 0 | 0 | 1 | 1 | 1 | 1 | 1 | 1 | 1 | 1 | 1 | 1 | 1 | 1 | 1 | 1 | 1 | 1 | 1 |
| D[B]1, P[B]2 | — | — | — | 1 | 1 | 1 | 1 | 1 | 0 | 0 | 0 | 1 | 1 | 1 | 1 | 1 | 1 | 1 | 1 | 1 | 1 | 1 | 1 | 1 | 1 | 1 | 1 | 1 |
| D[B]1, P[B]3 | — | — | — | 1 | 1 | 1 | 1 | 1 | 1 | 0 | 0 | 1 | 1 | 1 | 1 | 1 | 1 | 1 | 1 | 1 | 1 | 1 | 1 | 1 | 1 | 1 | 1 | 1 |
| D[B]2, P[B]1 | — | — | — | — | 1 | 1 | 1 | 1 | 0 | 0 | 0 | 0 | 1 | 1 | 1 | 1 | 1 | 1 | 1 | 1 | 1 | 1 | 1 | 1 | 1 | 1 | 1 | 1 |
| D[B]2, P[B]2 | — | — | — | — | 1 | 1 | 1 | 1 | 1 | 0 | 0 | 0 | 1 | 1 | 1 | 1 | 1 | 1 | 1 | 1 | 1 | 1 | 1 | 1 | 1 | 1 | 1 | 1 |
| D[B]2, P[B]3 | — | — | — | — | 1 | 1 | 1 | 1 | 1 | 1 | 0 | 0 | 1 | 1 | 1 | 1 | 1 | 1 | 1 | 1 | 1 | 1 | 1 | 1 | 1 | 1 | 1 | 1 |

For this demonstration, Boolean treatment events involving Drug 1 and Drug 2 would be investigated for all unordered combinations of the 40 dichotomous series included in Table 11 with the 10 shown in Table 12. The total number of ordered combinations would be 400 (10×40). Since the Boolean operators are not affected by the order in which the independent variables are considered, this number (400) can be reduced by the number of pairings that represent different orders of the same pairs of dichotomous series. Thus, for this demonstration, the total number of unordered pairings is 40×10—(10×9)/2=355 unordered pairings. Each type of Boolean treatment event yields a new dichotomous series. This demonstration investigated two types (AND and OR) of Boolean treatment events. This results in 710 dichotomous series (2×355) for Boolean treatment events.

Three levels of D[B] were investigated for each of the 710 dichotomous series used to investigate drug levels, levels of TEL and TEC, and the 2 types of Boolean treatment events. This results in 2130 (3×710) dichotomous series. In turn, 3 levels of P[B] were investigated for each of the 2130 series. This results in a total of 6390 (3×2130) dichotomous treatment event series for Stage 3 of the analysis for this demonstration.

The total number of dichotomous series used to represent treatment events in Stage 3 of this demonstration (6390) can be compared to the 268,435,456 ($2^{28}$) dichotomous series that are possible when there are 28 periods (days in this demonstration). The total number of dichotomous series that is possible does not adjust for instances where a value in the dichotomous series can not be determined. For example, it Step 21. Repeat step 8. Namely, consider the dependent variables one by one. Pair the dichotomous series for each treatment (independent) event with the dichotomous series for each health (dependent) event. Form the 2×2 tables for these pairings and compute the LAS or B/H score for each pairing as shown in Section 4.1.1. Also compute values of the measures of strength of longitudinal association (Section 4.1.6) that correspond with each LAS or B/H score.

Stage 3 of the analysis for the primary demonstration results in a multidimensional array of 25,560 (6390×4) B/H scores. The dimensions of this array correspond to the various required and selected optional analysis features for Stage 3 of this demonstration.

Step 22. Did any of the LASs or B/H scores resulting from Stage 3 of the analysis account for all of the variation in the occurrence of the target health events? If "yes," stop the analysis for this dependent variable and, if there are any remaining unanalyzed dependent variables, return to Step 8 to begin analysis of the next dependent variable. If "no," and if there are no remaining unanalyzed dependent variables, and if there is more than one dependent variable, offer the option of going to Stage 4, Step 23 to begin analysis of Boolean health (dependent) events.

Stage 3 of the analysis did account for all the variation in the occurrence of the target health events for the primary demonstration. For this reason, and because the demonstration data have only one dependent variable, analyses for the primary demonstration will stop.

4.4.3.4.1. Discussion of Primary Demonstration

Table 14 compares the dichotomous series for treatment events that is marked in Table 13 with the dichotomous series for the y≧3 target health events that is marked in Table 7.

Values of the dichotomous series representing treatment events are indeterminate for Days 1, 2 and 3. Other than this, the two dichotomous series in Table 14 are identical. The 2×2 table formed by cross-classifying these series and that is used to calculate the B/H score for the series in Table 14 is shown in Table 15.

For convenience, the demonstration data from Table 4 are reproduced here as Table 16.

demonstration have not been investigated, it is fully expected that the B/H score resulting from Table 15 to be the most extreme B/H score in the entire array.

All conditions that define the treatment events in the dichotomous series that yielded Table 15 can be read from the labels for the series marked in Table 13. This treatment event series is for Drug 1 AND Drug 2 when the dose of Drug 1 is ≧30 for 2 or more (TEC≧2) of 3 (TEL=3) consecutive days and when Drug 2 is present for 2 or more (TEC≧2) of 3 (TEL=3) consecutive days. The delay after the Boolean treatment event is 1 day (D[B]=1) and the persistence is 2 days (P[B]=2). The AND Boolean operator identifies an interaction between Drug 1 and Drug 2. Table 14 includes the label of the target health events, namely, symptom severity greater than of equal to 3. Not only does the present invention quantify the direction, amount, and strength of evidence for longitudinal associations; it also provides a detailed description of the treatment (independent) and health (dependent) events that yield the measures of longitudinal association.

Stage 3 of the analysis of the data for the primary demonstration successfully identified the conditions from within the data (Table 4) that are necessary and sufficient to account for all variation in the occurrence of the target health events. Such a highly successful result certainly is not guaranteed. However, this demonstration does show that the method and system is a useful and flexible tool for finding patterns in repeated measures and multiple time-series data. The pattern is described with respect to a designated set of analysis parameter levels and Boolean operators.

TABLE 14

COMPARISON OF ONE DICHOTOMOUS TREATMENT EVENT SERIES WITH
THE DICHOTOMOUS TARGET HEALTH EVENT SERIES FOR THIS DEMONSTRATION

| | Day | | | | | | | | | | | | | | | | | | | | | | | | | | | |
|---|---|---|---|---|---|---|---|---|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 |
| | Dichotomous treatment event series marked in Table 13 | | | | | | | | | | | | | | | | | | | | | | | | | | | |
| D[B]I, | — | — | — | 0 | 1 | 1 | 1 | 1 | 0 | 0 | 0 | 0 | 0 | 0 | 0 | 1 | 1 | 1 | 1 | 1 | 0 | 0 | 0 | 0 | 0 | 0 | 0 | 0 |
| | Dichotomous target health event series marked in Table 7 | | | | | | | | | | | | | | | | | | | | | | | | | | | |
| y ≧ 3 | 0 | 0 | 0 | 0 | 1 | 1 | 1 | 1 | 0 | 0 | 0 | 0 | 0 | 0 | 0 | 1 | 1 | 1 | 1 | 1 | 0 | 0 | 0 | 0 | 0 | 0 | 0 | 0 |

TABLE 15

2 × 2 TABLE BASED ON TABLE 14

| | | Treatment Event | | |
|---|---|---|---|---|
| | | Present (1) | Absent (0) | |
| Health Event | Present (1) | 1, 1<br>a = 9 | 0, 1<br>b = 0 | a + b = 9 |
| | Absent (0) | 1, 0<br>c = 0 | 0, 0<br>d = 16 | c + d = 16 |
| | | a + c = 9 | b + d = 16 | n = 25 |

TABLE 16

COPY OF DATA FOR THE PRIMARY DEMONSTRATION

| | Day | | | | | | | | | | | | | | | | | | | | | | | | | | | |
|---|---|---|---|---|---|---|---|---|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 |
| Drug 1 | 10 | 20 | 30 | 40 | 20 | 30 | 20 | 0 | 20 | 30 | 30 | 40 | 40 | 40 | 40 | 40 | 30 | 20 | 20 | 20 | 20 | 20 | 20 | 0 | 20 | 20 | 20 | 20 |
| Drug 2 | 1 | 1 | 1 | 1 | 1 | 0 | 0 | 0 | 0 | 0 | 0 | 0 | 0 | 1 | 1 | 1 | 1 | 1 | 1 | 1 | 1 | 1 | 1 | 0 | 1 | 1 | 1 | 1 |
| Symptom | 0 | 1 | 1 | 2 | 3 | 4 | 3 | 3 | 0 | 0 | 1 | 0 | 0 | 1 | 1 | 4 | 3 | 4 | 4 | 3 | 1 | 0 | 0 | 0 | 0 | 1 | 0 | 0 |

The B/H score for Table 15, which indicates that an health event was present on all 9 days when the treatment event was present and the health event was absent on all 16 days when the treatment event was absent, is −14.153. The values of all three measures of strength of longitudinal association for Table 15, would be −1 indicating that variation in the dichotomous series for the health event accounted for all variation in the occurrence of target health events.

Although all the 27,360 (1,800 from Stage 2+25,560 from Stage 3) B/H scores that result from analyses for the primary The following commentary is intended to help provide insight into how the method and system works as applied to the data for the primary demonstration as shown in Table 16.

The primary demonstration shows how application of the method and system for the quantitative analysis of longitudinal associations can identify a known and moderately complex set of conditions strongly associated with the occurrence of target health events. The target health events were symptom severity ratings of 3 or more on a given day.

First, it is described how the conditions were present on each day for which symptom severity was 3 or more.

Day 5 was the first day when symptom severity was 3 or more. The conditions associated with this rating are as follows. Day 4 was the first day on which the criterion was met for a Drug 1 dose of 30 or more on 2 or more (TEC) of 3 (TEL) consecutive days. The same criterion in terms of TEC and TEL also was met for Drug 2 on Day 4. Meeting these criteria for both drugs on Day 4 yielded the treatment event defined by the Boolean AND operator. The apparent response occurred with a delay of 1 day, putting the apparent response on Day 5.

The health event on Day 6 can be accounted for in either of two ways. First, the Day 6 health event could be persistence from the Day 5 response. Second, the criterion of a Drug 1 dose of 30 or more on 2 or more of 3 consecutive days was also met on Day 5 together with the same criterion for Drug 2. Given a 1day delay, this also could account for the health event on Day 6. The health event on Day 7 also can be accounted for in both ways given that the criterion for both drugs was met on Day 6.

The health event on Day 8 can not be accounted for with the same criteria that were used for the health event events on Days 5, 6, and 7 because these criteria were not met for either drug on Day 7. The health event on Day 8 can be accounted for by persistence from the health event on Day 7.

Notice that the criterion for a Drug 1 dose of 30 or more on 2 or more of 3 consecutive days was met on Days 11, 12, 13, and 14. But values of symptom severity remained below 3 between Days 8 and 15 inclusive. It was not until Day 15 that the criterion also was met for 2 out of 3 consecutive days of treatment with Drug 2. This satisfied the conditions for a Boolean AND treatment event and the health event occurred with a 1-day delay on Day 16.

The health events on Days 17, 18, and 19 are consistent with the criteria for Boolean AND events involving Drug 1 and Drug 2, each at their required levels. However, starting on Day 19, the criteria for the AND Boolean treatment event between Drug 1 and Drug 2 were no longer met. The health event on Day 20 appears to be persistence from the health event on Day 19.

This commentary will be extended to describe how the demonstration might have played out in medical practice when the intent is to help optimize pharmacotherapy for an individual patient suffering from a chronic disorder. The data for the primary demonstration could have been produced under the following circumstances. The patient had been receiving Drug 2 before Drug 1 was being introduced on Day 1. Concern about a possible adverse drug interaction prompted use of a health-effect monitoring program (Section 4.2.2.2). B/H scores were calculated and reviewed after data entry on most days as part of the monitoring program. Analysis parameters and levels were as specified for this demonstration.

The dose of Drug 1 was increased gradually over the first 4 days. The unacceptably high symptom severity ratings starting on Day 5 prompted the temporary suspension of Drug 2 and reductions in the dose of Drug 1. On Days 8 and 24, the patient was non-compliant and failed to take either drug. Starting on Day 9, the dose of Drug 2 was gradually increased to the maximum dose of 40. This, by itself, was not associated with any unacceptable symptom severity ratings on Days 9 through 15. Drug 2 was restarted on Day 14. By Day 15, the criteria for the Boolean AND treatment event were again met, namely, 2 of 3 consecutive days of treatment for both drugs with the dose of Drug 1 being 30 or more. This was associated with a severity rating of 3 or more with a one-day delay on Day 16. Apparent responses on Days 17, 18, and 19 could be accounted for either by persistence from the previous days response or in terms of meeting the criteria for an AND interaction. By Day 19, the criteria for the AND interaction were no longer met because of the reduction in dose of Drug 1. The apparent response on Day 20 is associated with persistence from the previous day's response. Days 21 through 28 suggest that both drugs can be taken together without being associated with unacceptable symptom severity ratings so long as the dose of Drug 1 does not exceed 20.

4.4.3.5. Stage 4—Quantify Longitudinal Associations for Optional Boolean Dependent Events Stage 4. Extend analyses to include investigation of dependent (health) events that require more than one dependent variable.

Stage 4 offers two different options for defining Boolean dependent or health events when there is more than one dependent variable.

Step 23. Offer the option of applying Boolean operators directly to dependent variables to define Boolean health events. If "yes," specify which of the Boolean operators will be investigated for which dependent variables before going to Step 24. If "no," go to Step 24.

Step 24. Offer the option of defining Boolean dependent (health) events by applying Boolean Health Event Scope (BHES) and Boolean Health Event Criterion (BHEC). If "yes," then specify the levels of BHES and BHEC that will be applied and the dependent variables to which they will be applied. If"no," go to Stage 5, Step 25.

Since the data for the primary demonstration include only one dependent variable, Stage 4 will be illustrated with a supplementary demonstration. The data and the results of this demonstration are shown in Table 17. In addition, the data in Table 17 will be used to illustrate transition-on and transition-off events for Boolean dependent events.

The data for the first dependent variable (DV 1) in Table 17 consists of the $y \geq 3$ dichotomous series for symptom severity taken from Table 7 plus dichotomous series for two additional dependent variables. For simplicity, all the data in Table 17 consist of dichotomous series. In practice, all of the dependent variables could be dimensional series that could be converted to dichotomous series and analyzed in accord with the principles already demonstrated.

Steps 23 and 24 offer optional ways to define Boolean dependent (health) events. The option using the BHES and BHEC analysis parameters would be much simpler to implement in certain situations involving more than a few dependent variables. For example, it would be much easier to define a health event consisting of the presence of at least 5 of 8 symptoms by using BHES and BHEC rather than by using Boolean operators directly.

BHES and BHEC are applied in much the same way as TEL and TEC except that BHES and BHEC are investigated across variables at each period while TEL and TEC are investigated across periods for a single variable. BHES is the number of variables across which an event is defined. BHEC is the minimum number of variables for which individual events need to be present on a given period in order for a Boolean health event to be present. The presence of an event is indicated by a "1" in a dichotomous series.

The maximum level of BHES is the number of dependent variables selected by the user for the evaluation of BHES and BHEC. All three of the dependent variables in Table 17 will be used in this demonstration so that the maximum level of BHES is 3. The default level for BHES is 1. The minimum and default levels of BHEC are 1. The maximum level of BHEC is the level of BHES (3 in this demonstration).

The following nine combinations of levels for the BHES and BHEC analysis parameters will be investigated for the data in Table 17:

BHES=3 across DV 1, DV 2, and DV 3
  BHEC≧1, BHEC>2, and BHEC=3
BHES=2 across DV 1 and DV 2
  BHEC≧1 and BHEC=2
BHES=2 across DV 1 and DV 3
  BHEC≧1 and BHEC=2
BHES=2 across DV 2 and DV 3
  BHEC≧1 and BHEC=2.

The dichotomous series for BHES=1, BHEC=1 would be identical to the dichotomous series for the dependent variable to which the analysis parameters are applied and is not illustrated here.

Table 17 illustrates selected applications of Steps 23 and 24. In addition, Table 17 illustrates transition-on and transition-off events for the BHES=2, BHEC=1 across DV 2 and DV 3 Boolean dependent or health event.

TABLE 17

SELECTED APPLICATIONS OF STEPS 23 AND 24 TO DEFINE BOOLEAN DEPENDENT (HEALTH) EVENTS

| Day | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 |
|---|---|---|---|---|---|---|---|---|---|---|---|---|---|---|---|---|---|---|---|---|---|---|---|---|---|---|---|---|
| *Dichotomous series for three dependent variables* | | | | | | | | | | | | | | | | | | | | | | | | | | | | |
| DV 1 | 0 | 0 | 0 | 0 | 1 | 1 | 1 | 1 | 0 | 0 | 0 | 0 | 0 | 0 | 0 | 1 | 1 | 1 | 1 | 1 | 0 | 0 | 0 | 0 | 0 | 0 | 0 | 0 |
| DV 2 | 1 | 1 | 0 | 0 | 0 | 0 | 1 | 1 | 1 | 1 | 1 | 0 | 0 | 0 | 0 | 0 | 1 | 1 | 1 | 1 | 1 | 0 | 0 | 0 | 0 | 0 | 0 | 0 |
| DV 3 | 0 | 0 | 0 | 0 | 0 | 0 | 0 | 0 | 0 | 0 | 0 | 0 | 0 | 0 | 0 | 0 | 1 | 1 | 1 | 1 | 1 | 1 | 1 | 1 | 0 | 0 | 0 | 0 |
| *1. DV 1 AND DV 2* | | | | | | | | | | | | | | | | | | | | | | | | | | | | |
|  | 0 | 0 | 0 | 0 | 0 | 0 | 1 | 1 | 0 | 0 | 0 | 0 | 0 | 0 | 0 | 0 | 1 | 1 | 1 | 0 | 0 | 0 | 0 | 0 | 0 | 0 | 0 | 0 |
| *2. DV 1 AND DV 2 AND DV 3* | | | | | | | | | | | | | | | | | | | | | | | | | | | | |
|  | 0 | 0 | 0 | 0 | 0 | 0 | 0 | 0 | 0 | 0 | 0 | 0 | 0 | 0 | 0 | 0 | 1 | 1 | 1 | 0 | 0 | 0 | 0 | 0 | 0 | 0 | 0 | 0 |
| *3. DV 1 AND NOT DV 2* | | | | | | | | | | | | | | | | | | | | | | | | | | | | |
|  | 0 | 0 | 0 | 0 | 1 | 1 | 0 | 0 | 0 | 0 | 0 | 0 | 0 | 0 | 0 | 1 | 1 | 0 | 0 | 0 | 0 | 0 | 0 | 0 | 0 | 0 | 0 | 0 |
| *4. DV 1 OR DV 3* | | | | | | | | | | | | | | | | | | | | | | | | | | | | |
|  | 0 | 0 | 0 | 0 | 1 | 1 | 1 | 1 | 0 | 0 | 0 | 0 | 0 | 0 | 0 | 1 | 1 | 1 | 1 | 1 | 1 | 1 | 1 | 1 | 0 | 0 | 0 | 0 |
| *5. DV 1 OR DV 2 OR DV 3* | | | | | | | | | | | | | | | | | | | | | | | | | | | | |
|  | 1 | 1 | 0 | 0 | 1 | 1 | 1 | 1 | 1 | 1 | 1 | 0 | 0 | 0 | 0 | 1 | 1 | 1 | 1 | 1 | 1 | 1 | 1 | 1 | 0 | 0 | 0 | 0 |
| *6. DV 1 OR DV 2 AND DV 3* | | | | | | | | | | | | | | | | | | | | | | | | | | | | |
|  | 0 | 0 | 0 | 0 | 0 | 0 | 0 | 0 | 0 | 0 | 0 | 0 | 0 | 0 | 0 | 0 | 1 | 1 | 1 | 1 | 1 | 0 | 0 | 0 | 0 | 0 | 0 | 0 |
| *7. DV 2 XOR DV 3* | | | | | | | | | | | | | | | | | | | | | | | | | | | | |
|  | 1 | 1 | 0 | 0 | 0 | 0 | 1 | 1 | 1 | 1 | 1 | 0 | 0 | 0 | 0 | 0 | 0 | 0 | 0 | 0 | 0 | 1 | 1 | 1 | 0 | 0 | 0 | 0 |
| *8. DV 2 NOR DV 3* | | | | | | | | | | | | | | | | | | | | | | | | | | | | |
|  | 0 | 0 | 1 | 1 | 1 | 1 | 0 | 0 | 0 | 0 | 0 | 1 | 1 | 1 | 1 | 1 | 0 | 0 | 0 | 0 | 0 | 0 | 0 | 0 | 0 | 1 | 1 | 1 |
| *Dichotomous series for three dependent variables* | | | | | | | | | | | | | | | | | | | | | | | | | | | | |
| *9. DV 1 NOR DV 2 NOR DV 3* | | | | | | | | | | | | | | | | | | | | | | | | | | | | |
|  | 0 | 0 | 1 | 1 | 0 | 0 | 0 | 0 | 0 | 0 | 0 | 1 | 1 | 1 | 1 | 0 | 0 | 0 | 0 | 0 | 0 | 0 | 0 | 0 | 0 | 1 | 1 | 1 |
| *10. BHES = 3, BHEC ≧ 1 across DV 1, DV 2, and DV 3* | | | | | | | | | | | | | | | | | | | | | | | | | | | | |
|  | 1 | 1 | 0 | 0 | 1 | 1 | 1 | 1 | 1 | 1 | 0 | 0 | 0 | 0 | 1 | 1 | 1 | 1 | 1 | 1 | 1 | 1 | 1 | 1 | 0 | 0 | 0 | 0 |
| *11. BHES = 3, BHEC ≧ 2 across DV 1, DV 2, and DV 3* | | | | | | | | | | | | | | | | | | | | | | | | | | | | |
|  | 0 | 0 | 0 | 0 | 0 | 0 | 1 | 1 | 0 | 0 | 0 | 0 | 0 | 0 | 0 | 0 | 1 | 1 | 1 | 1 | 0 | 0 | 0 | 0 | 0 | 0 | 0 | 0 |
| *12. BHES = 3, BHEC = 3 across DV 1, DV 2, and DV 3* | | | | | | | | | | | | | | | | | | | | | | | | | | | | |
|  | 0 | 0 | 0 | 0 | 0 | 0 | 0 | 0 | 0 | 0 | 0 | 0 | 0 | 0 | 0 | 0 | 1 | 1 | 1 | 0 | 0 | 0 | 0 | 0 | 0 | 0 | 0 | 0 |
| *13. BHES = 2, BHEC ≧ 1 across DV 1 and DV 2* | | | | | | | | | | | | | | | | | | | | | | | | | | | | |
|  | 1 | 1 | 0 | 0 | 1 | 1 | 1 | 1 | 1 | 1 | 1 | 0 | 0 | 0 | 0 | 1 | 1 | 1 | 1 | 1 | 1 | 1 | 0 | 0 | 0 | 0 | 0 | 0 |
| *14. BHES = 2, BHEC = 2 across DV 1 and DV 2* | | | | | | | | | | | | | | | | | | | | | | | | | | | | |
|  | 0 | 0 | 0 | 0 | 0 | 0 | 1 | 1 | 0 | 0 | 0 | 0 | 0 | 0 | 0 | 0 | 1 | 1 | 1 | 0 | 0 | 0 | 0 | 0 | 0 | 0 | 0 | 0 |
| *15. BHES = 2, BHEC ≧ 1 across DV 1 and DV 3* | | | | | | | | | | | | | | | | | | | | | | | | | | | | |
|  | 0 | 0 | 0 | 0 | 1 | 1 | 1 | 1 | 0 | 0 | 0 | 0 | 0 | 0 | 0 | 1 | 1 | 1 | 1 | 1 | 1 | 1 | 1 | 1 | 0 | 0 | 0 | 0 |
| *16. BHES = 2, BHEC = 2 across DV 1 and DV 3* | | | | | | | | | | | | | | | | | | | | | | | | | | | | |
|  | 0 | 0 | 0 | 0 | 0 | 0 | 1 | 1 | 0 | 0 | 0 | 0 | 0 | 0 | 0 | 0 | 0 | 0 | 0 | 1 | 1 | 0 | 0 | 0 | 0 | 0 | 0 | 0 |
| *17. BHES = 2, BHEC = 1 across DV 2 and DV 3* | | | | | | | | | | | | | | | | | | | | | | | | | | | | |

TABLE 17-continued

SELECTED APPLICATIONS OF STEPS 23 AND 24 TO DEFINE
BOOLEAN DEPENDENT (HEALTH) EVENTS

| Day | | | | | | | | | | | | | | | | | | | | | | | | | | | |
|---|---|---|---|---|---|---|---|---|---|---|---|---|---|---|---|---|---|---|---|---|---|---|---|---|---|---|---|
| 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 |
| 1 | 1 | 0 | 0 | 0 | 0 | 1 | 1 | 1 | 1 | 1 | 0 | 0 | 0 | 0 | 0 | 0 | 1 | 1 | 1 | 1 | 1 | 1 | 1 | 1 | 0 | 0 | 0 |

18. Transition-on events for the BHES = 2, BHEC = 1 across DV 2 and DV 3
Boolean dependent (health) events, Series 17 above

| — | 0 | 0 | 0 | 0 | 0 | 1 | 0 | 0 | 0 | 0 | 0 | 0 | 0 | 0 | 0 | 0 | 1 | 0 | 0 | 0 | 0 | 0 | 0 | 0 | 0 | 0 | 0 |
|---|---|---|---|---|---|---|---|---|---|---|---|---|---|---|---|---|---|---|---|---|---|---|---|---|---|---|---|

19. Transition-off events for the BHES = 2, BHEC = 1 across DV 2 and DV 3
Boolean dependent (health) events, Series 17 above

| — | 0 | 1 | 0 | 0 | 0 | 0 | 0 | 0 | 0 | 0 | 1 | 0 | 0 | 0 | 0 | 0 | 0 | 0 | 0 | 0 | 0 | 0 | 0 | 1 | 0 | 0 | 0 |
|---|---|---|---|---|---|---|---|---|---|---|---|---|---|---|---|---|---|---|---|---|---|---|---|---|---|---|---|

20. BHES = 2, BHEC = 2 across DV 2 and DV 3

| 0 | 0 | 0 | 0 | 0 | 0 | 0 | 0 | 0 | 0 | 0 | 0 | 0 | 0 | 0 | 0 | 1 | 1 | 1 | 1 | 1 | 0 | 0 | 0 | 0 | 0 | 0 | 0 |
|---|---|---|---|---|---|---|---|---|---|---|---|---|---|---|---|---|---|---|---|---|---|---|---|---|---|---|---|

Dichotomous series that result from the application of Steps 23 and 24 are numbered in Table 17 to facilitate discussion. For the sake of this discussion, it will be assumed that the DVs represent symptoms. In practice, the DVs could represent many variables that can be measured repeatedly.

Series 1 and 2 represent Boolean dependent or health events defined across either two or three symptoms respectively. This option could be useful, for example, to users who want to quantify the apparent benefit/harm of therapy across sets of major signs or symptoms used to define particular medical conditions.

Series 3 illustrates how AND and NOT could be used together to define health events that require the presence of one or more symptoms in the required absence of one or more other symptoms.

Series 4 and 5 represent health events defined as being present if any one or more of a set of specified symptoms are present. Here is a specific example of how the OR operator could be used. Tricyclic antidepressants are associated with anti-cholinergic side effects such as dry mouth, urinary retention, blurred vision, and impaired concentration. Different patients who take these drugs may experience these symptoms differently. Investigators would have the option of saying that a patient experienced anti-cholinergic side effects during a particular reporting period if the patient reported one or more of the specific symptoms.

Series 6 represents more complex ways in which health events could be defined across dependent variables when there are more than two dependent variables. In this case the complex event is the occurrence of an event on either or both DV 1 and DV 2 and an event on DV 3. Series 6 illustrates how very complex events can be defined across multiple dependent variables.

Series 7 represents an application of the XOR Boolean operator across two dependent variables. An event defined by the XOR operator is said to be present only when one of the individual events is present.

Series 8 and 9 represent applications of the NOR Boolean operator. Here an event is said to be present only in the absence of events on the dependent variables it is defined across. Investigators could use this option, together with others options, to say for example that a drug is safe and effective only in the absence of certain specified side effects.

Series 10 through 17 and Series 20 represent the nine combinations of BHES and BHEC identified in Step 24. It is important to note that these options produce dichotomous series that also could be produced directly by Boolean operators. For example, Series 2 which identifies Boolean AND events across the three dependent variables is identical to Series 12 for BHES=3 and BHEC=3. The option provided by Step 24 often provides a simpler way to identify complex events than the option provided by Step 23. To illustrate, consider this example. The diagnosis of mental health disorders often includes criteria of the following form. In order for a particular diagnosis to be present, the patient must manifest at least 5 of 8 specified symptoms. Investigators may want to investigate a treatment in accord with such diagnostic criteria. It would be much easier to accomplish this by selecting the BHES and BHEC option in Step 24 rather than by using Boolean operators to identify all 93 different ways that a patient could manifest at least 5 of 8 specified symptoms.

A procedure analogous to the use of BHES and BHEC to define Boolean dependent (health) events in Step 24 could be applied to independent variables.

Step 25. Repeat Step 8. Namely, pair the dichotomous series for each treatment (independent) event with the dichotomous series for each health (dependent) event. Form the 2×2 tables for these pairings and compute the LAS or B/H score for each pairing as shown in Section 4.1.1. Also compute values of the measures of strength of longitudinal association (Section 4.1.6) that correspond with each LAS or B/H score.

The dichotomous Boolean dependent (health) event series formed from two or more dependent variables would be paired with all the dichotomous independent (treatment) event series produced during Stages 1 through 3 of this analysis. LASs or B/H scores and values for the strength of longitudinal association measures would be calculated from these pairings.

Stages 5 through 8 are presented in less detail than the earlier stages. The intent is to show additional ways in which the method and system can be developed and how these additional developments would build upon Stages 1 through 4.

4.4.3.6. Stage 5—Quantify Longitudinal Associations for Additional Analysis Options Stage 5. Offer the option of extending analyses by applying any additional analysis options including options described in Section 4.1.14.

Step 26. Offer the option of applying additional levels of optional analysis parameters or of defining additional Boolean independent or Boolean dependent events.

This step would provide users the option of going back and selecting additional analysis parameters, levels of analysis parameters, or ways of defining Boolean events. These would be in addition to the options selected during previous analysis cycles through Stages 2 through 4.

Step 27. Offer the option of creating additional analysis parameters or of creating new ways to define independent and dependent events.

This step would provide users with a set of tools to implement the option of creating new operationally defined procedures to define independent and dependent events that would be analyzed with LASs or B/H scores. These events would be defined and applied in accord with the principles illustrated by previous options described in Section 4.1.14.

4.4.3.7. Quantify Longitudinal Associations as Functions of Period or Time (Sequential LASs and B/H Scores)

Stage 6. Offer the option of analyzing LASs or B/H scores sequentially. Stage 6 would implement the procedures described in Section 4.1.15.

Sequential LASs or B/H scores are obtained by computing LASs or B/H scores and values of the strength of longitudinal association measures after each additional period after the first. The results will be described in part by using data in Table 14. Day 5 is the first day the health event occurred. For this reason it is the first day on which the B/H score could be different from 0. The B/H score, based on data for days 4 and 5 from Table 14, is −1 and the values for all three strength of longitudinal association measures are −1. A B/H score of −1 provides very little evidence for a longitudinal association even though values of the strength of longitudinal association measures indicate that the association is at maximum strength. B/H scores would increase rather steadily in magnitude from −1 on Day 5 to −14.153 on Day 28. Values of the strength of longitudinal association measures would remain constant at −1 throughout this interval for the data in Table 14.

The procedures for analyzing sequential B/H scores can greatly increase need for computer resources and produce an extraordinary amount of information. The following two steps illustrate flexible ways of summarizing and analyzing sequential B/H scores.

Step 28. Offer the option to calculate and summarize sequential LASs or B/H scores for target dependent events. If "yes," follow procedures described below. If "no," go directly to Step 29.

This option could be run during the course of computing LASs or B/H scores for Stages 1 through 3 of the analysis. Target health events would be identified at Step 7. The main computational step for each stage (Step 8 for Stage 1, Step 16 for Stage 2, and Step 21 for Stage 3) would be rerun after the addition of data for each additional period after the first. The most extreme LAS or B/H score after each period for each target dependent event would be identified and stored together with the number of the period on which it was observed, values of the strength of longitudinal association measures and the identity of the treatment event that yielded the most extreme LAS or B/H score. All this information for each dependent event would be updated if a subsequent LAS or B/H score were more extreme in absolute value than any previous LAS or B/H score for the same health event. At the end of such an analysis, the investigator could examine a summary of sequential B/H scores for each target health event and identify any that warrant additional study. B/H scores identified in this manner could be analyzed in more detail during Step 29.

Step 29. Offer the option of computing sequential LASs or B/H scores for specified pairs of independent and dependent events defined during previous stages of the analysis. If "yes," specify the event pairs for which sequential LASs or B/H scores would be computed before going to Stage 7, Step 30. If "no," go to Step 30.

For each specified independent and dependent event pair, the program would calculate and present LAS or B/H score and values for the strength of longitudinal association measures after each additional period.

4.4.3.8. Stage 7—Use LASs or B/H Scores to Compute Optional Predictive Indices

Stage 7. Offer the option of computing values of predictive indices. Predictive indices were described briefly in Section 4.1.17.

Step 30. Offer the option of calculating values of predictive indices. If "yes," specify the dependent variable that is to be predicted and apply the procedures described below before going to Step 31. If "no," go to Step 31.

The third supplementary demonstration will be used to illustrate the central procedure for calculating values of predictive indices. In addition, the value of these indices and a few strategic options for computing them are discussed briefly.

The U. S. Index of Leading Economic Indicators is a well-known example of a predictive index. It is predictive of gross national product (GNP). Predictive indices calculated by the method and system for the quantitative analysis of longitudinal associations could serve a similar function. Predictive indices derived from LASs are designed to predict fluctuations from longer-term trends. In general, predictive indices could be calculated to use information from two or more independent or predictor variables for predicting values of a dependent or predicted variable.

Suppose one wants to test the method and system by comparing the predictive performance of an index calculated with the method and system to the performance of the U. S. Index of Leading Economic Indicators. Predictive performance of indices can be quantified and compared as follows. First, compute the standardized residuals between values of an index and a regression line through the values of the index over the study interval. Second, repeat the first step for each index. Third, repeat the first step for the predicted values. Use the same type of linear or nonlinear regression line for each of the first three steps. Forth, compute the average of the squared deviations between the residuals for each index and the residuals for the predicted values across the study interval. Lower values of this average indicate better predictive performance.

In order to focus the comparison on the methodology, the new index would be calculated from the same data used by the established index. At the time of an earlier demonstration, the U. S. Index of Leading Economic Indicators was based on data for 12 predictor variables. This is how one could proceed. Many of the specifics could be changed depending on the interests of investigators and the availability of data.

First one needs to select the length of the "window of experience" one would use, the temporal resolution of the analysis, and the specific objective of the index one is going to calculate. For these, suppose one chooses to use a 20-year window of experience, that one is going to use quarterly data that provides a temporal resolution of 3 months, and that one decides to develop an index predictive of GNP 6 months in the future (the prediction interval).

Since the established index of leading economic indicators is not as specific about the prediction interval, one could chose to investigate several new indices with a range of predictive intervals. These intervals would have to be consistent with temporal resolution of the data. For example one could chose to investigate indices with predictive intervals of 3, 6, 9, 12 and 15 months when analyzing quarterly data. For simplicity, one interval, a 6-month interval, will be illustrated here.

Suppose that one wants to compare the performance of the new and established index as a predictor of GNP over a period of time such as a test interval of 10 years. Since one does not want to wait 10 years to get the result, it is decided to conduct a type of prospective study using available data. For such a study, each value of the new index would be calculated only from data that would have been available at least 6 months (the prediction interval) before the value of GNP that the value of the index would be used to predict. Consider the first value of the new predictive index that would be calculated for the 10-year test period. This value would be calculated from data for 82 consecutive repeated quarterly measurements of the 12 predictors and GNP covering a 20½-year period (the 20-year window plus the 6-month prediction interval) ending 6 months before the value of GNP that the value of the index would be used to predict. For the next value of the predictive index, one would drop data for the oldest measurement and add data for the next more recent measurement.

With these things established, one is prepared to go through the analysis steps described above. Step 1 involves inputting the right data. The quarterly data would consist of the 13 variables covering a period of time starting 20½ years before the test interval through 6 months before the end of the test interval. Each successive value of the index would be calculated from a somewhat different portion of the data as described above.

At Step 2 one would identify the 12 predictors as independent variables and GNP as the dependent variable. At Step 3 the direction of all variables is set so that 1S in the dichotomous series will represent "worse" conditions as determined by preliminary examinations of LASs between the predictor variables and GNP. For example, larger numbers of new unemployment claims and small numbers of housing starts will be considered "worse." One doesn't need the option offered in Step 4.

Step 5 provides very important options when calculating indices. Two options would be performed in sequence. First, indices computed with this procedure are designed to predict short-term fluctuations relative to the longer-term trends that could be identified with regression procedures. Given that a 20-year window of experience was selected, the "longer-term" trend would be assessed over 20 years. Also, suppose that a linear, rather than non-linear trend was selected. To accomplish this, one would select to transform each of the 13 variables by computing the residuals from the linear regression line for each variable. For GNP, negative residuals will be referred to as indicating weak economic activity relative to the 20-year trend. Positive residuals will indicate relatively strong economic activity. The magnitude of the residuals would indicate degrees of economic strength or weakness.

Second, one also could select to simplify analyses by reducing the dimensional resolution to between 7 and 13 intervals based on z-score intervals. One is now ready to convert each variable into a set of dichotomous series (Step 6). Steps 5 and 6 would have to be repeated for each successive value of the index because each value would be based on a somewhat different portion of the data. Analyses will not be targeted in Step 7.

Stage 1 of the analysis, beginning with Step 8, is limited to the default level of D which is 0. The desired index requires investigation of D=2 since the temporal resolution is 3 months and the prediction interval is 6 months. For this reason, one can go directly to Stage 2 of the analysis.

Steps 10 and 11 in Stage 2 offer the options of evaluating TEL and TEC. Although selecting optional levels of TEL and TEC could only improve the predictive performance of the new index, these options are foregone here. One would select D=2 at Step 12. Step 13 would allow optional levels of P that could improve predictive performance. Again, for simplicity, this option is foregone. Similarly, the options in Steps 15 and 16 are forgone.

The LASs would be calculated during Step 16. Actually Step 16 would have to be repeated 40 times for each of the 12 predictor variables, once for each successive value of the predictive index over the 10-year study interval. As described above, each successive value of the index would be calculated from data that adds results from a more recent measurement and drops data from the most distant measurement.

Calculation of values of the predictive index using the type of information that would be derived from the LASs calculated during Step 16 is now demonstrated. Step 16 would yield 480 LAS score arrays for which D=2. One of these arrays would correspond to each combination of the 12 predictors with each quarter over the 10-year study interval. These arrays would be used as follows to form a table, a portion of which is shown in Table 18. Table 18 shows the first 24 of the 40 quarters.

Each entry in the body of Table 18 is based on one of the 480 D=2 LAS arrays. Each of these arrays has two dimensions, independent variable level and GNP level. Select the most extreme negative LAS from each array. Determine the last cell assignment (a, b, c or d) for the 2×2 table that was used to calculate this LAS. Enter this cell assignment in the appropriate place of a table partially illustrated by Table 18. Table 1 illustrates how cell assignments are labeled when cross-classifying pairs of dichotomous series.

Table 18 shows the cell assignments used to calculate values of the predictive index. The actual values shown in Table 18 are from a similar demonstration that used a 12-year stationary window of experience that corresponded to the 12-year study interval. The cell assignments are for the value of D that yielded the most extreme LAS. The actual period of time represented by Table 18 ranges from approximately the second quarter of 1972 to the second quarter of 1978.

Rows 1 through 12 in Table 18 represent the 12 independent or predictor variables. The columns labeled 1 through 24 correspond to 24 consecutive quarters. The full table for this demonstration would have 40 columns, one for each quarter in the 10-year study interval. The letters a, b, c, and d, identify cells form a 2×2 table such as the one shown in Table 9. As explained earlier in this section, each of the cell assignment entries is the last cell assignment used to compute the most extreme LAS in an array corresponding to D=2 for a given predictor at a given quarter.

Each cell assignment shown in Table 18 would be based on a 20-year moving window of experience of the longitudinal association between an independent variable and GNP. Selection of the most extreme LAS in an array helps assure that the cell assignment is based on the conditions that provide the most predictive power. A d-cell assignment indicates that the predictor is consistent with relatively high levels of GNP. Given the way the directions of variables were set in Step 3, high GNP would be indicated by, for example, high levels of new housing starts or low levels of new unemployment claims.

Each a-cell assignment in Table 18 would be consistent with relatively low levels of GNP. Each b-cell and c-cell assignment is inconsistent with predictions of either higher or lower GNP.

The formula for calculating a value of the index is based on the count of d-cell and a-cell entries across predictor variables for a given quarter. These counts, labeled as $D_c$ and $A_c$ respectively, are included near the bottom of Table 18.

The formula for calculating values of the new predictive index is $100(D_c-A_c)/n$ where $D_c$ equals the count of d-cell assignments, AC equals the count of a-cell assignments, and n equals the number of predictor variables.

The weights for the individual predictors are equal in the formula as shown. The performance of the resulting index was very good. However, it would appear to be highly desirable to weight the individual predictors in accord with their contribution to improving predictive performance as quantified above. Without unequal weights, inclusion of a predictor that could make a small contribution to predictive performance if appropriately weighted could actually weaken predictive performance by diluting the contributions of more powerful predictors.

One feasible approach to weighting independent variables or predictors while computing values of predictive indices is to set a modest number of particular optional weights for each variable, calculate values of the predictive index with each combination of weights for the set of predictors, investigate the predictive performance across the study interval for all combinations of weights, select the combination of weights that yields the best predictive performance, and use the value of the index calculated with these weights to make a prediction. This proposal would become more computational intensive as the number of predictors and the number of different weights increases but would appear to work very well.

Values of the predictive index can range from −100 to 100. Positive values would predict relatively high GNP relative to the trend over the window of experience. Negative values would predict relatively low GNP. Magnitudes of predictive index values would indicate the consistency of evidence for the prediction.

Although not illustrated above, the procedure for calculating predictive indices could be enhanced by including additional analysis parameters such as persistence, episode length, and episode criterion.

TABLE 18

CELL ASSIGNMENTS USED TO CALCULATE VALUES OF A PREDICTIVE INDEX

PERIODS (Quarters)

| IV | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| 1 | d | d | d | d | c | a | a | a | a | a | a | b | a | b |
| 2 | d | d | d | d | d | a | a | a | a | a | a | b | a | a |
| 3 | d | d | d | d | d | a | a | a | a | a | a | a | a | a |
| 4 | d | d | d | d | d | d | a | a | a | b | d | d | d | d |
| 5 | d | d | d | d | d | d | b | b | b | a | a | a | b | a |
| 6 | d | d | d | b | b | b | a | a | a | a | a | a | a | a |
| 7 | d | d | d | d | c | a | a | a | a | a | a | a | a | a |
| 8 | d | d | d | d | d | b | a | a | a | a | a | a | b | b |
| 9 | d | d | c | c | a | a | a | a | a | a | a | b | a | a |
| 10 | d | d | d | d | d | d | c | a | a | a | a | d | d | d |
| 11 | c | c | c | a | a | a | a | a | a | a | a | a | a | a |
| 12 | d | d | d | a | a | a | a | a | a | a | a | a | a | a |

Cell Counts

| | | | | | | | | | | | | | | |
|---|---|---|---|---|---|---|---|---|---|---|---|---|---|---|
| $D_c$ | 11 | 11 | 10 | 8 | 6 | 3 | 0 | 0 | 0 | 0 | 1 | 2 | 2 | 2 |
| $A_c$ | 0 | 0 | 0 | 2 | 3 | 7 | 10 | 11 | 11 | 11 | 11 | 7 | 8 | 8 |

Predictive Index Values

| 92 | 92 | 83 | 50 | 25 | −33 | −83 | −92 | −92 | −92 | −83 | −42 | −50 | −50 |

PERIODS (Quarters)

| IV | 15 | 16 | 17 | 18 | 19 | 20 | 21 | 22 | 23 | 24 |
|---|---|---|---|---|---|---|---|---|---|---|
| 1 | a | b | d | d | d | d | d | d | d | d |
| 2 | a | a | d | d | d | d | d | d | d | d |
| 3 | a | b | d | d | d | d | d | d | d | d |
| 4 | d | d | d | d | d | d | d | d | d | d |
| 5 | a | d | d | d | d | d | d | d | d | c |
| 6 | a | a | a | a | a | d | d | d | d | d |
| 7 | a | a | d | d | d | d | d | d | d | d |
| 8 | b | a | d | d | d | d | d | d | d | d |
| 9 | a | d | d | d | d | d | d | d | d | d |
| 10 | d | d | d | d | c | d | d | d | d | d |
| 11 | a | a | a | a | a | b | d | d | d | d |
| 12 | a | a | b | b | b | b | d | d | d | d |

Cell Counts

| | | | | | | | | | | |
|---|---|---|---|---|---|---|---|---|---|---|
| $D_c$ | 2 | 4 | 9 | 9 | 8 | 9 | 12 | 12 | 12 | 11 |
| $A_c$ | 10 | 6 | 2 | 2 | 2 | 1 | 0 | 0 | 0 | 0 |

Predictive Index Values

| −67 | −17 | 58 | 58 | 50 | 67 | 100 | 100 | 100 | 92 |

The procedure for calculating values of predictive indices that has been described above assumes that the contributions of individual predictors to predictive performance are essentially additive as described above. Stage 3 of the analysis could be used to identify Boolean predictive events when predictors do not contribute additively to predictive performance. In this case, subsets of predictors could be used to define Boolean predictive events. LASs would be computed between these new predictive events and the predicted variable. The LAS arrays resulting from these computations would be used to calculate values of predictive indices in exactly the same way as described for Table 18. Values of the predictive index could be based on any number or combination of different Boolean predictor events and predictor events defined on individual independent variables.

The procedure for calculating predictive indices also can be extended to Stage 4 with Boolean predicted events defined across two or more predicted variables. For example, it would be possible to develop an index predictive of both high GNP and high levels of a population based measure of satisfaction with economic conditions.

In many instances, hundreds or thousands of potential predictive variables are available for making economic, investment, or business predictions. An important problem is the selection of a relatively small but optimal subset of these variables for making predictions. For example, what are the 7 most important predictors to consider when predicting levels of the predicted variable? A major challenge in selecting optimal subsets of predictors is that the individual predictors may be associated with each other. If individual predictors are associated with each other, LASs between the predictors and the predicted variable may not provide the information required to identify optimal subsets of predictors for a predictive index.

The following 3-step approach can be developed to identify optimal subsets of predictors for calculating values of predictive indices. First, compute LAS arrays for each individual predictor and the predicted variable. Identify the LAS with the most extreme value in each of these arrays. Select the predictor that yields the extreme LAS with the largest magnitude as the first predictor in the optimal subset. Second, pair the first predictor in the optimal subset with every other potential predictor. Compute values of the predictive index as illustrated for Table 18 for each pair. Investigate the predictive performance over a study interval of each pair as described above. The next predictor in the optimal subset would be the potential predictor that yielded the best predictive performance when combined with the previously selected predictor. Third, repeat the second step m—1 times to identify an optimal subset of predictors of size m.

4.4.3.9. Stage 8—Offer the Option Reanalyzing Data after Resetting Functions of Variables and Analytic Options Stage 8. Stage 8 offers the option of changing the way variables function as independent and dependent variables before reanalyzing data.

Step 31. Offer the option of returning to Step 2 and changing the way that any or all of the variables function as independent and dependent variables before reanalyzing the data with either the previously selected or new analysis options.

The primary demonstration considered how drug use was associated with symptom severity. Stage 8 of the analysis would facilitate, for example, the option of analyzing how symptoms may affect drug use. Section 4.1.9 illustrates another example of the use of this feature.

The option of being able to reverse the function of variables in analyses also would be valuable for many applications in economics, investing, and business intelligence. For example, new plant and equipment investment is a component of the index of leading economic indicators that is designed to predict GNP. Some analyses suggest that even though new plant and equipment investment is useful as a predictor of GNP, GNP may be an even better predictor of investment in new plant and equipment.

4.4.4. Presentation and Summarization of Results

The steps enumerated above provided little information about presenting and summarizing results. These issues, however, should be addressed in the specifications for any practical program. Therefore, they are discussed here. Sections 2.1 and 4.1.3 illustrated the summarization of LAS and B/H score arrays.

Results of analyses generally would be presented separately for the different stages. An exception would be for the results of Step 26 that should be consolidated with results from earlier stages. Users should have options to specify which displays they want to see. Tables 19 and 20 illustrate formats for presenting results from the primary demonstration. Descriptions of these tables include commentary about summarizing and interpreting results.

Results from Stage 1 could be presented as a table for each combination of one independent variable with one dependent variable. Table 19 illustrates the presentation of results for Drug 1 and symptom severity.

TABLE 19

Format for Displaying Results From Stage 1 of the Analysis

|  |  |  | $y \geq 1$ | $y \geq 2$ | $y \geq 3$ | $y = 4$ | Extremes |
|---|---|---|---|---|---|---|---|
| Level of Drug 1 | $x \geq 10$ | B/H score S $S_{denom}$ |  |  |  |  |  |
|  | $x \geq 20$ | B/H score S $S_{denom}$ |  |  |  |  |  |
|  | $x \geq 30$ | B/H score S $S_{denom}$ |  |  |  |  |  |
|  | $x = 40$ | B/H score S $S_{denom}$ |  |  |  |  |  |
| Extremes |  | B/H score S $S_{denom}$ |  |  |  |  |  |

The array presented in Table 19 would include the LAS for each combination of level of Drug 1 with level of symptom severity. Each LAS would be presented with the value of the corresponding value(s) of one or more of the strength of longitudinal association measures selected by the user. Values of each strength of longitudinal association measure would be presented with its denominator, ($S_{denom}$).

Values of the strength of longitudinal association measures and their denominators can play important roles when interpreting LASs and B/H scores. LASs, B/H scores, and values of the strength of longitudinal association measures could be small or zero for two very different reasons. First, these scores and values can be small or zero when the data provide much information for investigating longitudinal associations. In this case, if the value of a particular $S_{denom}$ is large, the user could conclude that the LAS had been adequately investigated and that the LAS is either very weak or nonexistent. On the other hand, LASs, B/H scores, and values of the strength of longitudinal association measures could be small or zero because the data did not provide any or only a small amount of information for evaluating the longitudinal associations. In this case, $S_{denom}$ would also be small or equal to zero and the user could conclude that the LAS had not been adequately investigated.

Here is an example from the results of the primary demonstration for which the B/H score and values for all the strength of longitudinal association measures and their denominators would all be zero. Consider the dichotomous treatment event series for Drug 1, x≧10, TEL=4, and TEC ≧1 in Table 11. This series consists of 1S for all determinate values. There is no variation in the occurrence of this treatment event and the b+d marginal frequency of the 2×2 table would be 0. The B/H score could only be zero because there were no periods (days) for which the event could be investigated and was found to be absent. B/h scores always are zero if either the treatment or the health events are either never or always present. In such instances, users could conclude that the longitudinal association had not been adequately investigated because the data provided no information for investigating the association.

Table 19 includes columns and rows labeled "extremes." These columns and rows would show the most extreme positive or negative value in the corresponding column or row. Such extreme values are used to summarize the results of analyses performed with the method and system. For example, the column for the extreme values of B/H scores in Table 19 would show benefit and harm as a function of drug dose across levels of symptom severity. The row for the extreme value of B/H scores would show benefit and harm as a function of symptom severity level across drug dose. FIG. 3 in previously cited publication by Bagne and Lewis also illustrates this type of summary.

Tables that present results from applying the method and system for the quantitative analysis of longitudinal associations also should emphasize the most extreme LAS or B/H score in the entire table. Showing this score in bold type could do this. The most extreme score is a summary of the entire array. For Table 19, the most extreme B/H score would be a high level summary of the longitudinal association between Drug 1 and symptom severity. The coordinates of the most extreme value in such arrays identify the type of independent (treatment) event and the type of dependent (health) event that provided the most evidence for a longitudinal association.

When there are two or more dependent variables, the most extreme LAS or B/H score for each dependent variable could be presented as profile similar to FIG. 1 in the previously cited publication by Bagne and Lewis. B/H scores for different dependent variables can be averaged to provide measures of overall benefit and harm as described in Section 4.1.20. Summary LASs, summary B/H scores, and overall B/H scores from two or more individuals can be analyzed statistically as indicated in Sections 2.4, 2.5 and 2.6.

Relatively advanced versions of the analysis software could include more advanced display options. For example, users would be able to click on particular LASs or B/H scores and be given options to select certain additional displays. These additional displays would include options to view the pair of dichotomous treatment event and health event series from which the LAS or B/H score was calculated, the 2×2 table for the LAS or B/H score, and values for the optional strength of longitudinal association measures presented in Section 4.1.6.

Results from Stage 2 of analyses can be presented and summarized in a manner analogous to that shown and described for Stage 1. The primary difference is that the arrays would have additional dimensions to represent TEL, TEC, D, P, HEL, and HEC.

Table 20 illustrates how the full array of 25,560 B/H scores that result from Stage 3 of the analysis of data for the primary demonstration can be displayed. Table 20 includes the values of S and $S_{denom}$ that correspond to each B/H score. Users should have the option to select any or all of the strength of longitudinal association measures to include in a presentation of results. All 25,560 B/H scores could be included in a table with 355 sections, one section of which is shown in Table 20. The resulting table would be the most detailed presentation of results for the Stage 3 analysis of data for the primary demonstration.

The entire array of standardized B/H scores for Stage 3 of the analysis for the primary demonstration could be summarized to various degrees as illustrated for Stage 1. The most extreme B/H score in the full table of which Table 20 is one of 355 parts has a value of −14.153 that is obtained from the 2×2 table shown in Table 15.

Section 4.2.4.4 presents a special instance of presenting and displaying results from analyses of serial functional images.

TABLE 20

FORMAT FOR DISPLAYING RESULTS FROM STAGE 3
OF THE ANALYSIS
Drug 1, x ≧ 30, TEL = 3, TEC ≧ 2 paired with
Drug 2, TEL = 3, TEC ≧ 2

| | Symptom Severity | | | |
|---|---|---|---|---|
| | y ≧ 1 | y ≧ 2 | y ≧ 3 | y = 4 | Extremes |

Drug 1 AND Drug 2
D[B] = 0, P[B] = 1
B/H score
S
$S_{denom}$
D[B] = 0, P[B] = 2
B/H score
S
$S_{denom}$
D[B] = 0, P[B] = 3
B/H score
S
$S_{denom}$
D[B] = 1, P[B] = 1
B/H score
S
S denom
D[B] = 1, P[B] = 2
B/H score
S
$S_{denom}$
D[B] = 1, P[B] = 3
B/H score
S
$S_{denom}$
D[B] = 2, P[B] = 1
B/H score
S
$S_{denom}$
D[B] = 2, P[B] = 2
B/H score
S
$S_{denom}$
D[B] = 2, P[B] = 3
B/H score
S
$S_{denom}$
Extremes
B/H score
S
$S_{denom}$
Drug 1 OR Drug 2

B/H score
S
$S_{denom}$
D[B] = 0, P[B] = 2

TABLE 20-continued

FORMAT FOR DISPLAYING RESULTS FROM STAGE 3
OF THE ANALYSIS
Drug 1, x ≧ 30, TEL = 3, TEC ≧ 2 paired with
Drug 2, TEL = 3, TEC ≧ 2

Symptom Severity

|  | y ≧ 1 | y ≧ 2 | y ≧ 3 | y = 4 | Extremes |
|---|---|---|---|---|---|
| B/H score |  |  |  |  |  |
| S |  |  |  |  |  |
| S$_{denom}$ |  |  |  |  |  |
| D[B] = 0, P[B] = 3 |  |  |  |  |  |
| B/H score |  |  |  |  |  |
| S |  |  |  |  |  |
| S$_{denom}$ |  |  |  |  |  |
| D[B] = 1, P[B] = 1 |  |  |  |  |  |
| B/H score |  |  |  |  |  |
| S |  |  |  |  |  |
| S denom |  |  |  |  |  |
| D[B] = 1, P[B] = 2 |  |  |  |  |  |
| B/H score |  |  |  |  |  |
| S |  |  |  |  |  |
| S$_{denom}$ |  |  |  |  |  |
| D[B] = 1, P[B] = 3 |  |  |  |  |  |
| B/H score |  |  |  |  |  |
| S |  |  |  |  |  |
| S$_{denom}$ |  |  |  |  |  |
| D[B] = 2, P[B] = 1 |  |  |  |  |  |
| B/H score |  |  |  |  |  |
| S |  |  |  |  |  |
| S$_{denom}$ |  |  |  |  |  |
| D[B] = 2, P[B] = 2 |  |  |  |  |  |
| B/H score |  |  |  |  |  |
| S |  |  |  |  |  |
| S$_{denom}$ |  |  |  |  |  |
| D[B] = 2, P[B] = 3 |  |  |  |  |  |
| B/H score |  |  |  |  |  |
| S |  |  |  |  |  |
| S$_{denom}$ |  |  |  |  |  |
| Extremes |  |  |  |  |  |
| B/H score |  |  |  |  |  |
| S |  |  |  |  |  |
| S$_{denom}$ |  |  |  |  |  |

While the best mode for carrying out the invention has been described in detail, those familiar with the art to which this invention relates will recognize various alternative designs and embodiments for practicing the invention as defined by the following claims.

APPENDIX

| | |
|---|---|
| 1. | BACKGROUND OF THE INVENTION |
| 1.1. | Technical Field |
| 1.2. | Description of Related Art |
| 1.2.1. | Fundamental Limitations of the Statistical Method and a Derivative Nexus of Problems and Needs |
| 1.2.1.1. | Limitations of Correlation Coefficients |
| 1.2.1.2. | Limitations of Conventional Group Clinical Trial Designs and Procedures |
| 1.2.1.2.1. | The Targeting Problem in Clinical Trials |
| 1.2.1.2.1.1. | The Need to Identify Treatment Responders, Placebo Responders, and Predictors of Differential Response |
| 1.2.1.2.1.2. | The Need for Both Detailed and Comprehensive Information |
| 1.2.1.2.1.2.1. | The Need for Many Analyses and the Problem of Many Tests |
| 1.2.1.2.1.2.2. | Some Problems with Multivariate Analyses |
| 1.2.1.2.1.2.3. | The Aggregation Problem with Composite Health Measures |
| 1.2.1.2.1.2.3.1. | The Weighting Problem for Composite Health Measures |
| 1.2.1.2.1.2.4. | Some Problems Involving Hierarchies of Health Measures |
| 1.2.1.2.1.2.5. | Some Problems Involving the Separation of Safety and Efficacy Evaluations |
| 1.2.1.2.1.3. | The Need to Use Early Responses to Predict Later Responses |
| 1.2.1.2.1.4. | The Classification Problem |
| 1.2.1.2.2. | The Efficiency Problem in Clinical Trials |
| 1.2.1.2.2.1. | Problems that Derive from Unreliable Measures of Treatment and Health |
| 1.2.1.2.2.2. | Problems Related to Limitations in Using Independent Variables as Within Patient Variables |
| 1.2.1.2.2.3. | The Baseline Problem |
| 1.2.1.2.2.4. | The Problem of Missing and Erroneous Data |
| 1.2.1.2.3. | Problems Involving Soft Analyses of Clinical Trial Data |
| 1.2.1.2.4. | Problems Related to Incompatibilities between Procedures for Rigorous Science and Quality Clinical Care |
| 1.2.1.2.5. | The Failure to Reveal Longitudinal Associations: An Example |
| 1.2.1.2.6. | The Need to Investigate Dynamic Functioning Including Internal Control |
| 1.2.2. | Citations |
| 2. | BRIEF SUMMARY OF THE INVENTION |
| 2.1. | Overview of MQALA's Features |
| 2.2. | Overview of MQALA's Applications and Uses |
| 2.3. | How MQALA Is Distinct from the Statistical Method |
| 2.4. | MQALA and the Statistical Method often are Complementary |
| 2.5. | MQALA, the Statistical Method, and the Experimental Method |
| 2.6. | MQALA, the Statistical Method, and Epidemiologic Investigations: An Example |
| 2.7. | How MQALA Addresses the Nexus of Limitations, Problems, and Needs |
| 2.7.1. | Addressing the Fundamental Limitations of the Statistical Method |
| 2.7.1.1. | Addressing the Limitations of Correlation Coefficients |
| 2.7.1.2. | Addressing the Limitations of Conventional Group Clinical Trial Designs and Procedures |
| 2.7.1.2.1. | Addressing the Targeting Problem in Clinical Trials |
| 2.7.1.2.1.1. | Addressing the Need to Identify Treatment Responders, Placebo Responders, and Predictors of Differential Response |
| 2.7.1.2.1.2. | Addressing the Need for both Detailed and Comprehensive Information |
| 2.7.1.2.1.2.1. | Addressing the Need for Many Analyses and the Problem of Many Tests |
| 2.7.1.2.1.2.2. | Addressing the Problems with Multivariate Analyses |
| 2.7.1.2.1.2.3. | Addressing the Aggregation Problem with Composite Health Measures |
| 2.7.1.2.1.2.3.1. | Addressing the Weighting Problem for Composite Health Measures |
| 2.7.1.2.1.2.4. | Addressing the Problems Involving Hierarchies of Health Measures |
| 2.7.1.2.1.2.5. | Addressing the Problems Involving the Separation of Safety and Efficacy Evaluations |
| 2.7.1.2.1.3. | Addressing the Need to Use Early Responses to Predict Later Responses |
| 2.7.1.2.1.4. | Addressing the Classification Problem |
| 2.7.1.2.2. | Addressing the Efficiency Problem in Clinical Trials |
| 2.7.1.2.2.1. | Addressing Problems that Derive from Unreliable Measures of Treatment and Health |
| 2.7.1.2.2.2. | Addressing Problems Related to Limitations in Using Independent Variables as Within Patient Variables |
| 2.7.1.2.2.3. | Addressing the Baseline Problem |
| 2.7.1.2.2.4. | Addressing the Problem of Missing or Erroneous Data |
| 2.7.1.2.3. | Addressing Problems Involving Soft Analyses of Clinical Trial Data |
| 2.7.1.2.4. | Addressing Problems Related to Incompatibilities between Procedures for Rigorous Science and Quality Clinical Care |
| 2.7.1.2.5. | Addressing the Failure to Reveal Longitudinal Associations |

APPENDIX-continued

| | |
|---|---|
| 2.7.1.2.6. | Addressing the Need to Investigate Dynamic Functioning |
| 2.8. | Using MQALA and the Statistical Method to Best Advantage in the Age of the Internet |
| 2.8.1. | Using MQALA and the Statistical Method to Best Advantage from an Epistemological Perspective |
| 2.8.2. | Using MQALA and the Statistical Method to Best Advantage from a Practical Perspective |
| 2.8.3. | The Impact of the Statistical Method and the Promise of MQALA from a Historical Perspective |
| 2.8.4. | Conclusion |
| 2.9. | Definitions |
| 3. | BRIEF DESCRIPTION OF THE SEVERAL VIEWS OF THE DRAWING |
| 4. | DETAILED DESCRIPTION OF THE INVENTION |
| 4.1. | Detailed Descriptions of the Features Needed To Understand MQALA |
| 4.1.1. | Computing LASs for Dichotomous Series |
| 4.1.2. | Converting Dimensional Series into Sets of Dichotomous Series |
| 4.1.3. | Summarizing LAS Arrays |
| 4.1.4. | Mathematical Transformations of Dimensional Series before Converting into Sets of Dichotomous Series |
| 4.1.5. | Set and Change Signs of LASs to Form Benefit/Harm Scores |
| 4.1.6. | Measures of Strength of Longitudinal Association |
| 4.1.7. | Episode Length |
| 4.1.8. | Episode Criterion |
| 4.1.9. | Delay |
| 4.1.10. | Persistence |
| 4.1.11. | Boolean Events |
| 4.1.12. | Delay and Persistence after Boolean Events |
| 4.1.13. | Transition Events |
| 4.1.14. | Other Procedures Applied to Form Additional Dichotomous Series |
| 4.1.15. | Sequential Analysis of LASs and the Strength of Longitudinal Association Measures |
| 4.1.16. | Analyzing Time-Series Data with MQALA |
| 4.1.17. | Predictive Indices |
| 4.1.18. | Statistical Analysis of LASs and Measures Based on LASs |
| 4.1.19. | Differential Weighting of LASs for Various Events and Variables |
| 4.1.20. | Averaging B/H Scores to Obtain Overall B/H Scores |
| 4.1.21. | Protocols for Scoring Longitudinal Associations |
| 4.1.22. | Targeting Subsets of Dichotomous Series for Additional Analyses |
| 4.1.23. | Changing how Variables Function in Analyses before Re-analyses of Data |
| 4.1.24. | Implementation of MQALA on the Internet |
| 4.2. | Detailed Descriptions of the Applications and Uses of MQALA |
| 4.2.1. | The Application of MQALA Broadly Described |
| 4.2.1.1. | Use of MQALA to Monitor Changing Longitudinal Associations and the Emergence of New Entities |
| 4.2.1.2. | Use of MQALA for Data Mining |
| 4.2.1.3. | Use of MQALA to Form Databases and Knowledge Bases |
| 4.2.2. | Application of MQALA for the Quantification and Analysis of the Benefit and Harm of Many Treatments and Other Exposures |
| 4.2.2.1. | Use of the Health Application on the Internet to Conduct Group Clinical Trials of Treatments for the Management of Chronic Disorders |
| 4.2.2.2. | Use of the Health Application for Health-Effect Monitoring |
| 4.2.3. | Application of MQALA for the Quantification and Analysis of Internal Control in Adaptive Systems |
| 4.2.3.1. | Use of the Internal Control Application for Living Things |
| 4.2.3.2. | Use of the Internal Control Application for Machines and/or Devices |
| 4.2.3.3. | Use of the Internal Control Application to Monitor Internal Control |
| 4.2.3.4. | Use of the Internal Control Application for Standardized Tests |
| 4.2.4. | Application of MQALA for Analyses Involving Serial Functional Images |
| 4.2.4.1. | Use of the Imaging Application to Image Apparent Responses to Stimuli, Tasks, and Exposures |
| 4.2.4.2. | Use of the Imaging Application to Image Apparent Internal Control |
| 4.2.4.3. | Use of the Imaging Application to Investigate the Apparent Control of Imaged Activity on Behavior |
| 4.2.4.4. | Use of the Imaging Application to Create Images that Display LASs, Measures Derived from LASs, and Levels of Analysis Parameters |
| 4.2.5. | Application of MQALA to Analyze Behavior |
| 4.2.6. | Application of MQALA to Analyze Behavior Modification and Organization |
| 4.2.6.1. | Use of the Behavior Modification and Organization Application for Living Things |
| 4.2.6.2. | Use of the Behavior Modification and Organization Application for Machines, Devices, and Software Systems |
| 4.2.6.3. | Use of the Behavior Modification and Organization Application to Quantify, Discover, Analyze, and Describe Individual Differences in Responsiveness to Behavior Modification |
| 4.2.6.4. | Use of the Behavior Modification and Organization Application to Create Machines, Devices, and Software Systems Whose Behavior Can Be Modified |
| 4.3. | Overview of the Features, Applications, and Uses of MQALA That Are Major Improvements |
| 4.4. | Description of the Preferred Embodiment |
| 4.4.1. | Introduction |
| 4.4.2. | Primary Demonstration |
| 4.4.3. | Overview of Steps and Stages for Analyses with MQALA |
| 4.4.3.1. | Preliminary Steps |
| 4.4.3.2. | Stage 1 - Quantify Longitudinal Associations as Functions of Required Analysis Parameters |
| 4.4.3.3. | Stage 2 - Quantify Longitudinal Associations as Functions of Selected Optional Analysis Parameters |
| 4.4.3.4. | Stage 3 - Quantify Longitudinal Associations for Optional Boolean Independent Events and Additional Temporal Analysis Parameters |
| 4.4.3.4.1. | Discussion of Primary Demonstration |
| 4.4.3.5. | Stage 4 - Quantify Longitudinal Associations for Optional Boolean Dependent Events |
| 4.4.3.6. | Stage 5 - Quantify Longitudinal Associations for Additional Analysis Options |
| 4.4.3.7. | Stage 6 - Quantify Longitudinal Associations as Functions of Period or Time (Sequential LASs and B/H Scores) |
| 4.4.3.8. | Stage 7 - Use LASs to Compute Optional Predictive Indices |
| 4.4.3.9. | Stage 8 - Offer the Option Reanalyzing Data after Resetting Functions of Variables and Analytic Options |
| 4.4.4. | Presentation and Summarization of Results |
| 5. | Appendix |
| 6. | Claims |

What is claimed is:

1. A computational method to perform empirical induction, the method comprised of utilizing a computer or computer system programmed to:

convert any dimensional series of repeated measures data into sets of dichotomous series, the data being obtained by repeatedly measuring attributes or events for an individual entity or the individual's environment on two or more occasions over an interval of time, at least one variable functioning as an independent variable and being used to define independent events and at least one variable functioning as a dependent variable and being used to define dependent events;

apply at least one feature to any dichotomous series or any set of dichotomous series to form additional dichotomous series of events that may be associated longitudinally, wherein the at least one feature is selected from the group consisting of episode length, episode criterion, persistence, Boolean events, Boolean event scope, Boolean event criterion, delay after Boolean events, and persistence after Boolean events;

compute a longitudinal association score (LAS) for each selected combination of one dichotomous series of independent events with one dichotomous series of dependent events, each LAS and any array of LASs being descriptive of the amount of evidence and the positive or negative direction of any longitudinal association that may obtain between the independent variable(s) and the dependent variable(s) for the individual.

2. The method as claimed in claim 1 wherein the at least one feature is episode length, an analysis parameter that is applied to form additional dichotomous series of events that may be associated longitudinally.

3. The method as claimed in claim 2 wherein the at least one feature is episode criterion, an analysis parameter that is applied to form additional dichotomous series of events that may be associated longitudinally.

4. The method as claimed in claim 1 wherein the at least one feature is persistence, an analysis parameter that is applied to a dichotomous series of independent events to form additional dichotomous series of independent events that may be associated longitudinally with dependent events.

5. The method as claimed in claim 1 wherein the at least one feature is application of any or all of the Boolean operators (such as AND, OR, XOR, NOR, NOT) that are applied to form additional dichotomous series of events that may be associated longitudinally.

6. The method as claimed in claim 1 wherein the at least one feature is Boolean event scope that is applied to form additional dichotomous series of events that may be associated longitudinally.

7. The method as claimed in claim 6 wherein the at least one feature is Boolean event criterion that is applied together with Boolean event scope to form additional dichotomous series of events that may be associated longitudinally.

8. The method as claimed in claims 5, 6, or 7 wherein the at least one feature is delay after Boolean events, an analysis parameter that is applied to dichotomous series for Boolean independent events to form additional dichotomous series of independent events that may be associated longitudinally with dependent events.

9. The method as claimed in claims 5, 6, or 7 wherein the at least one feature is persistence after Boolean events, an analysis parameter that is applied to the dichotomous series for Boolean independent events to form additional dichotomous series of independent events that may be associated longitudinally with dependent events.

10. The method as claimed in claim 1 in which LASs or any measures derived at least in part from LASs are analyzed sequentially over measurement occasions.

11. The method as claimed in claim 10 that is used to monitor changing longitudinal associations and the emergence of new entities.

12. The method as claimed in claim 1 in which the series are time-series data.

13. The method as claimed in claim 1 in which LASs and intermediate results from calculating LASs are further used to calculate values of a predictive index or predictive indices.

14. The method as claimed in claim 1 in which procedures for calculating or computing LASs and measures derived at least in part from LASs are specified in a scoring protocol or scoring protocols.

15. The method as claimed in claim 1 that is implemented on the Internet.

16. The method as claimed in claim 1 that is used for data mining.

17. The method as claimed in claim 16 that is implemented on the Internet.

18. A database or knowledge base that is completely or partially obtained by use of the method as claimed in claim 1.

19. The method as claimed in claim 1 that is applied to medical and health data in which the data are about one or more patients, subjects, or other individuals, said data about each individual comprising values for one or more independent variables that may affect the health of the individual, the data for the independent variable(s) being used to define exposure or treatment events, and values for one or more dependent variables that are measures of the individual's health, the data for the dependent variable(s) being used to define outcome or health events and in which the signs of LASs may be set so that LASs become B/H scores.

20. The method as claimed in claim 19 that is implemented on the Internet.

21. Use of the method as claimed in claim 20 on the Internet to conduct group clinical trials of treatments used to manage or control chronic disorders.

22. Use of the method as claimed in claim 19 for the conduct of health-effect monitoring.

23. The method as claimed in claim 22 that is implemented on the Internet.

24. The method as claimed in claim 1 that is applied to measure and analyze internal control in adaptive systems in which the repeated measures data are about one or more individual adaptive systems, said data about each individual comprising values for one or more independent variables, each independent variable being a measure of an attribute of the individual or indicating the occurrence or non-occurrence of an event for the individual, the data for the independent variable(s) being used to define controlling events, and values for one or more dependent variables, each dependent variable being a measure of an attribute of the individual or indicating the occurrence or non-occurrence of an event for the individual, the data for the dependent variable(s) being used to define controlled events.

25. The method as claimed in claim 24 that is implemented on the Internet.

26. Use of the method as claimed in claim 24 to quantify internal control in living things.

27. The method as claimed in claim 26 that is implemented on the Internet.

28. Use of the method as claimed in claim 24 to quantify internal control in machines or devices.

29. The method as claimed in claim 28 that is implemented on the Internet.

30. Use of the method as claimed in claim 24 to monitor internal control.

31. The method as claimed in claim 30 that is implemented on the Internet.

32. Use of the method as claimed in claim 24 to quantify internal control under standardized test conditions.

33. The method as claimed in claim 32 that is implemented on the Internet.

34. The method as claimed in claim 1 that is applied to analyze serial functional images in which the repeated measures data are about one or more individuals, said data about each individual including one or more serial pixel variables or one or more serial region of interest variables.

35. The method as claimed in claim 34 that is implemented on the Internet.

36. The method as claimed in claim 34 in which the independent variable(s) are measures of stimuli, tasks, or exposures that are used to define stimulus, task, or exposure events and the dependent variable(s) are serial pixel variables or serial region of interest variables used to define response events.

37. The method as claimed in claim 36 that is implemented on the Internet.

38. The method as claimed in claim 34 in which both the independent and dependent variables are serial pixel or serial region of interest variables so that the LASs provided by MQALA are used to indicate internal control in the object that is imaged.

39. The method as claimed in claim 38 that is implemented on the Internet.

40. The method as claimed in claim 34 in which the independent variable(s) are serial pixel or serial region of interest variables and the dependent variables are measures of behaviors of the individual or events or variables in the individual's environment that may be affected by the individual so that MQALA is used to image activity in the object that controls the behavior of the object or controls the effects of the object's behavior on the individual's environment.

41. The method as claimed in claim 40 that is implemented on the Internet.

42. An image or images that portray LASs, measures derived at least in part from LASs, or levels of analysis parameters, said LASs, measures, or levels being obtained by use of the method as claimed in claim 34.

43. The method as claimed in claim 1 that is applied to analyze behavior in which the repeated measures data are about one or more individuals, said data about each individual comprising values for one or more independent variables, each independent variable being a measure of a stimulus or potential stimulus that may affect the individual, the data for the independent variable(s) being used to define stimuli or stimulus events, and values for one or more dependent variables, each dependent variable being a measure of a behavior or potential behavior, the data for the dependent variable(s) being used to define responses or response events.

44. The method as claimed in claim 43 that is implemented on the Internet.

45. The method as claimed in claim 1 that is applied to analyze behavior modification and organization in which the repeated measures data are about one or more individuals, said data about each individual comprising values for at least two variables comprising any combination of stimulus and response variables, the data for the stimulus variable(s) being used to define stimuli or stimulus events and the data for the response variable(s) being used to define responses or response events.

46. The method as claimed in claim 45 that is implemented on the Internet.

47. Use of the method as claimed in claim 45 to investigate behavior modification and organization in living things.

48. The method as claimed in claim 47 that is implemented on the Internet.

49. Use of the method as claimed in claim 45 to investigate behavior modification and organization in machines, devices, and software systems.

50. The method as claimed in claim 49 that is implemented on the Internet.

51. Use of the method as claimed in claim 45 to quantify, discover, analyze, and describe individual differences in responsiveness to behavior modification.

52. The method as claimed in claim 51 that is implemented on the Internet.

53. A machine, device, or software system whose behavior is modified by implementation of the method as claimed in claim 45.

54. A computer system to perform empirical induction, the system comprising:

means for converting any dimensional series of repeated measures data into sets of dichotomous series, the data being obtained by repeatedly measuring attributes or events for an individual entity or the individual's environment on two or more occasions over an interval of time, at least one variable functioning as an independent variable and being used to define independent events and at least one variable functioning as a dependent variable and being used to define dependent events;

means for applying at least one feature to any dichotomous series or any set of dichotomous series to form additional dichotomous series of events that may be associated longitudinally, wherein the at least one feature is selected from the group consisting of episode length, episode criterion, persistence, Boolean events, Boolean event scope, Boolean event criterion, delay after Boolean events, and persistence after Boolean events;

means for computing a LAS for each selected combination of one dichotomous series of independent events with one dichotomous series of dependent events, each LAS and any array of LASs being descriptive of the amount of evidence and the positive or negative direction of any longitudinal association that may obtain between the independent variable(s) and the dependent variable(s) for the individual.

55. The system as claimed in claim 54 wherein the at least one feature is episode length, an analysis parameter that is applied to form additional dichotomous series of events that may be associated longitudinally.

56. The system as claimed in claim 55 wherein the at least one feature is episode criterion, an analysis parameter that is applied to form additional dichotomous series of events that may be associated longitudinally.

57. The system as claimed in claim 54 wherein the at least one feature is persistence, an analysis parameter that is applied to a dichotomous series of independent events to form additional dichotomous series of independent events that may be associated longitudinally with dependent events.

58. The system as claimed in claim 54 wherein the at least one feature is application of any or all of the Boolean operators (such as AND, OR, XOR, NOR, NOT) that are applied to form additional dichotomous series of events that may be associated longitudinally.

59. The system as claimed in claim 54 wherein the at least one feature is Boolean event scope that is applied to form additional dichotomous series of events that may be associated longitudinally.

60. The system as claimed in claim 59 wherein the at least one feature is Boolean event criterion that is applied together with Boolean event scope to form additional dichotomous series of events that may be associated longitudinally.

61. The system as claimed in claims 58, 59, or 60 wherein the at least one feature is delay after Boolean events, an analysis parameter that is applied to dichotomous series for Boolean independent events to form additional dichotomous series of independent events that may be associated longitudinally with dependent events.

62. The system as claimed in claims 58, 59, or 60 wherein the at least one feature is persistence after Boolean events, an analysis parameter that is applied to the dichotomous series for Boolean independent events to form additional dichotomous series of independent events that may be associated longitudinally with dependent events.

63. The system as claimed in claim 54 in which LASs or any measures derived at least in part from LASs are analyzed sequentially over measurement occasions.

64. The system as claimed in claim 63 that is used to monitor changing longitudinal associations and the emergence of new entities.

65. The system as claimed in claim 54 in which the series are time-series.

66. The system as claimed in claim 54 in which LASs and intermediate results from calculating LAS are further used to calculate values of a predictive index or predictive indices.

67. The system as claimed in claim 54 in which procedures for calculating or computing LASs and measures derived at least in part from LASs are specified in a scoring protocol or scoring protocols.

68. The system as claimed in claim 54 in which the computer is programmed to provide the option of changing how independent and dependent variables function in analyses before data are reanalyzed.

69. The system as claimed in claim 54 that is implemented on the Internet.

70. The system as claimed in claim 54 that is used for data mining.

71. The system as claimed in claim 70 that is implemented on the Internet.

72. The system as claimed in claim 54 that is applied to medical and health data in which the data are about one or more individual patients or subjects, said data about each individual comprising values for one or more independent variables that may affect the health of the patient or subject, the data for the independent variable(s) being used to define exposure or treatment events, and values for one or more dependent variables that are measures of the patient's or subject's health, the data for the dependent variable(s) being used to define outcome or health events and in which the signs of LASs may be set so that LASs become B/H scores.

73. The system as claimed in claim 72 that is implemented on the Internet.

74. Use of the system as claimed in claim 73 on the Internet to conduct group clinical trials of treatments used to manage or control chronic disorders.

75. Use of the system as claimed in claim 72 for the conduct of health-effect monitoring.

76. The system as claimed in claim 75 that is implemented on the Internet.

77. The system as claimed in claim 54 that is applied to measure and analyze internal control in adaptive systems in which the repeated measures data are about one or more individual adaptive systems, said data for each individual comprising values for one or more independent variables, each independent variable being a measure of an attribute of the individual or indicating the occurrence or non-occurrence of an event for the individual, the data for the independent variable(s) being used to define controlling events, and values for one or more dependent variables, each dependent variable being a measure of an attribute of the individual or indicating the occurrence or non-occurrence of an event for the individual, the data for the dependent variable(s) being used to define controlled events.

78. The system as claimed in claim 77 that is implemented on the Internet.

79. Use of the system as claimed in claim 77 to quantify internal control in living things.

80. The system as claimed in claim 79 that is implemented on the Internet.

81. Use of the system as claimed in claim 77 to quantify internal control in machines or devices.

82. The system as claimed in claim 81 that is implemented on the Internet.

83. Use of the system as claimed in claim 82 to monitor internal control.

84. The system as claimed in claim 83 that is implemented on the Internet.

85. Use of the system as claimed in claim 77 to quantify internal control under standardized test conditions.

86. The system as claimed in claim 85 that is implemented on the Internet.

87. The system as claimed in claim 54 that is applied to analyze serial functional images in which the repeated measures data are about one or more individuals, said data about each individual including one or more serial pixel or serial region of interest variables.

88. The system as claimed in claim 87 that is implemented on the Internet.

89. The system as claimed in claim 87 in which the independent variable(s) are measures of stimuli, tasks, or exposures that are used to define stimulus, task, or exposure events and the dependent variable(s) are serial pixel or serial region of interest variables used to define response events.

90. The system as claimed in claim 89 that is implemented on the Internet.

91. The system as claimed in claim 87 in which both the independent and dependent variables are serial pixel or serial region of interest variables so that the LASs provided by MQALA are used to indicate internal control in the object that is imaged.

92. The system as claimed in claim 91 that is implemented on the Internet.

93. The system as claimed in claim 87 in which the independent variable(s) are serial pixel or serial region of interest variables and the dependent variables are measures of behaviors of the individual or events or variables in the individual's environment that may be affected by the individual so that MQALA is used to image activity in the object that controls the behavior of the object or controls the effects of the object's behavior on the individual's environment.

94. The system as claimed in claim 93 that is implemented on the Internet.

95. The system as claimed in claim 54 that is applied to analyze behavior in which the repeated measures data are about one or more individuals, said data for each individual comprising values for one or more independent variables, each independent variable being a measure of a stimulus or potential stimulus that may affect the individual, the data for the independent variable(s) being used to define stimuli or stimulus events, and values for one or more dependent variables, each dependent variable being a measure of a behavior or potential behavior, the data for the dependent variable(s) being used to define responses or response events.

96. The system as claimed in claim 95 that is implemented on the Internet.

97. The system as claimed in claim 54 that is applied to analyze behavior modification and organization in which the repeated measures data are about one or more individuals, said data for each individual comprising values for at least two variables comprising any combination of stimulus and response variables, the data for the stimulus variable(s) being used to define stimuli or stimulus events and the data for the response variable(s) being used to define responses or response events.

98. The system as claimed in claim 97 that is implemented on the Internet.

99. Use of the system as claimed in claim 97 to investigate behavior modification and organization in living things.

100. The system as claimed in claim 99 that is implemented on the Internet.

101. Use of the system as claimed in claim 97 to investigate behavior modification and organization in machines, devices, and software systems.

102. The system as claimed in claim 101 that is implemented on the Internet.

103. Use of the system as claimed in claim 97 to quantify, discover, analyze, and describe individual differences in responsiveness to behavior modification.

104. The system as claimed in claim 103 that is implemented on the Internet.

* * * * *

UNITED STATES PATENT AND TRADEMARK OFFICE
CERTIFICATE OF CORRECTION

PATENT NO. : 6,317,700 B1  
DATED : November 13, 2001  
INVENTOR(S) : Curtis A. Bagne It is certified that error appears in the above-identified patent and that said Letters Patent is hereby corrected as shown below:

<u>Title page,</u>
Item [76], delete "2511 Tarragona Way, Troy, MI 48098" and replace with
-- 2971 Vineyards Drive, Troy, MI 48098 --.

Signed and Sealed this

Third Day of September, 2002

*Attest:*

*Attesting Officer*

JAMES E. ROGAN
*Director of the United States Patent and Trademark Office*